US012613712B2

(12) United States Patent
Alper

(10) Patent No.: US 12,613,712 B2
(45) Date of Patent: Apr. 28, 2026

(54) SYSTEM AND METHOD TO SUPPORT HUMAN DATA ENTRY AND CONVERSION TO EXPRESSION IN INTERMEDIATE FORM FOR RESEARCH KNOWLEDGE

(71) Applicant: Brian Scott Alper, Franklin, NC (US)

(72) Inventor: Brian Scott Alper, Franklin, NC (US)

(*) Notice: Subject to any disclaimer, the term of this patent is extended or adjusted under 35 U.S.C. 154(b) by 733 days.

(21) Appl. No.: 18/060,055

(22) Filed: Nov. 30, 2022

(65) Prior Publication Data

US 2023/0185587 A1 Jun. 15, 2023

Related U.S. Application Data

(60) Provisional application No. 63/289,407, filed on Dec. 14, 2021.

(51) Int. Cl.
*G06F 9/45* (2006.01)
*G06F 9/451* (2018.01)
*G06F 9/54* (2006.01)
*G06F 3/0482* (2013.01)

(52) U.S. Cl.
CPC ................ *G06F 9/451* (2018.02); *G06F 9/54* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 11,947,537 B1 * | 4/2024 | Vig | ................... | G06F 16/24542 |
| 2013/0018948 A1 * | 1/2013 | Douillet | .................. | G06F 9/541 |
| | | | | 709/204 |
| 2020/0293541 A1 * | 9/2020 | Pigeon | .................. | G06F 16/258 |
| 2020/0334568 A1 * | 10/2020 | Liden | ................ | H04M 3/42382 |
| 2020/0402058 A1 * | 12/2020 | Zhou | ........................... | G06F 9/54 |
| 2021/0004407 A1 * | 1/2021 | Huang | .............. | G06F 16/24534 |
| 2021/0165836 A1 * | 6/2021 | Elenchin | ............... | G06F 9/5005 |

FOREIGN PATENT DOCUMENTS

GB           2549929 A  * 11/2017  ............. G06F 40/47

* cited by examiner

*Primary Examiner* — Craig C Dorais
(74) *Attorney, Agent, or Firm* — Grossman, Tucker, Perreault & Pfleger, PLLC

(57) ABSTRACT

In an approach to acquiring data representing research knowledge in a non-standard form and converting such data to an intermediate form, a system includes: a data storage server; one or more application programming interfaces (APIs); and a computing device. The computing device is configured to: display a creator graphical user interface (GUI) for entry of a first new data by a user; receive the first new data from the user; convert the first new data into a first current data in the intermediate form using a first API of the one or more APIs; store the first current data in the data storage server; convert the first current data into a viewable data in a human-readable display form using a second API of the one or more APIs; and display the viewable data in one or more reader GUIs.

16 Claims, 123 Drawing Sheets

BEST AVAILABLE IMAGE

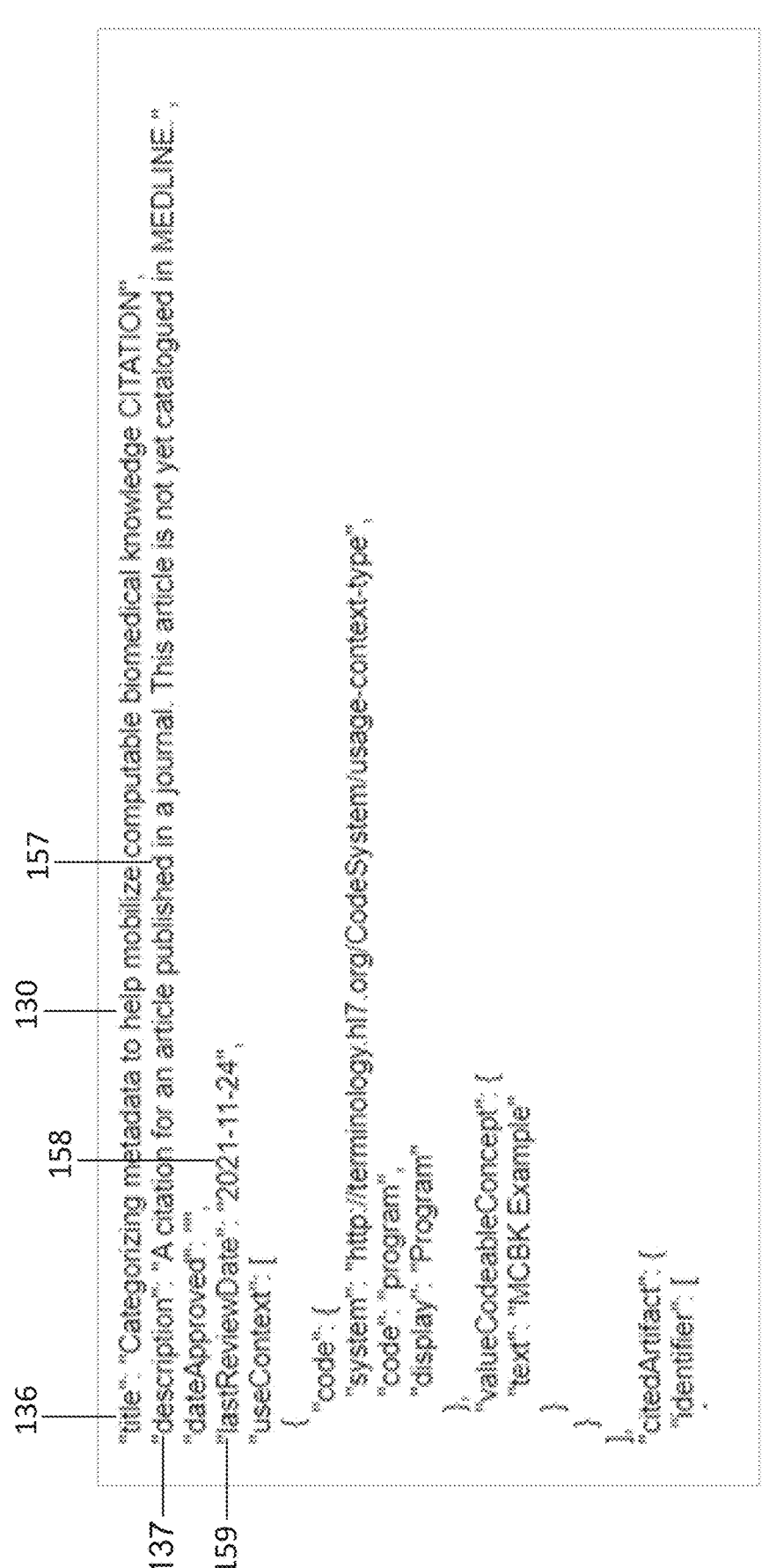

```
"title": "Categorizing metadata to help mobilize computable biomedical knowledge CITATION",
"description": "A citation for an article published in a journal. This article is not yet catalogued in MEDLINE.",
"dateApproved": "",
"lastReviewDate": "2021-11-24",
"useContext": [
  {
    "code": {
      "system": "http://terminology.hl7.org/CodeSystem/usage-context-type",
      "code": "program",
      "display": "Program"
    },
    "valueCodeableConcept": {
      "text": "NCBK Example"
    }
  }
],
"citedArtifact": {
  "identifier": [
```

FIG. 13

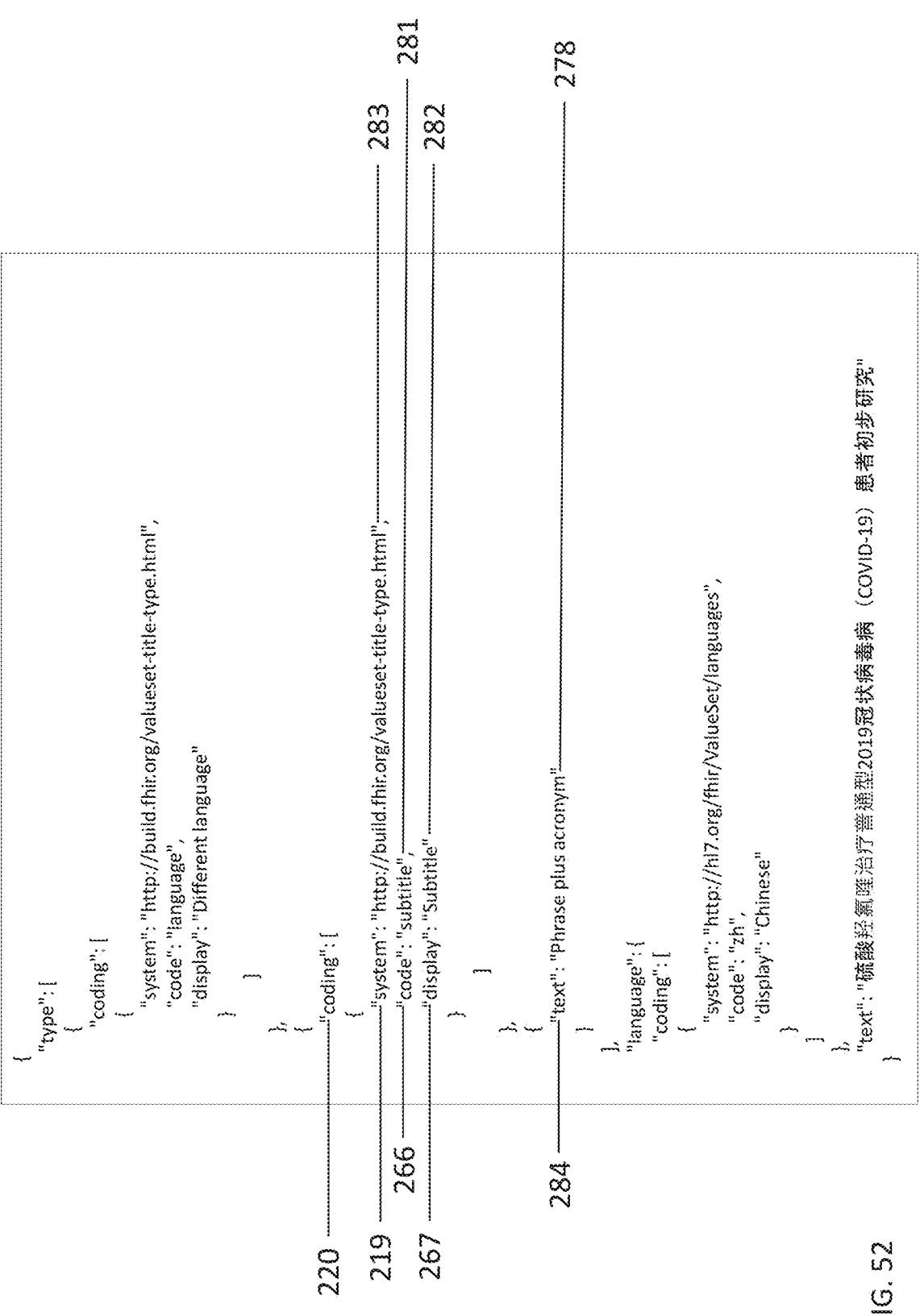

```
{
    "type": [
        {
            "coding": [
                {
                    "system": "http://build.fhir.org/valueset-title-type.html",
                    "code": "language",
                    "display": "Different language"
                }
            ]
        },
        {
            "coding": [
                {
                    "system": "http://build.fhir.org/valueset-title-type.html",
                    "code": "subtitle",
                    "display": "Subtitle"
                }
            ]
        },
    ],
    "text": "Phrase plus acronym"
    },
    "language": {
        "coding": [
            {
                "system": "http://hl7.org/fhir/ValueSet/languages",
                "code": "zh",
                "display": "Chinese"
            }
        ]
    },
    "text": "硫酸羟氯喹治疗普通型2019冠状病毒病（COVID-19）患者初步研究"
}
```

FIG. 52

Classifiers 3311   318   3312   319

| type | Classifiers | Who classified |
|---|---|---|
| Publishing Model | Print-Electronic | Publisher: NLM |
| Chemical | Antiviral Agents; remdesivir; Adenosine Monophosphate; Alanine | Publisher: NLM |
| MeSH heading | Adenosine Monophosphate (analogs & derivatives); Aged; Alanine (adverse effects, analogs & derivatives, therapeutic use); Antiviral Agents; Betacoronavirus; COVID-19; China; Coronavirus Infections; Double-Blind Method; Female; Humans; Infusions, Intravenous; Male; Middle Aged; Negative Results; Pandemics; Pneumonia, Viral; SARS-CoV-2 | Publisher: NLM |
| Publication type | Journal Article; Multicenter Study; Randomized Controlled Trial | Publisher: NLM |
| Knowledge Artifact Type | Journal Article | Publisher: Computable Publishing LLC |
| Supplemental MeSH for Protocol | COVID-19 drug treatment | Publisher: NLM |
| Citation subset | AIM; IM | Publisher: NLM |

FIG. 61

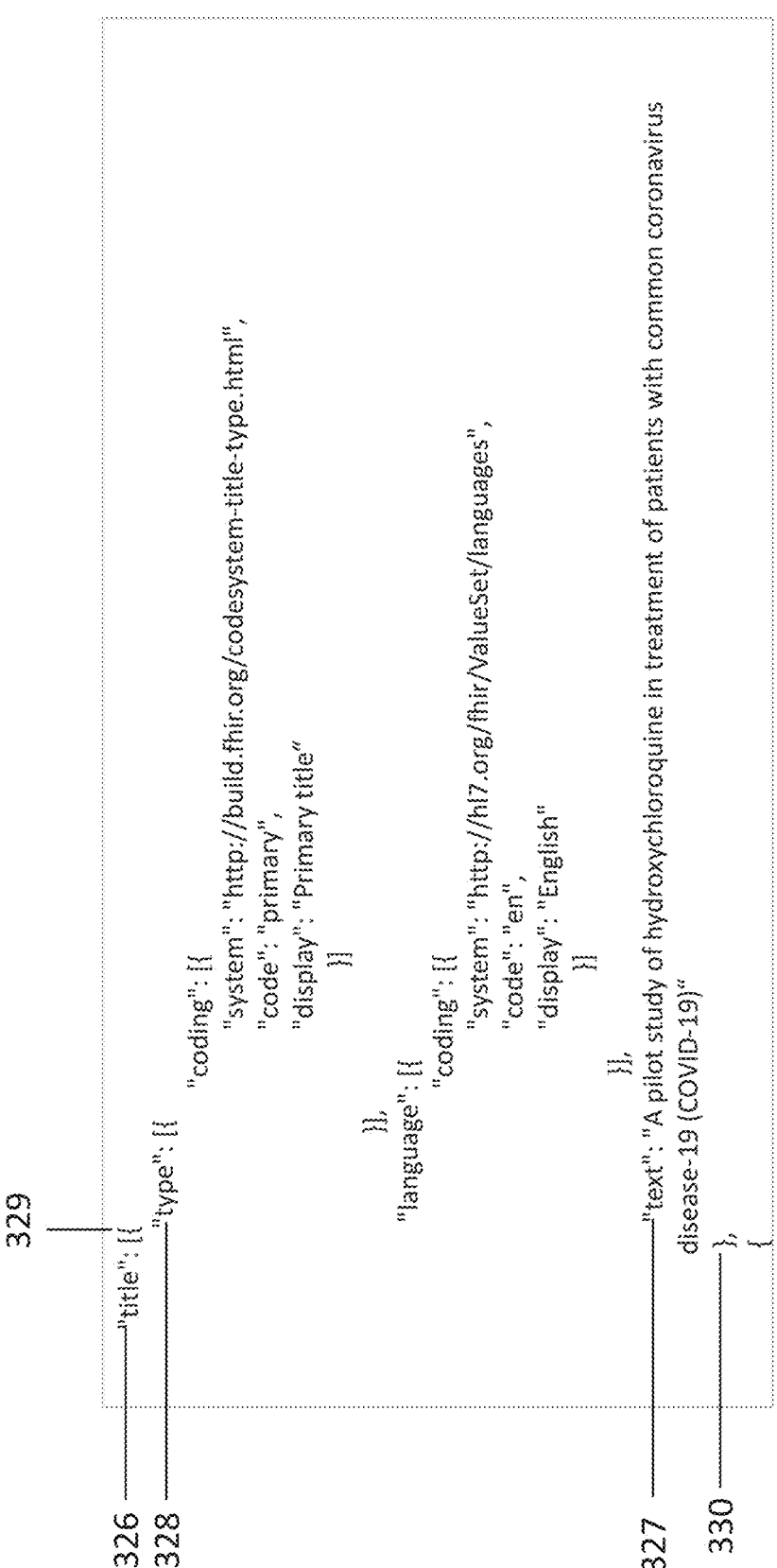

```
"title": [{
    "type": [{
        "coding": [{
            "system": "http://build.fhir.org/codesystem-title-type.html",
            "code": "primary",
            "display": "Primary title"
        }]
    }],
    "language": [{
        "coding": [{
            "system": "http://hl7.org/fhir/ValueSet/languages",
            "code": "en",
            "display": "English"
        }]
    }],
    "text": "A pilot study of hydroxychloroquine in treatment of patients with common coronavirus
disease-19 (COVID-19)"
},
{
```

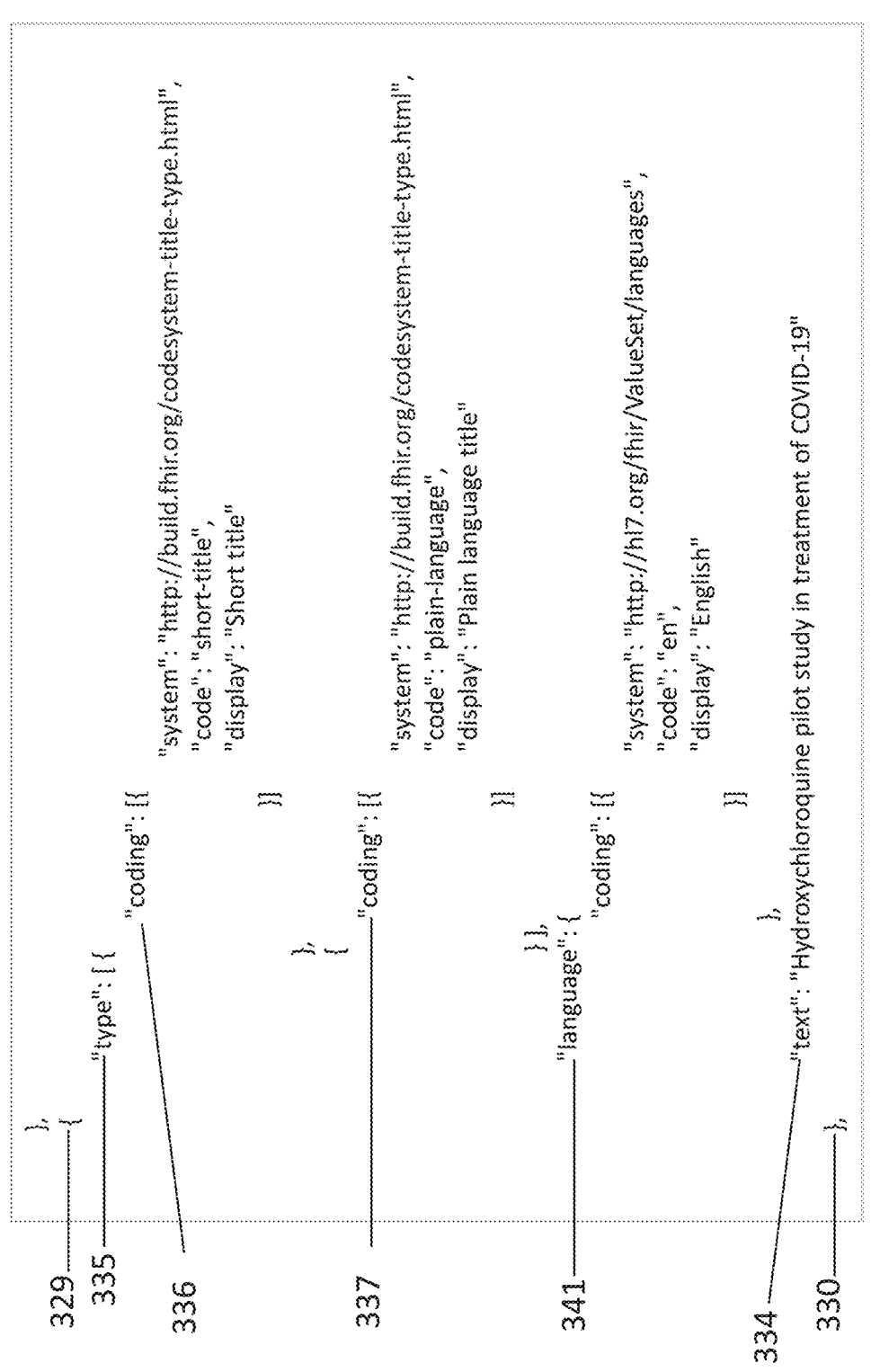

```
329 ──── },
335 ──── {
336 ──── "type": [{
                "coding": [{
                    "system": "http://build.fhir.org/codesystem-title-type.html",
                    "code": "short-title",
                    "display": "Short title"
                }]
            },
            {
337 ──────── "coding": [{
                    "system": "http://build.fhir.org/codesystem-title-type.html",
                    "code": "plain-language",
                    "display": "Plain language title"
                }]
            }],
341 ──── "language": {
                "coding": [{
                    "system": "http://hl7.org/fhir/ValueSet/languages",
                    "code": "en",
                    "display": "English"
                }]
            },
334 ──── "text": "Hydroxychloroquine pilot study in treatment of COVID-19"
330 ──── },
```

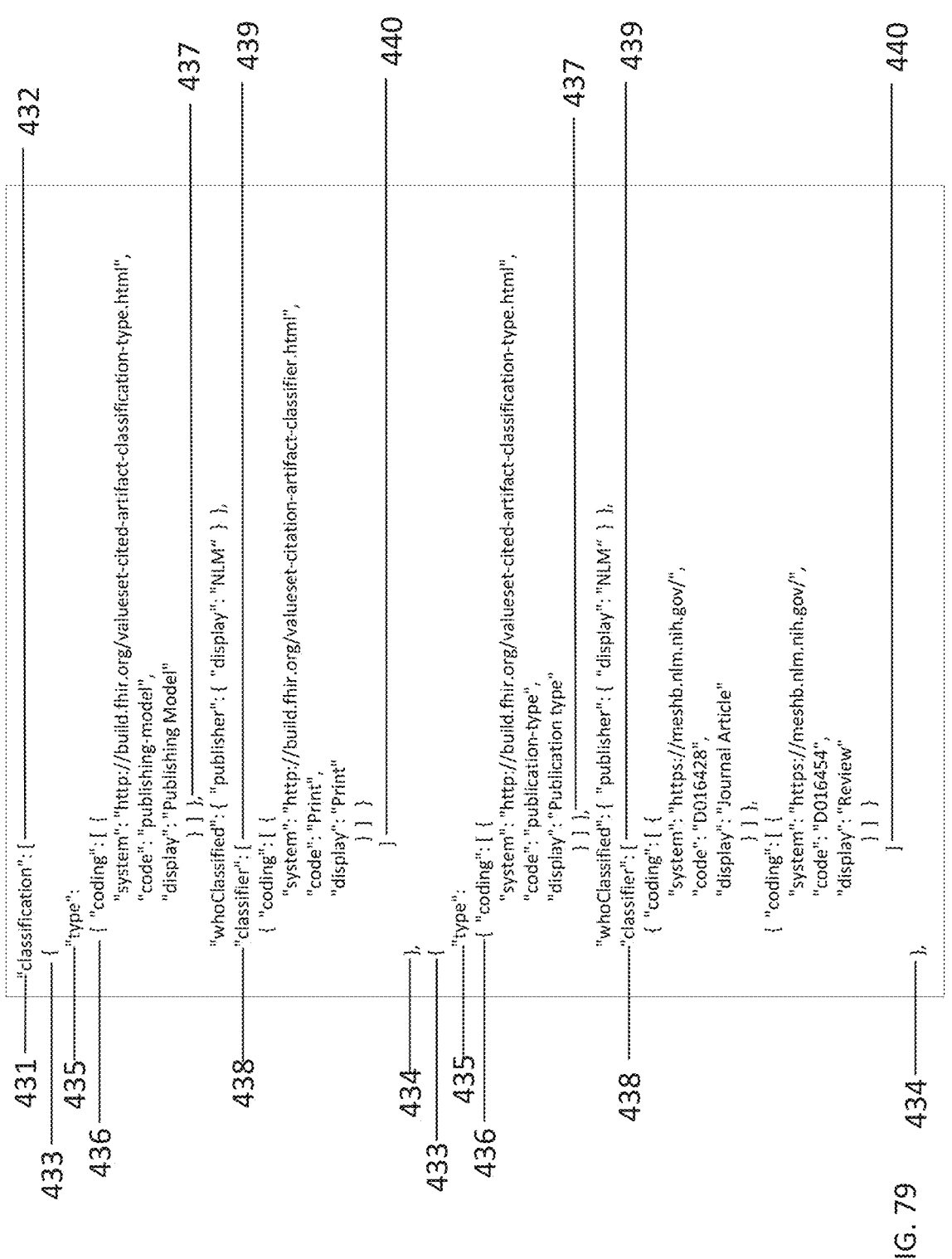

```
"classification": [
  {
    "type":
    { "coding": [ {
        "system": "http://build.fhir.org/valueset-cited-artifact-classification-type.html",
        "code": "publishing-model",
        "display": "Publishing Model"
      } ] },
    "whoClassified": { "publisher": { "display": "NLM" } },
    "classifier": [
      { "coding": [ {
          "system": "http://build.fhir.org/valueset-citation-artifact-classifier.html",
          "code": "Print",
          "display": "Print"
        } ] }
    ]
  },
  {
    "type":
    { "coding": [ {
        "system": "http://build.fhir.org/valueset-cited-artifact-classification-type.html",
        "code": "publication-type",
        "display": "Publication type"
      } ] },
    "whoClassified": { "publisher": { "display": "NLM" } },
    "classifier": [
      { "coding": [ {
          "system": "https://meshb.nlm.nih.gov/",
          "code": "D016428",
          "display": "Journal Article"
        } ] },
      { "coding": [ {
          "system": "https://meshb.nlm.nih.gov/",
          "code": "D016454",
          "display": "Review"
        } ] }
    ]
  },
```

GUI 1
961

API 1
962

GUI 3
965

API 3
966

GUI 2
963

API 2
964

GUI 4
967

API 4
968

NETWORK
120

API 5
953

API 6
954

API 7
955

API 8
956

API 9
957

WEB SERVER
951

DATA STORAGE
SERVER
952

SYSTEM AND METHOD TO SUPPORT HUMAN DATA ENTRY AND CONVERSION TO EXPRESSION IN INTERMEDIATE FORM FOR RESEARCH KNOWLEDGE

CROSS-REFERENCE TO RELATED APPLICATIONS

The present application claims the benefit of the filing date of U.S. Provisional Application Ser. No. 63/289,407, filed Dec. 14, 2021, the entire teachings of which application is hereby incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data conversion and, more particularly, to a system and method for human data entry and conversion of data to expression in intermediate form for scientific knowledge.

BACKGROUND

In the electronic exchange of data, standards may be established to provide explicit patterns for machine-interpretable formats for data transfer. Standards or standard form means a formal specification that has been approved by a standards developing organization (SDO) where an SDO is an organization whose primary function is developing, coordinating, promulgating, revising, amending, reissuing, interpreting, or otherwise producing technical standards to address the needs of a group of affected adopters. Adopting standards may enable greater interoperability and efficiency for data transfer between software systems such that software system developers no longer need to create customized schema and protocols for each pairing for data exchange. Adopting standards may enable a computer to "understand" the semantic meaning of data as it relates to coded terminologies.

Health Level 7 International (HL7®) is an example of an SDO. Fast Healthcare Interoperability Resources (FHIR®) is an example of a standard developed and maintained by HL7. HL7 and FHIR may be used in this description as examples of SDOs and standards, respectively. HL7® and FHIR® are the registered trademarks of Health Level Seven International and their use of these trademarks does not constitute an endorsement by HL7.

FHIR is an intermediate form for electronic data exchange. FHIR defines the labels used for data elements, the data types that are acceptable for the expression of each data element, the nesting pattern for data elements (which data elements are contained in other data elements), the number of instances that are allowed for a specific data element, and the terminologies that may be used with specific data elements. Data expressed in an intermediate form according to FHIR may be expressed using Extensible Markup Language (XML) or JavaScript Object Notation (JSON). XML and JSON are open standard file formats and data exchange formats that use human-readable text to store and transmit data objects consisting of attribute-value pairs and arrays (or other serializable values).

In the electronic exchange of scientific knowledge, standards are developing for exchange of data to convey research methodology, quantitative analysis of research findings, qualitative analysis of research findings, interpretation of research findings, recommendations informed by research, analysis of certainty of any of the aforementioned data, synthesis of any of the aforementioned data, reports of any of the aforementioned data, and citations to reference any of the aforementioned data.

Data representing scientific knowledge in non-standard form includes ideas in the human mind for which humans may enter data in some form for initial expression, ideas expressed in media (including print, digital, audio, or video) in natural language form, and ideas expressed in media in structured form that does not follow a standard form.

A barrier to using a standard form to provide interoperability and efficiency for data exchange of scientific knowledge is the difficulty to acquire data representing scientific knowledge in a nonstandard form and to convert such data to a standard form.

Content editing systems using structured coding language (such as XML or JSON) have been developed to provide a text-friendly view (What You See Is What You Get=WYSIWYG) and coding-specific view. These content editing systems provide direct 1:1 translation between the WYSIWYG and coding-specific representations of the content.

Data entry forms have been developed to enable developers to specify human-friendly labels and input methods to support the person entering data to use their natural language and understanding, and transformation scripts to convert the structured data collected in the data entry form to another structured data pattern, such as a coding-specific view.

Problems with the content editing system (WYSIWYG) approach for conveying scientific knowledge include scenarios in which the intense level of detail to be entered in precisely structured data is far beyond expression in natural language.

Problems with the data entry form approach for conveying scientific knowledge is the typical data entry form is developed for one-way data transfer and not designed for real-time editing of the coding-specific form of data expression.

Providing a WYSIWYG view as real-time editing of structured data is not immediately practical (or can be wildly disorienting) when tag signals that designate the beginning and ending of a container for data handling instructions appear in the middle of editing and the "interim" presentation would be meaningless, non-computable, or grossly inaccurate.

Upon creation of a coordinated data entry form for human-friendly use (such as a WYSIWYG view), a data entry form for data encoding in structured coding language (such as an "XML View" or "JSON View"), a "working state" to coordinate between the two views, and automated creation of generated data (such as supporting a WYSIWYG representation of results of the entered data), a resulting problem was system delay due to automated calculations to create the generated data.

A common data type for knowledge conveyance is a coding which allows expression of the code system, code, and description values. The matching of a code with a description is a coordination central to the development of a code system. A "term" describes the code and description combination in a code system. Known tools and applications include representations of the code system using "human-friendly display," such as brief titles and acronyms, and representations of the code system using Universal Resource Indicators (URIs), as required in the FHIR standard. Problems with this approach include inefficiency or inability for the person entering data to express a code system in either or both of these methods of representation, inefficiency if the person entering data is required to identify the URI to express a code system, and inefficiency in providing human-friendly labels for code systems where the data identifying the code system is available in different forms.

Known tools and applications include picklists to select preset terms (combinations of code system, code, and description values), ability to select more than one choice from a picklist, and "tool tips" to convey meaning of concepts for specific selections. Problems with this approach is that it does not address the combination of all three interface functions (picklists, multiple choice selection, and tool tips) in the same interface that interacts with data in standard form with both conversion of data from standard form to picklist display and conversion of data from picklist selection to standard form.

Known tools and applications include provision of picklists to allow selection of preset options and enablement of free text entry for options that are not preset. Problems with this approach include inability to add options that are not present where the data to be entered is not in the form of a single text entry for a single field.

Known tools and applications include a limited ability for the person doing data entry to enter or modify the data used in a picklist and have manually entered data converted to structured data in standard form. A problem with this approach is that it does not address situations where the person doing data entry desires to include code system terms that are not available in the preset picklists, and desires to maintain the semantic and structural integrity of the data.

A common data type for knowledge conveyance is a codable concept which allows expression of the concept using one or more codings and/or a text string. Known tools and applications include separate data entry forms for codings (from a picklist) and text elements for write-in entries. Problems with this approach include separation of codable concepts selected from preset choices (stored as codings) and codable concepts generated from write-in choices (stored as text) such that the separated approaches alter the view of the dataset while creating it. Attempts to keep the data the "same format" to overcome the altered view problem lead to either converting codings to text (and losing structured data) or converting text to codings (and introducing artificial structure).

Known tools and applications to support data entry include offering preset data combinations (such as from a picklist) for common code systems and offering text elements for write-in entries. A problem with this approach is that it does not address situations where the person doing data entry desires to include both code system terms (structured data) and text entries, and desires to maintain the semantic and structural integrity of the data. Another problem with this approach is inefficiency in adding options based on text data type to the picklist generated from options based on coding data type.

Known tools and applications to support data entry allow only one coding entry per codable concept and require use of expressions instead of codable concepts to convey "any of" combinations of codings. A problem with this approach is the inefficiency for the person entering data to express a codable concept as a series of codings where any one of the codings is sufficient to define the codable concept.

A common pattern in code systems is to coordinate smaller, primitive terms into complex terms. Known tools and applications include pre-coordination to create terms in a code system prior to their use, but there are many scenarios where users need terms beyond the available pre-coordinated terms. Known tools and applications include post-coordination to assemble smaller, primitive terms into complex post-coordinated terms, but post-coordinated terms are often not standard and thus not interoperable and re-usable. Standard approaches to coding datatypes do not include coding qualifiers and leave the concept for pre-coordination or post-coordination to be handled by code systems. A problem with this approach is that there is no standard for post-coordination processes across code systems.

A common data type for knowledge conveyance is a text string used for the name, title, or other label assigned to an object or concept. Known tools and applications include specification in standards of any number of data element labels for the labeling concept itself (such as name, title, label, subtitle, short title, running title, official title, and acronym), coordination of these data element labels with the text strings used for data element values, and user interfaces that provide a simple pairing of the label for the data element and the value of the data element. Problems with this approach include inefficiency in creating tools and applications to support many types of labels, and inefficiency when there is a need to associate more than one type classification to the same label value (multiple data element labels matching the same data element value for the data about labels).

A common data type for knowledge conveyance is an identifier used for a unique label assigned to an object or concept. Known tools and applications include specification in standards of multiple methods of defining the identification system including text-based description, URL for identification, and expression of the organization or entity assigning the identifier. However, user interfaces for data entry of identifiers are commonly simpler and either provide a method to select specific identifier systems by a common name (such as SSN for social security number), or a single method to express the identification system along with the identifier value. Problems with this approach include inefficiency in creating tools and applications to support multiple identifiers using different methods of identification system specification, and challenges for the person entering data to quickly specify the identification system when there are many ways to do it.

Known tools and applications include provision of picklists to allow selection of preset options and enablement of free text entry for options that are not preset. Problems with this approach include inability to add options that are not present where the data to be entered is not in the form of a single text entry for a single field.

There are situations in which an object and concept are both uniquely identified and have one-to-many, many-to-one, or many-to-many relationships between the object and concept. Problems with this approach include confusion when the unique identifier for the concept cannot be distinguished from the unique identifier for the object. An example is a research study publication with a digital object identifier (DOI) which is a unique identifier for the published report, and a National Clinical Trials (NCT) identifier which is a unique identifier for the research study as registered at ClinicalTrials.gov. Approaches seeking to deduplicate citations could be correct when using the DOI and incorrect when using the NCT identifier if the context is deduplication of published articles, or the opposite if the context is deduplication of research studies. No contextagnostic distinction is possible if both identifiers are simply encoded as identifiers as used in common tools and applications.

A common compound data type for knowledge conveyance is a classification which allows expression of the classification system and one or more classifiers (which can be expressed as codable concepts). Known tools and applications include frequent representation of the "classification system" as the label for data entry and the "classifiers" as the data entered. Problems with this approach include voluminous forms for data entry and data management when there is a desire to present multiple classification systems, and substantial inefficiency requiring data entry form development to add new classification systems.

A common compound data type for knowledge conveyance is a characteristic which allows expression of the type of characteristic (which can be expressed as a codable concept) and the value of the characteristic (which can be expressed in various data types). Known tools and applications include frequent representation of the "characteristic type" as the label for data entry and the "characteristic value" as the data entered. Problems with this approach include voluminous forms for data entry and data management when there is a desire to present multiple characteristic types, and substantial inefficiency requiring data entry form development to add new characteristic types. Additional problems with this approach include limitations when characteristic values are better represented in different data types, including codable concepts, quantities, ranges, expressions, or other forms of structured data. In such cases there may be substantial inefficiency requiring data entry form development to add new data types for characteristic values.

A common compound data type for knowledge conveyance is a relationship between knowledge objects or concepts. These knowledge objects or concepts are also called knowledge artifacts, or simply artifacts. Known tools and applications include an artifact-to-artifact relationship specification which allows expression of the type of relationship (commonly expressed from a limited code system) and identification of the related artifact (commonly expressed with a limited data type). Problems with this approach include the need for additional data elements, interfaces, and software code or other bespoke solutions for (1) relationship types not included in the underlying code system, (2) modifiers to classify the relationship type, (3) modifiers to classify the target artifact, and (4) multiple methods of identification of the related artifact.

On Sep. 20, 2021, the FHIR standard was changed to revise the RelatedArtifact data type to include a required type element with 32 options for expression as a code, an optional classifier element with unlimited use for classifying the related artifact using codable concepts, and many other optional elements used for identification of the related artifact. As the RelatedArtifact data type standard was only specified in this form on Sep. 20, 2021, known tools and applications do not support this pattern of conveyance of a relationship between knowledge objects.

A common compound data type for knowledge conveyance is a container data element that includes two or more data elements and thus supports associations among the contained data elements (these associated data elements are herein called a matched dataset). When there are multiple instances of the same data element in the container, this is called an array. Known tools and applications include a backbone element specification which allows expression of multiple data elements associated with each other in the same container. When the backbone element itself is provided in more than one instance, this is the representation of multiple data elements within arrays.

Problems with this approach include the complexity of providing a simple user interface for data entry when the number of entries in the array is not predetermined and the data entry needs for each instance is more complex than what can be handled in single data entry fields. Problems with this approach also include the coordination of data entry, data revision, and data deletion with the correct array instance. Although these problems can be overcome with a tabular or subsection representation of the array, the time delay for processing is noticeable when there are many data elements contained in this pattern.

When a container data element contains multiple instances (considered herein a parent array) and such instances include data elements that contain multiple instances (considered herein a child array), there is a need to maintain coordination of data linkages in nested arrays. Known tools and applications include creation of a separate data entry form for each instance of the parent array and/or a separate data entry form for each instance of the child array. Problems with this approach include the inefficiency of switching data entry interfaces to address instances within the child array and concepts outside of the child array instance. Tabular solutions for the parent array can become impractical when the child array contains multiple data elements, and tables within tables can become unwieldy with increasing number and complexity of data elements. Although these problems can be overcome with a tabular array representation within a subsection array representation, the time delay for processing is noticeable when there are many data elements contained in this pattern.

There are many methods for expressing different types of scientific knowledge. Types of scientific knowledge expressed in scientific communication include: research design, with methods of expression including templates used for listing in research study registries and formats used for study protocols and statistical analysis plans; variable definitions in scientific research, with methods of expression including templates used for listing in research study registries and classification tags used in bibliographic databases; quantitative analysis of research findings (statistics), with methods of expression including software for conducting statistical analysis and formats used for common graphical representations of meta-analyses; evidence represented as a specification of the variables and the statistics related to that precise combination of variables, with methods of expression including software for conducting systematic reviews and formats used for common tabular representations of research results; certainty of evidence, with methods of expression including rating the certainty of evidence as high, moderate, low or very low, and rating five certainty subcomponents or reasons for uncertainty (risk of bias, imprecision, inconsistency, indirectness, and publication bias) as to the degree of concern; reports of evidence sets, with methods of expression including templates and formats used for journal article publications and Clinical Trial Reports; and citations to identify knowledge objects, with methods of expression including structured data forms such as MEDLINE and Research Information Systems (RIS) tags.

Problems with all of these methods for expressing different types of scientific knowledge are they do not follow a standard so are not immediately interoperable with all other systems and methods for conveyance of these types of scientific knowledge.

Additional problems with methods for expressing variable definitions are they consider definitions as singular codable concepts or only simple combinations (AND or OR) of codable concepts.

Additional problems with methods for expressing the certainty of evidence is that the rating system described above is not universally accepted and there are more than 100 other ways that researchers and scholars report certainty of evidence concepts.

Additional problems with methods for expressing the certainty of evidence is that systems to convey certainty ratings may variably include the object being rated, the type of rating, the rating, who created the rating, when the rating was created, and justification for the rating.

Additional problems with methods for expressing citations as structured data such as MEDLINE and Research Information Systems (RIS) tags include: they are not applicable to many different types of knowledge objects (ranging from journal articles to books to database entries to datasets to parts of event to executable software and more) or they are limited to pairs of data elements and not able to handle complex, nested data elements with multiple datatypes; there are more than 8,000 different standards of styles for how to summarize a citation, such as when used in reference lists in an article, and problems with these styles include no method to distinguish the "human-friendly" form of the cited artifact (such as a URL for human viewing) from a "machine-friendly" form (such as a URL for a computable artifact intended for direct use by a machine); there are many styles for how to summarize a citation, such as when used in reference lists in an article, that do not specify the type of artifact being cited, and problems occur when citing many types of artifacts where the titles may be similar but the type of artifact cited is not obvious or included in the title; citations in citation repositories often contain value-added content such as multiple URLs for accessing different components or different forms of the cited artifact or different classifiers of the cited artifact, and data sharing across citation repositories can compound these value-added content components, but there are challenges in deduplicating and matching citations and sharing content components across citations that compound tremendously as the number of citation repositories involved increase; copyright statements are commonly associated with digital objects, but problems with this approach include the data structure does not easily support different copyright statements for different components of a digital object and element-level copyright statements will often be left unused; author lists in structured data in citation repositories may be represented as structured data for each of the individual authors or may be represented as a text string for the author list, and problems with this approach include the different data structures are incompatible across tools and applications and data transformed from one structure to the other during exchange between tools and applications may lead to errors or loss of data; common forms of contributorship summaries in the published literature include author lists, statements of author contributions to the published work, and acknowledgement statements for contributions by people who are not authors; and problems with this approach include the different data is unstructured or in local systems with structures that are incompatible across tools and applications, data transformation from one structure to the other during exchange between tools and applications may lead to errors or loss of data, and the limited structures do not easily support other potential styles of contributorship summaries; common forms of structured data representation of individual contributors to a knowledge artifact include representation of roles (such as separate listings for authors, editors, and reviewers) and conveyance of author identifiers, affiliations, and contact detail (such as reported in bibliographic databases like MEDLINE), and problems with this approach include no common structure that include all these concepts (role, identifier, affiliation, and contact detail for the individual contributor) and no common structure for conveying contribution types or contribution instances that may be reported in contributorship statements; and a corresponding author is often reported in addition to a list of authors, and problems with this approach include the "corresponding" modifier of the author role is often not contained in the structured data of the role, and the "corresponding" concept is often not directly reported for roles other than author. For all these reasons, there is no comprehensive system that can support the depth of citation data across the many types of things that can be cited.

There are draft standards for expression of these types of scientific knowledge in the FHIR standard, but all of these draft standards are at maturity level 0 or 1 (on a 1-5 scale) and not yet used for such conveyance as of Dec. 1, 2021.

There are many methods for expressing a code system which is a structured terminology wherein each term has a code and associated properties.

There is an established (normative) standard for expression of a CodeSystem Resource in the FHIR standard (build.fhir.org/codesystem.html). Systems to create, edit, and maintain code systems are not designed to create FHIR CodeSystem Resource instances. Problems with current systems include inefficiency in creating, editing, and maintaining code systems and inefficiency in interoperability and data exchange between code system development systems and FHIR Resource development systems.

Classifications of knowledge artifacts are used extensively and range from simple "is a" classifiers to compound ratings of judgments. Classification data is not completely independent from the knowledge artifact being classified but can have many digital object properties that are used for independent digital objects such as provenance, copyright, and publishing state which may differ from the digital object properties for the knowledge artifact being classified. Known methods include specialized schema for classification developed for each tool and application. Problems with this approach include barriers to interoperability and re-use of data between tools and applications where each classification schema requires element-to-element mapping and data transformation software, and inconsistency in availability and method of identifying the sub-part of a knowledge artifact being classified.

JavaScript Object Notation (JSON) will be described repeatedly in this document.

FIG. 1 shows an example of content in JSON form that will be used here to describe conventions for expression in this document, including: the smallest unit of JSON expression is a pairing of a data element name with a data element value, represented in the example with the string "dataElement": "some data" where: the data element name is provided between quotation marks ("characters 1) and immediately followed by a colon (: character 2); the data element value may take different forms including a common form of a string of characters; when the data element value is in the form of a string of characters, the data element value will be provided between quotation marks ("characters 4) and immediately preceded by a colon (: character 2) which is immediately preceded by the data element name; and the data element value ("some data" 5 in this example) will be represented in quotation marks in this document (for example, "some data" 5) unless it is necessary to express the literal JSON string (for example, "some data" 5); a JSON expression of a numerical value does not include quotation marks surrounding the data element value, as shown in this example with the numberOfSomething element 6 appearing twice with the values "34" 7 and "35" 8; a JSON expression of a boolean choice (wherein the only acceptable values are "true" and "false") does not include quotation marks surrounding the data element value, as shown in this example with the booleanElement element 9 appearing twice with the values "true" 10 and "false" 11 unless it is necessary to express the literal JSON string (for example, true 10 and false 11); a data element value may contain data elements in which case: the data element value is contained between curly braces ({12 and } 13 characters}); when two or more data elements are contained between the curly braces, each data element is separated by a comma (, character 14); and the curly braces will be assigned different reference characters in this document when they are associated with different data element names (for example, { 12 and } 13 for the containerOfNonRepeatingElements element 15 and { 16 and } 17 for the containerOfArray element 18); a data element may contain multiple instances of data element values (also called an array) in which case: the data element values are contained between square brackets ([ 19 and ] 20 characters); when two or more data element values are contained between the square brackets, each data element value is separated by a comma (, character 14); and the square brackets will be assigned different reference characters in this document when they are associated with different data element names (for example, [ 19 and ] 20 for the containerOfArray element 18).

With the many considerations noted above there is no existing system coordinating scientific communication in structured form in a standard form (called herein an intermediate form). Known tools and applications include many systems coordinating scientific communication in structured form but no interoperable standard for coordination across systems. Problems with this approach is that each tool and application require specific development of data input and data output interfaces, and each pairing of applications requires specific development of data transformation mappings to achieve coordination.

FIG. 2 is a concept diagram showing the current state with seven applications (ClinicalTrials.gov 23, MEDLINE 24, MAGICapp 25, GRADEpro 26, McMaster University Evidence Alerts 27, PICO Portal 28, DynaMed 29) requiring twenty-one (21) unique (non-reusable) linkages between applications and forty-two (42) unique data transformation tools, including: a tool 30 to transform data from ClinicalTrials.gov schema to MEDLINE schema; a tool 31 to transform from MEDLINE schema to ClinicalTrials.gov schema; a tool 32 to transform data from ClinicalTrials.gov schema to MAGICapp schema; a tool 33 to transform from MAGICapp schema to ClinicalTrials.gov schema; a tool 34 to transform data from ClinicalTrials.gov schema to GRADEpro schema; a tool 35 to transform from GRADEpro schema to ClinicalTrials.gov schema; a tool 36 to transform data from ClinicalTrials.gov schema to McMaster University Evidence Alerts schema; a tool 37 to transform from McMaster University Evidence Alerts schema to ClinicalTrials.gov schema; a tool 38 to transform data from ClinicalTrials.gov schema to PICO Portal schema; a tool 39 to transform from PICO Portal schema to ClinicalTrials.gov schema; a tool 40 to transform data from ClinicalTrials.gov schema to DynaMed schema; a tool 41 to transform from DynaMed schema to ClinicalTrials.gov schema; a tool 42 to transform data from MEDLINE schema to MAGICapp schema; a tool 43 to transform from MAGICapp schema to MEDLINE schema; a tool 44 to transform data from MEDLINE schema to GRADEpro schema; a tool 45 to transform from GRADEpro schema to MEDLINE schema; a tool 46 to transform data from MEDLINE schema to McMaster University Evidence Alerts schema; a tool 47 to transform from McMaster University Evidence Alerts schema to MEDLINE schema; a tool 48 to transform data from MEDLINE schema to PICO Portal schema; a tool 49 to transform from PICO Portal schema to MEDLINE schema; a tool 50 to transform data from MEDLINE schema to DynaMed schema; a tool 51 to transform from DynaMed schema to MEDLINE schema; a tool 52 to transform data from MAGICapp schema to GRADEpro schema; a tool 53 to transform from GRADEpro schema to MAGICapp schema; a tool 54 to transform data from MAGICapp schema to McMaster University Evidence Alerts schema; a tool 55 to transform from McMaster University Evidence Alerts schema to MAGICapp schema; a tool 56 to transform data from MAGICapp schema to PICO Portal schema; a tool 57 to transform from PICO Portal schema to MAGICapp schema; a tool 58 to transform data from MAGICapp schema to DynaMed schema; a tool 59 to transform from DynaMed schema to MAGICapp schema; a tool 60 to transform data from GRADEpro schema to McMaster University Evidence Alerts schema; a tool 61 to transform from McMaster University Evidence Alerts schema to GRADEpro schema; a tool 62 to transform data from GRADEpro schema to PICO Portal schema; a tool 63 to transform from PICO Portal schema to GRADEpro schema; a tool 64 to transform data from GRADEpro schema to DynaMed schema; a tool 65 to transform from DynaMed schema to GRADEpro schema; a tool 66 to transform data from McMaster University Evidence Alerts schema to PICO Portal schema; a tool 67 to transform from PICO Portal schema to McMaster University Evidence Alerts schema; a tool 68 to transform data from McMaster University Evidence Alerts schema to DynaMed schema; a tool 69 to transform from DynaMed schema to McMaster University Evidence Alerts schema; a tool 70 to transform data from PICO Portal schema to DynaMed schema; and a tool 71 to transform from DynaMed schema to PICO Portal schema.

FIG. 3 is a concept diagram showing a system and method consistent with the present disclosure, in which seven applications (ClinicalTrials.gov 23, MEDLINE 24, MAGICapp 25, GRADEpro 26, McMaster University Evidence Alerts 27, PICO Portal 28, DynaMed 29) require only seven (7) unique linkages with an intermediate form 72 and fourteen (14) unique data transformation tools, including: a tool 73 to transform data from ClinicalTrials.gov schema to an intermediate form; a tool 74 to transform from an intermediate form schema to ClinicalTrials.gov schema; a tool 75 to transform from MEDLINE schema to an intermediate form; a tool 76 to transform data from an intermediate form to MEDLINE schema; a tool 77 to transform from MAGICapp schema to an intermediate form; a tool 78 to transform data from an intermediate form to MAGICapp schema; a tool 79 to transform from GRADEpro schema to an intermediate form; a tool 80 to transform data from an intermediate form to GRADEpro schema; a tool 81 to transform from McMaster University Evidence Alerts schema to an intermediate form; a tool 82 to transform data from an intermediate form to McMaster University Evidence Alerts schema; a tool 83 to transform from PICO Portal schema to an intermediate form; a tool 84 to transform data from an intermediate form to PICO Portal schema; a tool 85 to transform from DynaMed schema to an intermediate form; and a tool 86 to transform data from an intermediate form to DynaMed schema.

BRIEF SUMMARY OF THE INVENTION

In some embodiments, a system and method consistent with the present disclosure is a system and method that includes numerous user interfaces to support data entry by humans to express scientific knowledge, software applications to convert the data into intermediate form, software applications to convert data between structured forms and the intermediate form, software applications to convert the data in intermediate form to viewable data in a human-friendly display form, and user interfaces to support human-friendly display via internet browsers.

BRIEF DESCRIPTION OF THE DRAWINGS

These and other features and advantages will be better understood by reading the following detailed description, taken together with the images wherein:

FIG. 13 is a portion of data in intermediate form, corresponding to the example in FIG. 12;

FIG. 52 is a portion of intermediate form of data corresponding to FIG. 51;

FIG. 61 is a screen shot of the Classifiers section of the Computable Publishing: Citation Viewer tool version 1.5.0, with demonstration of a coding qualifier corresponding to data shown in FIG. 60, an exemplary system and method consistent with the present disclosure;

FIG. 63 is a portion of intermediate form of data, with "Title text" value of "A pilot study of hydroxychloroquine in treatment of patients with common coronavirus disease-19 (COVID-19)", corresponding to the example in FIG. 62;

FIG. 64 is a portion of intermediate form of data, with "Title text" value of "Hydroxychloroquine pilot study in treatment of COVID-19", corresponding to the example in FIG. 62;

FIG. 75 is a screen shot of the Identifiers section of the Computable Publishing: Citation Builder tool version 1.4.4 with inclusion of a Related Identifiers subsection, an exemplary system and method consistent with the present disclosure;

FIG. 79 is a portion of intermediate form of data corresponding to FIG. 77;

FIG. 119 is a screen shot of the Contributors section of the Computable Publishing: Citation Builder tool version 1.4.4, an exemplary system and method consistent with the present disclosure;

FIG. 120 is a functional block diagram illustrating a distributed data processing environment consistent with the present disclosure;

FIG. 121 is an example of the system for human data entry and conversion of data to expression in intermediate form for scientific knowledge, on the distributed data processing environment of FIG. 120, consistent with the present disclosure;

Figure 120:
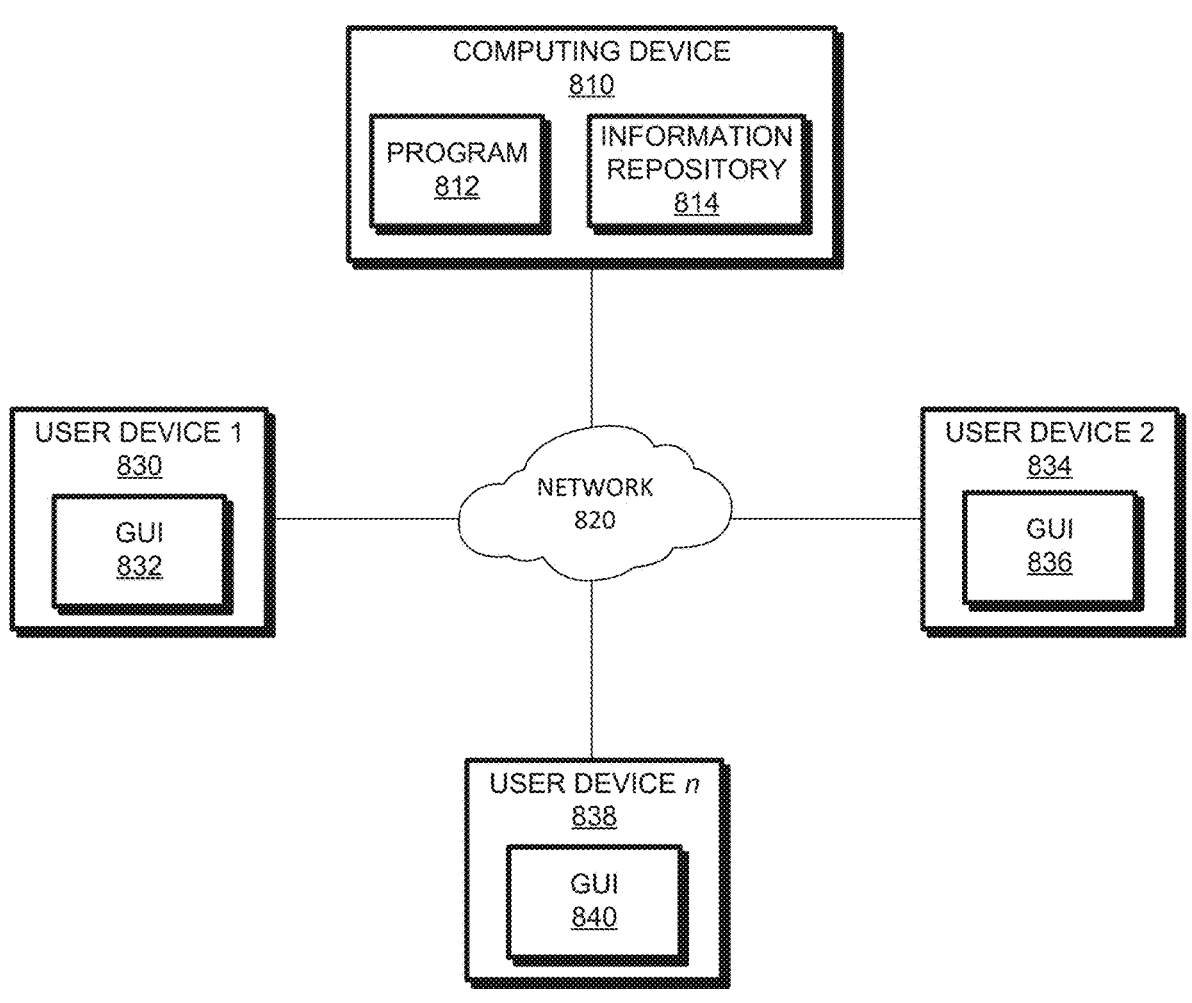
Figure 122:
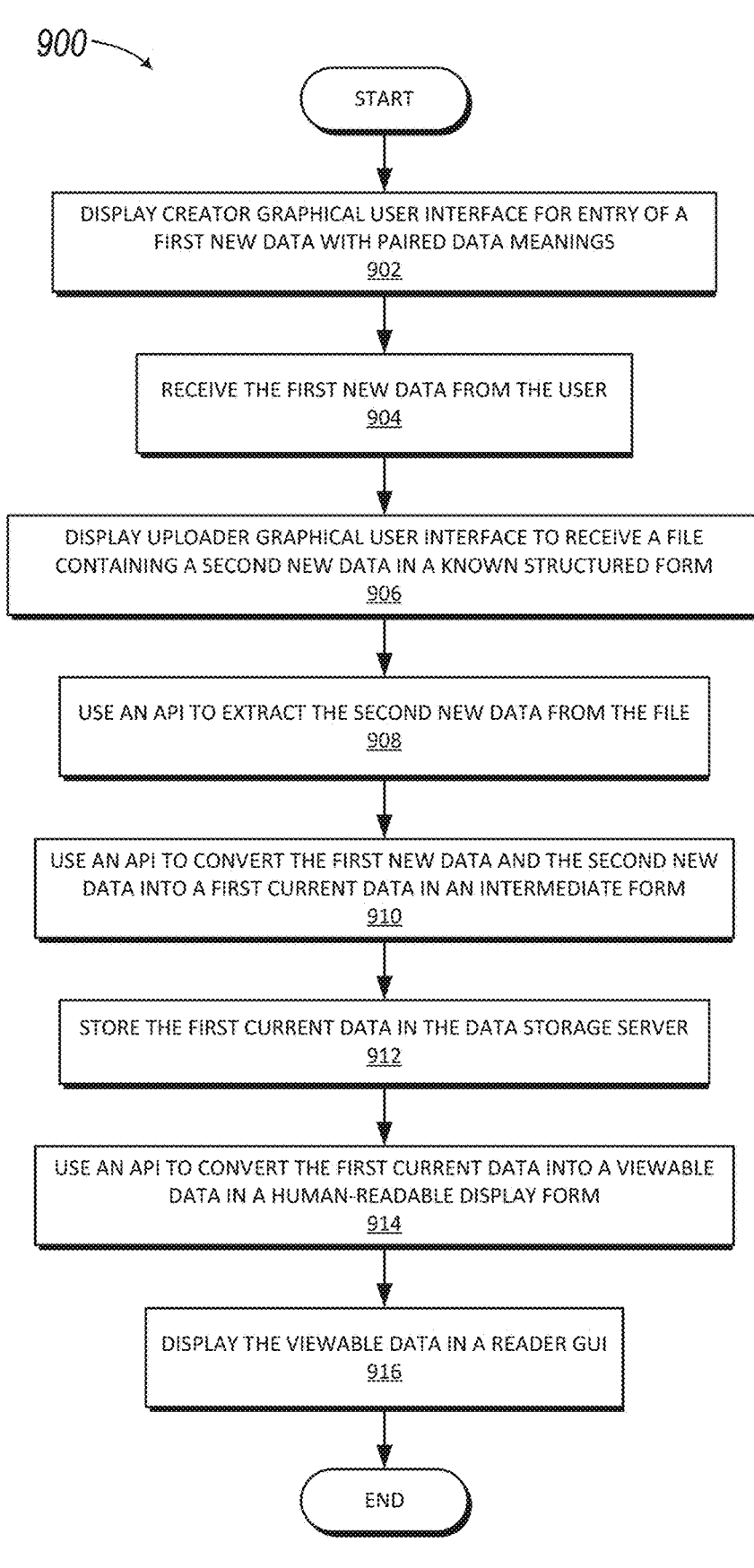
Figure 123:
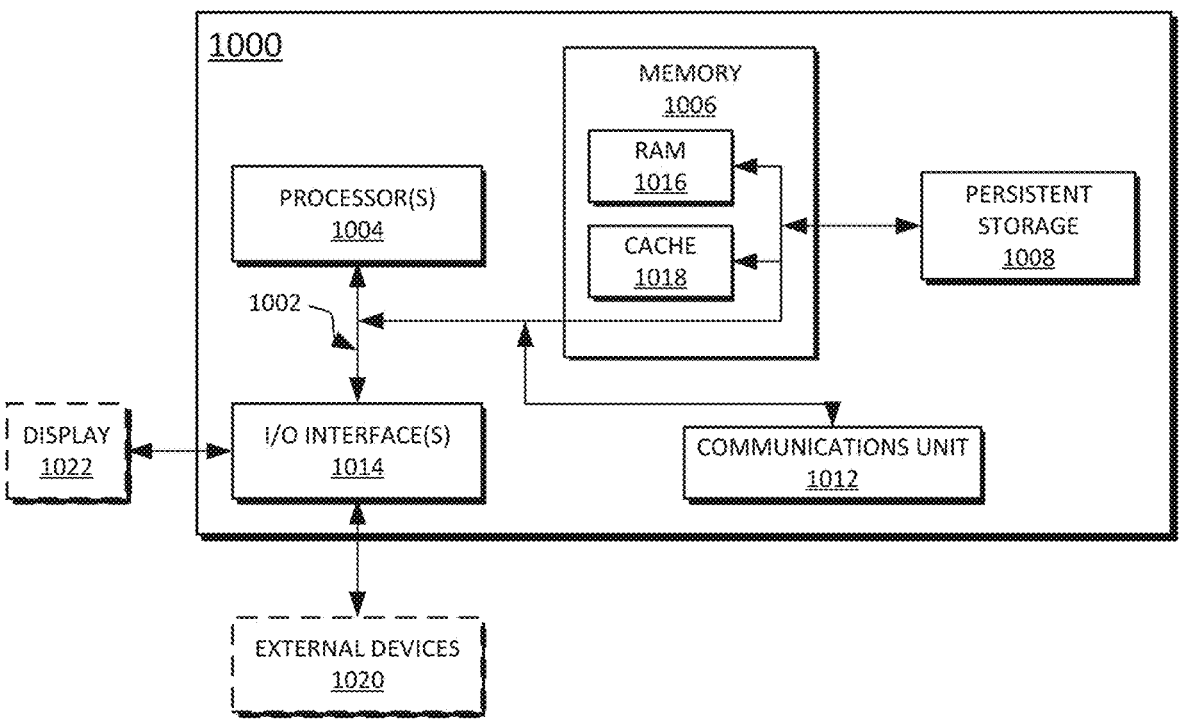

FIG. 122 is a flowchart diagram depicting operations for the program for human data entry and conversion of data to expression in intermediate form for scientific knowledge, on the distributed data processing environment of FIG. 120, consistent with the present disclosure; and FIG. 123 depicts a block diagram of components of the computing device executing the program within the distributed data processing environment of FIG. 120, consistent with the present disclosure.

Certain figures in the drawings illustrate user interface elements that include text in a foreign language. The foreign-language text is reproduced in the drawings in its original form to accurately illustrate the appearance and placement of such text within example user interfaces. In accordance with U.S. patent practice, English translations of all foreign-language text appearing in the drawings are provided below.

Figure 43:
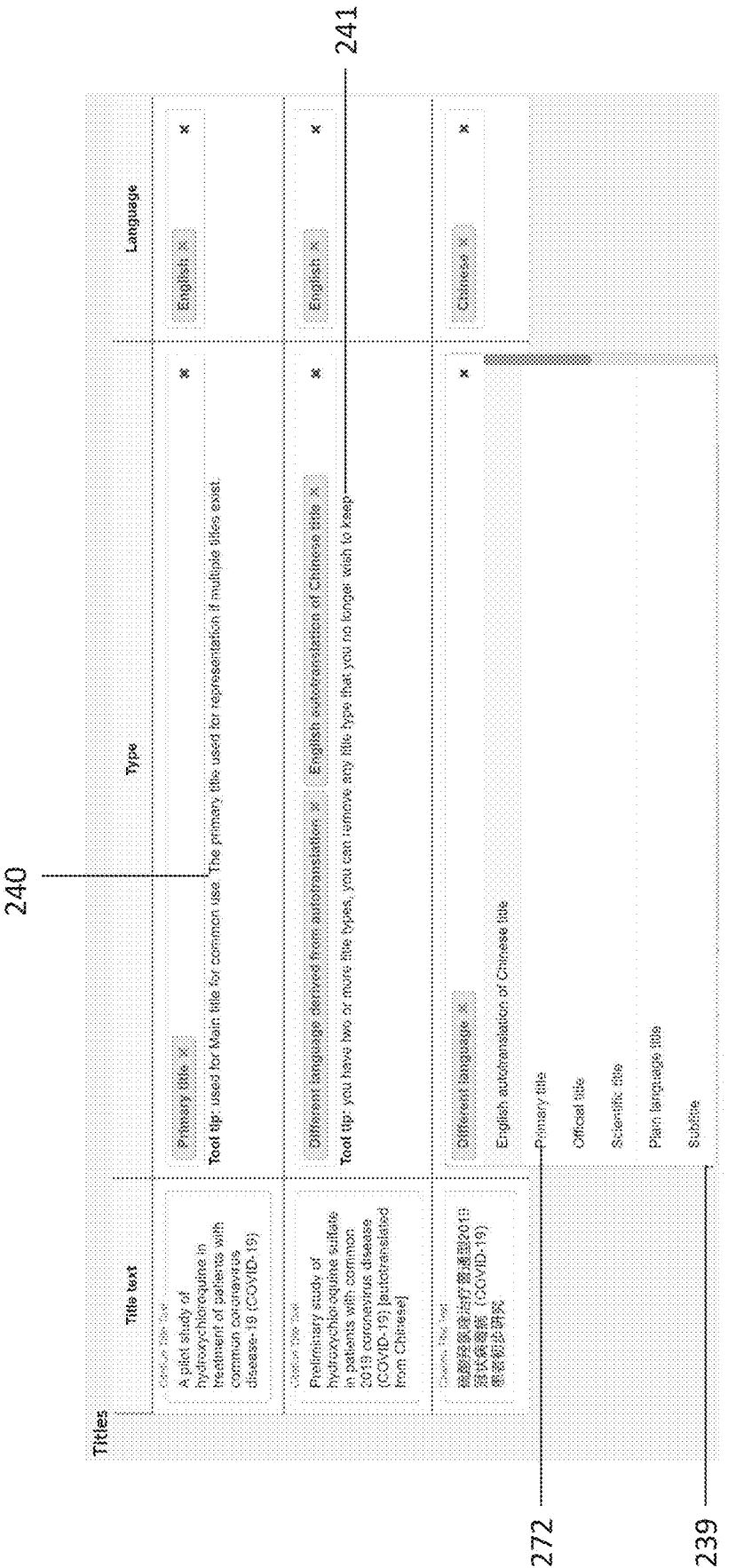
FIG. 43 is a screen shot of the Titles section of the Computable Publishing: Citation Builder tool version 1.4.4, an exemplary system and method consistent with the present disclosure.

FIG. 43 illustrates a table displaying titles in multiple languages. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

Figure 49:
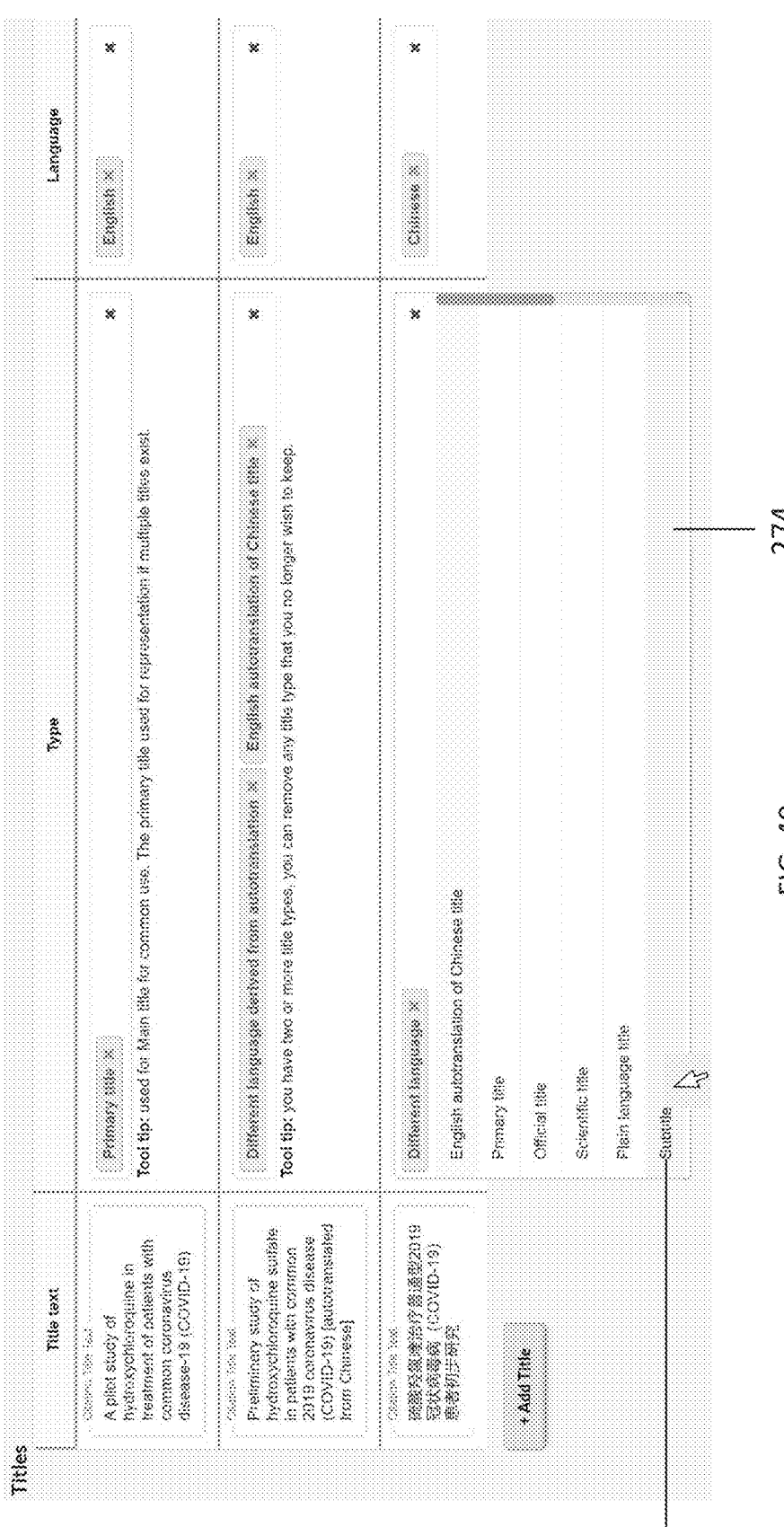
FIG. 49 is a screen shot of the Titles section of the Computable Publishing: Citation Builder tool version 1.4.4 with emphasis of selection of an option from a picklist menu for Type data entry, an exemplary system and method consistent with the present disclosure.

FIG. 49 illustrates a titles section of a citation builder tool with a picklist menu for selection of title types. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

Figure 50:
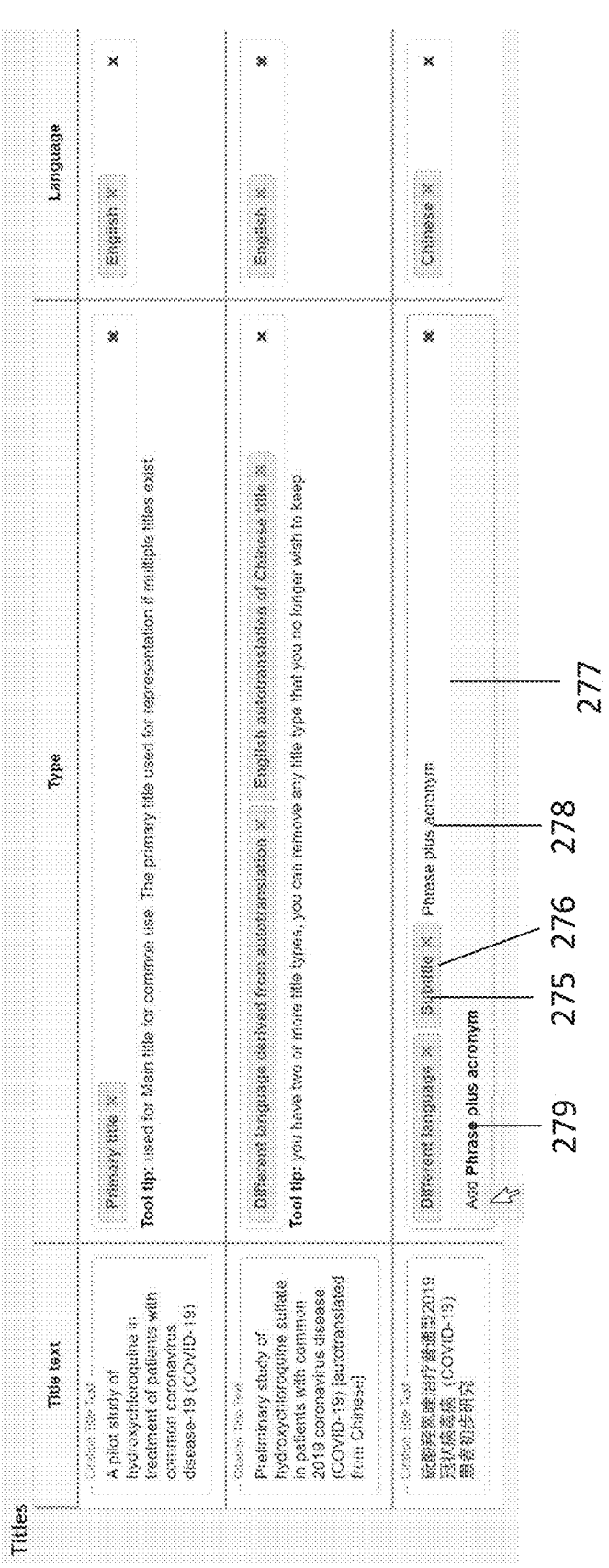
FIG. 50 is a screen shot of the Titles section of the Computable Publishing: Citation Builder tool version 1.4.4 with emphasis of text entry for write-in option for Type data entry, an exemplary system and method consistent with the present disclosure.

FIG. 50 illustrates a titles section showing data entry with both picklist selection and text entry options. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

Figure 51:
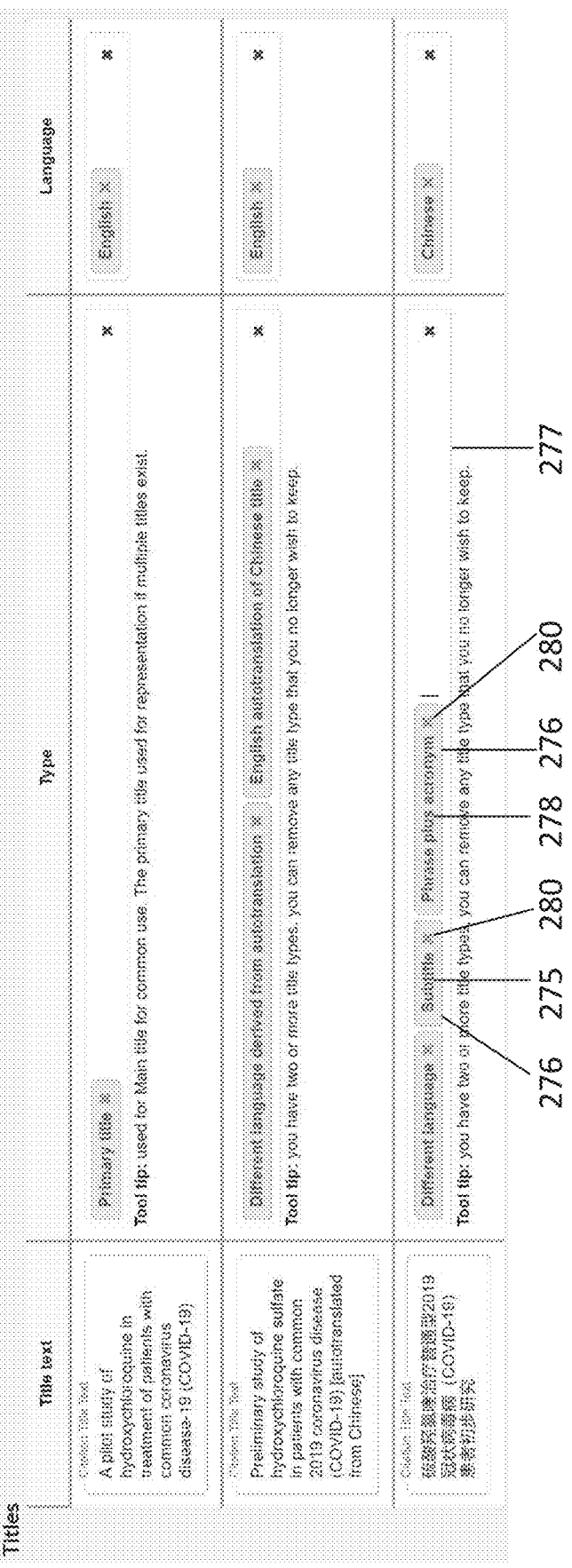
FIG. 51 is a screen shot of the Titles section of the Computable Publishing: Citation Builder tool version 1.4.4 with emphasis of 2 codable concepts for title Type derived from 2 different methods (a preset coding and a write-in text entry), an exemplary system and method consistent with the present disclosure.

FIG. 51 illustrates a titles section displaying multiple title types including foreign language entries. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

FIG. 52 shows structured data in JSON format corresponding to FIG. 51. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

Figure 53:
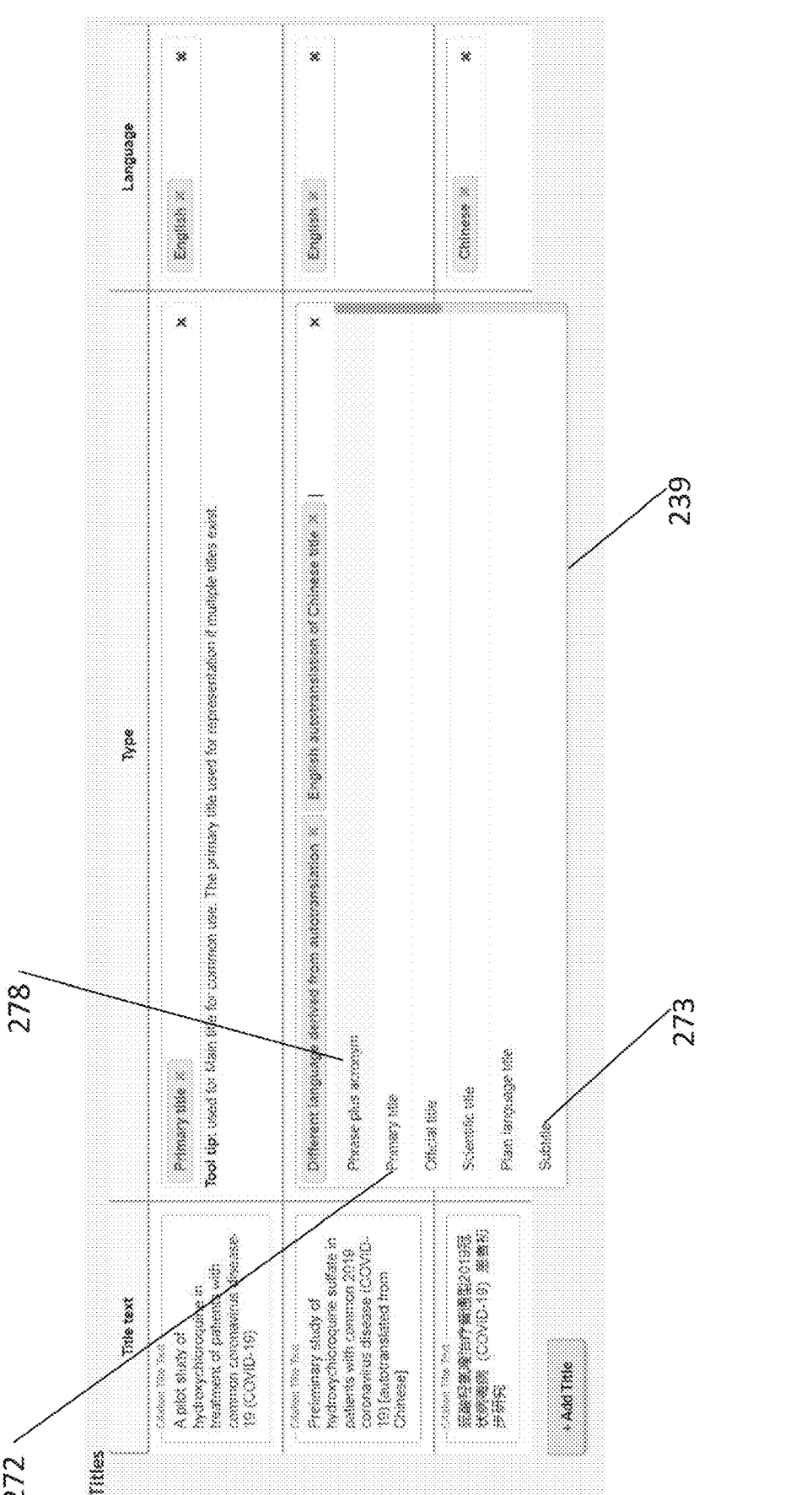
FIG. 53 is a screen shot of the Titles section of the Computable Publishing: Citation Builder tool with emphasis of picklist menu containing options for codable concepts for title Type derived from 2 different methods (a preset coding and a write-in text entry), an exemplary system and method consistent with the present disclosure.

FIG. 53 illustrates a picklist containing preset options with foreign language text. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

Figure 62:
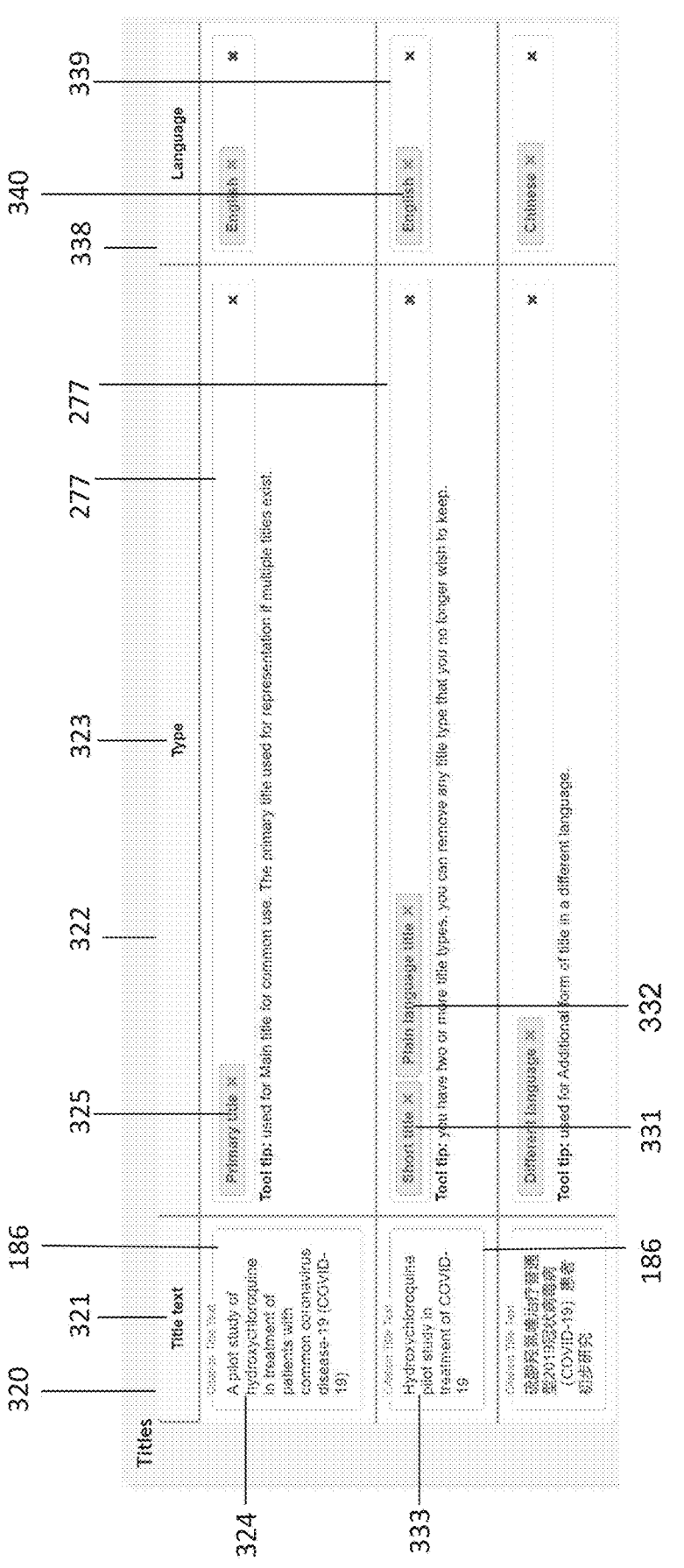
FIG. 62 is a screen shot of the Titles section of the Computable Publishing: Citation Builder tool version 1.4.4, an exemplary system and method consistent with the present disclosure.

FIG. 62 illustrates a data entry interface for titles with multiple language options. The figure includes Chinese-language text reading "硫酸羟氯喹治疗普通型2019冠状病毒病(COVID-19)患者初步研究," which translates to "Preliminary study of hydroxychloroquine sulfate in patients with common 2019 coronavirus disease (COVID-19)" in English.

DETAILED DESCRIPTION

Aspects of the present disclosure may relate to facilitating expression of scientific knowledge in non-standard form and conversion of such expression to data in structured form in a standard form (called herein an intermediate form), and conversion of such data in an intermediate form into non-standard form to facilitate interpretation, revision, and interaction.

Figure 1:
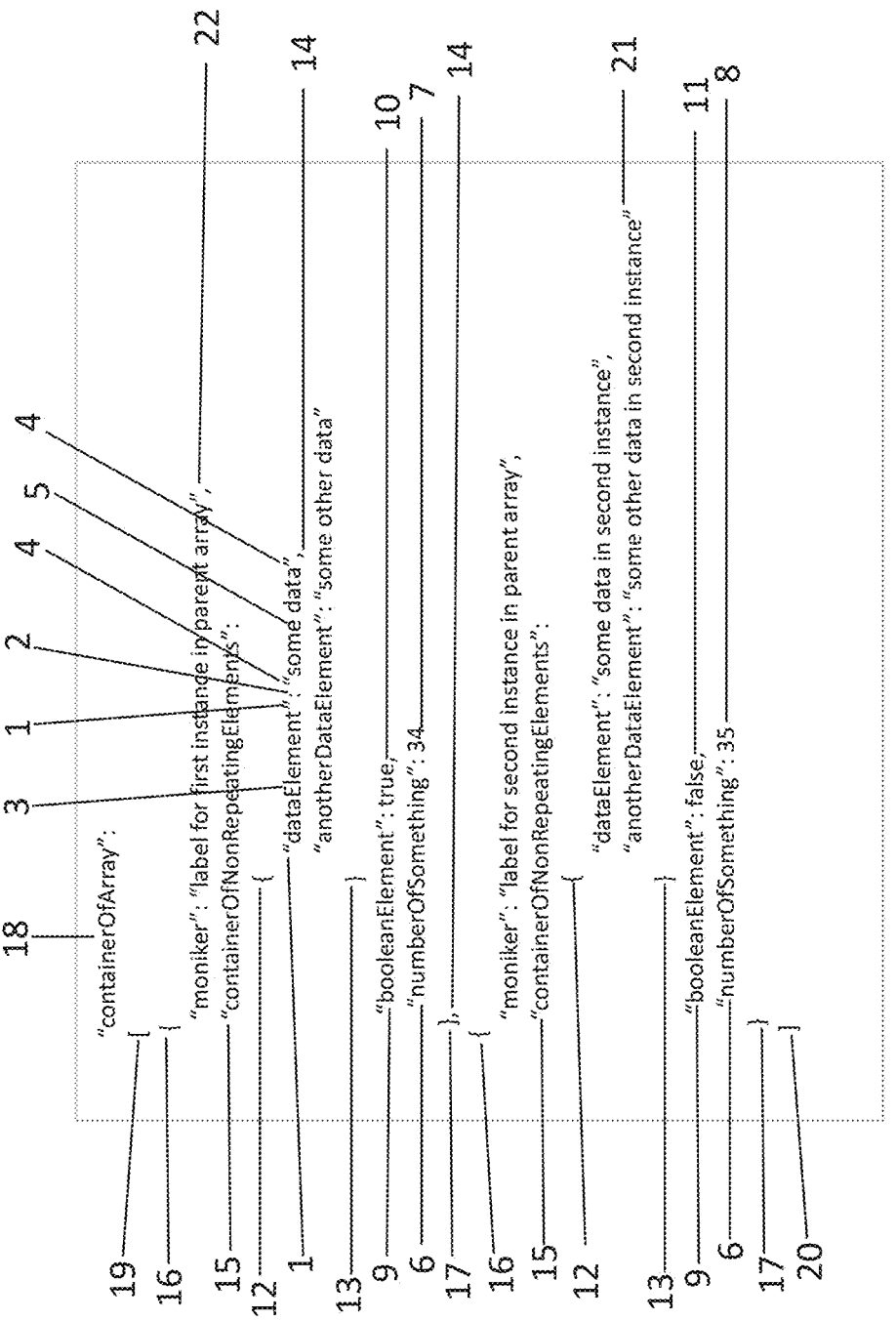
FIG. 1 is an example of a structured form of data using JavaScript Object Notation (JSON)
Figure 2:
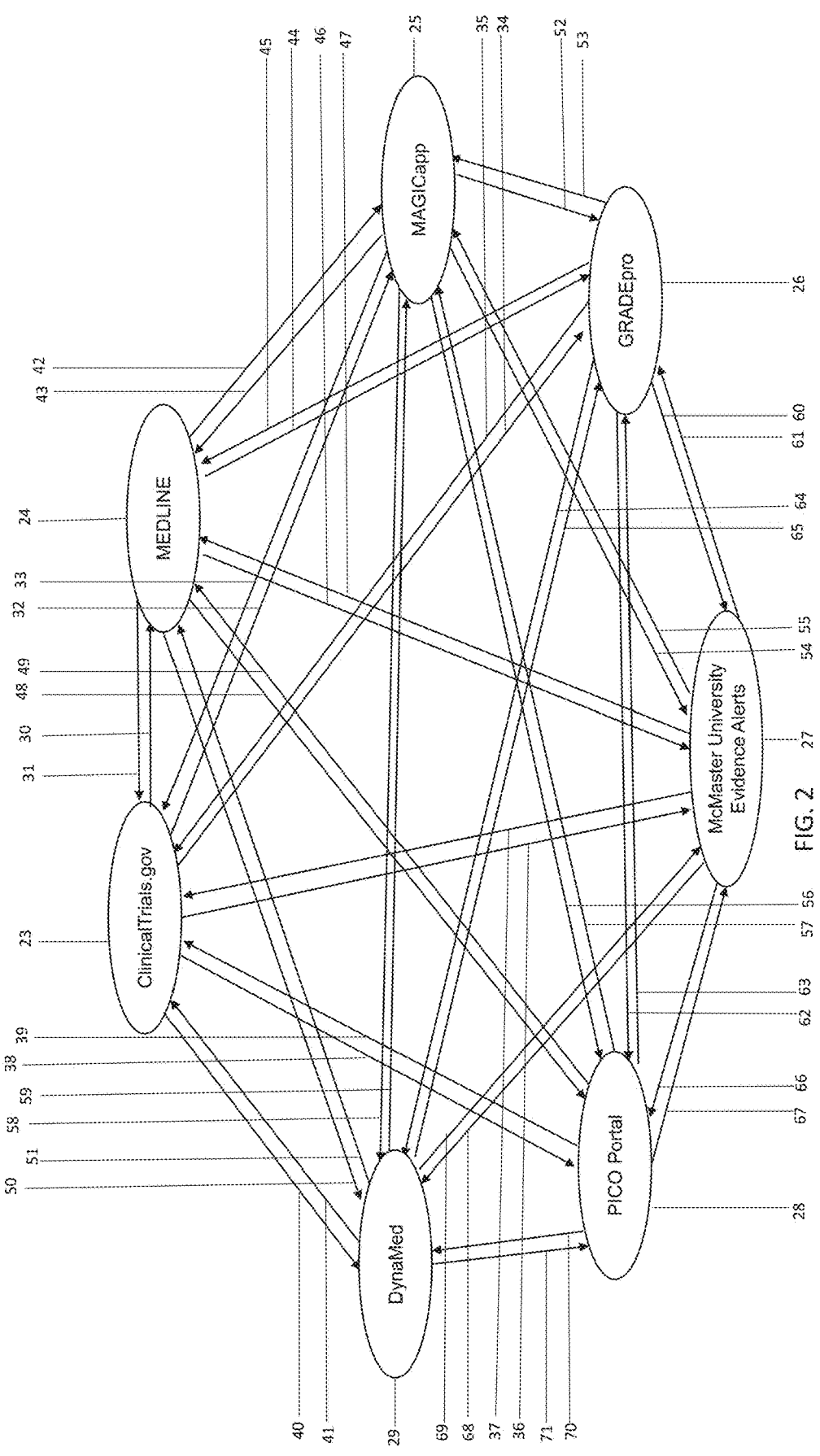
FIG. 2 is a concept diagram showing 7 independent applications require 42 distinct transformation tools, a diagrammatic view of how applications interact consistent with known systems without the present disclosure.
Figure 3:
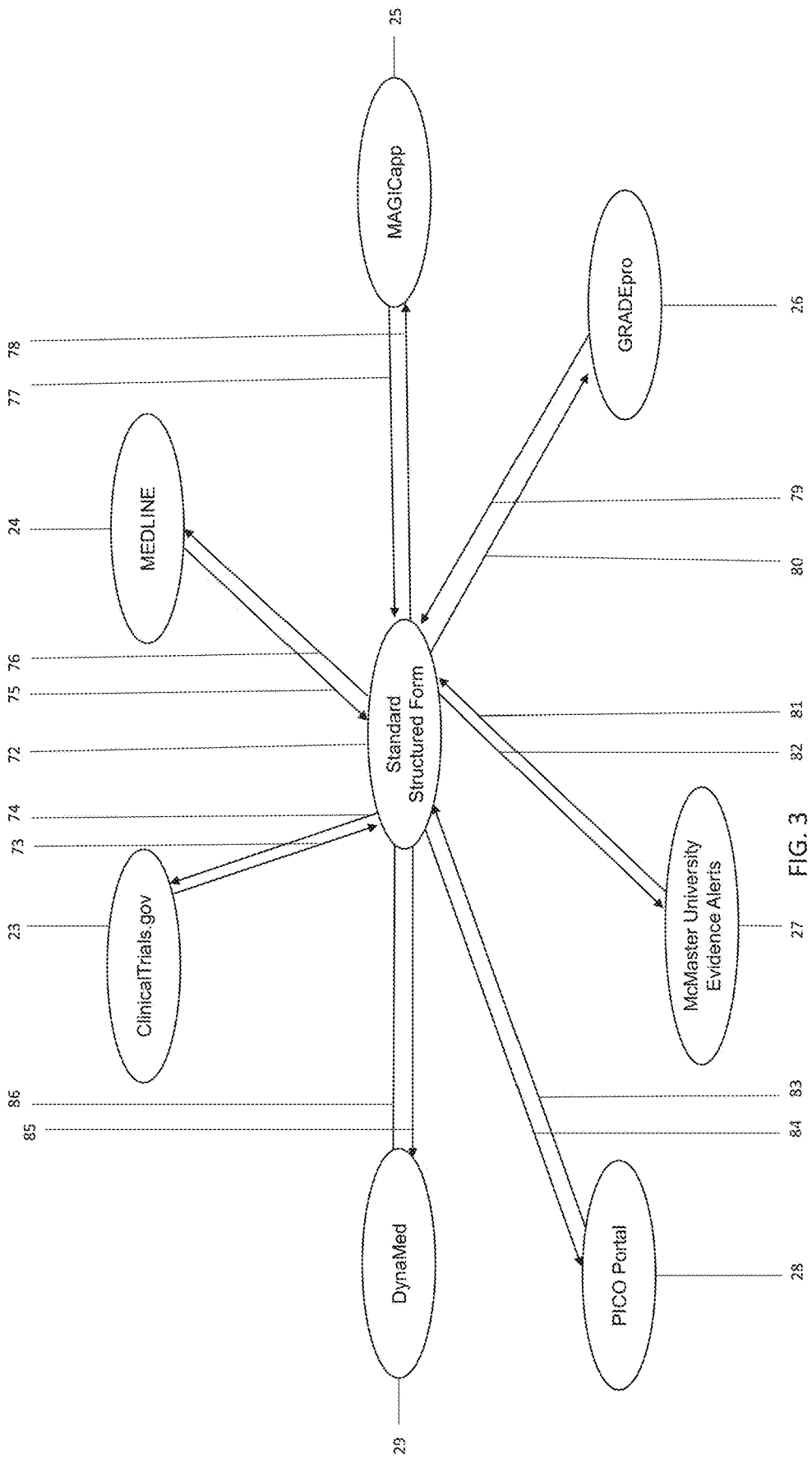
FIG. 3 is a concept diagram showing 7 independent applications require 14 distinct transformation tools when using a standard for data exchange, a diagrammatic view of how applications interact with a system consistent with the present disclosure.
Figure 4:
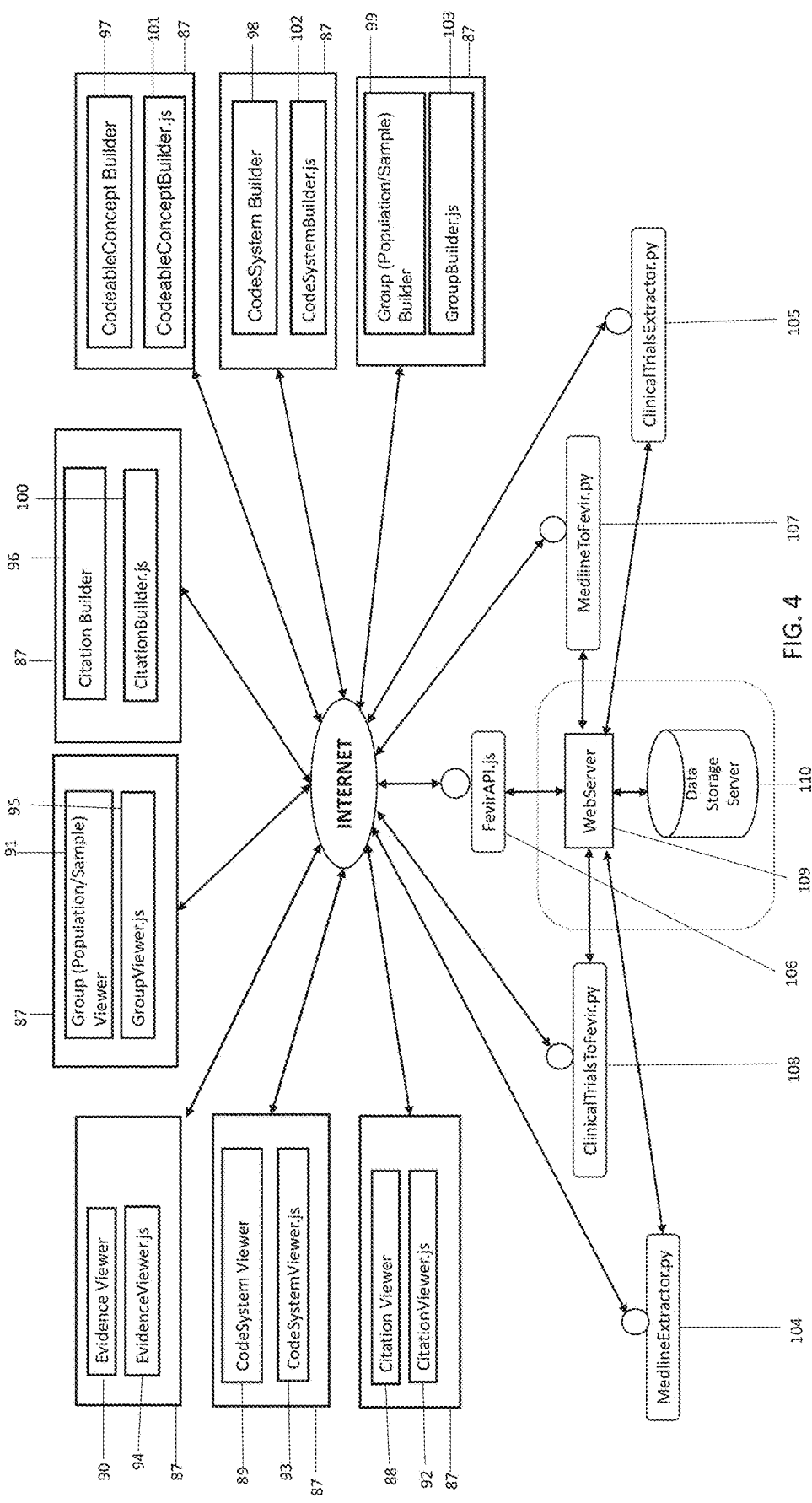
FIG. 4 is a technology entity relationship diagram for the Fast Evidence Interoperability Resources (FEvIR) Platform, a diagrammatic view of an exemplary system consistent with the present disclosure.

In some embodiments, a system and method consistent with the present disclosure includes digital tools for data viewing, digital tools for data input, digital tools for data extraction, digital tools for data transformation (or conversion), data storage on a server-side database, authentication tools, and authorization tools, and data exchange between any of these components. A conceptual diagram is shown in FIG. 4.

The digital tools in one exemplary instance of the system and method disclosed herein (identified in part by example in FIG. 4) include: data display interfaces within an internet browser 87, such as Citation Viewer 88, CodeSystem Viewer 89, Evidence Viewer 90, and Group (Population/Sample) Viewer 91; software code to manifest the data display interfaces within an internet browser 87, such as CitationViewer.js 92, CodeSystemViewer.js 93, EvidenceViewer.js 94, and GroupViewer.js 95; data entry interfaces displayed within an internet browser 87, such as Citation Builder 96, CodeableConcept Builder 97, CodeSystem Builder 98, and Group (Population/Sample) Builder 99; software code to manifest the data entry interfaces displayed within an internet browser 87, such as CitationBuilder.js 100, CodeableConceptBuilder.js 101, CodeSystemBuilder.js 102, and GroupBuilder.js 103; application programming interfaces (APIs) supporting data extraction, such as MedlineExtractor.py 104 and ClinicalTrialsExtractor.py 105; APIs supporting data entry, such as FevirAPI.js 106; and APIs supporting data transformation between structured forms, such as MedlineToFevir.py 107 and ClinicalTrialsToFevir.py 108.

The software code that supports data display interfaces within an internet browser (such as CitationViewer.js 92, CodeSystemViewer.js 93, EvidenceViewer.js 94, and GroupViewer.js 95) and the software code that supports data entry interfaces displayed within an internet browser (such as such as CitationBuilder.js 100, CodeableConceptBuilder.js 101, CodeSystemBuilder.js 102, and GroupBuilder.js 103) is initially located on a web server 109 and copied to the user's internet browser 87 using conventional methods via the FevirAPI.js API 106.

The API accessed capabilities supporting data transformation between structured forms include data extraction tools applied to third party applications (such as MedlineExtractor.py 104 and ClinicalTrialsExtractor.py 105), and executable computer code that converts data from one structured form to another structured form (conversion capabilities) (such as MedlineToFevir.py 107 and ClinicalTrialsToFevir.py 108).

Data storage on a server-side database 110 includes data in an intermediate form, such as data in a form matching the schema expressed in FHIR. FHIR defines the labels used for data elements, the data types that are acceptable for the expression of each data element, the nesting pattern for data elements (which data elements are contained in other data elements), the number of instances that are allowed for a specific data element, and the terminologies that may be used with specific data elements. Data expressed in an intermediate form according to FHIR may be expressed using Extensible Markup Language (XML) or JavaScript Object Notation (JSON). XML and JSON are open standard file formats and data exchange formats that use human-readable text to store and transmit data objects consisting of attribute-value pairs and arrays (or other serializable values).

Figure 5:
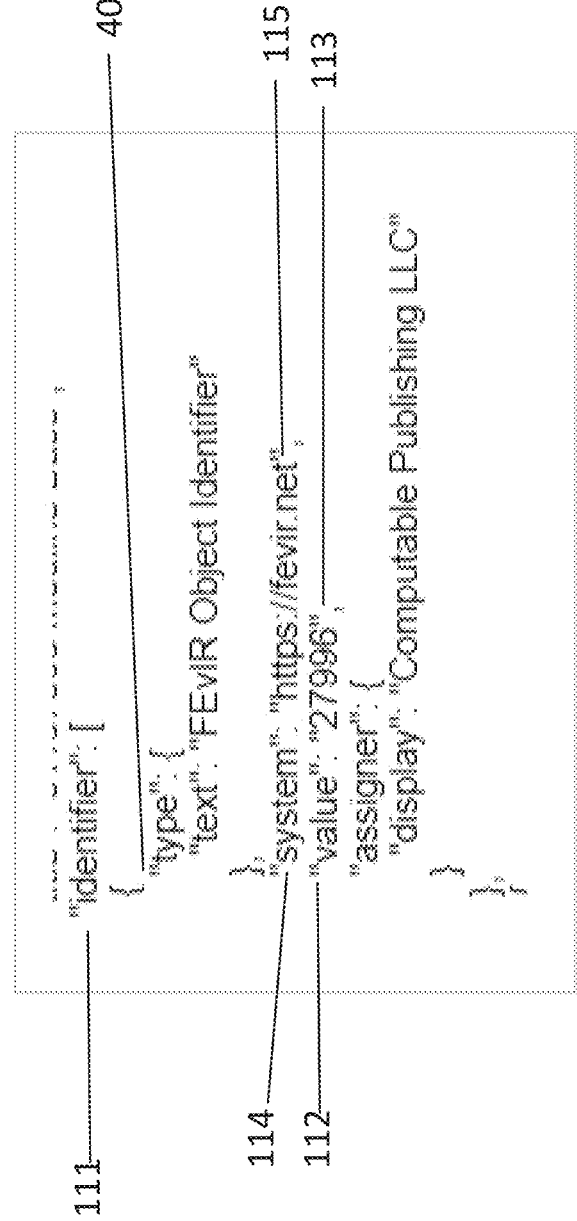
FIG. 5 is a screen shot showing a unique identifier in intermediate form, and corresponding to the example in FIG. 72, taken from the FEvIR Platform which is an exemplary system consistent with the present disclosure.

Data exchange between the digital tools and the data storage on a server-side database involves maintaining a unique identifier for each data object. FIG. 5 shows an example of a unique identifier in intermediate form in FHIR JSON and includes an identifier element 111 which contains a value element 112 containing the value of the unique identifier 113 and a system element 114 containing the value of the Universal Resource Identifier (URI) for the identification system 115.

Data exchange between the digital tools and the data storage includes data exchanged in an intermediate form.

Digital tools that produce data transformation (conversion) translate data between a structured form (that may be used in external or third-party applications) and an intermediate form.

Digital tools that provide data entry interfaces or data display interfaces use digital tools that translate data between a structured form (used in the system and method disclosed herein to display data in human-friendly form) and an intermediate form.

Digital tools that provide data entry interfaces or data display interfaces present data for human use in a structured form designed for rapid interpretation by humans with scientific expertise and not necessarily any expertise related to machine-interpretable expression.

The combination of digital tools that provide data entry interfaces or data display interfaces and digital tools for data transformation provide immediate translation between human-friendly expression and machine-interpretable expression in an intermediate form.

FIGS. 6, 7, 8, 9, 10, 11, 12 and 13 show an example of a novel arrangement of elements providing a technical improvement over the prior art with a combination of user interfaces and digital transformation tools that allows humans to enter data representing research knowledge in a form structured to be recognizable by the person entering the data, such data is converted into an intermediate form, such data in an intermediate form is mapped into structured forms for display within a user interface that allows humans to view the data, such data in an intermediate form is mapped into structured forms for display within a user interface that allows humans to change the data, and data altered in the editor Graphical User Interface (GUI) is converted into the intermediate form.

Figure 6:
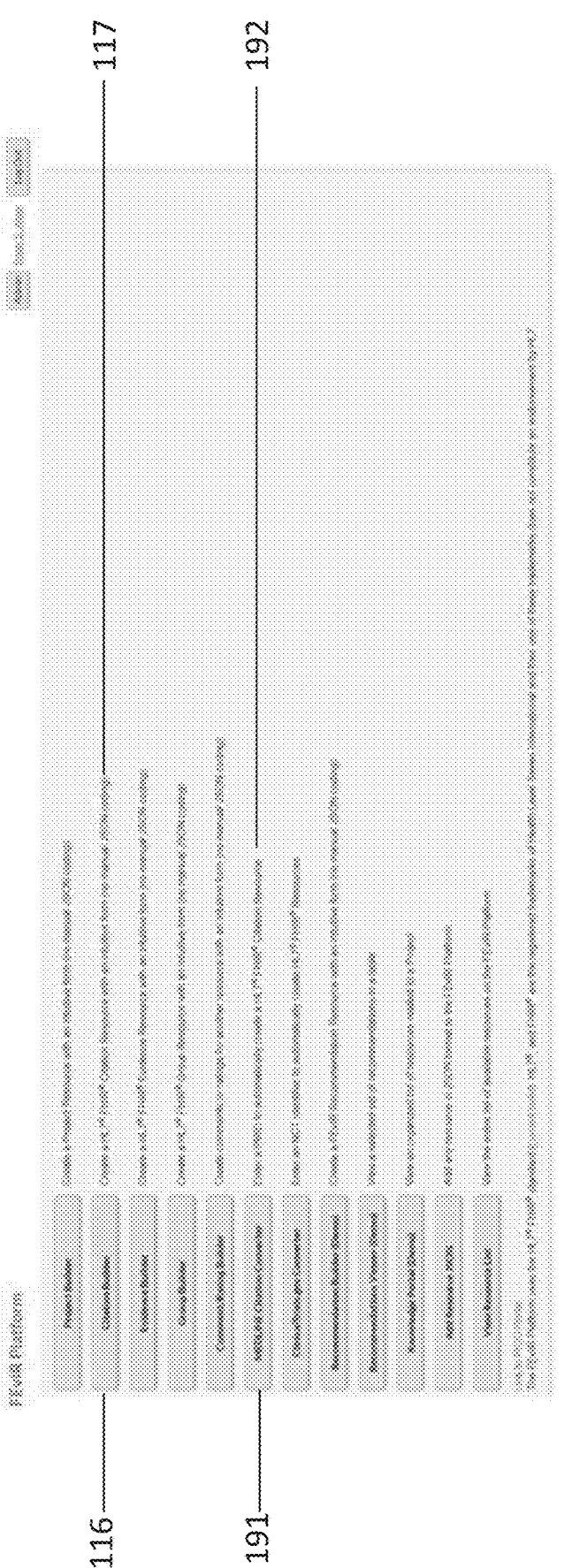
FIG. 6 is a screen shot of the home page of the FEvIR Platform version 0.29.0, an exemplary system and method consistent with the present disclosure.

FIG. 6 shows a button labeled "Citation Builder" 116 and explanatory text including "Create a HL7® FHIR® Citation Resource with an intuitive form (no manual JSON coding)." 117.

Figure 7:
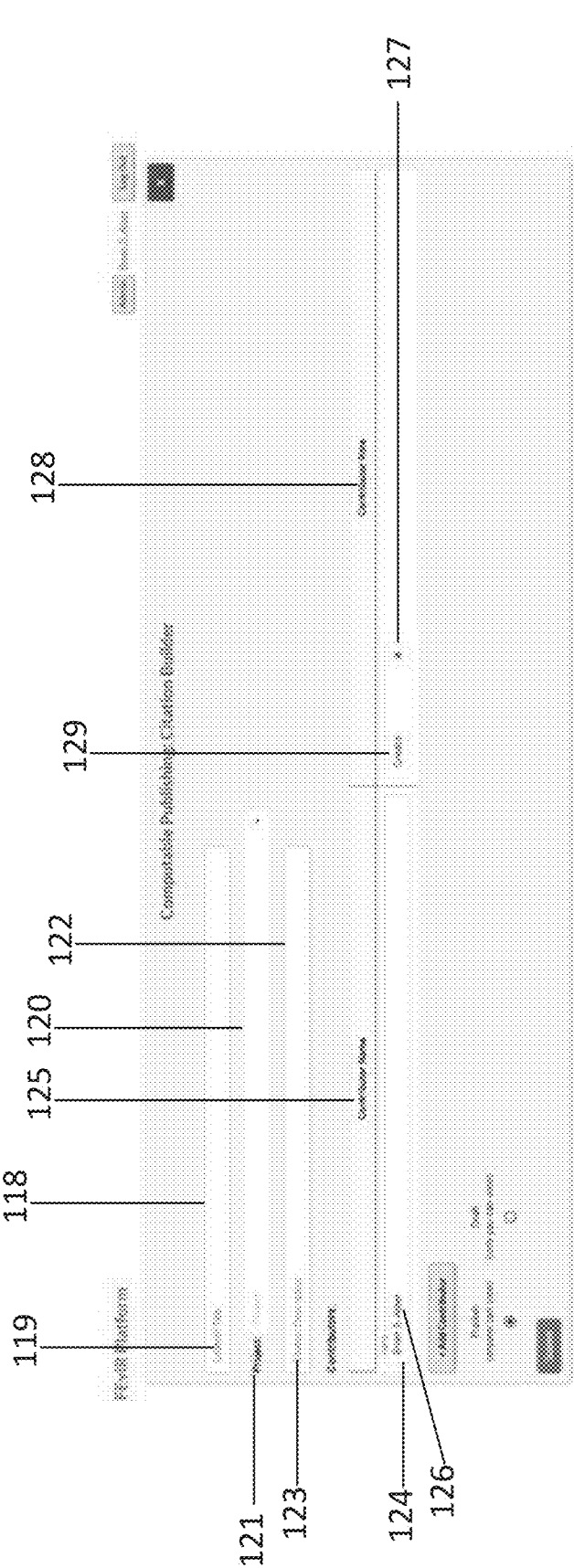
FIG. 7 is a screen shot of the initial data entry interface of the Computable Publishing: Citation Builder tool version 1.4.4 displayed within the FEvIR Platform version 0.29.0, an exemplary system and method consistent with the present disclosure.

FIG. 7 shows an example of a creator GUI for entry of new data. FIG. 7 shows the user interface displayed after clicking the button labeled "Citation Builder" 116 shown in FIG. 6. FIG. 7 shows multiple data entry fields including: a data entry field 118 labeled "Citation Title" 119; a data entry field 120 labeled "Project:" 121; a data entry field 122 labeled "Citation Description" 123; a data entry field 124 displayed in a table cell with the column header "Contributor Name" 125 and containing a data value 126 (automatically suggested by the system based on name display value associated with the logged-in user); and a data entry field 127 displayed in a table cell with the column header "Contributor Role" 128 and containing a data value "Creator" 129 (automatically suggested as a default value for initial data entry).

Figure 8:
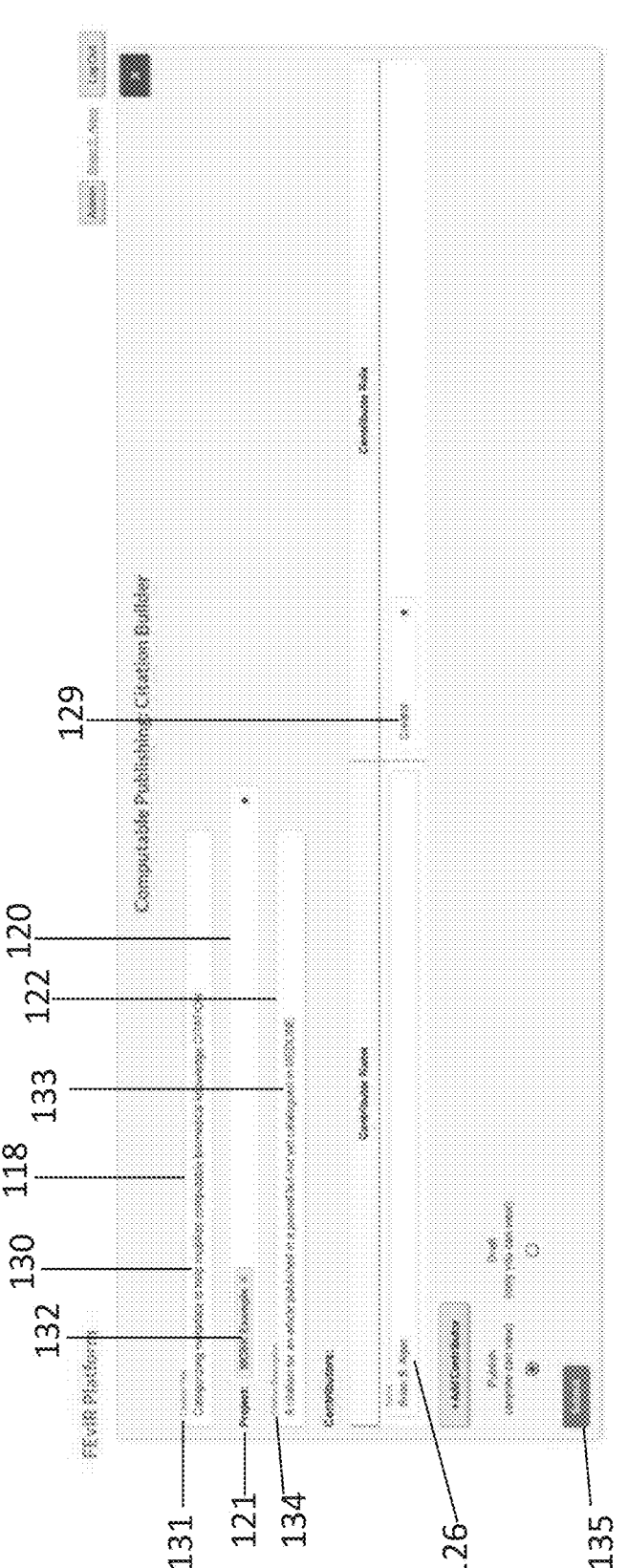
FIG. 8 is a screen shot of the initial data entry interface of the Computable Publishing: Citation Builder tool version 1.4.4 with example data entered, an exemplary system and method consistent with the present disclosure.

FIG. 8 shows an example of new data entered in the interface shown in the example in FIG. 7. FIG. 8 shows: a data value of "Categorizing metadata to help mobilize computable biomedical knowledge CITATION" 130 in a data entry field 118 labeled "Citation Title" 131; a data value of "MCBK Example" 132 in a data entry field 120 labeled "Project:" 121; a data value of "A citation for an article published in a journal but not yet catalogued in MEDLINE" 133 in a data entry field 122 labeled "Citation Description" 134; the same data values 126, 129 selected by default as shown in the example in FIG. 7; and a button labeled "Submit" 135.

Figure 9:
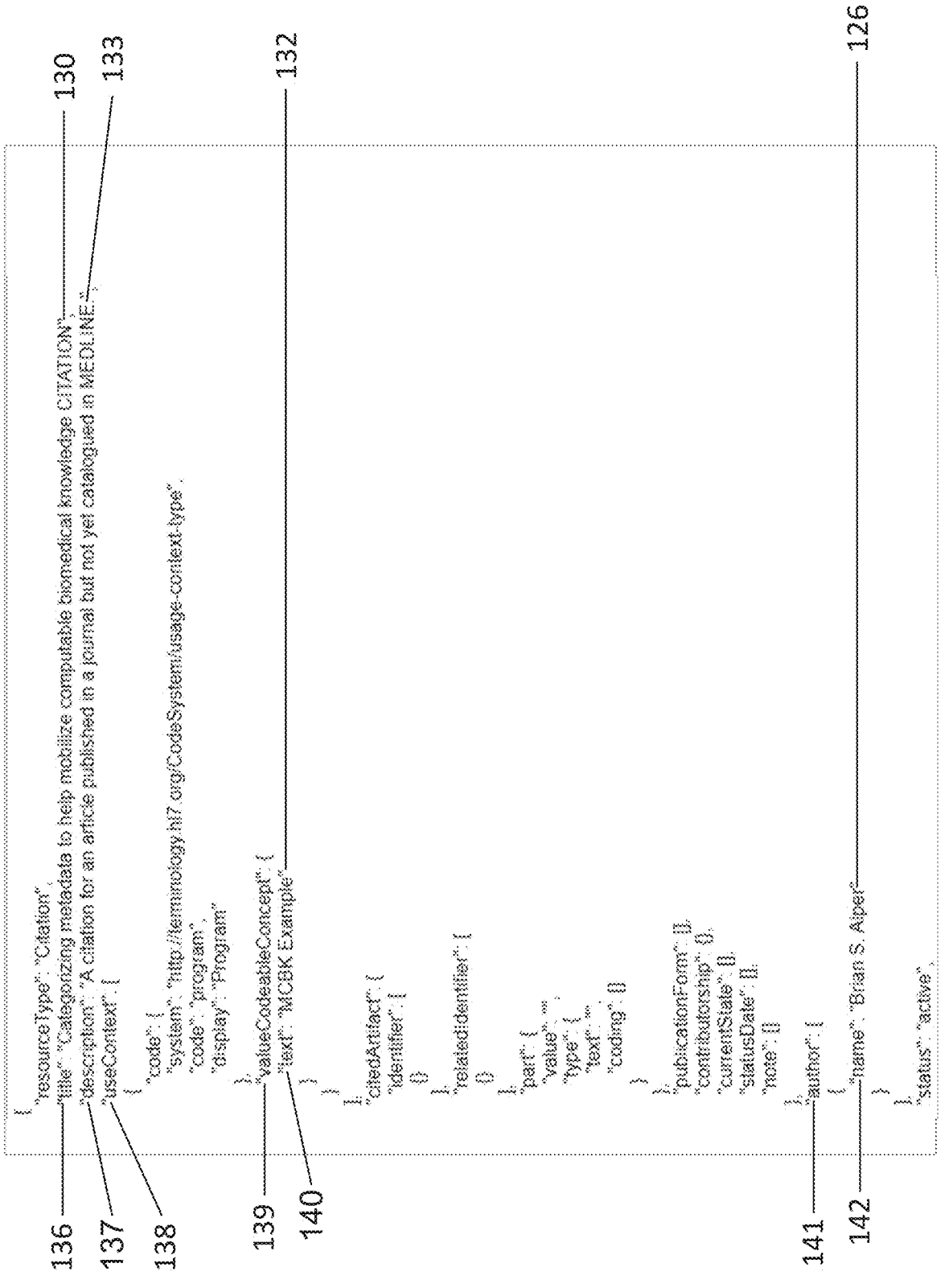
FIG. 9 is a portion of data in intermediate form, corresponding to the example in FIG. 8.

When the button labeled "Submit" 135 is clicked, the system and method disclosed herein will convert the new data that was entered into the creator GUI into current data in an intermediate form. FIG. 9 shows an example of current data consistent with the new data shown in FIG. 8 and converted into an intermediate form in JSON that includes: a title element 136 containing the value 130 (that was entered in a data entry field 118 labeled "Citation Title" 131 as shown in FIG. 8); a description element 137 containing the value 133 (that was entered in a data entry field 122 labeled "Citation Description" 134 as shown in FIG. 8); a useContext element 138 containing a valueCodeableConcept element 139 containing a text element 140 containing the value 132 (that was entered in a data entry field 120 labeled "Project:" 121 as shown in FIG. 8); and an author element 141 containing a name element 142 containing the value 126 (that was selected by default as shown in the example in FIG. 7).

Figure 10:
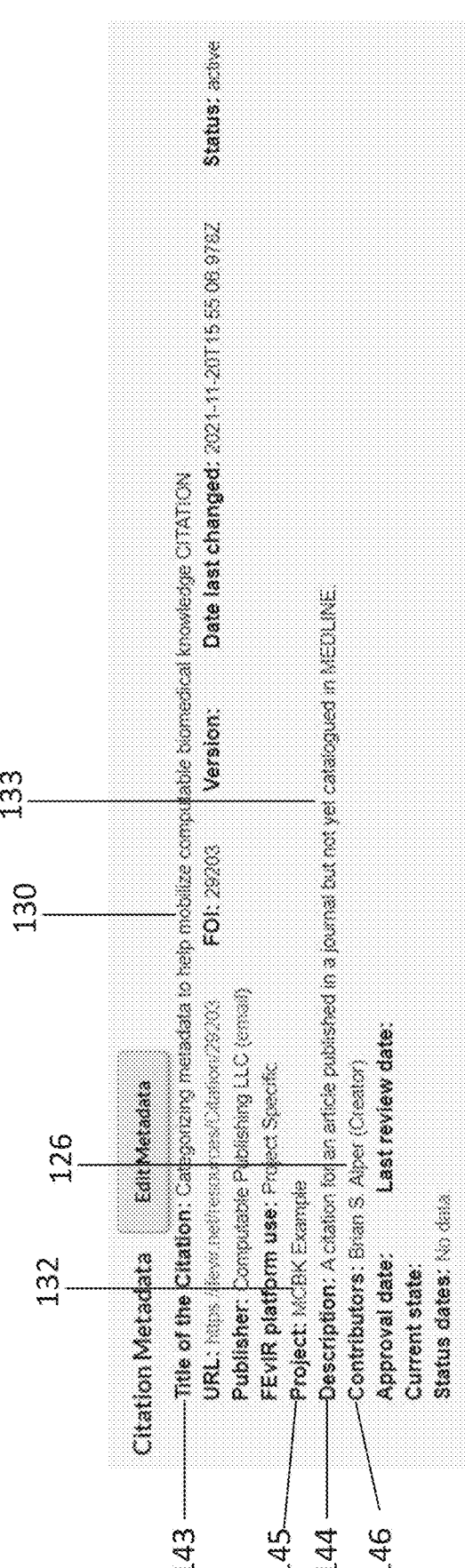
FIG. 10 is a screen shot of the read-only view of the Citation Metadata section of the Computable Publishing: Citation Builder tool version 1.4.4, corresponding to the example shown in FIG. 9, and is an exemplary system and method consistent with the present disclosure.

In some embodiments, a system and method consistent with the present disclosure will convert the current data in intermediate form into display values in a reader GUI for viewing. FIG. 10 shows an example of a data display interface consistent with the current data shown in FIG. 9 and includes: a data element label "Title of the Citation:" 143 followed by the value 130 (that was associated with the title element 136 shown in FIG. 9); a data element label "Description:" 144 followed by the value 133 (that was associated with the description element 137 shown in FIG. 9); a data element label "Project:" 145 followed by the value 132 (that was associated with the text element 140 contained in the valueCodeableConcept element 139 contained in the useContext element 138 shown in FIG. 9); and a data element label "Contributors:" 146 followed by the value 126 (that was associated with the name element 142 contained in the author element 141 shown in FIG. 9).

Figure 11:
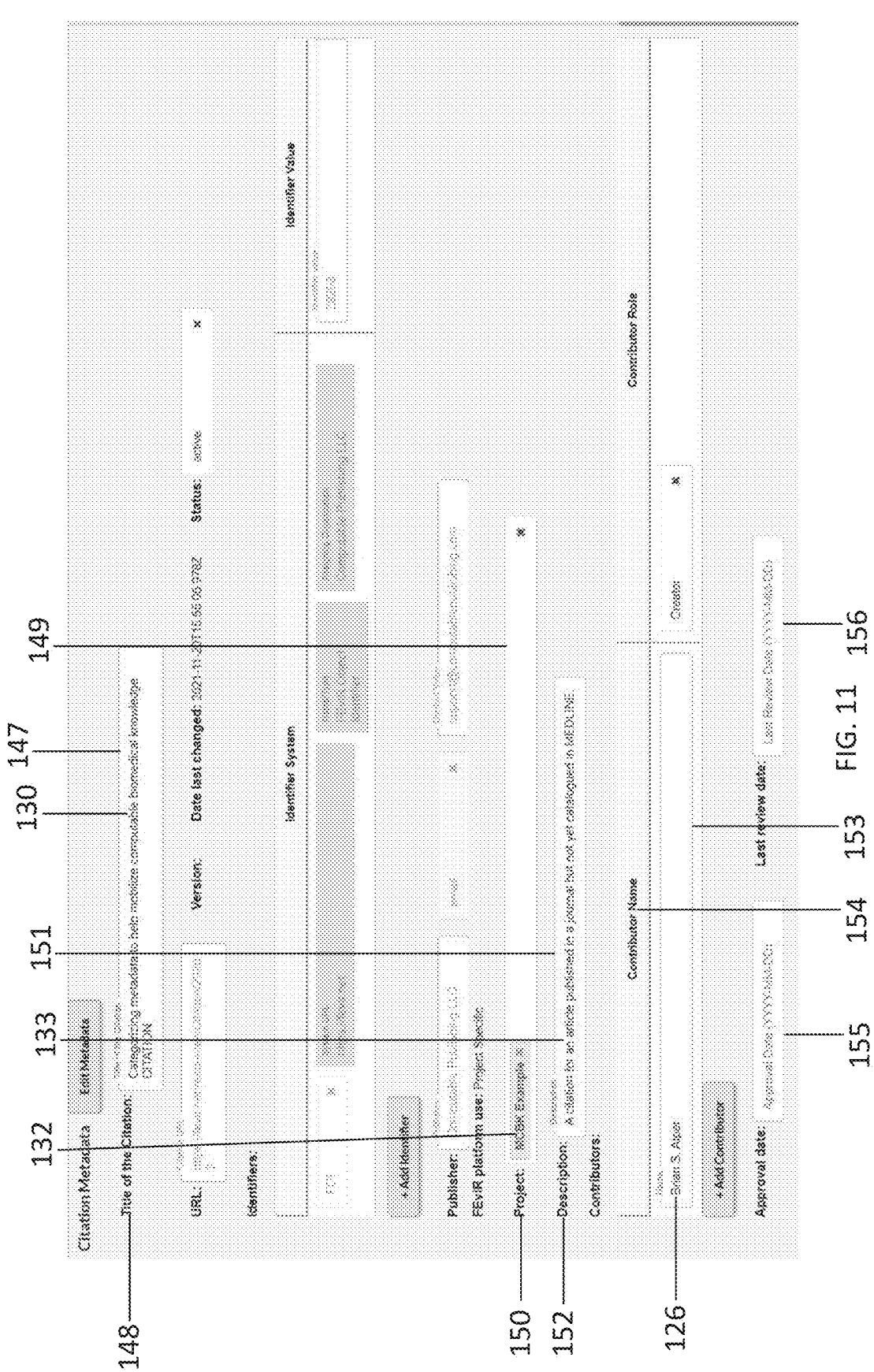
FIG. 11 is a screen shot of the editing view of the Citation Metadata section of the Computable Publishing: Citation Builder tool version 1.4.4, corresponding to the example shown in FIG. 9, and is an exemplary system and method consistent with the present disclosure.

In some embodiments, a system and method consistent with the present disclosure will convert the current data in intermediate form into display values in an editor GUI for revision of the current data and/or entry of new data. FIG. 11 shows an example of a data entry interface consistent with the current data shown in FIG. 9 and includes: a data entry field 147 labeled "Title of the Citation:" 148 and containing the value 130 (that was associated with the title element 136 shown in FIG. 9); a data entry field 149 labeled "Project:" 150 and containing the value 132 (that was associated with the text element 140 contained in the valueCodeableConcept element 139 contained in the useContext element 138 shown in FIG. 9); a data entry field 151 labeled "Description:" 152 and containing the value 133 (that was associated with the description element 137 shown in FIG. 9); a data entry field 153 displayed in a table cell with the column header "Contributor Name" 154 and containing the value 126 (that was associated with the name element 142 contained in the author element 141 shown in FIG. 9); and data entry fields to enter new data, including a data entry field labeled "Approval Date (YYYY-MM-DD)" 155 and a data entry field labeled "Last Review Date (YYYY-MM-DD)" 156.

Figure 12:
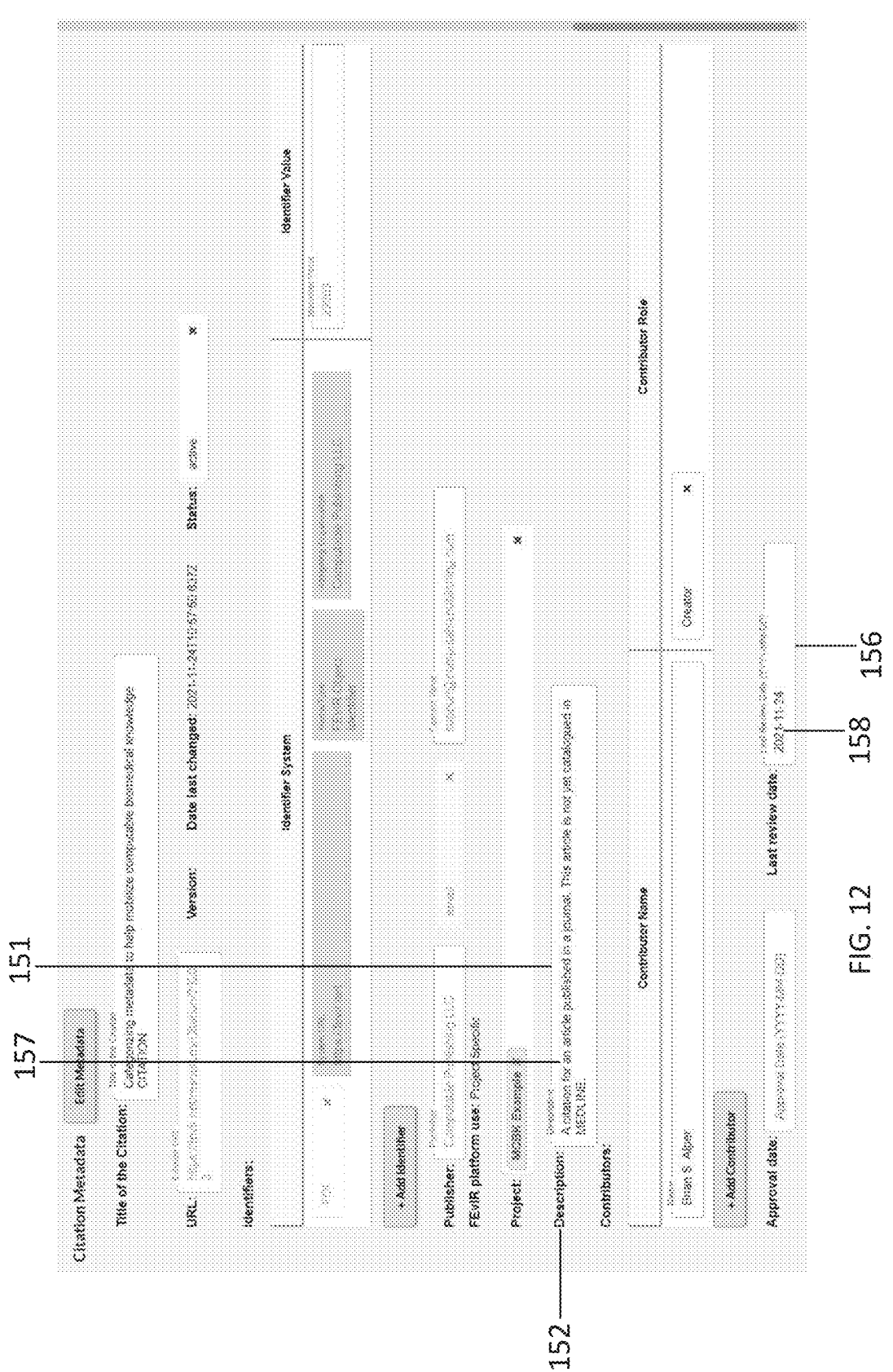
FIG. 12 is a screen shot of the editing view of the Citation Metadata section of the Computable Publishing: Citation Builder tool version 1.4.4, corresponding to the example shown in FIG. 11 with changes to the data, and is an exemplary system and method consistent with the present disclosure.

FIG. 12 shows an example of altered data and additional new data entered in the interface shown in the example in FIG. 11. FIG. 12 shows the same data as the example in FIG. 11 except: the data entry field 151 labeled "Description:" 152 contains a different value 157 (an example of revision of the current data); and the data entry field labeled "Last Review Date (YYYY-MM-DD)" 156 contains a value of "2021-11-24" 158 (an example of additional new data).

In some embodiments, a system and method consistent with the present disclosure will convert the altered data that was entered into the editor GUI into current data in the intermediate form. FIG. 13 shows an example of current data consistent with the altered data shown in FIG. 12 and converted into an intermediate form in JSON that includes: a title element 136 containing the value 130 (that was contained in a data entry field 147 labeled "Title of the Citation:" 148 as shown in FIG. 11 and not changed in the example shown in FIG. 12); a description element 137 containing the value 157 (that was entered in a data entry field 151 labeled "Citation Description" 152 as shown in FIG. 12); and a lastReviewDate element 159 containing the value 158 (that was entered in a data entry field labeled "Last Review Date (YYYY-MM-DD)" 156 as shown in FIG. 12).

The advantages of this arrangement of elements include: the ability of humans to enter new data representing scientific knowledge without any skill, expertise or pre-existing knowledge about the structured form for expression of such knowledge; the ability of humans to view current data representing scientific knowledge without any skill, expertise or pre-existing knowledge about the structured form for expression of such knowledge; immediate transformation of any data entered in a non-standard form into an intermediate form to maintain structural integrity and syntactic integrity of the data; immediate transformation of current data in an intermediate form into human-interpretable displays for viewing and for data entry which supports immediate recognition and correction of errors in the data; and immediate transformation of data revised in a non-standard form into an intermediate form to maintain structural integrity and syntactic integrity of the data.

These advantages overcome the barrier to using a standard form to provide interoperability and efficiency for data exchange of scientific knowledge by greatly reducing the difficulty to acquire data representing scientific knowledge in a nonstandard form and converting such data to a standard form.

Figure 14:
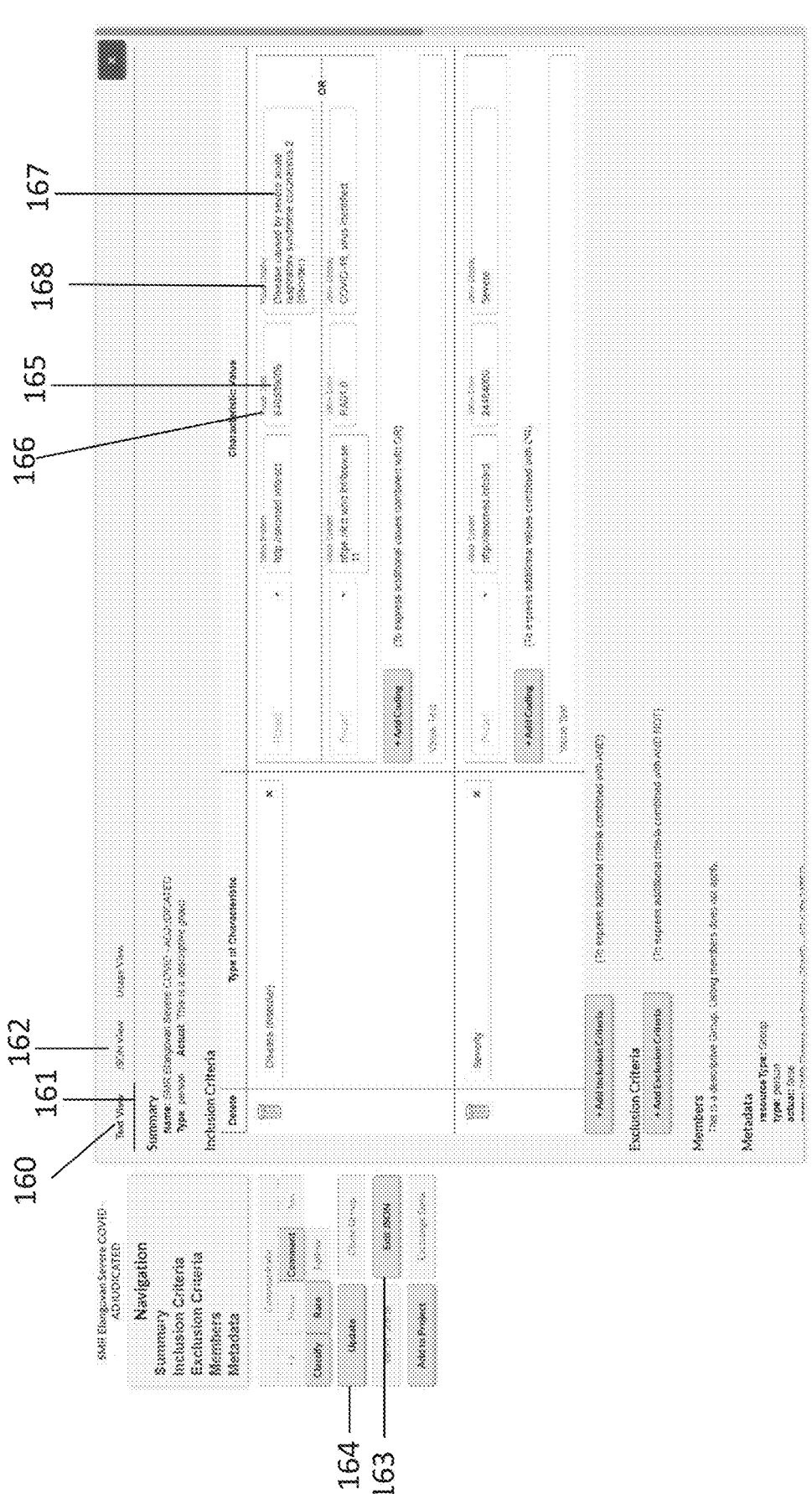
FIG. 14 is a screen shot of the Computable Publishing: Group (Population/Sample) Builder tool version 0.12.0, an exemplary system and method consistent with the present disclosure.

FIG. 14 shows an example of a novel arrangement of elements providing a technical improvement over the prior art with a system that defines a "working state" version of the content that can support interoperable viewing between a human-friendly representation in an editor GUI and a standard-based structured data representation in a developer GUI, transforms the altered data entered by a person using the editor GUI into the "working state" upon the person signaling they want to view the developer GUI or submit the altered data for saving, transforms the altered data entered by a person using the developer GUI into the "working state" upon the person signaling they want to view the editor GUI or submit the altered data for saving, and checks the altered data for non-computable data before allowing transfer of such data to the "working state".

FIG. 14 shows an editor GUI with: a tab labeled "Text View" 160 which is bold and has a bold underline 161 to demonstrate to the user that it represents the current view; a tab labeled "JSON View" 162 which represents a method to change the view to a developer GUI; a button labeled "Edit JSON" 163 which represents a method to change the view to a developer GUI; a button labeled "Update" 164 which represents a method to submit any changes to the data for saving; and a data entry form that includes a data value "840539006" 165 in a data entry field labeled "Value Code" 166 and a data value "Disease caused by severe acute respiratory syndrome coronavirus 2 (disorder)" 167 in a data entry field labeled "Value Display" 168.

Figure 15:
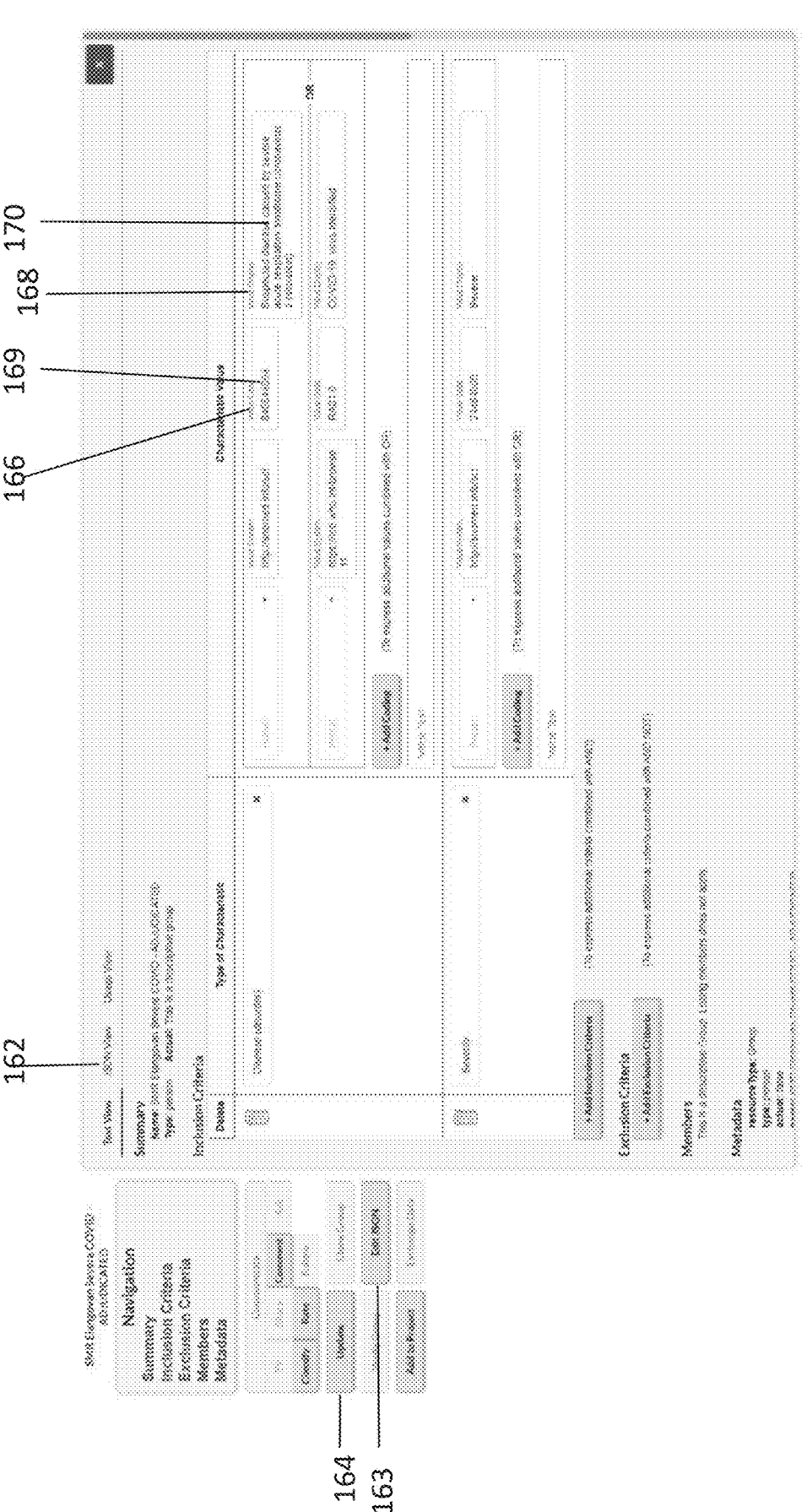
FIG. 15 is a screen shot of the Computable Publishing: Group (Population/Sample) Builder tool version 0.12.0 with an example of revised data corresponding to the example shown in FIG. 14, an exemplary system and method consistent with the present disclosure.

FIG. 15 shows the user interface from FIG. 14 after the user edits the data to include the data value "840544004" 169 in a data entry field labeled "Value Code" 166 and a data value "Suspected disease caused by severe acute respiratory syndrome coronavirus 2 (situation)" 170 in a data entry field labeled "Value Display" 168.

When the user of the user interface shown in FIG. 15 signals the desire to view the developer GUI by clicking the tab labeled "JSON View" 162 or the button labeled "Edit JSON" 163 or signals the desire to submit the data for saving by clicking the button labeled "Update" 164, the system and method disclosed herein will convert the altered data into a structured form called the "working state" for purposes of this detailed description.

Figure 16:
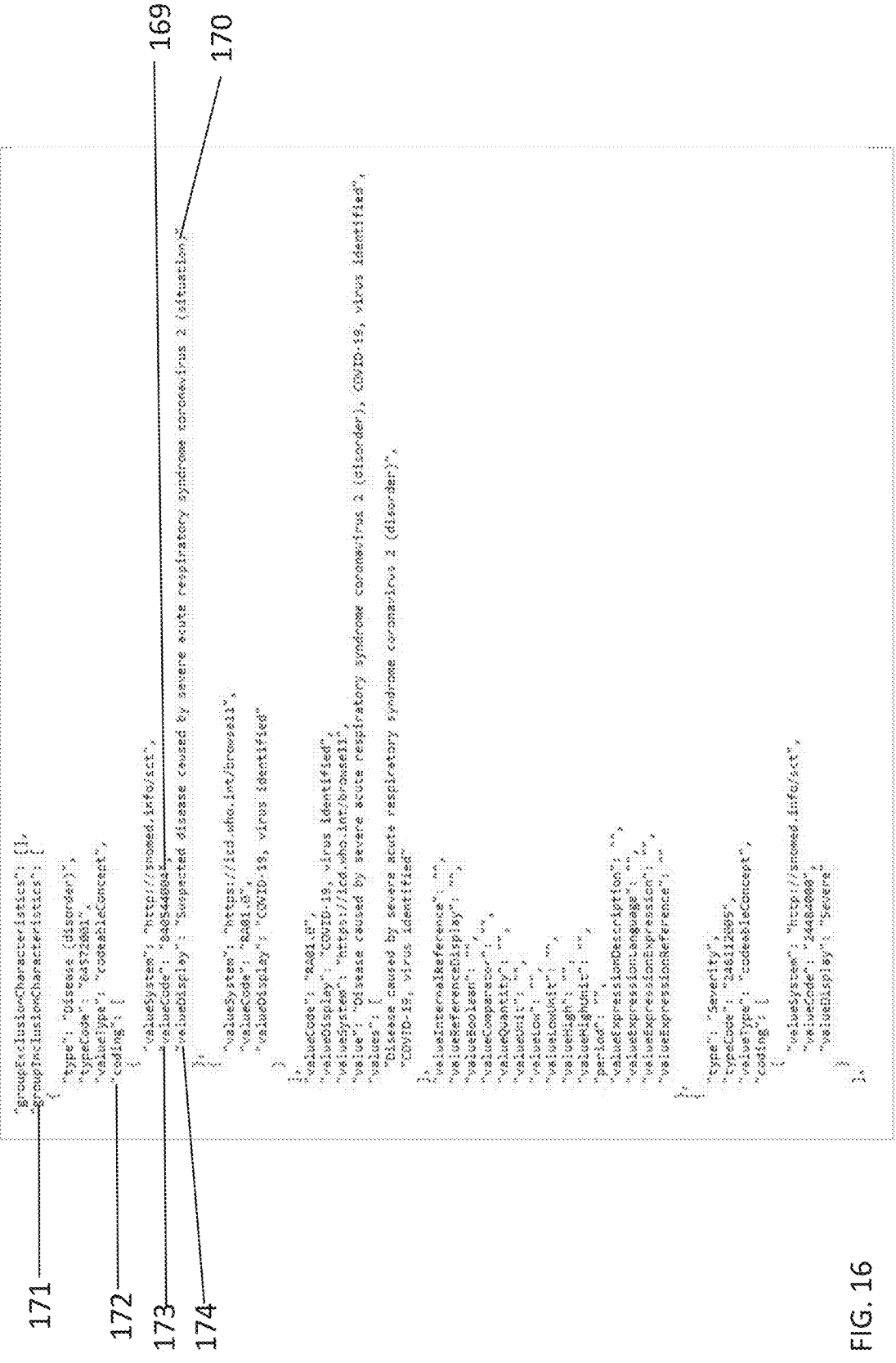
FIG. 16 is a portion of structured form of data, corresponding to the example in FIG. 15, and an exemplary system and method consistent with the present disclosure.

FIG. 16 shows an example of "working state" data consistent with the altered data shown in FIG. 15 and converted into a structured form in JSON (used for the "working state") with data that includes a groupInclusion-Characteristics element 171 which contains a coding element 172 which contains: a valueCode element 173 which contains the data value "840544004" 169; and a valueDisplay element 174 which contains the data value "Suspected disease caused by severe acute respiratory syndrome coronavirus 2 (situation)" 170.

Figure 17:
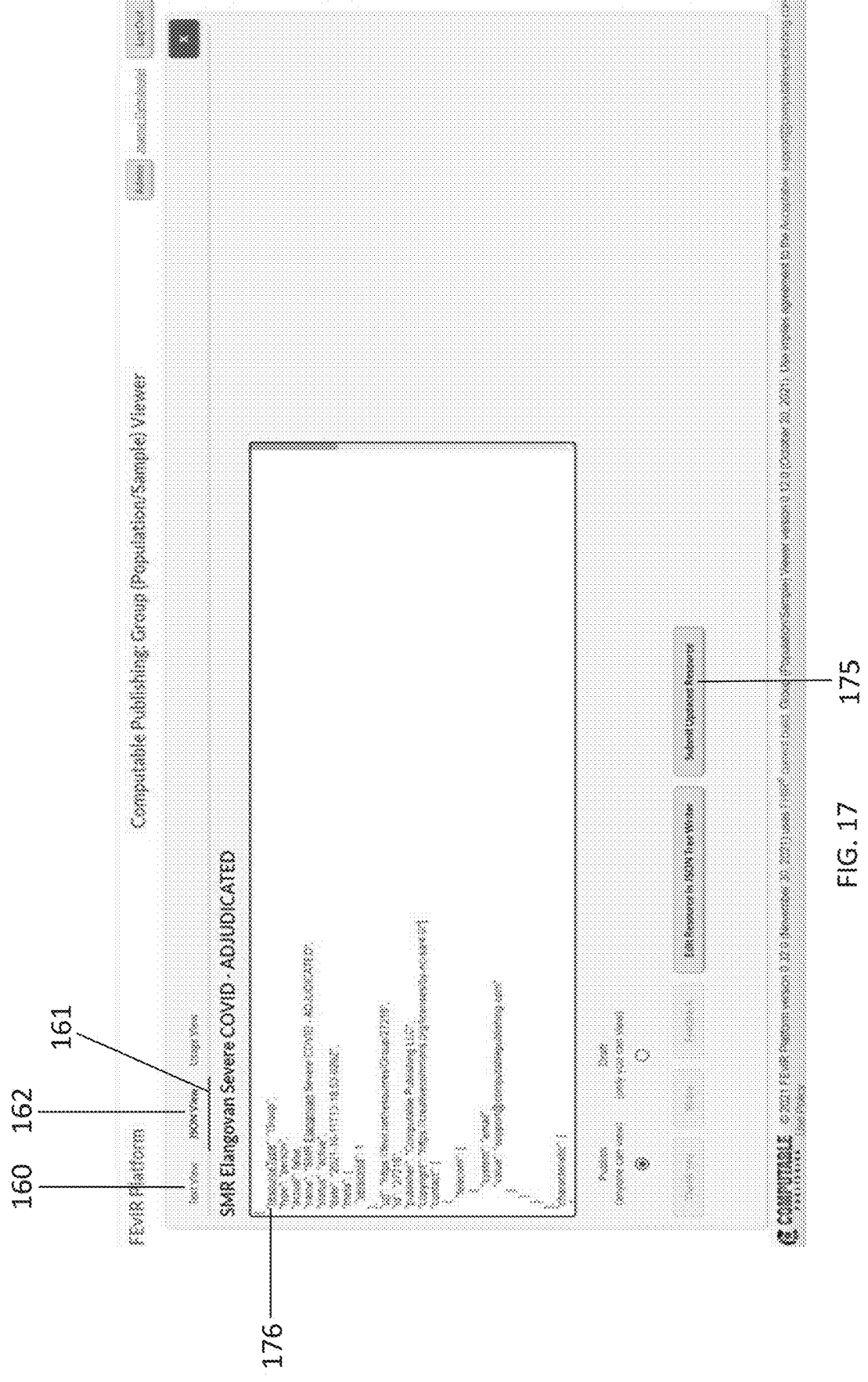
FIG. 17 is a screen shot of the JSON View of the Computable Publishing: Group (Population/Sample) Builder tool version 0.12.0, corresponding to the example shown in FIG. 15 and FIG. 16, and an exemplary system and method consistent with the present disclosure.

FIG. 17 shows a developer GUI with: a tab labeled "JSON View" 162 which is bold and has a bold underline 161 to demonstrate to the user that it represents the current view; a tab labeled "Text View" 160 which represents a method to change the view to an editor GUI; a button labeled "Submit Updated Resource" 175 which represents a method to submit any changes to the data for saving; and data in an intermediate form in JSON which includes "resourceType": "Group", 176.

Figure 18:
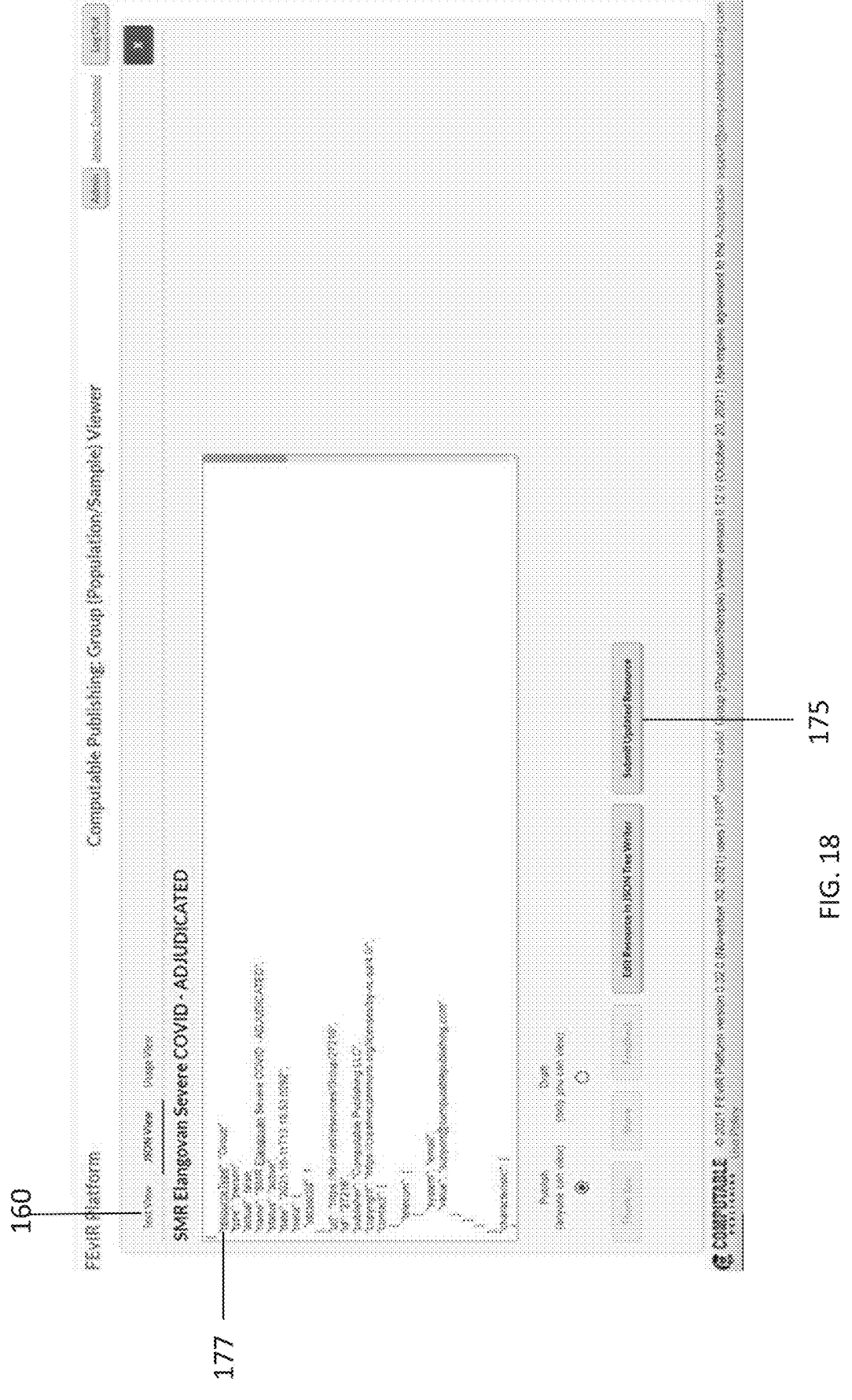
FIG. 18 is a screen shot of the JSON View of the Computable Publishing: Group (Population/Sample) Builder tool version 0.12.0 with an example of revised data corresponding to the example shown in FIG. 17 and representing data not matching the JSON specification, and an exemplary system and method consistent with the present disclosure.

FIG. 18 shows the user interface from FIG. 17 after the user edits the data to remove the first comma and includes "resourceType":"Group" 177.

When the user of the user interface shown in FIG. 18 signals the desire to view the editor GUI by clicking the tab labeled "Text View" 160 or signals the desire to submit the data for saving by clicking the button labeled "Submit Updated Resource" 175, the system and method disclosed herein will check if the altered data matches a structured form consistent with the JSON specification and, if matching the JSON specification, will convert the altered data into the structured form called the "working state".

Figure 19:
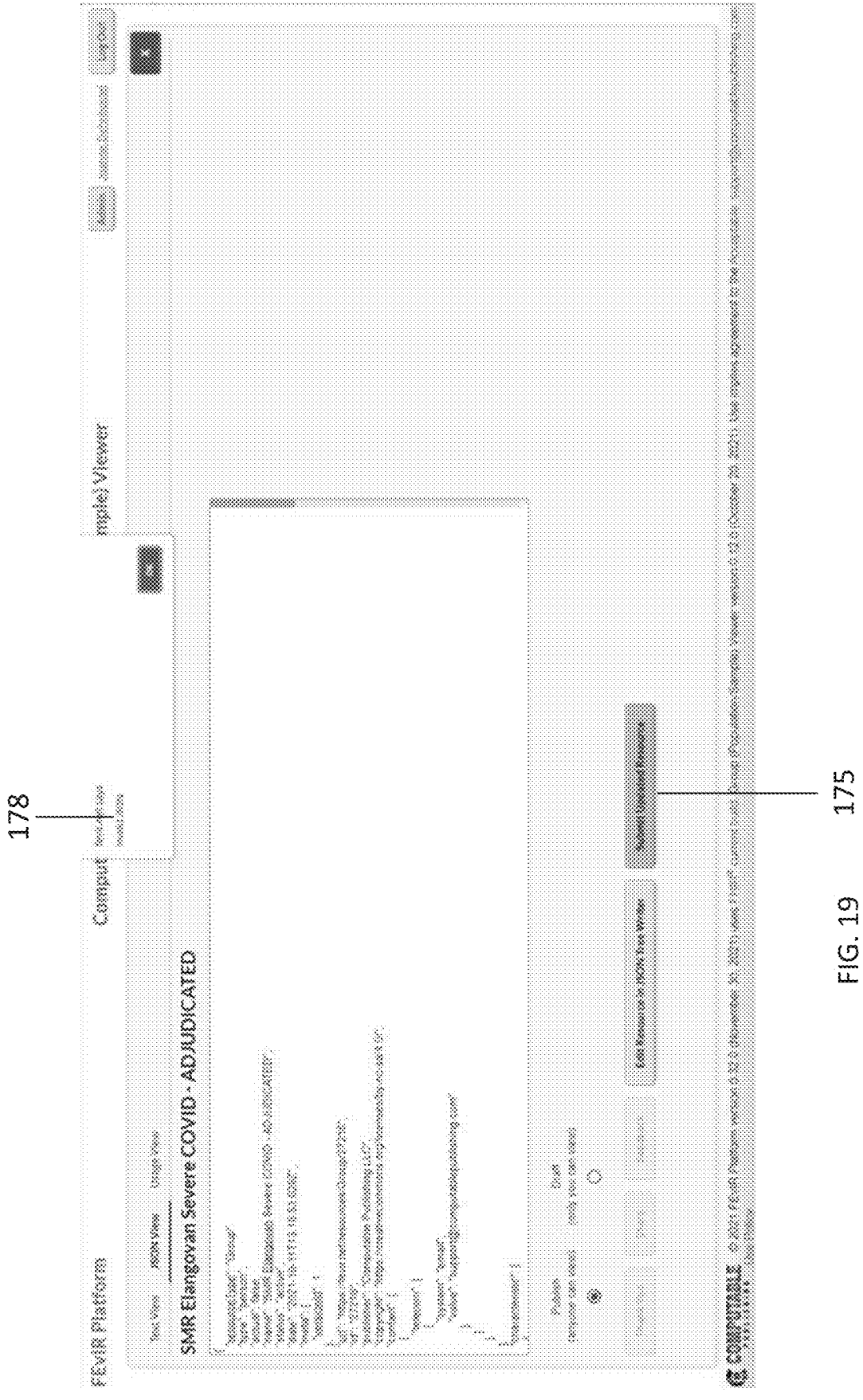
FIG. 19 is a screen shot of a warning message shown in the JSON View of the Computable Publishing: Group (Population/Sample) Builder tool version 0.12.0, corresponding to the example shown in FIG. 18, and an exemplary system and method consistent with the present disclosure.
Figure 20:
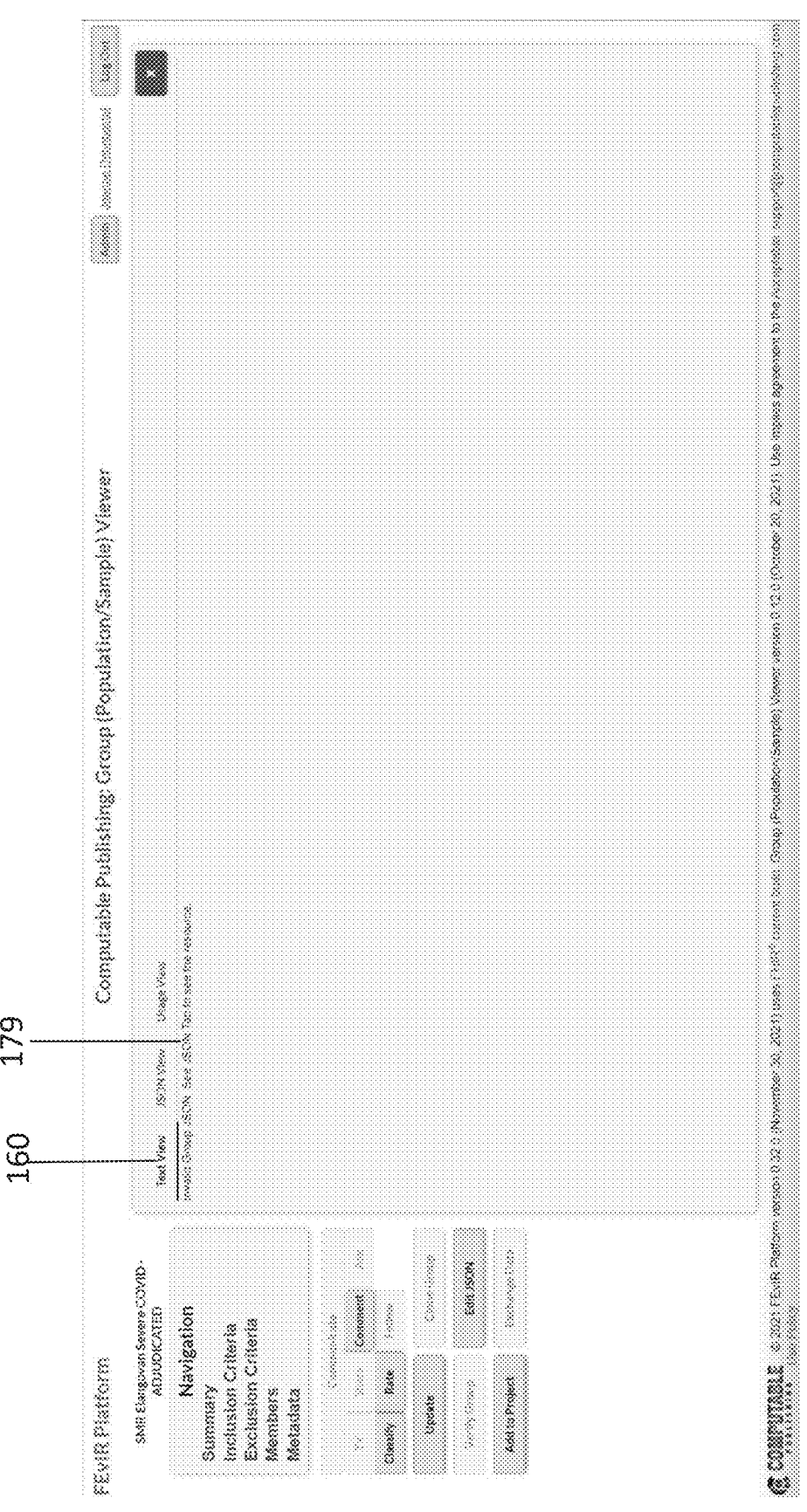
FIG. 20 is a screen shot of a warning message shown in the Text View of the Computable Publishing: Group (Population/Sample) Builder tool version 0.12.0, corresponding to the example shown in FIG. 18, and an exemplary system and method consistent with the present disclosure.

If the altered data edited in the developer GUI does not match the JSON specification, the system and method disclosed herein will present a warning message to the user. FIG. 19 shows the warning message "Invalid JSON" 178 that is displayed if the user clicks the button labeled "Submit Updated Resource" 175 and the data is found to not match the JSON specification. FIG. 20 shows the warning message "Invalid Group JSON. See JSON Tab to see the resource." 179 that is displayed if the user clicks the tab labeled "Text View" 160 and the altered data is found to not match the JSON specification.

Figure 21:
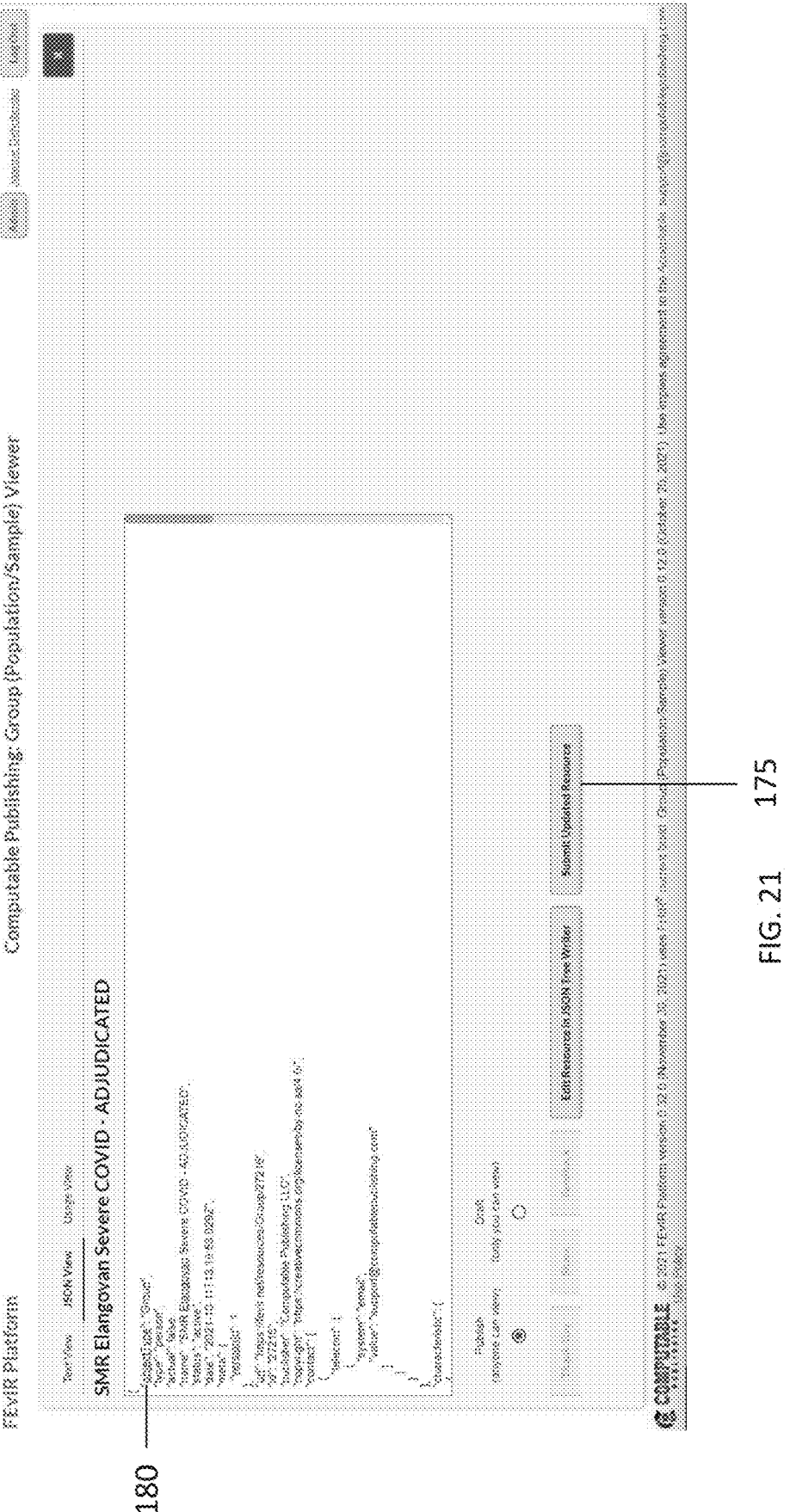
FIG. 21 is a screen shot of the JSON View of the Computable Publishing: Group (Population/Sample) Builder tool version 0.12.0 with an example of revised data corresponding to the example shown in FIG. 17 and representing data not matching the FHIR JSON specification, and an exemplary system and method consistent with the present disclosure.

FIG. 21 shows the user interface from FIG. 17 after the user edits the data to change "resourceType":"Group", 176 (shown in FIG. 17) to "objectType":"Group", 180.

When the user of the user interface shown in FIG. 21 signals the desire to submit the altered data for saving by clicking the button labeled "Submit Updated Resource" 175, the system and method disclosed herein will check if the altered data matches a structured form consistent with the JSON specification and if matching the JSON specification will convert the altered data into the structured form called the "working state".

Figure 22:
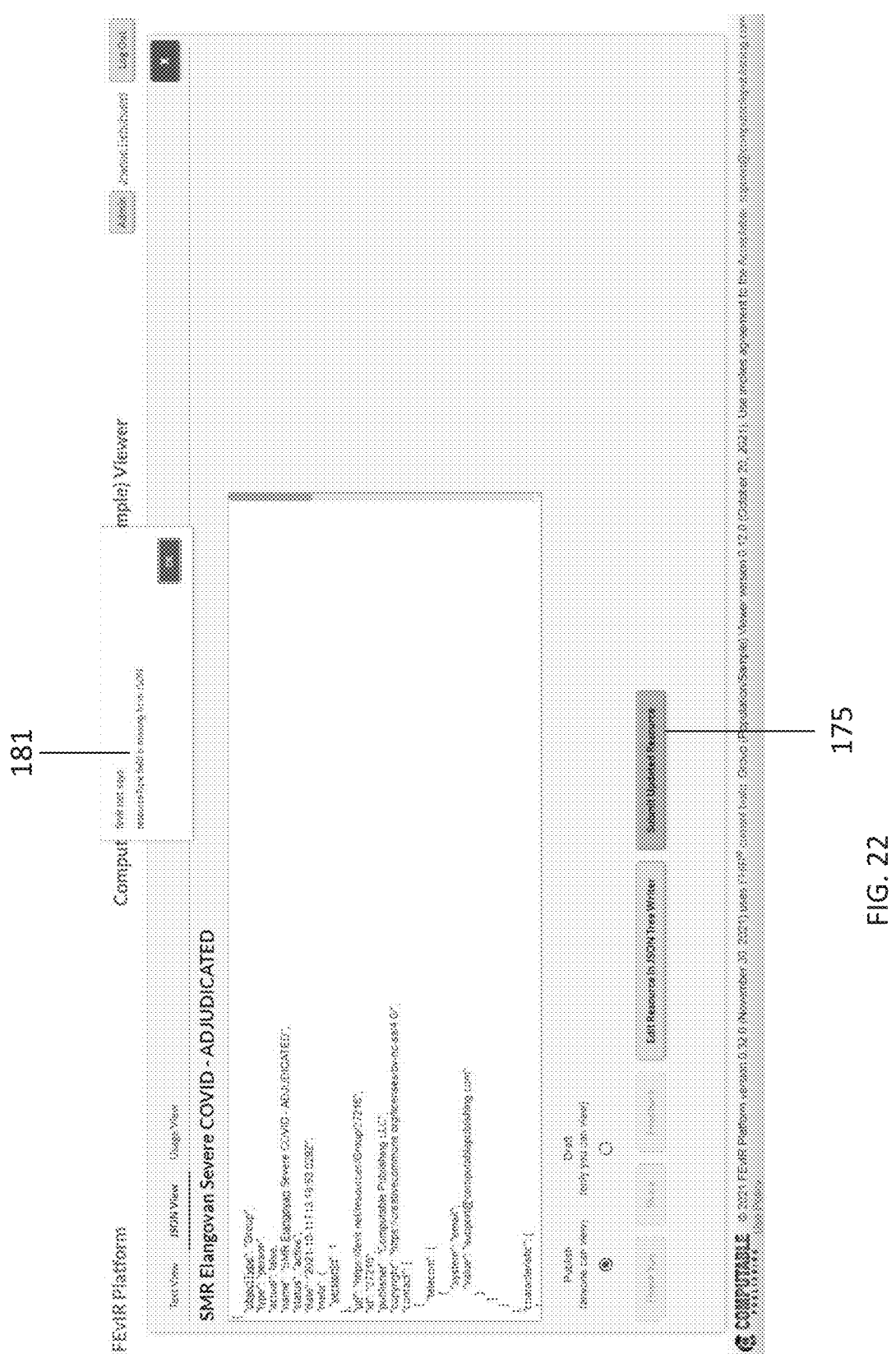
FIG. 22 is a screen shot of a warning message shown in the JSON View of the Computable Publishing: Group (Population/Sample) Builder tool version 0.12.0, corresponding to the example shown in FIG. 21, and an exemplary system and method consistent with the present disclosure.

If the altered data edited in the developer GUI does not match the intermediate form, the system and method disclosed herein will present a warning message to the user. FIG. 22 shows the warning message "resourceType field is missing from JSON" 181 that is displayed if the user clicks the button labeled "Submit Updated Resource" 175 and the altered data is found to not match the intermediate form (in this example by not containing a required resourceType element).

The advantages of this arrangement of elements are that users can use either or both of editor or developer GUIs for data entry and can select whichever user interface is more efficient for them, users can use the developer GUI for data that is too complex or specialized to be supported by the editor GUI, users who change data in the developer GUI can immediately view the altered data in the editor GUI to check its appearance before submitting the altered data for saving, and users who change data in the editor GUI can immediately view the altered data in the developer GUI to check its appearance before submitting the altered data for saving. These advantages overcome problems noted in Background #0009 and #0010.

Figure 23:
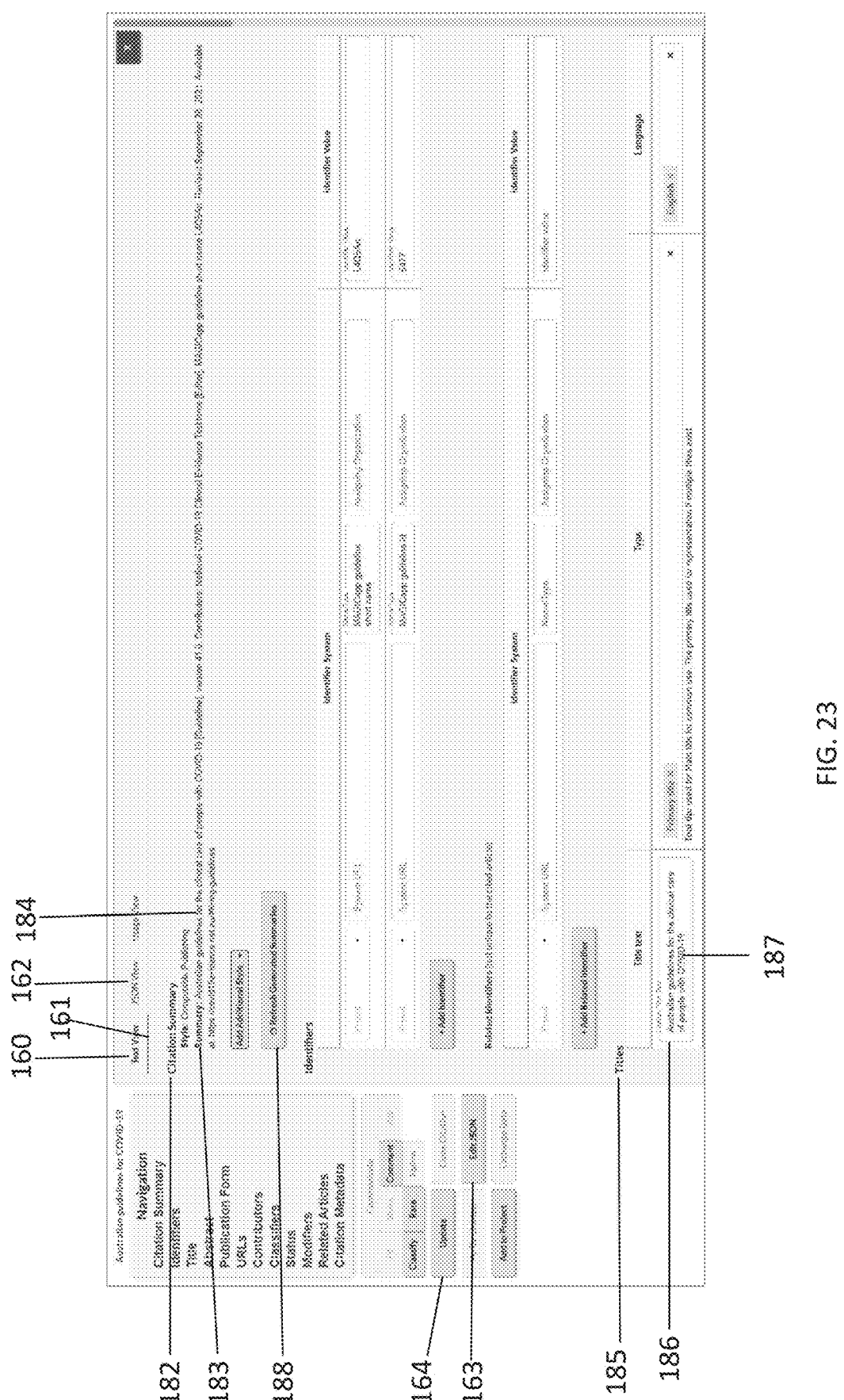
FIG. 23 is a screen shot of the Computable Publishing: Citation Builder tool version 1.4.4, an exemplary system and method consistent with the present disclosure.

FIG. 23 shows an example of a novel arrangement of elements providing a technical improvement over the prior art with a system that isolates the data that is automatically derived (or autogenerated) from the altered data entered in a GUI, and limits the autogeneration of such data to select actions in which the user elects to save the altered data, upload the altered data to a server, change between editing views, or trigger autogeneration of such data.

FIG. 23 shows an editor GUI which includes: a section labeled "Citation Summary" 182 that includes a data element label of "Summary:" 183 followed by data 184 that was automatically derived from the data in the "working state"; a section labeled "Titles" 185 which includes a data entry field 186 labeled "Citation Title Text" which contains data 187; a tab labeled "Text View" 160 which is bold and has a bold underline 161 to demonstrate to the user that it represents the current view; a tab labeled "JSON View" 162 which represents a method to change the view to a developer GUI; a button labeled "Edit JSON" 163 which represents a method to change the view to a developer GUI; a button labeled "Update" 164 which represents a method to submit any changes to the data for saving; and a button labeled "Refresh Generated Summaries" 188 which represents a method to trigger conversion of entered data to the "working state" and autogeneration of data from the data in the "working state".

Figure 24:
FIG. 24 is a screen shot of the Computable Publishing: Citation Builder tool version 1.4.4 with an example of revised data corresponding to the example shown in FIG. 23, an exemplary system and method consistent with the present disclosure.

FIG. 24 shows the user interface from FIG. 23 after the user changes the data 189 in the data entry field 186 labeled "Citation Title Text."

Figure 25:
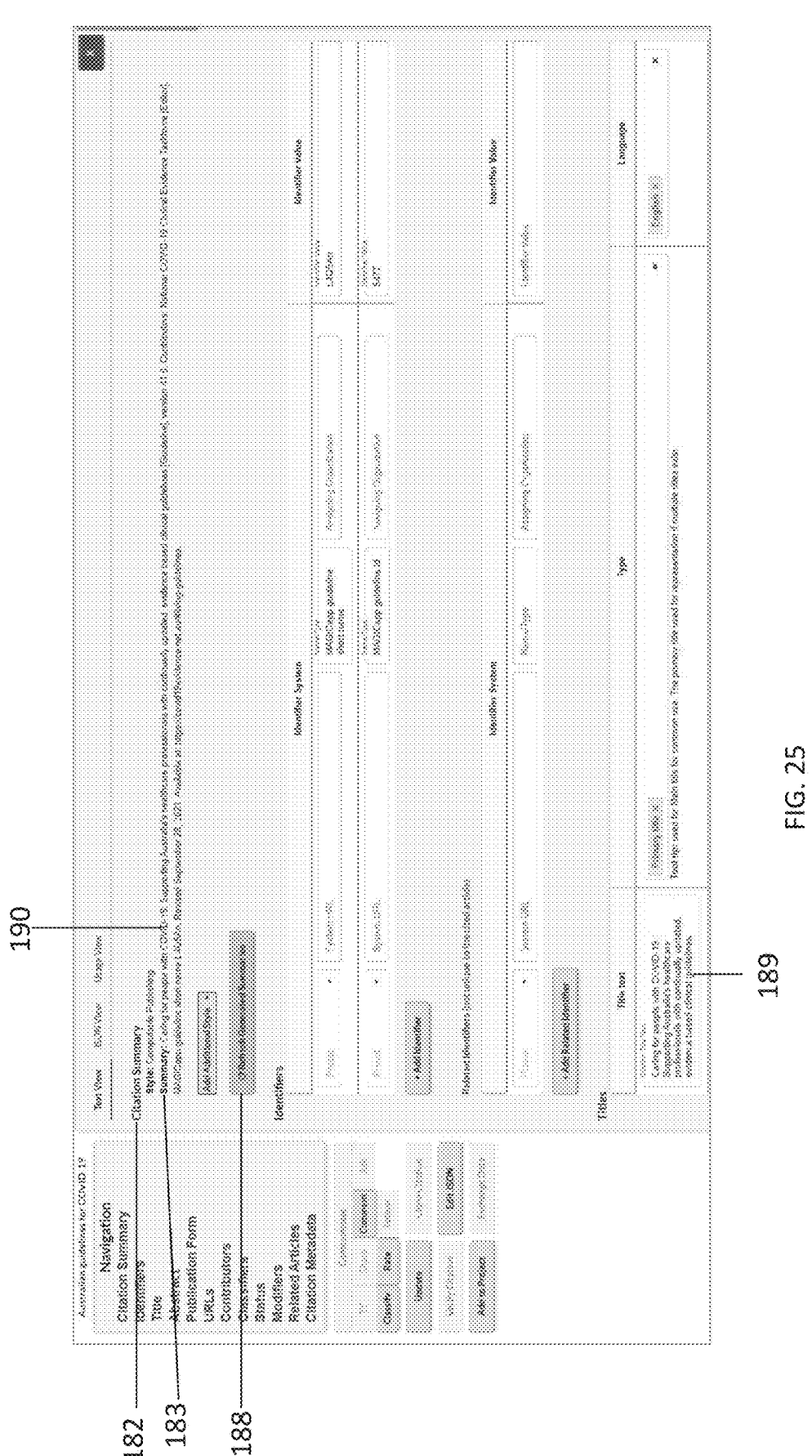
FIG. 25 is a screen shot of the Computable Publishing: Citation Builder tool version 1.4.4 with an example of autogenerated data corresponding to the example shown in FIG. 24, an exemplary system and method consistent with the present disclosure.

FIG. 25 shows the user interface from FIG. 24 after the user clicks the button labeled "Refresh Generated Summaries" 188 and shows the changed data 190 (corresponding to the change in the data 189 also shown in FIG. 24) displayed after the data element label of "Summary:" 183 in the section labeled "Citation Summary" 182.

The advantage of this arrangement of elements is that use of computing resources and time delay for the user for the autogeneration of new data can be limited to conditions for which the autogeneration of new data is required or requested. This advantage overcomes problems noted in Background #0012.

FIGS. 6, 26, 27, 28, 29, 30, 31, 32 and 33 show an example of a novel arrangement of elements providing a technical improvement over the prior art with a combination of user interfaces and digital transformation tools that allows humans to enter data representing scientific knowledge in a form structured to be recognizable by the person entering the data and including the ability to enter data to identify current data available in a known structured form (wherein known structured form means a structured form that has a human mapping of data element structure between such form and a standard form), such current data is converted into an intermediate form, such standardized data in an intermediate form is converted into structured forms for display within a user interface that allows humans to change the data, and such standardized data in an intermediate form is converted into structured forms for display within a user interface that allows humans to view the data.

FIG. 6 shows a button labeled "MEDLINE Citation Converter" 191 and explanatory text including "Enter a PMID to automatically create a HL7® FHIR® Citation Resource." 192. A person familiar with MEDLINE will recognize that PMID is an abbreviation for PubMed Identifier and a commonly used unique identifier for MEDLINE records.

Figure 26:
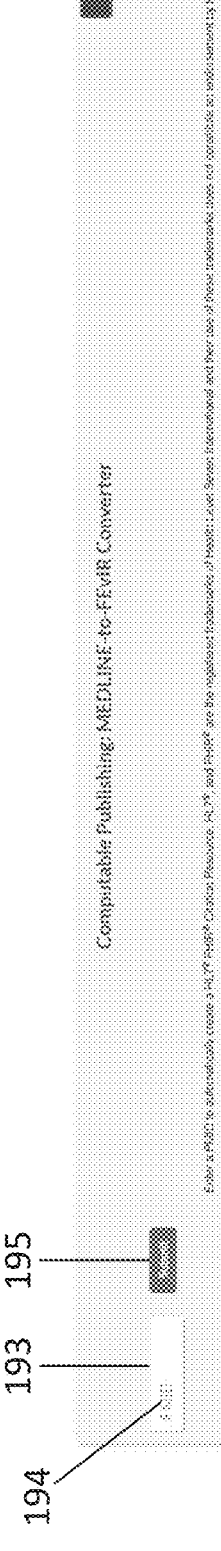
FIG. 26 is a screen shot of the Computable Publishing: MEDLINE-to-FEvIR Converter tool version 1.6.0, an exemplary system and method consistent with the present disclosure.

FIG. 26 shows an example of an uploader GUI which is displayed after clicking the button labeled "MEDLINE Citation Converter" 191 shown in FIG. 6. FIG. 26 shows a data entry field 193 with a label "PMID" 194 and a button labeled "Submit" 195.

Figure 27:
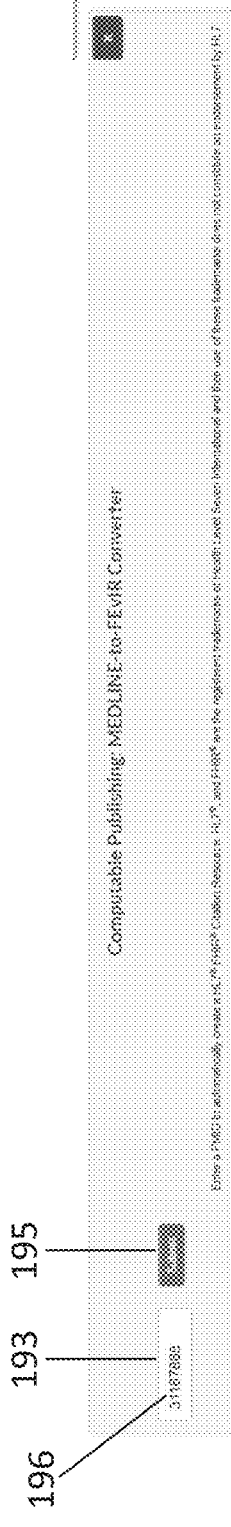
FIG. 27 is a screen shot of the Computable Publishing: MEDLINE-to-FEvIR Converter tool version 1.6.0 with a data value entered, an exemplary system and method consistent with the present disclosure.

FIG. 27 shows the user interface shown in FIG. 26 after the user enters a value "31167868" 196 in the data entry field 193.

Figure 28:
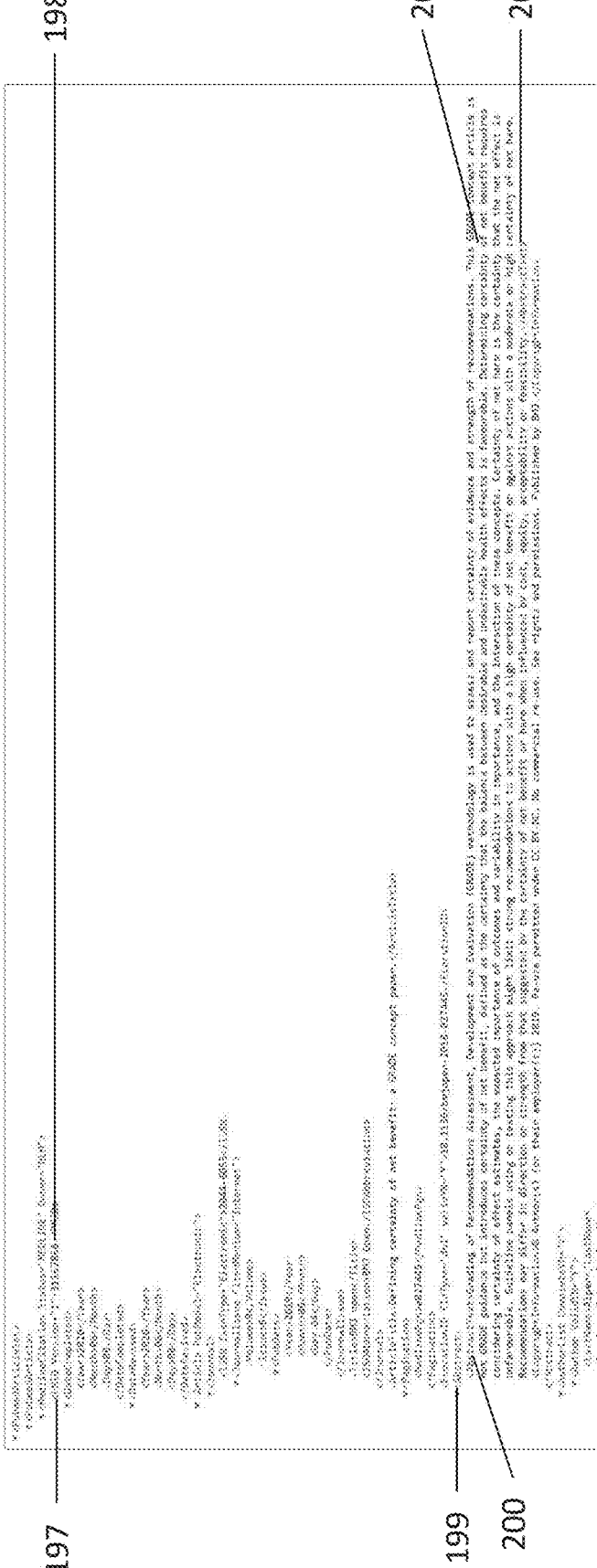
FIG. 28 is a portion of data in structured form in XML for a MEDLINE record.

When the button labeled "Submit" 195 is clicked, the system and method disclosed herein will convert the data value that was entered into a request to extract target data from the MEDLINE database where such target data matches the data value for the PMID data element and the target data to be extracted is in a structured form. FIG. 28 shows an example of the structured form of target data retrieved from the MEDLINE database matching the data shown in FIG. 27.

FIG. 28 shows a data element name "PMID" 197 containing the value "31167868" 198 and a data element name "Abstract" 199 which contains a data element named "AbstractText". The "AbstractText" data element is represented with <AbstractText> 200 to denote the beginning of the data element, </AbstractText> 201 to denote the end of the data element, and the data value 202 (with five sentences in this example) is contained between these <AbstractText> 200 and </AbstractText> 201 strings.

Figure 29:
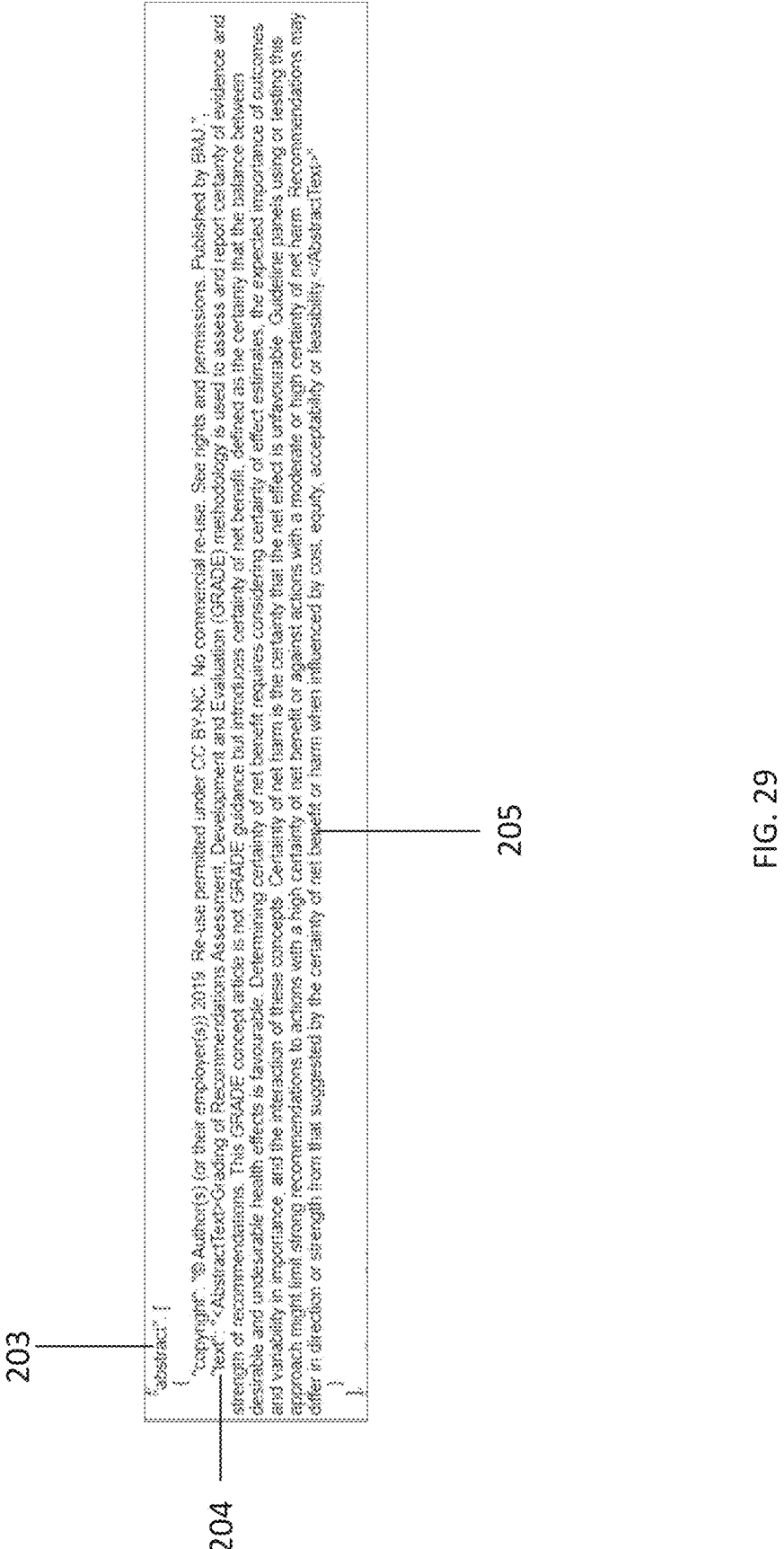
FIG. 29 is a portion of data in intermediate form, corresponding to the example in FIG. 28.

In some embodiments, a system and method consistent with the present disclosure will convert current data in a known structured form into standardized data in an intermediate form. FIG. 29 shows an example of standardized data consistent with the current data shown in FIG. 28 and converted into an intermediate form in JSON that includes an abstract element 203 that contains a text element 204 that contains a data value 205 (that combines the data element name and beginning notation 200, the contained data value 202, and the data element name and ending notation 201 that were present in the MEDLINE record in the example in FIG. 28).

Figure 30:
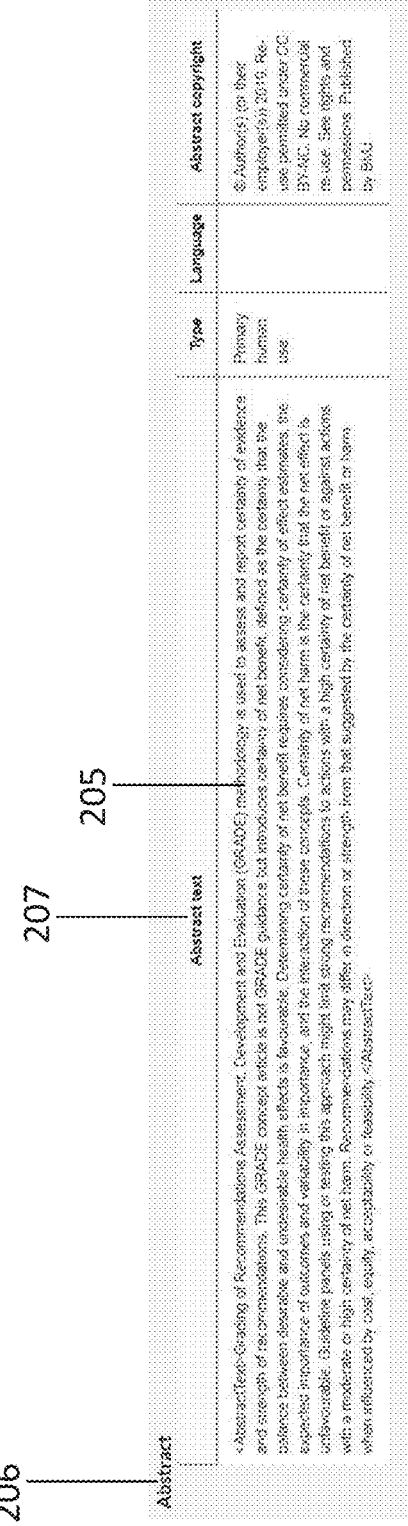
FIG. 30 is a screen shot of the Abstract section of the Computable Publishing: Citation Viewer tool version 1.4.4, corresponding to the examples shown in FIGS. 27, 28 and 29, and an exemplary system and method consistent with the present disclosure.

In some embodiments, a system and method consistent with the present disclosure will convert standardized data in intermediate form into display values in a reader GUI for viewing. FIG. 30 shows an example of a reader data display interface consistent with standardized data shown in FIG. 29 and includes: a section header labeled "Abstract" 206; a table in which the first column has a header labeled "Abstract text" 207; and the data value 205 is displayed in the corresponding cell in the first row of the table.

Figure 31:
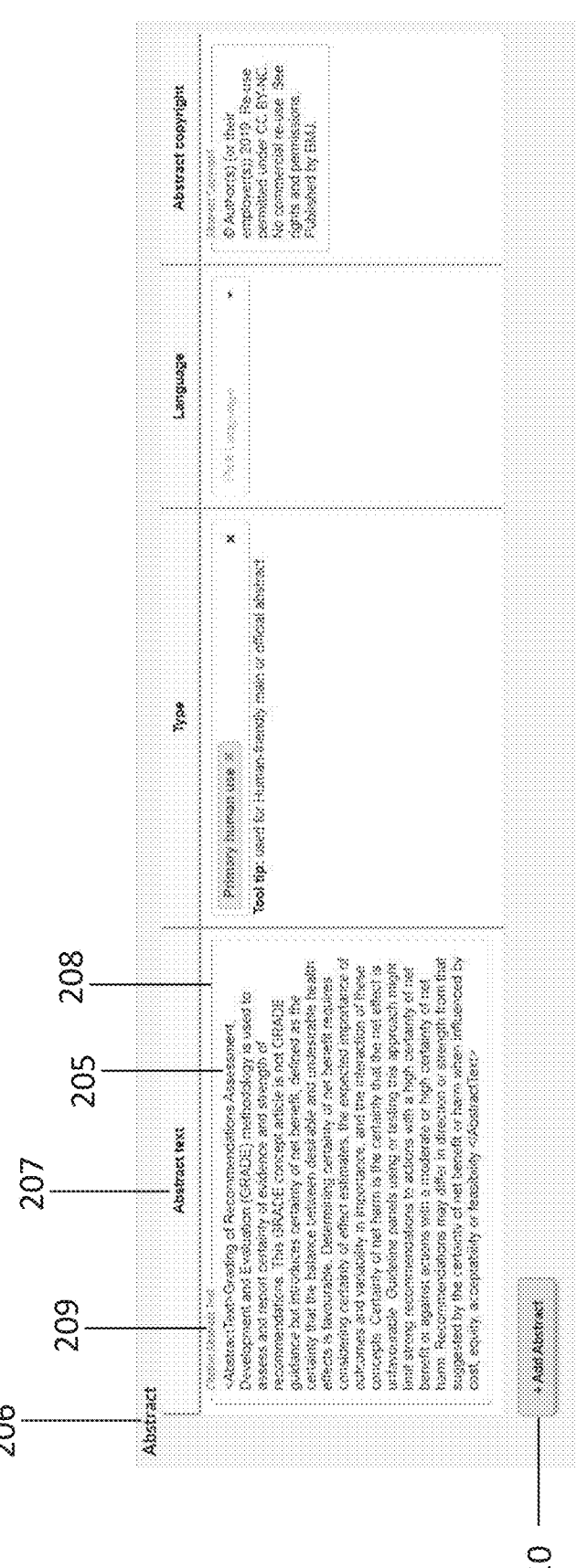
FIG. 31 is a screen shot of the Abstract section of the Computable Publishing: Citation Builder tool version 1.4.4, corresponding to the examples shown in FIGS. 27, 28 and 29, and an exemplary system and method consistent with the present disclosure.

In some embodiments, a system and method consistent with the present disclosure will convert standardized data in intermediate form into display values in an editor GUI for data entry. FIG. 31 shows an example of an editor data display interface consistent with standardized data shown in FIG. 29 and includes: a section header labeled "Abstract"

206; a table in which the first column has a header labeled "Abstract text" 207; a data entry field 208 labeled "Citation Abstract Text" 209 in the first ("Abstract text") column, wherein this data entry field contains the data value 205; and a button labeled "+ Add Abstract" 210.

Figure 32:
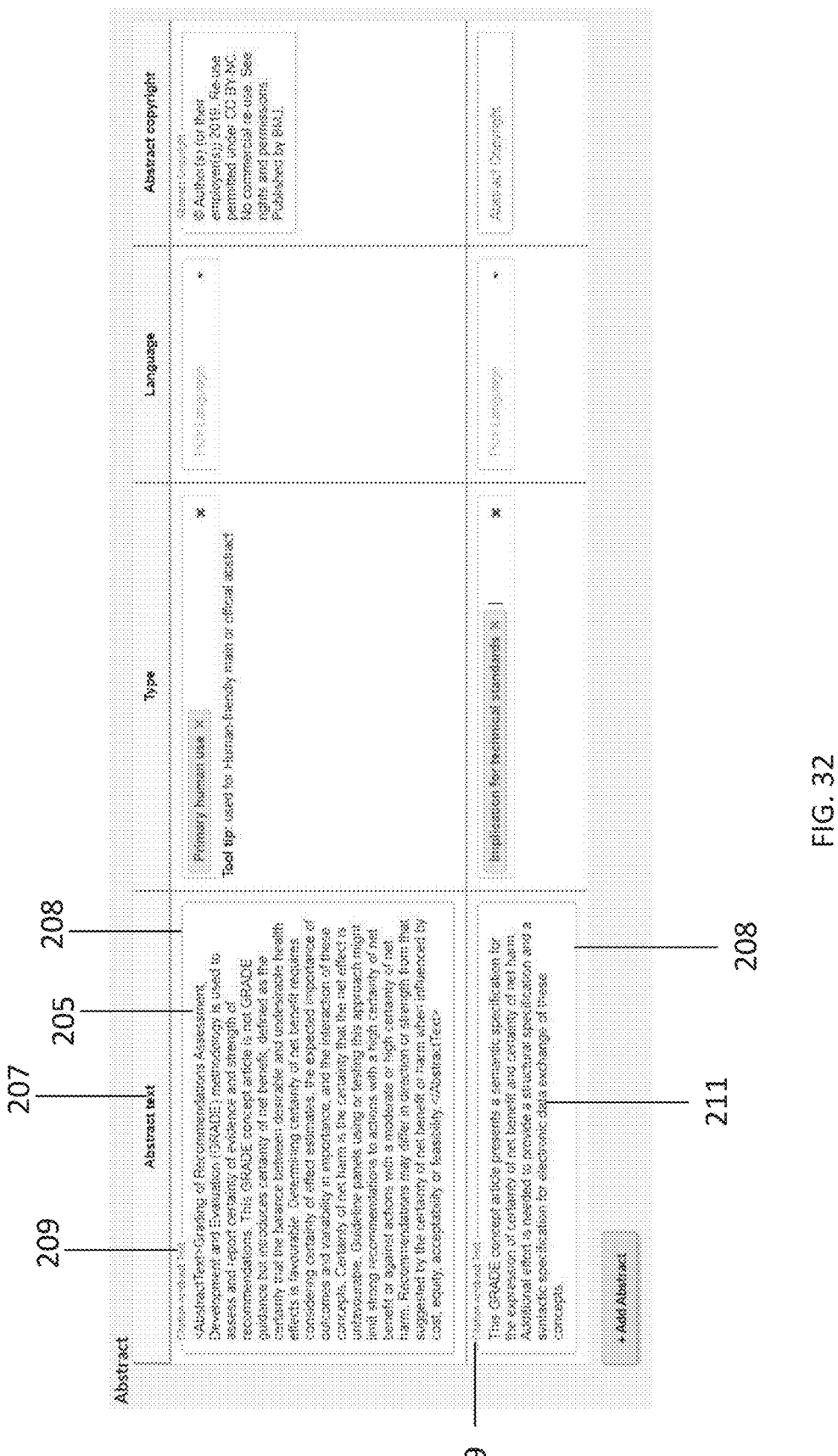
FIG. 32 is a screen shot of the Abstract section of the Computable Publishing: Citation Builder tool version 1.4.4, corresponding to the example shown in FIG. 31 with data added for an additional abstract, and an exemplary system and method consistent with the present disclosure.

FIG. 32 shows an example of a data entry interface consistent with the display after clicking the button labeled "+ Add Abstract" 210 in FIG. 31 and entering new data for an additional abstract. FIG. 32 shows the same content as FIG. 31 plus an additional row in the table with a data entry field 208 labeled "Citation Abstract Text" 209 in the first column (with a header labeled "Abstract text" 207), wherein this data entry field contains the data value "This GRADE concept article presents a semantic specification for the expression of certainty of net benefit and certainty of net harm. Additional effort is needed to provide a structural specification and a syntactic specification for electronic data exchange of these concepts." 211.

Figure 33:
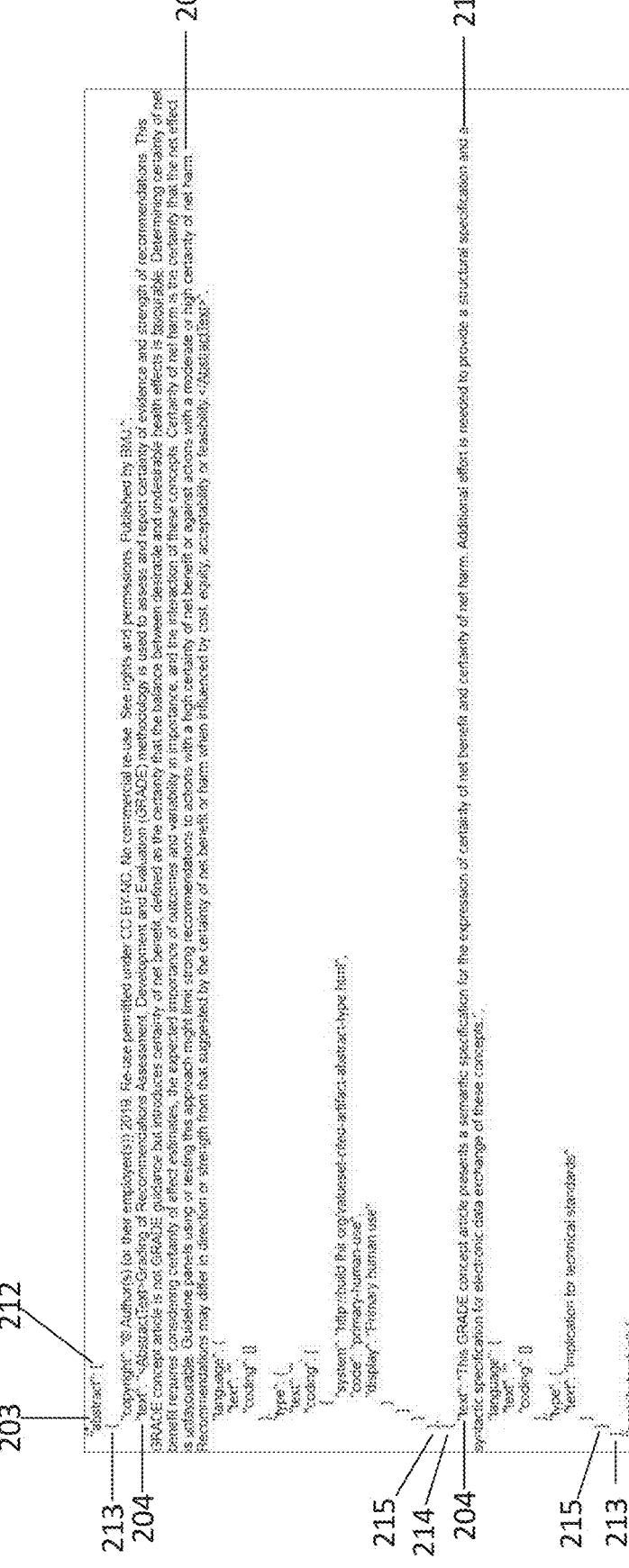
FIG. 33 is a portion of data in intermediate form, corresponding to the example in FIG. 32.

In some embodiments, a system and method consistent with the present disclosure will convert such altered data into standardized data in an intermediate form. FIG. 33 shows an example of standardized data consistent with altered data shown in FIG. 32 and converted into an intermediate form in JSON with an abstract element 203 containing: [ 212 and ] 213 characters to represent that one or more instances of the abstract element may be contained between these characters; { 214 and } 215 characters to represent each instance of the abstract element that is contained between these characters; the first instance of the abstract element contains a text element 204 containing a data value 205 (that was displayed in a data entry field 208 labeled "Citation Abstract Text" 209 in the first row with data in the table shown in FIG. 32); and the second instance of the abstract element contains a text element 204 containing a data value 211 (that was entered in a data entry field 208 labeled "Citation Abstract Text" 209 in the second row with data in the table shown in FIG. 32).

The advantages of this arrangement of elements include: the ability of humans to enter any data representing scientific knowledge without any skill, expertise or pre-existing knowledge about the structured form for expression of such knowledge; the ability of humans to view any data representing scientific knowledge without any skill, expertise or pre-existing knowledge about the structured form for expression of such knowledge; immediate transformation of any data entered into standardized data in an intermediate form to maintain structural integrity and syntactic integrity of the data; immediate transformation of standardized data in an intermediate form into human-interpretable displays for viewing and for data entry which supports immediate recognition and correction of errors in the data; and coordination of data entry and data transformation with current data in a known structured form to provide efficiency of data entry and data aggregation without the use of disparate systems.

These advantages overcome the barrier to using a standard form to provide interoperability and efficiency for data exchange of scientific knowledge by greatly reducing the difficulty to acquire data representing scientific knowledge in a nonstandard form and converting such data to a standard form.

Figure 34:
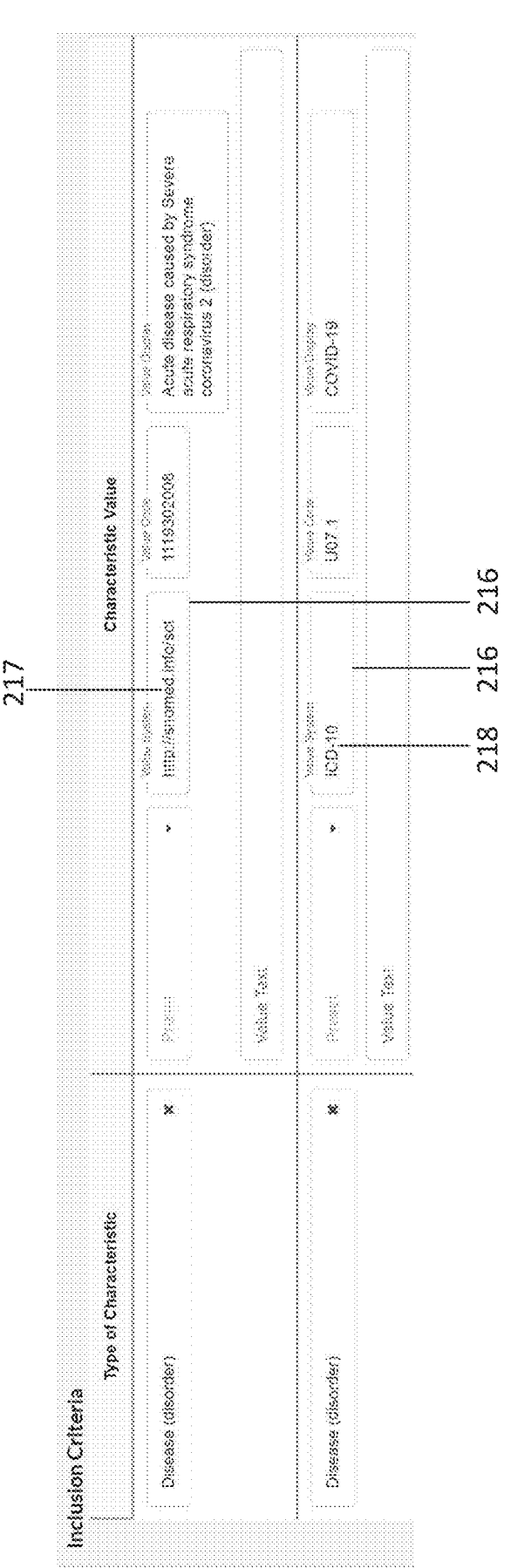
FIG. 34 is a screen shot of the Computable Publishing: Group (Population/Sample) Builder tool version 0.10.3, with demonstration of data in URI form and non-URI form to identify the code system used to describe a characteristic value, an exemplary system and method consistent with the present disclosure.

FIG. 34 shows an example of a novel arrangement of elements providing a technical improvement over the prior art with an editor GUI that allows optional entry of a Universal Resource Indicator (URI) value or a text string value for the identity of a code system. The user interface will support entry of a URI value or a non-URI value in the same data entry field.

FIG. 34 shows two different forms of data values entered in data entry fields 216 to identify the "code system" associated with a term (the code system associated with a code), including an example of a data value 217 entered in URI form and an example of a data value entered in non-URI form 218.

In some embodiments, a system and method consistent with the present disclosure will check whether or not the data value identifying a code system is in URI form.

Figure 35:
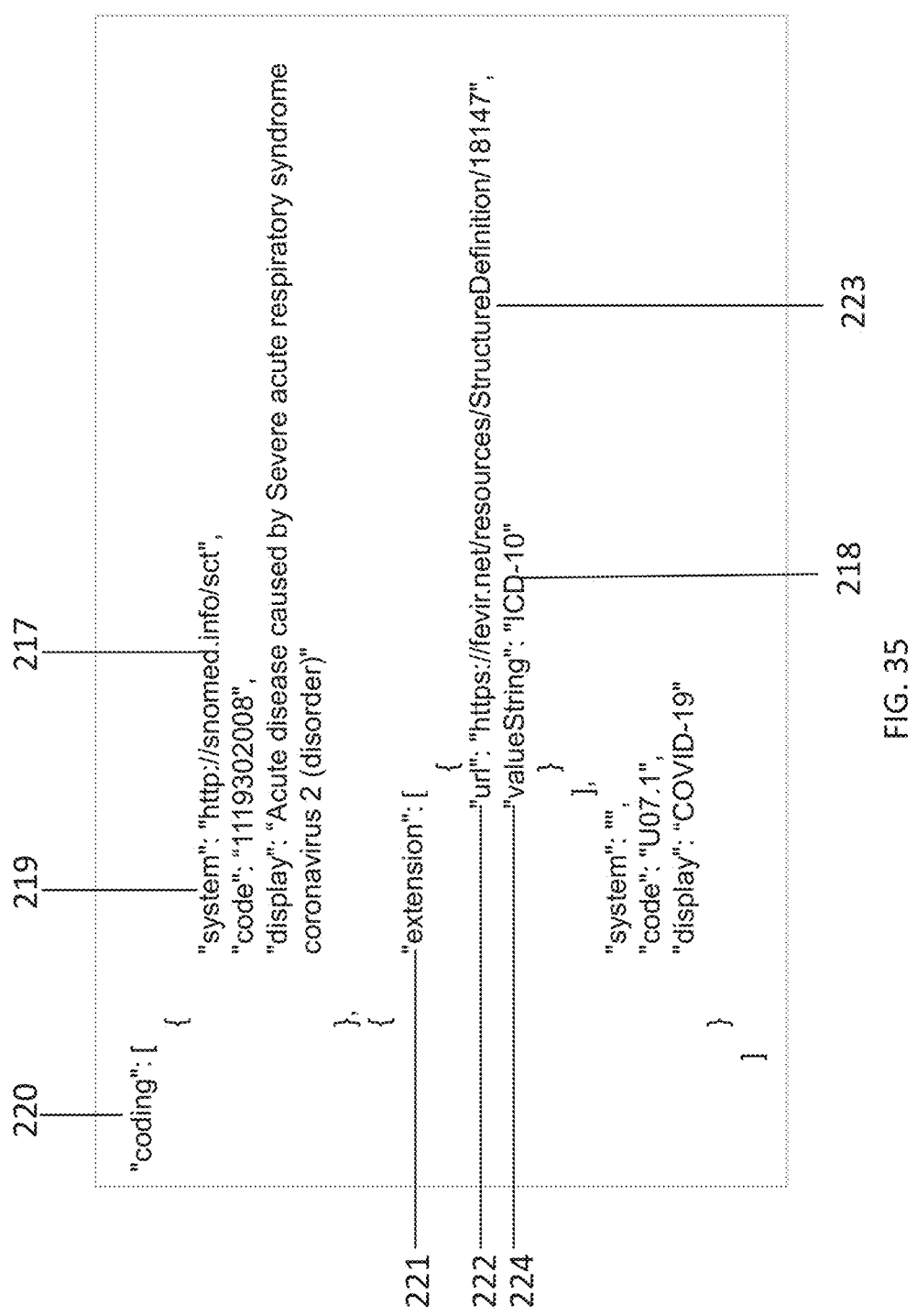
FIG. 35 is a portion of intermediate form of data, with two "coding" element instances, corresponding to the example in FIG. 34.

In some embodiments, a system and method consistent with the present disclosure will convert such data into an intermediate form. FIG. 35 shows an example of data consistent with data shown in FIG. 34 and converted into an intermediate form in JSON with data that includes: When the data value identifying the code system is in URI form, the data value 217 is included in a system element 219 within a coding element 220, a data pattern conformant with the intermediate form in JSON.

When the data value identifying the code system is not in URI form, an extension element 221 is added within a coding element 220, and the extension element 221 contains: a URL element 222 that includes a value "https://fevir.net/resources/StructureDefinition/18147" 223 that defines the structured form for the extension to the intermediate form in JSON; and a valueString element 224 that includes the data value 218 that is not in URI form.

The advantage of this arrangement of elements is that people entering codes for code systems not already available in picklists for efficient entry using the system and method disclosed herein can enter an identifying label for the code system by simple free text entry instead of looking up the exact URI. This advantage overcomes a problem noted in Background #0013.

Figure 36:
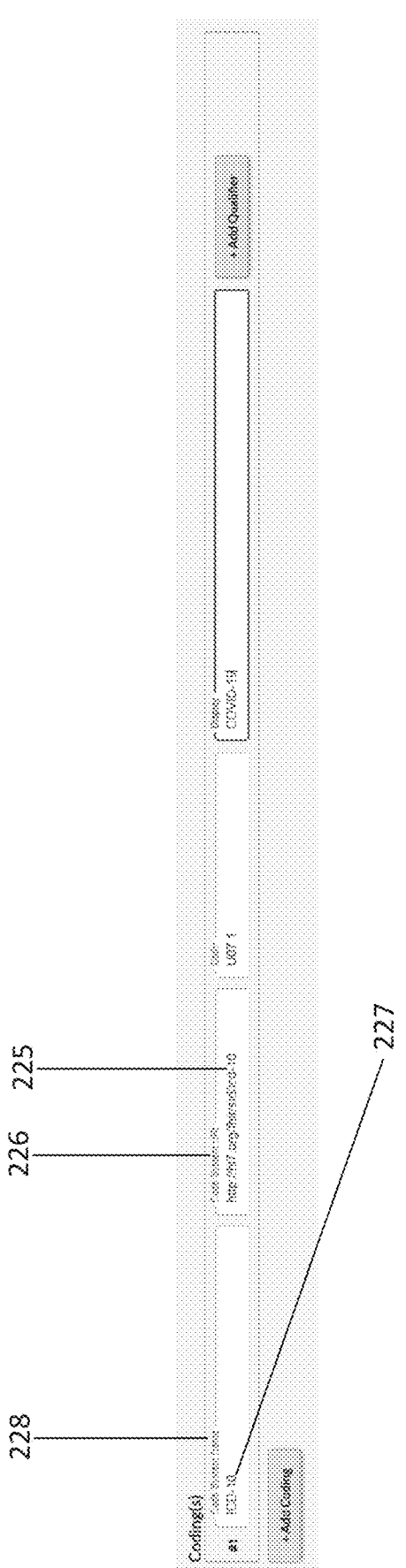
FIG. 36 is a screen shot of the Computable Publishing: CodeableConcept Builder tool version 0.1.0, with demonstration of data in URI form and non-URI form to identify the code system, an exemplary system and method consistent with the present disclosure.

FIG. 36 shows an example of a novel arrangement of elements providing a technical improvement over the prior art with an editor GUI that allows optional entry of a Universal Resource Indicator (URI) value and a text string value to identify a code system. The user interface will support entry of URI and non-URI data values in separate data entry fields.

FIG. 36 shows data values entered to identify the "code system" associated with a term (the code system associated with a code) in two different forms including a URI ("http://hl7.org/fhir/sid/icd-10" 225) entered in a data entry field labeled for code system URI data 226 and a non-URI text description ("ICD-10" 227) entered in a data entry field labeled for code system name data 228.

Figure 37:
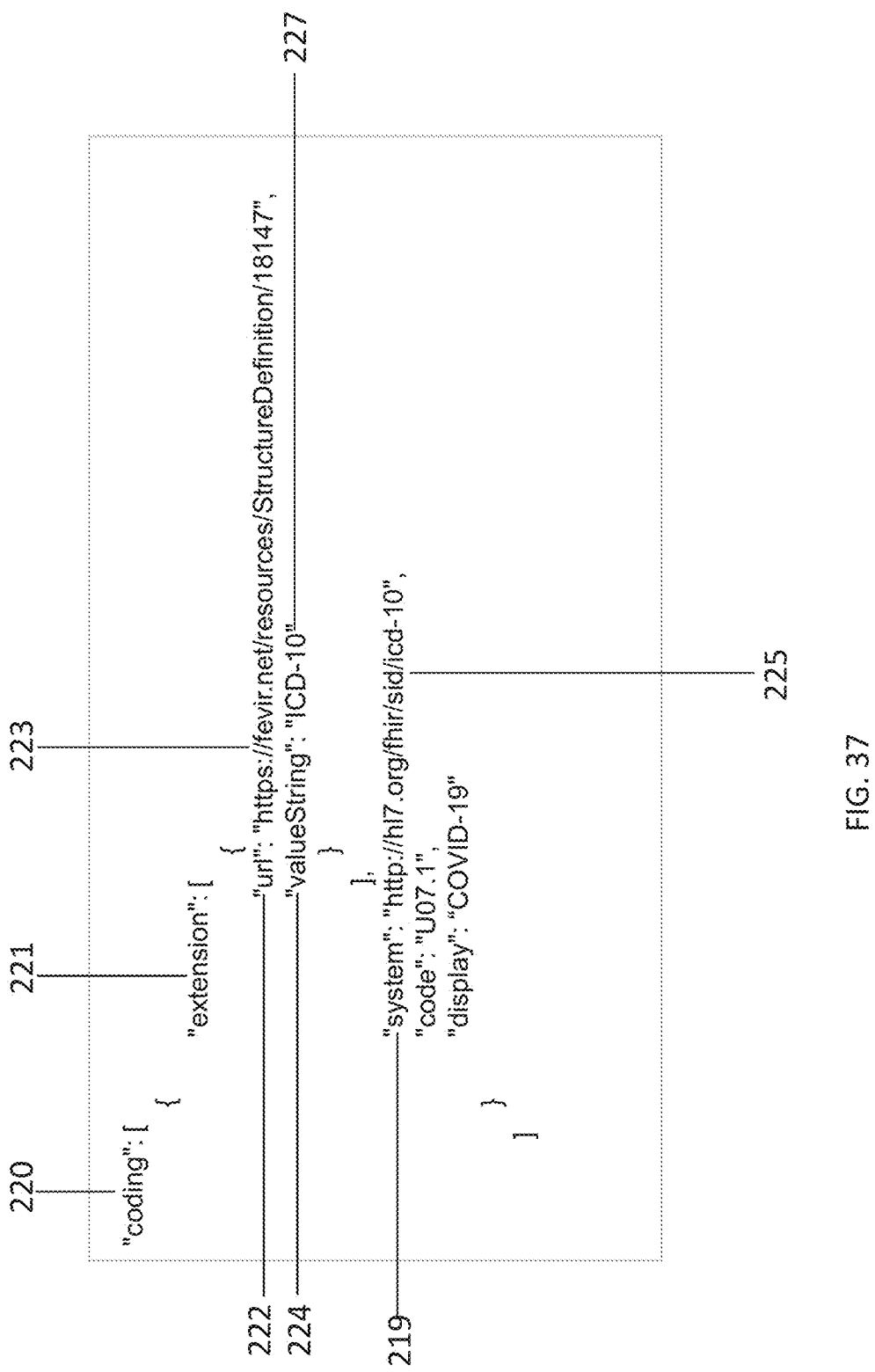
FIG. 37 is a portion of intermediate form of data, with two "coding" element instances, corresponding to the example in FIG. 36.

In some embodiments, a system and method consistent with the present disclosure will convert such data into an intermediate form. FIG. 37 shows an example of data consistent with data values shown in FIG. 36 and converted into an intermediate form in JSON with data that includes: The data value "http://hl7.org/fhir/sid/icd-10" 225 entered in the "code system URI" data entry field is included in a system element 219 within a coding element 220, a data pattern conformant with the intermediate form in JSON.

The data value "ICD-10" 227 entered in the "code system name" data entry field is included in an extension element 221 within a coding element 220, and the extension element 221 contains: A URL element 222 that includes a value "https://fevir.net/resources/StructureDefinition/18147" 223 that defines the structured form for the extension to the intermediate form in JSON; and A valueString element 224 that includes the data 227 that is not in URI form. Both the code system URI data 225 and the code system name data 227 are contained in structured form within the same coding element 220.

The advantage of this arrangement of elements is that people entering codes for code systems not already available in picklists for efficient data entry using the system and method disclosed herein can enter an identifying label for the code system in simple free text entry in addition to entering the URI, and this data representing a more human-friendly label for the code system can be used in subsequent displays for viewing the data. This advantage overcomes a problem noted in Background #0013.

Figure 38:
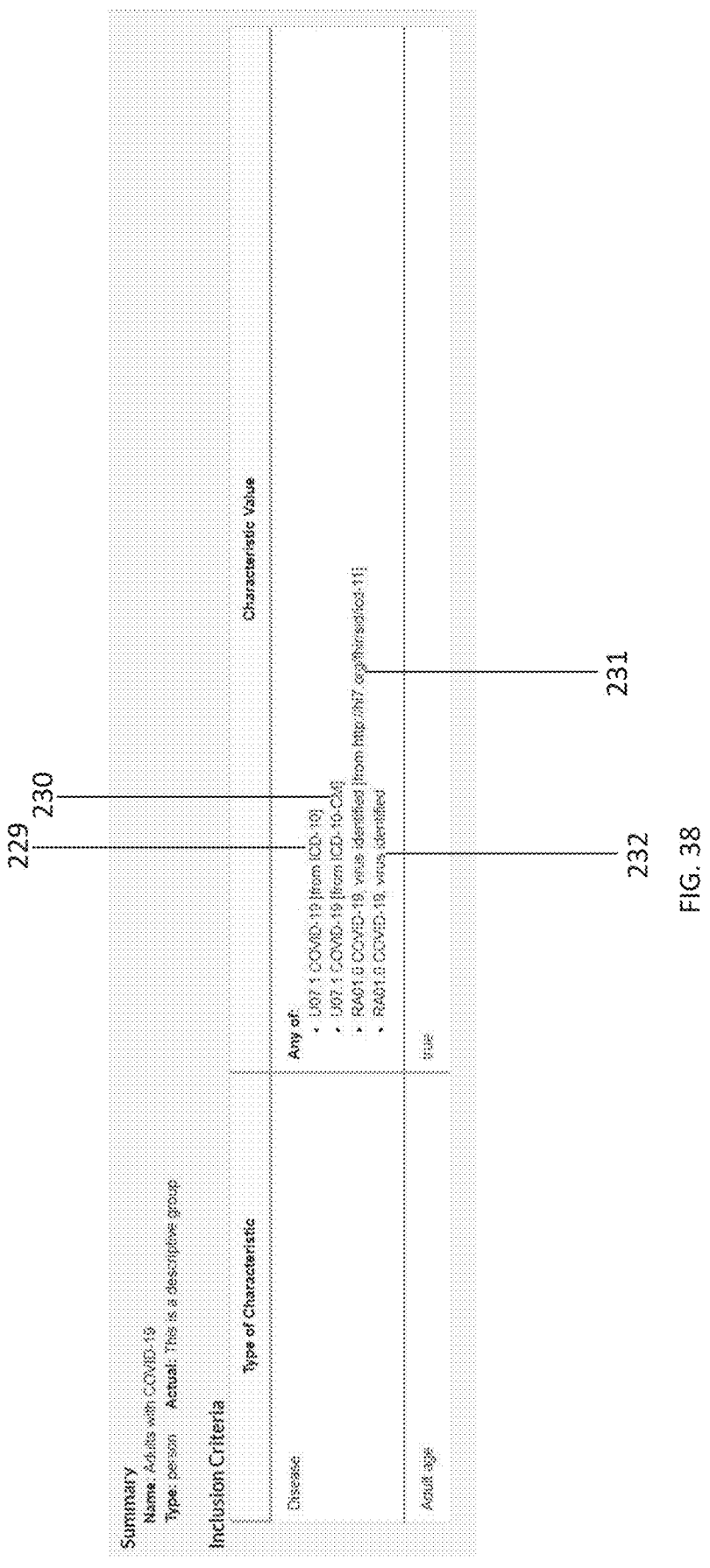
FIG. 38 is a screen shot of the Computable Publishing: Group (Population/Sample) Viewer tool version 0.10.3, with demonstration of different "human-friendly display" values to identify a code system, an exemplary system and method consistent with the present disclosure.

FIG. 38 shows an example of a novel arrangement of elements providing a technical improvement over the prior art with a reader GUI that displays a "human-friendly display" for a code system derived from a prioritized selection from available data.

FIG. 38 shows four different methods to show a "human-friendly display" to identify a code system, including: a predetermined common display 229 associated with the code system; use of the text string 230 designated to define or describe the code system; use of the URI 231 designated to define or describe the code system; and default representation 232 when other options (a)-(c) are not available to describe the code system.

Figure 39:
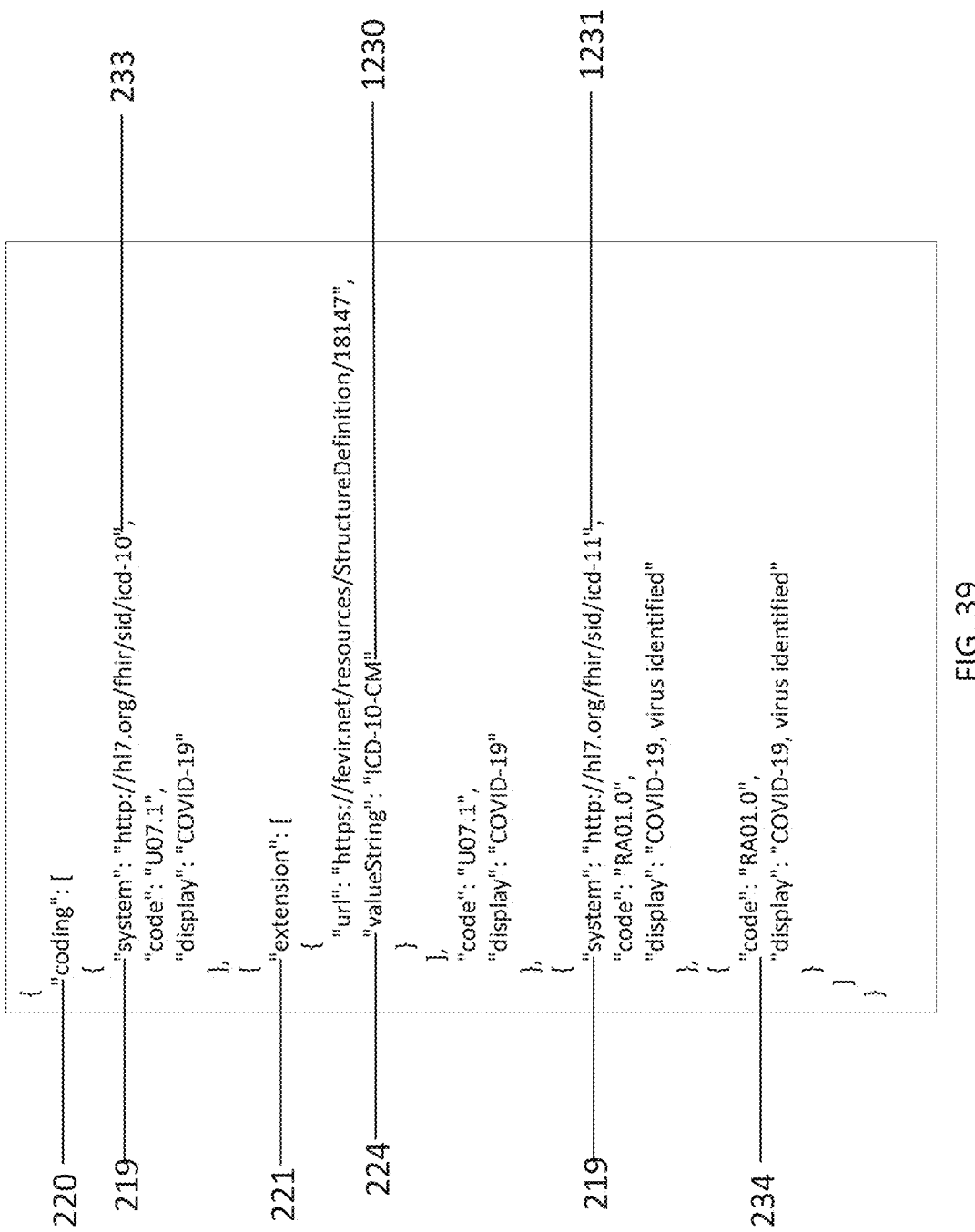
FIG. 39 is a portion of intermediate form of data, with four "coding" element instances, corresponding to the example in FIG. 38.

FIG. 39 shows an example of data consistent with data values shown in FIG. 38 and in an intermediate form in JSON with data that includes: a coding element 220 containing four instances of contained data; The first coding instance includes a system element 219 with a data value 233 in the form of a URI; the second coding instance includes an extension element 221 which contains a valueString element 224 with a data value 1230 in the form of a text string; the third coding instance includes a system element 219 with a data value in the form of the URI 1231; and the fourth coding instance 234 does not include a system element and does not include an extension element.

In some embodiments, a system and method consistent with the present disclosure will interrogate the coding.system data in intermediate form (as shown in FIG. 39) and convert such data to a non-standard structured representation with a "human-friendly display" value (a single-phrase display value) of the code system (as shown in FIG. 38). The data conversion uses a predetermined conditional evaluation of the available data to select the most preferred form available for "human-friendly display" in order of a predetermined display matching recognized code systems, else the text string in the coding.extension.valueString element, else the URI in the coding.system element, else no value displayed if none of these data values are present.

Figure 40:
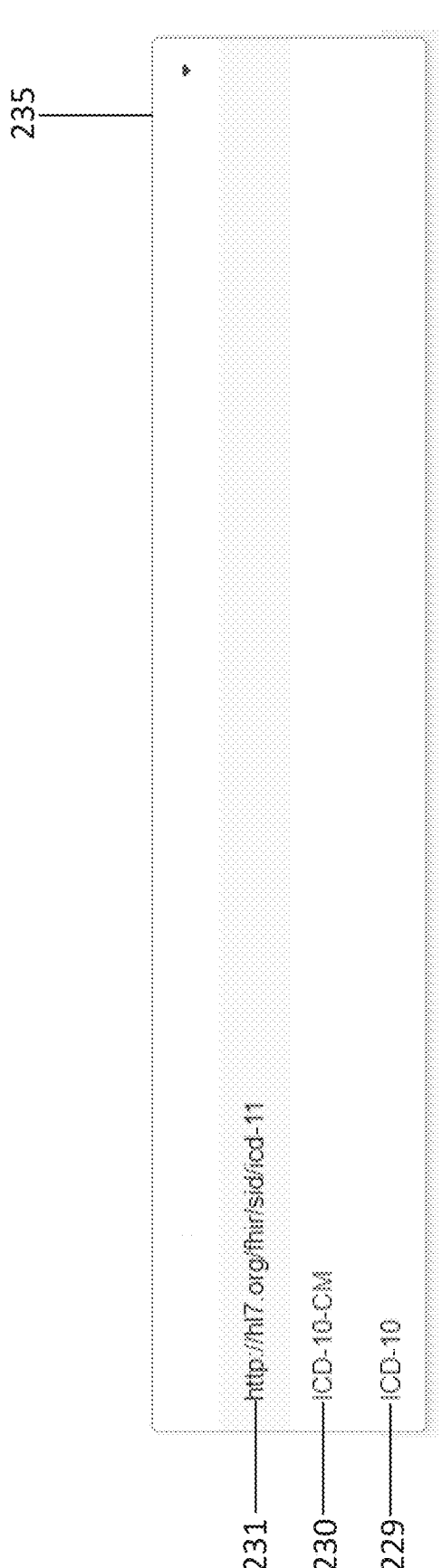
FIG. 40 is a screen shot of a picklist for selection of choices to identify a code system, corresponding to the example in FIG. 39, and an exemplary system and method consistent with the present disclosure.

FIG. 40 shows an example of an editor GUI that displays a "human-friendly display" value for a code system derived from a prioritized selection from available data. FIG. 40 includes a picklist menu 235 for selection of code system values as a form of data entry, and the values 2229, 2230, 2231 displayed in FIG. 40 correspond to the values derived from the prioritized selection of available data as shown in FIG. 39.

The advantages of this arrangement of elements are that it is more efficient to select a recognized code system than to enter data to describe the code system, and it is more efficient to generate a recognizable display of a code system from the available data than to require pre-coordinated effort. These advantages overcome problems noted in Background #0013.

Figure 41:
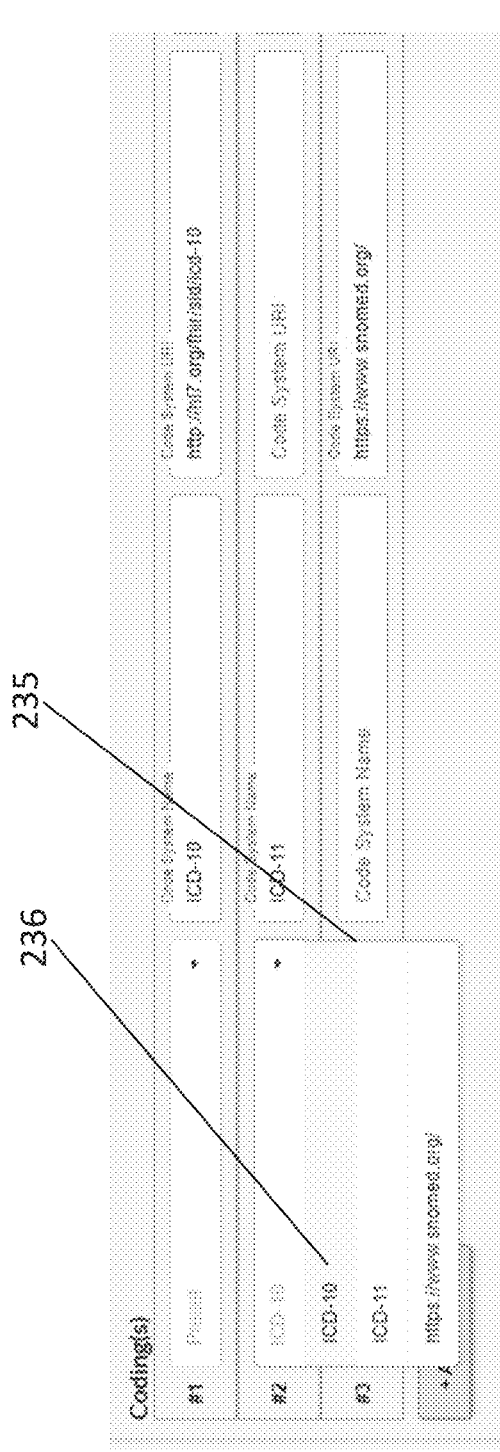
FIG. 41 is a screen shot of the Computable Publishing: CodeableConcept Builder tool version 0.3.0, with demonstration of a picklist for selection of choices to identify a code system and selection of an item from the picklist, an exemplary system and method consistent with the present disclosure.
Figure 42:
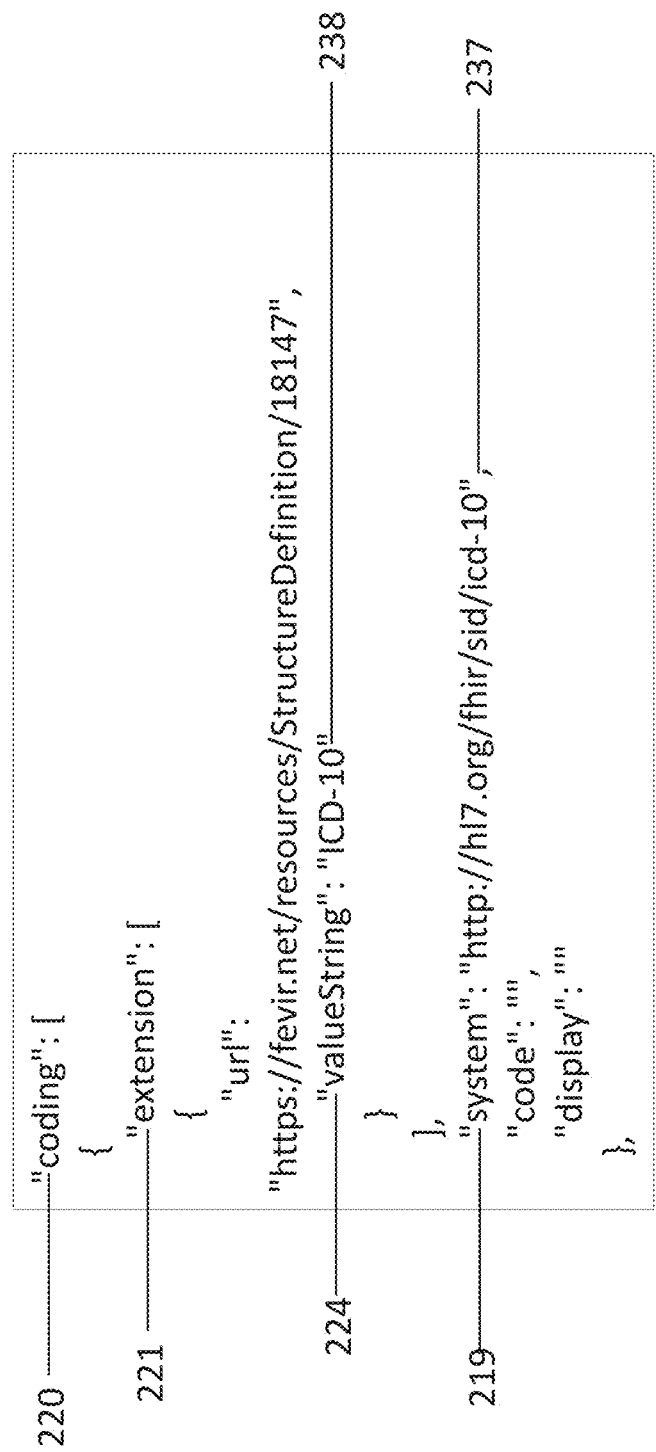
FIG. 42 is a portion of intermediate form of data, corresponding to the example in FIG. 41.

FIGS. 41 and 42 show an example of a novel arrangement of elements providing a technical improvement over the prior art with an editor GUI and conversion tool that combines the functions of presenting a picklist containing the "human-friendly display" values for available options to facilitate rapid specification of a code system by allowing a predetermined pattern to be selected in one click, and translating choices from selecting a picklist containing the "human-friendly display" values for available options for specification of a code system into structured data in standard form for the system.

FIG. 41 shows a picklist menu 235 for selection of code system values as a form of data entry, and the response to user action of moving the mouse pointer to identify a picklist item 236 for selection.

In some embodiments, a system and method consistent with the present disclosure will interpret data entered as an option selection from a picklist (as shown in FIG. 41) and convert such data into coding.system and coding.extension element values in an intermediate form, as shown in JSON in the example in FIG. 42.

FIG. 42 shows an example of data consistent with the data values shown in FIG. 41 and in an intermediate form in JSON with data that includes: a coding element 220 containing a system element 219 with a data value 237 in the form of a URI; and the same coding element 220 containing an extension element 221 which contains a valueString element 224 with a data value 238 in the form of a text string.

The advantage of this arrangement of elements is that it is more efficient to select a recognized code system than to enter data to describe the code system, and the prior mapping between "human-friendly display" values and intermediate form can be re-used. This advantage overcomes a problem noted in Background #0013.

FIG. 43 shows an example of a novel arrangement of elements providing a technical improvement over the prior art with an editor GUI that provides a picklist 239 for selection of coding values, a definition or explanation associated with the selected coding value (as shown with a "tool tip" 240 matching the selected item when a single item is selected from the picklist), and a variant explanation when multiple coding values are selected (as shown with a "multiple choices selected tool tip" 241 when two or more choices are selected from the picklist).

Figure 44:
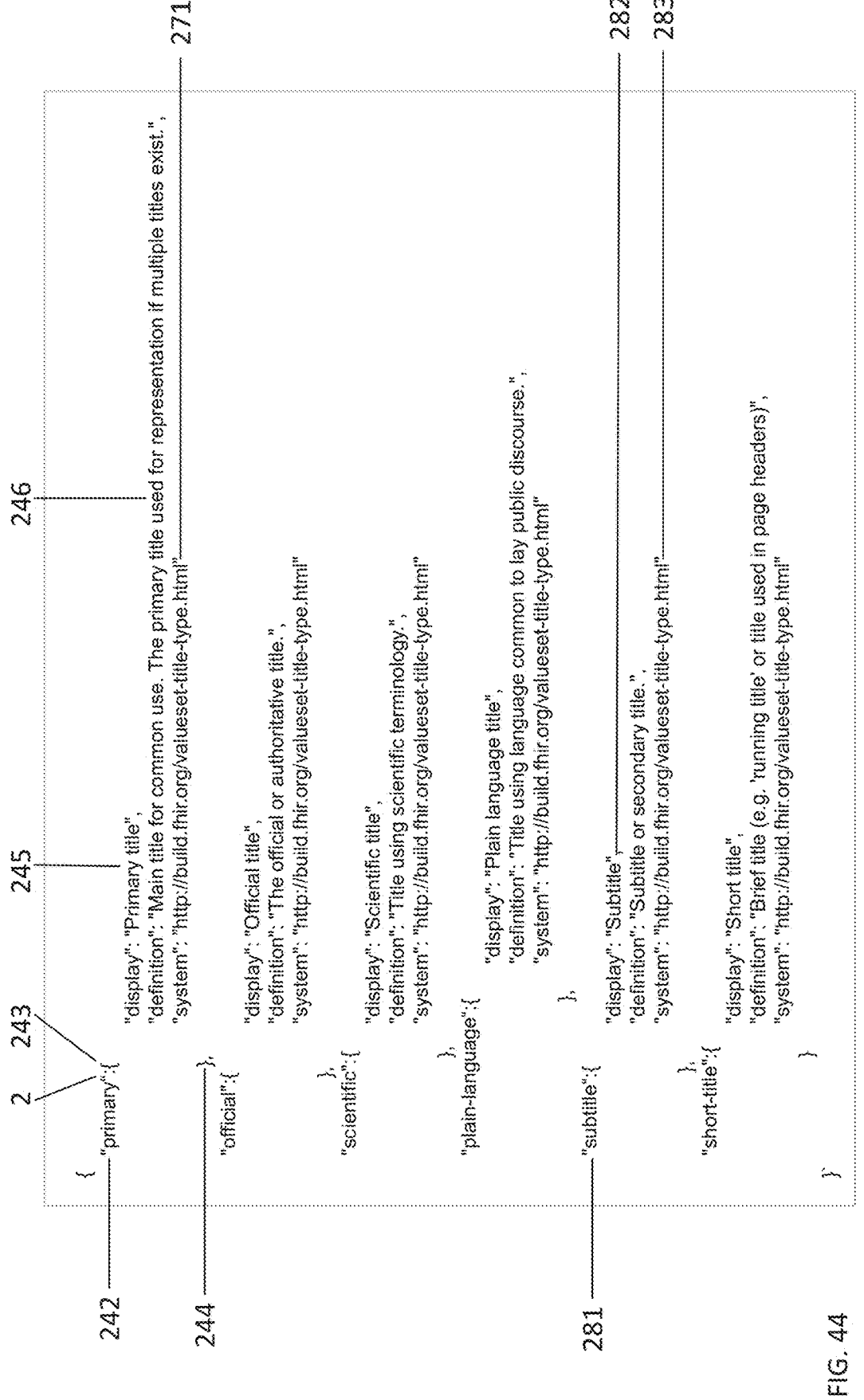
FIG. 44 is a portion of structured form of data, representing a predetermined list of terms (code, display, definition, and system), and corresponding to the example in FIG. 43.

FIG. 44 shows an example of structured data that associates explanatory text with code system terms (system, code and display), including: the first value shows "primary" 242 as the code value; the associated values are contained between { 243 and } 244 characters and these { 243 and } 244 characters immediately follow a : character 2 which immediately follows the associated code value 242; the first associated value for the "primary" code value 242 is "display": "Primary title" 245 which represents the human-readable display associated with the code value; and the second associated value for the "primary" code value 242 is "definition": "Main title for common use. The primary title used for representation if multiple titles exist." 246 which represents the explanatory text associated with the code value.

In some embodiments, a system and method consistent with the present disclosure will interpret structured data representing the "definition" or otherwise predetermined explanatory text associated with a term in a code system (as shown in the example 246 in FIG. 44), and convert such data into phrasing for on-screen display for immediate association with the term when it is displayed in a human-friendly editing interface following selection of the term from a picklist, as shown in the example "Tool tip" 240 in FIG. 43.

The advantage of this arrangement of elements is that people doing data entry who need more information to understand the choices selected from a picklist can see the additional instruction immediately upon selection and not require additional links to look-up material and not require closing additional windows. This advantage overcomes a problem noted in Background #0014.

Figure 45:
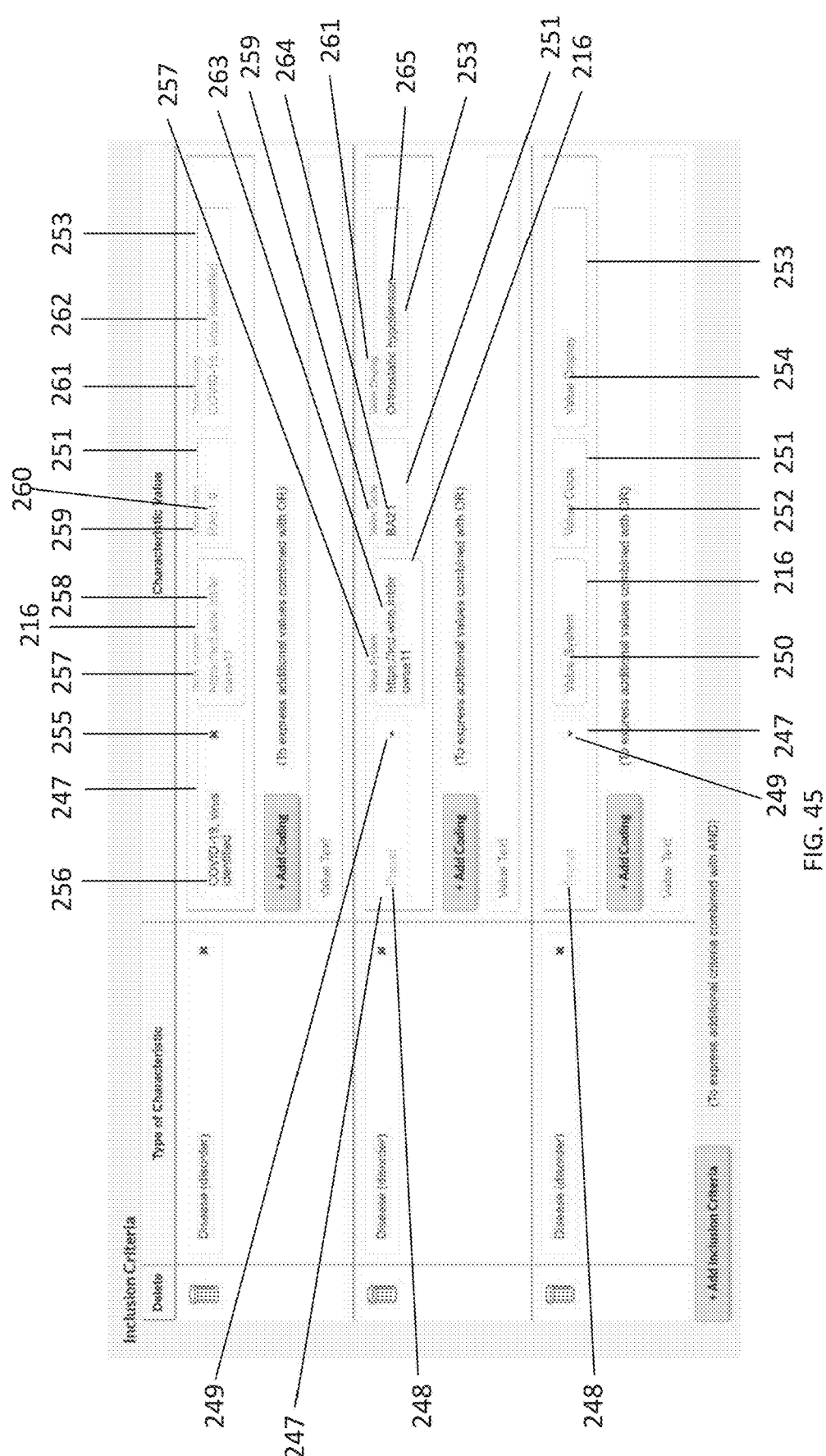
FIG. 45 is a screen shot of the Inclusion Criteria section of the Computable Publishing: Group (Population/Sample) Builder tool version 0.12.0, with demonstration of different "human-friendly display" values to identify a code system, an exemplary system and method consistent with the present disclosure.

FIG. 45 shows an example of a novel arrangement of elements providing a technical improvement over the prior art with an editor GUI that allows optional entry of data to express a code system term (including any components of the code system, the code, and the display) using either selection from a picklist or text entry for any of the components expressing the code system, the code, or the display.

FIG. 45 shows the empty data entry form in the third row including: a data entry field 247 labeled "Preset" 248 and containing a downward-facing triangle 249 to indicate this is a dropdown list for a preset picklist of code system terms, a data entry field 216 labeled "Value System" 250 to indicate this is the text entry field for the value describing the code system, a data entry field 251 labeled "Value Code" 252 to indicate this is the text entry field for the value describing the code, and a data entry field 253 labeled "Value Display" 254 to indicate this is the text entry field for the value describing the display.

FIG. 45 shows a completed data entry form in the first row including: a data entry field 247 containing an x 255 to indicate the method to remove the selected term from a picklist and containing the value "COVID-19, virus identified" 256, a data entry field 216 labeled "Value System" 257 to indicate this is the text entry field for the value describing the code system and containing the value "https://icd-.who.int/browse11" 258, a data entry field 251 labeled "Value Code" 259 to indicate this is the text entry field for the value describing the code and containing the value "RA01.0" 260, and a data entry field 253 labeled "Value Display" 261 to indicate this is the text entry field for the value describing the display and containing the value "COVID-19, virus identified" 262.

FIG. 45 shows a completed data entry form in the second row including: an unused data entry field 247 labeled "Preset" 248 and containing a downward-facing triangle 249 to indicate this is a dropdown list for a preset picklist of code system terms, a data entry field 216 labeled "Value System" 257 to indicate this is the text entry field for the value describing the code system and containing the value "https://icd.who.int/browse11" 263, a data entry field 251 labeled "Value Code" 259 to indicate this is the text entry field for the value describing the code and containing the value "BA21" 264, and a data entry field 253 labeled "Value Display" 261 to indicate this is the text entry field for the value describing the display and containing the value "Orthostatic hypotension" 265.

Figure 46:
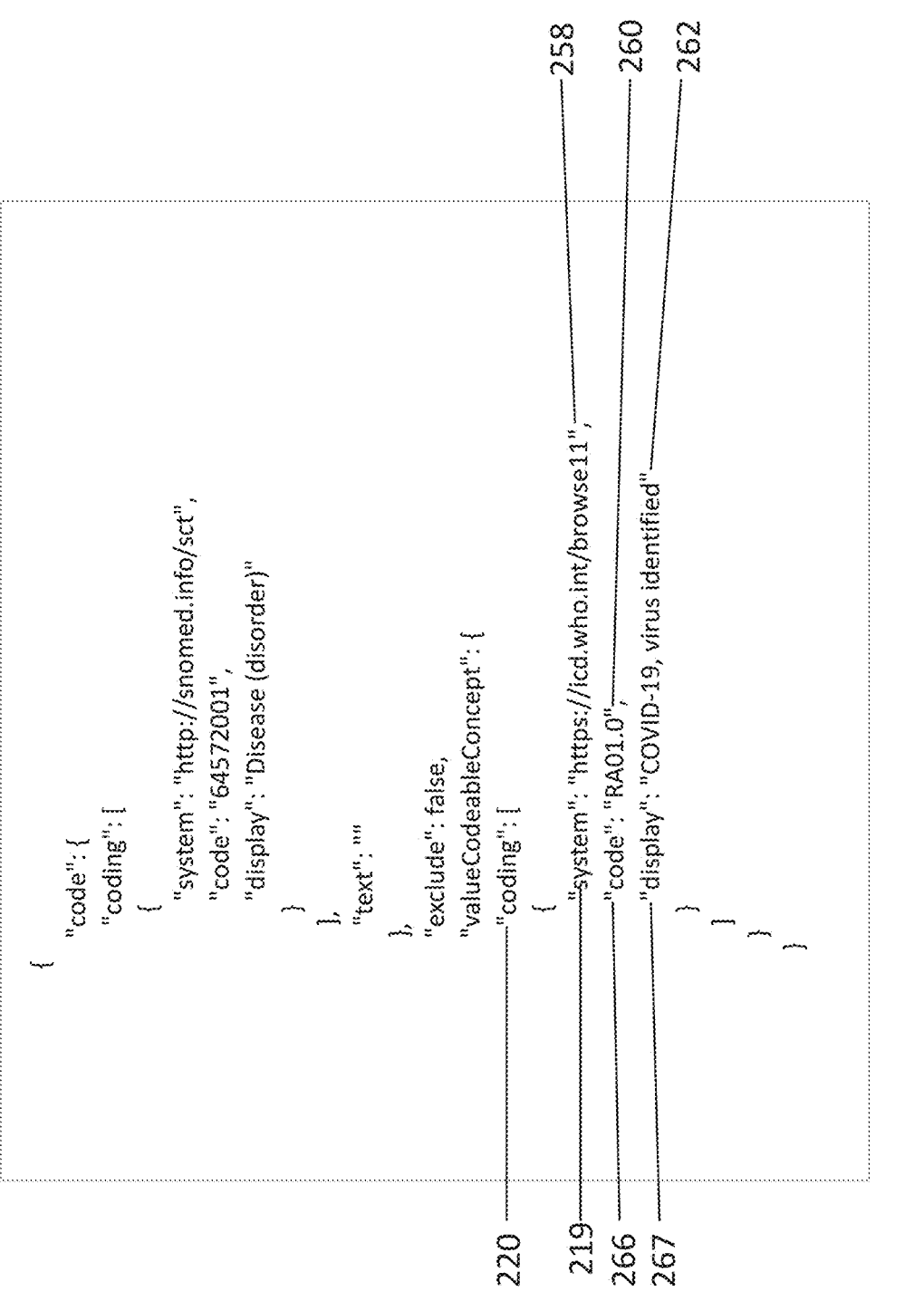
FIG. 46 is a portion of intermediate form of data, corresponding to the example in FIG. 45.

In some embodiments, a system and method consistent with the present disclosure will convert such data into an intermediate form. FIG. 46 shows an example of data consistent with data shown in FIG. 45 and converted into an intermediate form in JSON with data that includes: the data 258 entered in the "Value System" data entry field is included in a system element 219 within a coding element 220, a data pattern conformant with the intermediate form in J SON; the data 260 entered in the "Value Code" data entry field is included in a code element 266 within a coding element 220, a data pattern conformant with the intermediate form in JSON; and the data 262 entered in the "Value Display" data entry field is included in a display element 267 within a coding element 220, a data pattern conformant with the intermediate form in JSON.

The advantages of this arrangement of elements are that people entering code system terms can use picklists for rapid single-item selection for predetermined code system terms, and when such picklist choices are unavailable can efficiently describe the code system term by entering any of the identifying value for the code system, the code, and the display in simple free text entry. These advantages overcome problems noted in Background #0015.

Figure 47:
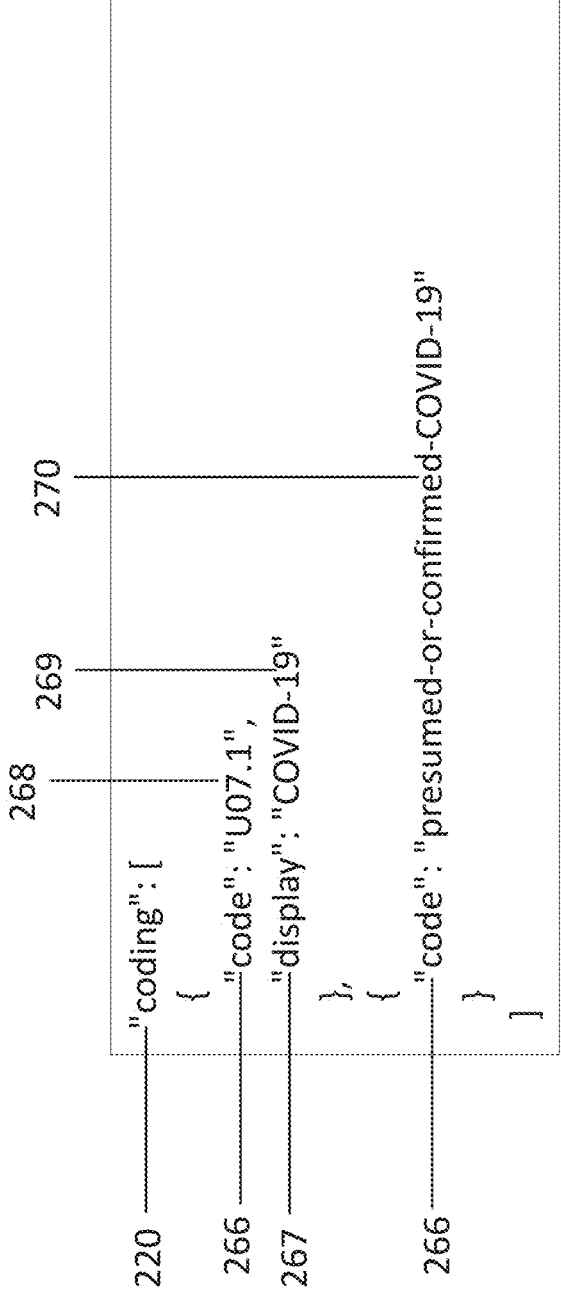
FIG. 47 is a portion of intermediate form of data including coding elements which may contain values for system, code, and display elements.
Figure 48:
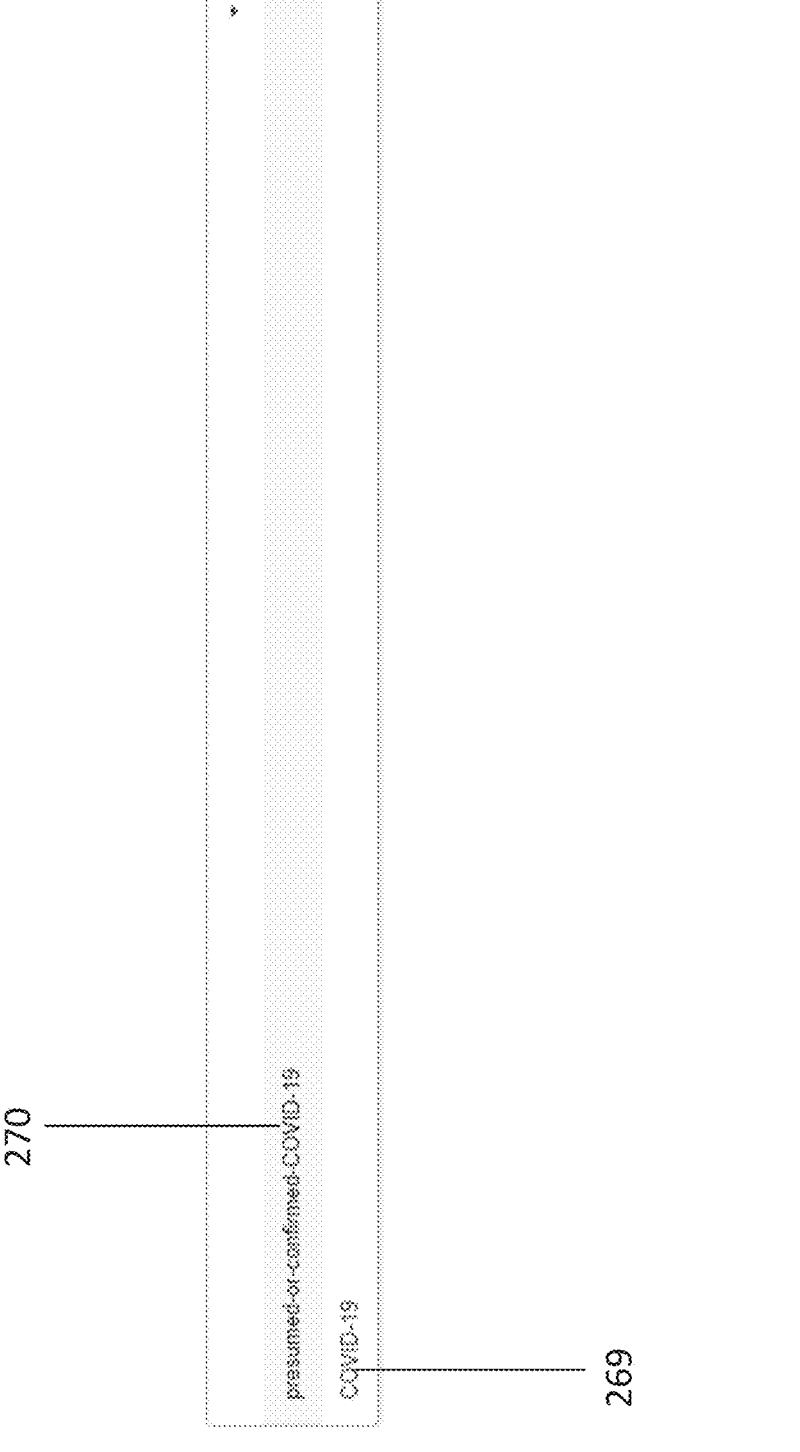
FIG. 48 is a screen shot showing a picklist for selection of terms, corresponding to the example in FIG. 47, an exemplary system and method consistent with the present disclosure.

FIGS. 47 and 48 show an example of a novel arrangement of elements providing a technical improvement over the prior art with an editor GUI that translates structured data in standard form for a coding (a term with code system, code, and display) into an option in a picklist containing the "human-friendly display" values for available options for specification of terms from the code system.

FIG. 47 shows data for a Coding data type in an intermediate form in JSON, including two entries in the coding element 220 with: one entry including a code element 266 containing the value "U07.1" 268 and a display element 267 containing the value "COVID-19" 269; and one entry including a code element 266 containing the value "presumed-or-confirmed-COVID-19" 270 and not containing a display element.

In some embodiments, a system and method consistent with the present disclosure will interrogate each instance of coding data in intermediate form (as shown in FIG. 47) and select a single-phrase display value for "human-friendly display" based on the value found in the display element 267 and if no such value is present then use the value found in the code element 266.

In some embodiments, a system and method consistent with the present disclosure will convert the selected representations of coding values for "human-friendly display" into single-phrase display values in a picklist menu. FIG. 48 shows a picklist menu with single-phrase display values of "COVID-19" 269 and "presumed-or-confirmed-COVID-19" 270, corresponding to the data shown in FIG. 47.

The advantages of this arrangement of elements are that it is more efficient to select a recognized term than to enter data to describe the code and display (hence the creation of a picklist), and it is more efficient to generate a recognizable display of a code system term from the available data than to require pre-coordinated effort (so the picklist can be auto generated). These advantages overcome problems noted in Background #0016.

FIGS. 43, 44, 49 and 50 show an example of a novel arrangement of elements providing a technical improvement over the prior art with an editor GUI that allows picklist selection of single-phrase display values matched to preset coding values and allows text entry of write-in choices in the same data entry field.

FIG. 44 shows an example of structured data which associates code values with display and system values, including: the first value shows "primary" 242 as the code value;

The associated values are contained between { 243 and } 244 characters and these { 243 and } 244 characters immediately follow a : character 2 which immediately follows the associated code value 242; the first associated value for the "primary" code value 242 is "display": "Primary title" 245 which represents the human-readable display associated with the code value; and the third associated value for the "primary" code value 242 is "system": "http://build.fhir.org/valueset-title-type.html" 271 which represents the URI identifying the code system associated with the code value.

In some embodiments, a system and method consistent with the present disclosure will interrogate data in structured form representing the "display" associated with a term in a code system (as shown in the example 245 in FIG. 44) and convert such data into on-screen display in a picklist menu, as shown with the single-phrase display value of "Primary title" 272 in the example shown in FIG. 43.

The user interface will allow selection of a picklist option as one method of data entry (as shown in FIG. 49) and will allow text entry as another method of data entry for the same data entry field (as shown in FIG. 50).

FIG. 49 shows the resulting display of the user interface, following the example in FIG. 43, when the user uses the computer mouse or other user interface functions to emphasize an entry in the picklist (as shown with "Subtitle" 273 in the example), the area containing the selected entry will change from a white background to gray background 274.

FIG. 50 is an example of the user interface, following the example in FIG. 49, that demonstrates what happens after the user clicks the mouse or presses the Enter key to select the highlighted item ("Subtitle" 273 in the example shown in FIG. 49) and the resulting display presents the "display" value ("Subtitle" 275 in the example in FIG. 50) in a box with a gray background 276 and this box is presented in the data entry field 277.

FIG. 50 also demonstrates that the user can type into the same data entry field 277. In this example, the user typed in "Phrase plus acronym" 278 and the user interface displays a clickable element with the phrase "Add Phrase plus acronym" 279 which can be clicked to select the typed-in value as the data to be recorded.

The advantages of this arrangement of elements are that it is more efficient to select a recognized term than to enter data to describe the term, and when the desired term is not present it is more efficient to directly enter the desired phrase than to click a button to create a new data entry field, and it is easier for the person entering data to recognize that use of preset terms or typing in new phrases are applied to the same data entry field. These advantages overcome problems noted in Background #0017.

FIGS. 51 and 52 show an example of a novel arrangement of elements providing a technical improvement over the prior art with a system that maintains the coding structure for data selected from a picklist AND maintains the text structure for write-in data.

FIG. 51 is an example of the editor GUI that demonstrates what happens after the user clicks the phrase "Add Phrase plus acronym" 279 (shown in FIG. 50). FIG. 51 shows three entries in the data entry field 277, including: one entry displayed as "Subtitle" 275 (which was derived from the "display" value from a coding data type) and displayed within a box with a gray background 276 wherein such box contains an x character 280; and one entry displayed as "Phrase plus acronym" 278 (which was derived from the "text" value from free-text entry) and displayed within a box with a gray background 276 wherein such box contains an x character 280.

In some embodiments, a system and method consistent with the present disclosure will convert such data into an intermediate form. FIG. 52 shows an example of data consistent with data shown in FIG. 51 and converted into an intermediate form in JSON with data that includes: the data 273 that is selected from a picklist entry (as shown in FIG. 49) is matched to structured data associating code value 281, display value 282, and code system value 283 values (as shown in FIG. 44) and these data values are included in a coding element 220 which contains: a system element 219 containing the code system value 283; a code element 266 containing the code value 281; and a display element 267 containing the display value 282.

The data 278 that is text entered by the user (as shown in FIG. 50) is included in a text element 284 which contains the data 278.

The advantages of this arrangement of elements are that maintenance of both forms of expression (structured coding and unstructured text) avoids data loss that occurs if structured coding is converted to unstructured text; maintenance of both forms of expression (structured coding and unstructured text) avoids erroneous data addition that occurs if unstructured text is converted to structured coding by adding meaningless data to add structure; and a system supporting both structured coding and unstructured text is interoperable with any other system and not limited by systems that can only support one but not both forms.

These advantages overcome problems noted in Background #0018.

FIG. 53 shows an example of a novel arrangement of elements providing a technical improvement over the prior art with an editor GUI that that presents a picklist containing preset options based on code system terms (coding data type) AND the write-in options (text data type), so the overall "view" shows similar representation of all available predetermined options for expressing codable concepts.

FIG. 53 shows a picklist 239 that contains values derived from code system terms (including "Primary title" 272 and "Subtitle" 273) and a value derived from user-entered text ("Phrase plus acronym" 278 in the example).

In some embodiments, a system and method consistent with the present disclosure will interpret data in structured form representing a predetermined list of terms for "human-friendly display" of preset codings (as shown in FIG. 44) and data entered as text entry (as shown in FIG. 51 and FIG. 52) and convert such data into entries in a picklist menu for selection (as shown in FIG. 53).

The advantages of this arrangement of elements are that data entry is more efficient if selections from predetermined options and user-determined options can be provided in the same one-click selection menu, and it is more efficient if the user can enter new items to these selections without the need to navigate to a separate data entry interface. These advantages overcome a problem noted in Background #0018.

Figure 54:
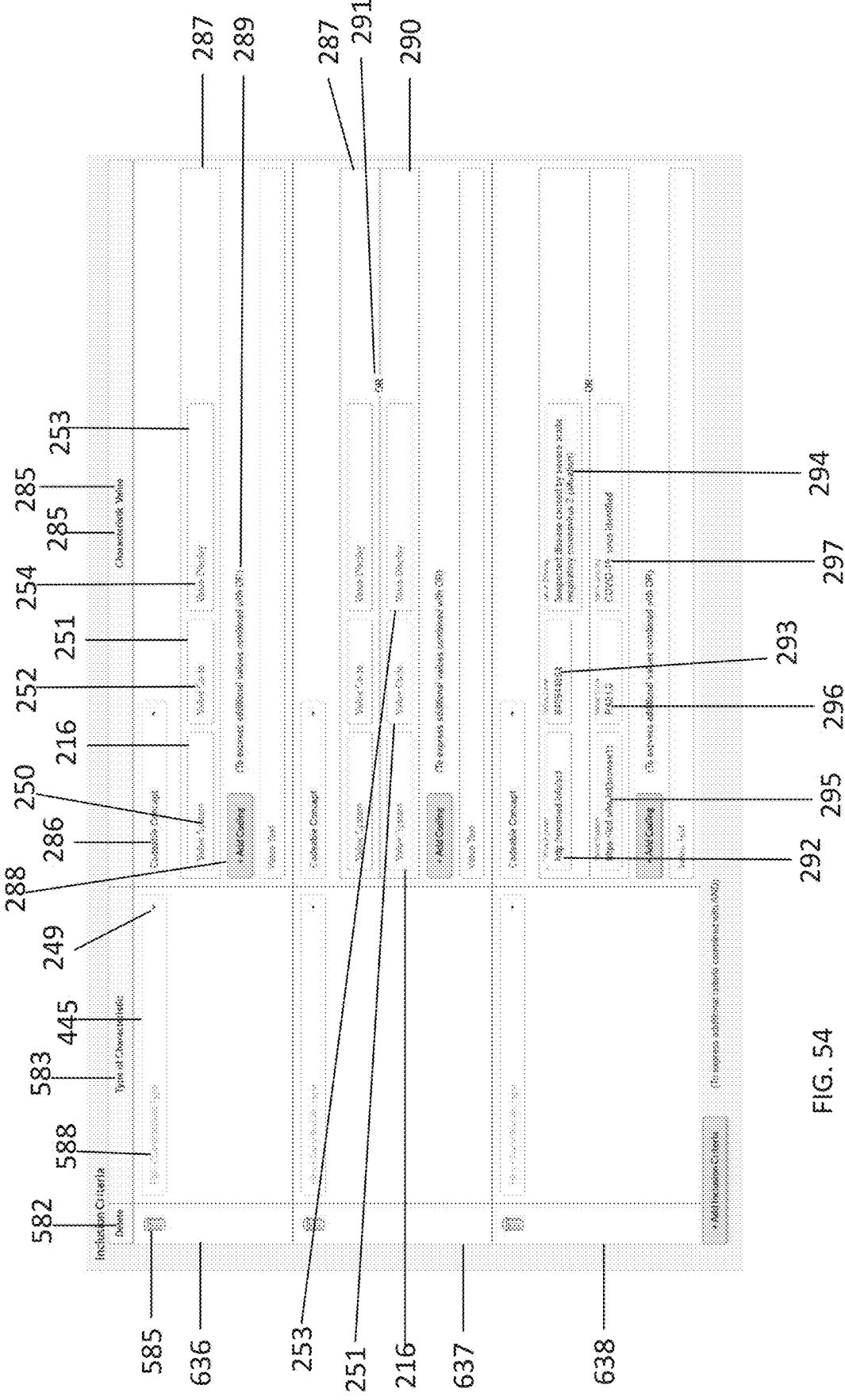
FIG. 54 is a screen shot of the Inclusion Criteria section of the Computable Publishing: Group (Population/Sample) Builder tool version 0.12.0, with demonstration of data representing multiple codings within a codable concept, an exemplary system and method consistent with the present disclosure.

FIG. 54 shows an example of a novel arrangement of elements providing a technical improvement over the prior art with an editor GUI that supports data entry for any number of coding elements within a codable concept element and a user interface that supports display of codable concepts with multiple coding elements represented as an "any of" combination.

FIG. 54 shows a table with a column header labeled "Characteristic Value" 285 and in this column: the first row shows each of: the data type selected as Codeable Concept 286; a single-row table 287 with three data entry fields: a data entry field 216 labeled "Value System" 250 to indicate this is the text entry field for the value describing the code system, a data entry field 251 labeled "Value Code" 252 to indicate this is the text entry field for the value describing the code, and a data entry field 253 labeled "Value Display" 254 to indicate this is the text entry field for the value describing the display; a button 288 labeled "+ Add Coding"; and descriptive text labeled "(To express additional values combined with OR)" 289.

The second row shows an example consistent with the result of clicking the button 288 labeled "+ Add Coding" in the first row and includes: the same content as shown in the first row plus an additional row 290 with the same three data entry fields 216, 251, 253 and the word "OR" 291 displayed in the line separating the rows for entering coding data in the single-row table 287, and the additional row 290.

The third row shows an example consistent with the result of entering data values 292, 293, 294, 295, 296, 297 in each of the six data entry fields that were shown in empty form in the second row.

Figure 55:
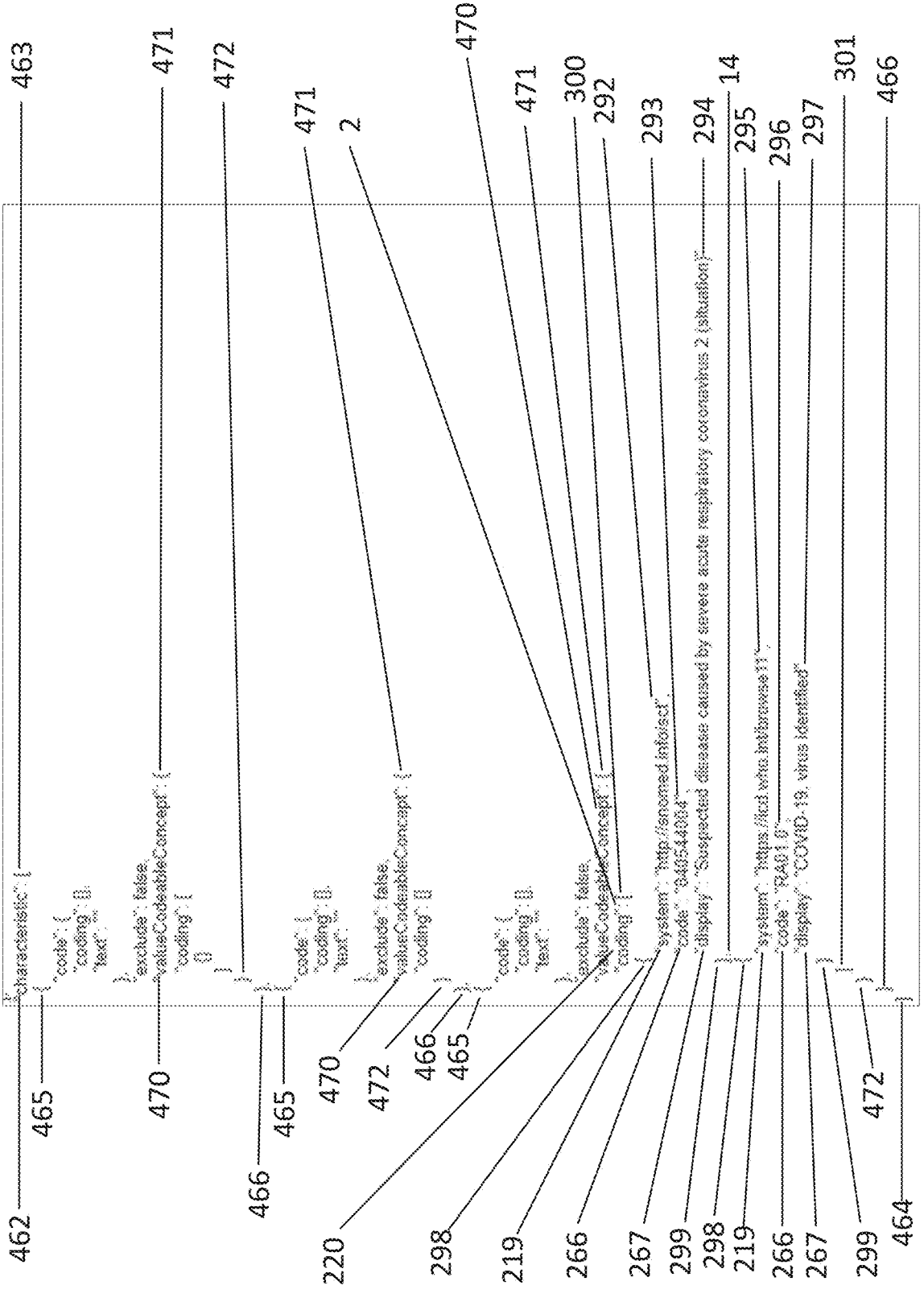
FIG. 55 is a portion of structured form of data, representing multiple codings within a codable concept, and corresponding to the example in FIG. 54.

In some embodiments, a system and method consistent with the present disclosure will convert such data into an intermediate form. FIG. 55 shows an example of data consistent with data shown in FIG. 54 and converted into an intermediate form in JSON with data that includes: the data value 292 entered in the "Value System" data entry field is included in a system element 219; the data value 293 entered in the "Value Code" data entry field is included in a code element 266; the data value 294 entered in the "Value Display" data entry field is included in a display element 267; the three elements 219, 266, 267 and data values 292, 293, 294 that represent one coding instance are contained between { 298 and } 299 characters; the data value 295 entered in the "Value System" data entry field is included in a system element 219; the data 296 entered in the "Value Code" data entry field is included in a code element 266; the data 297 entered in the "Value Display" data entry field is included in a display element 267; the three elements 219, 266, 267 and data values 295, 296, 297 that represent one coding instance are contained between { 298 and } 299 characters; the two coding instances are separated by a, character 14 and contained between [ 300 and ] 301 characters; and all the data contained between and including the [ 300 and ] 301 characters immediately follows a : character 2 which immediate follows the coding element 220, a data pattern conformant with the intermediate form in JSON.

Figure 56:
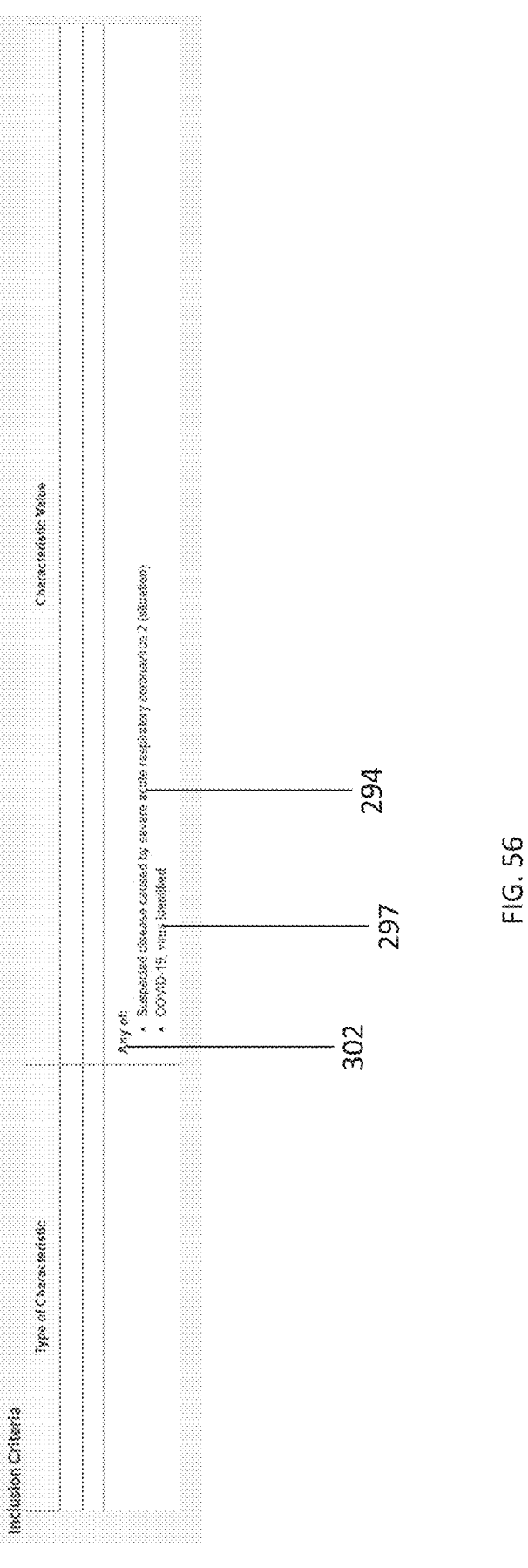
FIG. 56 is a screen shot of the Inclusion Criteria section of the Computable Publishing: Group (Population/Sample) Viewer tool version 0.12.0, with demonstration of data representing multiple codings within a codable concept and corresponding to the example in FIG. 55, an exemplary system and method consistent with the present disclosure.

In some embodiments, a system and method consistent with the present disclosure will interpret data containing multiple codings in a codable concept in an intermediate form and convert such data to viewable data in human-readable display form representing these codings as having an "any of" combination. FIG. 56 shows an example of a user interface displaying content consistent with the example in FIG. 55. FIG. 56 shows a header of "Any of:" 302 and two data values 294, 297 corresponding to the data that was included in display elements in the intermediate form.

The advantage of this arrangement of elements is that data entry to express a concept of "code A or code B" is more efficient to express through modification of a common recognized form of data entry for each code than to create a new data entry method for handling the "or" part of the expression. This advantage overcomes a problem noted in Background #0019.

FIGS. 57, 58, 59, and 60 show an example of a novel arrangement of elements providing a technical improvement over the prior art with an editor GUI and data conversion tool that adds the definition of a "coding qualifier" as an extension to the standard for structured data exchange to support post-coordination of terms. An extension is a functional structure that is not accepted by a group of users as a standard.

Figure 57:
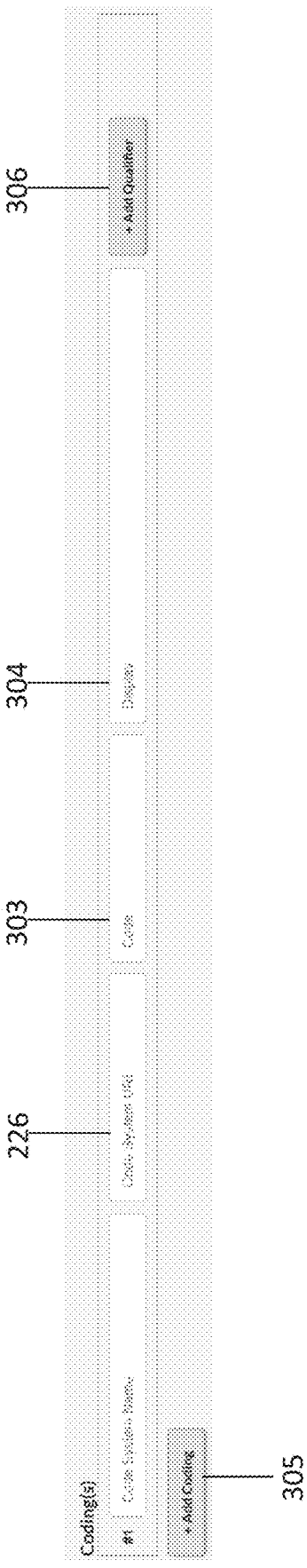
FIG. 57 is a screen shot of the Computable Publishing: CodeableConcept Builder tool version 0.1.0, with demonstration of a data entry trigger to add a coding qualifier, an exemplary system and method consistent with the present disclosure.

FIG. 57 shows data entry fields for elements used to define a coding in intermediate form, including data entry fields labeled for code system URI data 226, labeled for code data 303, and labeled for display data 304; a button labeled "+ Add Coding" 305 to add a second coding", and a button labeled "+ Add Qualifier" 306 to add a coding qualifier.

Figure 58:
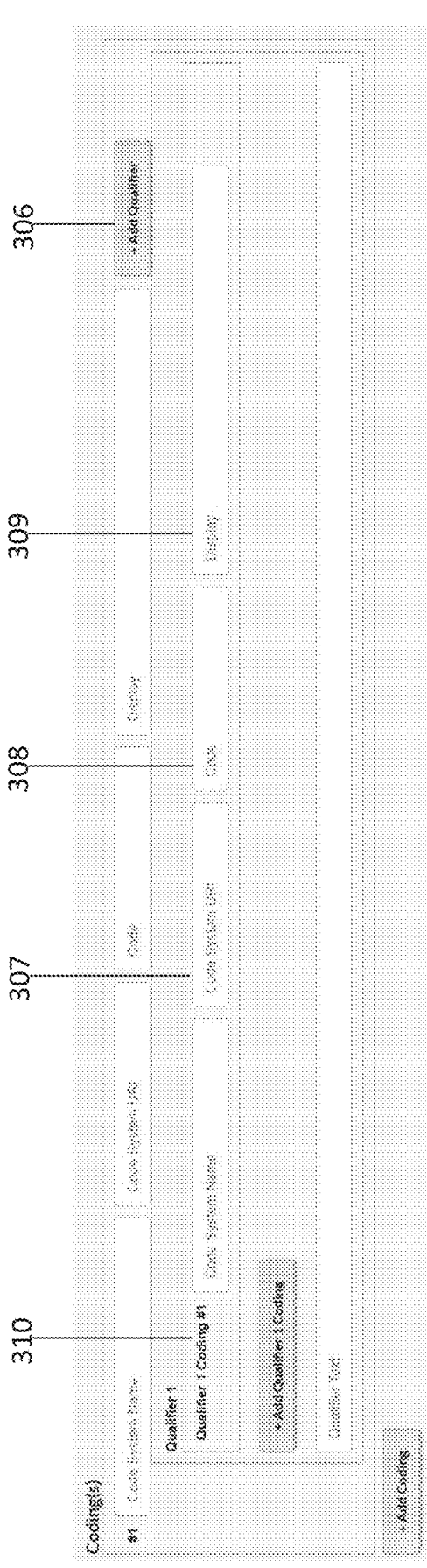
FIG. 58 is a screen shot of the Computable Publishing: CodeableConcept Builder tool version 0.1.0, with demonstration of a data entry form to add a coding qualifier, an exemplary system and method consistent with the present disclosure.

FIG. 58 shows the data entry form that appears after the user clicks the button labeled "+ Add Qualifier" 306 (as shown in FIG. 57), and includes a data entry field labeled for code system URI data 307, a data entry field labeled for code data 308, and a data entry field labeled for display data 309 within an area labeled "Qualifier 1 Coding #1" 310.

Figure 59:
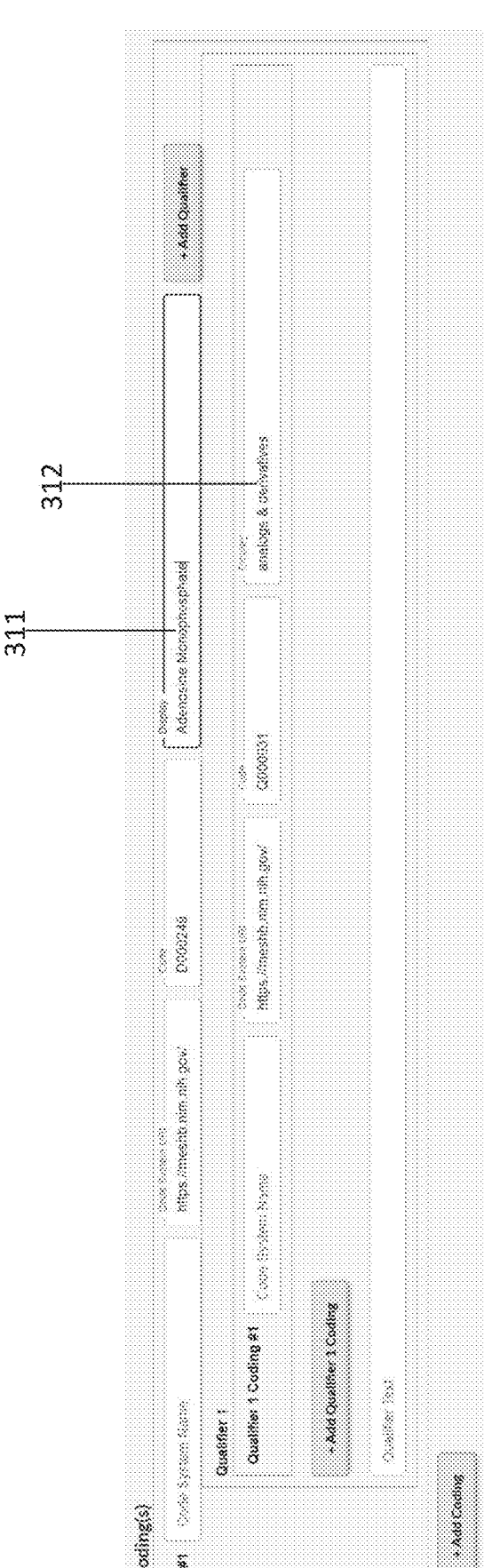
FIG. 59 is a screen shot of the Computable Publishing: CodeableConcept Builder tool version 0.1.0, with demonstration of example data including a coding qualifier, an exemplary system and method consistent with the present disclosure.

FIG. 59 shows example data including a coding display value 311 of "Adenosine Monophosphate" and a coding qualifier with a display value 312 of "analogs & derivatives".

Figure 60:
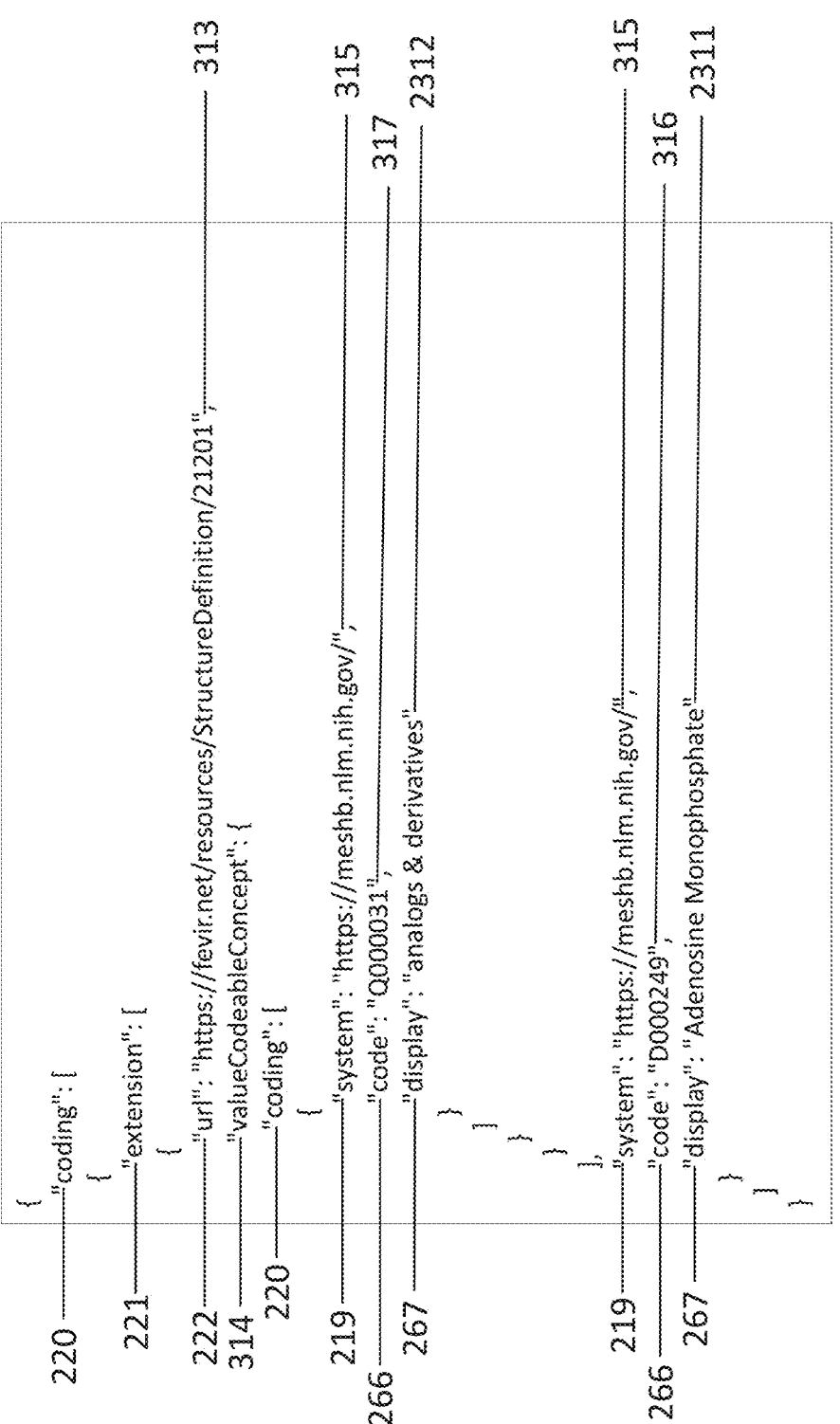
FIG. 60 is a portion of intermediate form of data corresponding to FIG. 59.

In some embodiments, a system and method consistent with the present disclosure will convert such data into an intermediate form. FIG. 60 shows an example of data consistent with data shown in FIG. 58 and converted into an intermediate form in JSON with data that includes a coding element 220 that contains: a system element 219, a data pattern conformant with the intermediate form in JSON; a code element 266, a data pattern conformant with the intermediate form in JSON; a display element 267 containing a data value 2311, a data pattern conformant with the intermediate form in JSON.

When the data describing a coding is entered as a coding qualifier, an extension element 221 will be added within the same coding element 220, and the extension element 221 will contain: A URL element 222 that includes a value "https://fevir.net/resources/StructureDefinition/21201" 313 that defines the structured form for the extension to the intermediate form in JSON; and A valueCodeableConcept element 314 that contains a coding element 220 which contains: a system element 219, a data pattern conformant with the intermediate form in JSON; a code element 266, a data pattern conformant with the intermediate form in JSON; and a display element 267 containing a data value 2312, a data pattern conformant with the intermediate form in JSON.

The advantage of this arrangement of elements is that people entering code system terms who desire to coordinate existing terms into complex terms that are not already available in pre-coordinated form can construct the complex term without interrogating instructions specific to each code system. This is more efficient than seeking such instructions and allows coordination of terms from different code systems. picklists for efficient entry using the system and method disclosed herein can enter an identifying label for the code system in simple free text entry instead of looking up the exact URI. These advantages overcome a problem noted in Background #0020.

FIGS. 60 and 61 show an example of a novel arrangement of elements providing a technical improvement over the prior art with a reader GUI that supports display of data structured in a CodeableConcept datatype with a coding qualifier extension.

FIG. 60 shows data for a CodeableConcept data type in an intermediate form in JSON with an extension for a coding qualifier in a structured form in JSON, including: a system element 219 containing the value "https://meshb.nlm.nih.gov/" 315; a code element 266 containing the value "D000249" 316; a display element 267 containing the data value 2311 "Adenosine Monophosphate"; and an extension element 221 containing: a URL element 222 containing the value "https://fevir.net/resources/StructureDefinition/21201" 313; and a valueCodeableConcept element 314 that contains a coding element 220 which contains: a system element 219 containing the value "https://meshb.nlm.nih.gov/" 315; a code element 266 containing the value "Q000031" 317; and a display element 267 containing the value 2312 "analogs & derivatives."

In some embodiments, a system and method consistent with the present disclosure will interrogate the coding data in structured form (as shown in JSON in FIG. 60) and convert such data to a non-standard structured representation with a "human-friendly display" of the code system term including coding qualifiers (as shown in FIG. 61).

FIG. 61 shows a reader GUI displaying the display value 3311 for a code system term, followed by ( 318 and ) 319 characters, and between the ( 318 and ) 319 characters is displayed the display value 3312 for a code system term used as a qualifier of the display value 3311.

The advantage of this arrangement of elements is that post-coordinated terms can be displayed in simple form without the user specifying how to describe the relations of codings and coding qualifiers. This advantage overcomes a problem noted in Background #0020.

FIG. 62 shows an example of a novel arrangement of elements providing a technical improvement over the prior art with an editor GUI that allows entry of a data element value and entry of additional data representing a categorization (herein called metadata) of the data element value. FIG. 62 shows a data entry interface in which the user can enter a data element value followed by selection of the type of data represented by this data element value, including: the first column of the table 320 is labeled as "Title text" in the column header 321; the second column of the table 322 is labeled as "Type" in the column header 323; for each row in the table, the table cell in the first ("Title text") column includes a data entry field 186 which allows free-text entry to express the value of the data element (as shown with "A pilot study of hydroxychloroquine in treatment of patients with common coronavirus disease-19 (COVID-19)" 324 in the first row in the example shown in FIG. 62); and for each row in the table, the table cell in the second ("Type") column includes a data entry field 277 which allows data entry to express the value(s) of the label(s) associated with the data element value in first column (as shown with "Primary title" 325 in the first row in the example shown in FIG. 62).

In some embodiments, a system and method consistent with the present disclosure will convert such data (data element value plus associated metadata) into current data in an intermediate form. FIG. 63 shows an example of current data consistent with the data shown in FIG. 62 and converted into an intermediate form in JSON with a title element 326 containing: the "Title text" data element value represented as "text": "A pilot study of hydroxychloroquine in treatment of patients with common coronavirus disease-19 (COVID-19)" 327; the "Type" data element value represented as "type": [{"coding": [{"system": "http:1/build.fhir.org/codesystem-title-type.html", "code": "primary", "display": "Primary title"}]}] 328; the association of the "Title text" data element value and the "Type" data element value is maintained by including these data element values between a { character 329 and a } 330 character for each instance.

The advantages of this arrangement of elements are that it avoids presenting the person performing data entry with a long list of possible labels for each data element, avoids the false suggestion that data is expected for every possible label, and avoids the generation of empty data elements for any unused data entry fields. These advantages overcome the problems noted in Background #0021.

FIG. 62 shows an example of a novel arrangement of elements providing a technical improvement over the prior art with an editor GUI that allows entry of a data element value and entry of multiple metadata element values associated with the data element value. FIG. 62 shows a data entry interface in which the user can enter a data element value followed by selection of more than one type of data represented by this data element value. In the second row of the table in the example shown in FIG. 62: the first column of the table 320 allows free-text entry in a data entry field 186 to express the value of the data element for each data element that is described as "Title text" in the column header 321; and the second column of the table 322 allows data entry in data entry field 277 to express the values 331, 332 of the labels for the associated "Title text" value 333, which in this example such labels are described as "Type" in the column header 323.

The second row in the example shows two different values 331, 332 entered in the space for data entry for the "Type" concept in data entry field 277.

The data entered in the example shown in FIG. 62 includes the value "Hydroxychloroquine pilot study in treatment of COVID-19" 333 for the value of the "Title text" data element, the value "Short title" 331 as a display to represent the "Type" data element, the value "Plain language title" 332 as a display to represent the "Type" data element, and both of the "Type" data element values 331, 332 are entered in the same data entry field 277.

In some embodiments, a system and method consistent with the present disclosure will convert such data (data element value plus associated metadata) into current data in an intermediate form. FIG. 64 shows an example of current data consistent with the data shown in FIG. 62 and converted into an intermediate form in JSON. FIG. 64 shows a second instance of data for a title element (consistent with the title element 326 shown in FIG. 63) with: the instance of data is contained between a { character 329 and a } 330 character; the "Title text" data element value represented as "text": "Hydroxychloroquine pilot study in treatment of COVID-19" 334; the "Type" data element value represented as "type": [{"coding": [{"system": "http://build.fhir.org/codesystem-title-type.html", "code": "short-title", "display": "Short title"}]}, {"coding": [{"system": "http://build.fhir.org/codesystem-title-type.html", "code": "plain-language", "display": "Plain language title"}]}] 335; and the "type" element contains two instances of codable concept entries with {"coding": [{"system": "http://build.fhir.org/codesystem-title-type.html", "code": "short-title", "display": "Short title"}]} 336 and {"coding": [{"system": "http://build.fhir.org/codesystem-title-type.html", "code": "plain-language", "display": "Plain language title"}]} 337.

The association of the "Title text" data and the "Type" data is maintained by containing both data elements between a { character 329 and a } 330 character.

The advantage of this arrangement of elements is that it avoids repeat data entry when the desire is to use the same data element value for more than one purpose. This advantage overcomes a problem noted in Background #0021.

FIG. 62 shows an example of a novel arrangement of elements providing a technical improvement over the prior art with an editor GUI that allows entry of a data element value and entry of multiple metadata element values and multiple kinds of metadata associated with the data element value. FIG. 62 shows a data entry interface in which the user can enter a data element value followed by selection of more than one type of data represented by this data element value and also selection of one or more languages to associate with the same data element value. In the second row of the table in the example shown in FIG. 62: the first column of the table 320 allows free-text entry in the data entry field 186 to express the value of the data element for each data element that is described as "Title text" in the column header 321; the second column of the table 322 allows the data entry in data entry field 277 to express the values 331, 332 of the labels for the associated "Title text" value 333, which in this example such labels are described as "Type" in the column header 323; and the third column of the table 338 allows data entry 339 to express the language 340 or languages for the associated "Title text" value 333.

The data entered in the example shown in FIG. 62 includes the value "Hydroxychloroquine pilot study in treatment of COVID-19)" 333 for the value of the "Title text" data element, the value "Short title" 331 as a display to represent the "Type" data element, the value "Plain language title" 332 as a display to represent the "Type" data element, and both of "Type" data element values 331, 332 are entered in the same data entry field 277, and the value "English" 340 as a display to represent the "Language" data element.

In some embodiments, a system and method consistent with the present disclosure will convert such data (data element value plus associated metadata) into current data in an intermediate form. FIG. 64 shows an example of current data consistent with the data shown in FIG. 62 and converted into an intermediate form in JSON. FIG. 64 shows a second instance of data for a title element (consistent with the title element shown in FIG. 63) with: the instance of data is contained between a { character 329 and a } 330 character; the "Title text" data element value represented as "text": "Hydroxychloroquine pilot study in treatment of COVID-19" 334; the "Type" data element value represented as "type": [{"coding": [{"system": "http://build.fhir.org/codesystem-title-type.html", "code": "short-title", "display": "Short title"}]}, {"coding": [{"system": "http://build.fhir.org/codesystem-title-type.html", "code": "plain-language", "display": "Plain language title"}]}]335; the "type" element contains two instances of codable concept entries with {"coding": [{"system": "http://build.fhir.org/codesystem-title-type.html", "code": "short-title", "display": "Short title"}]} 336 and {"coding": [{"system": "http://build.fhir.org/codesystem-title-type.html", "code": "plain-language", "display": "Plain language title"}]} 337; and the "Language" data element value represented as "language": {"coding": [{"system": "http://h17.org/fhir/ValueSet/languages", "code": "en", "display": "English"}]} 341.

The association of the "Title text" data, the "Type" data, and the "Language" data is maintained by containing all three data elements between a { character 329 and a } 330 character.

Though not shown in this example, the "Language" data can support more than one value via multiple coding element instances.

The advantage of this arrangement of elements is that it avoids complicated data entry when the desire is to express the language as a subtype. This approach avoids the overload of "picklist" choices to support data entry where the list for label type (other than language) and the list for language would be intermingled. These advantages overcome the problems noted in Background #0021.

Figure 65:
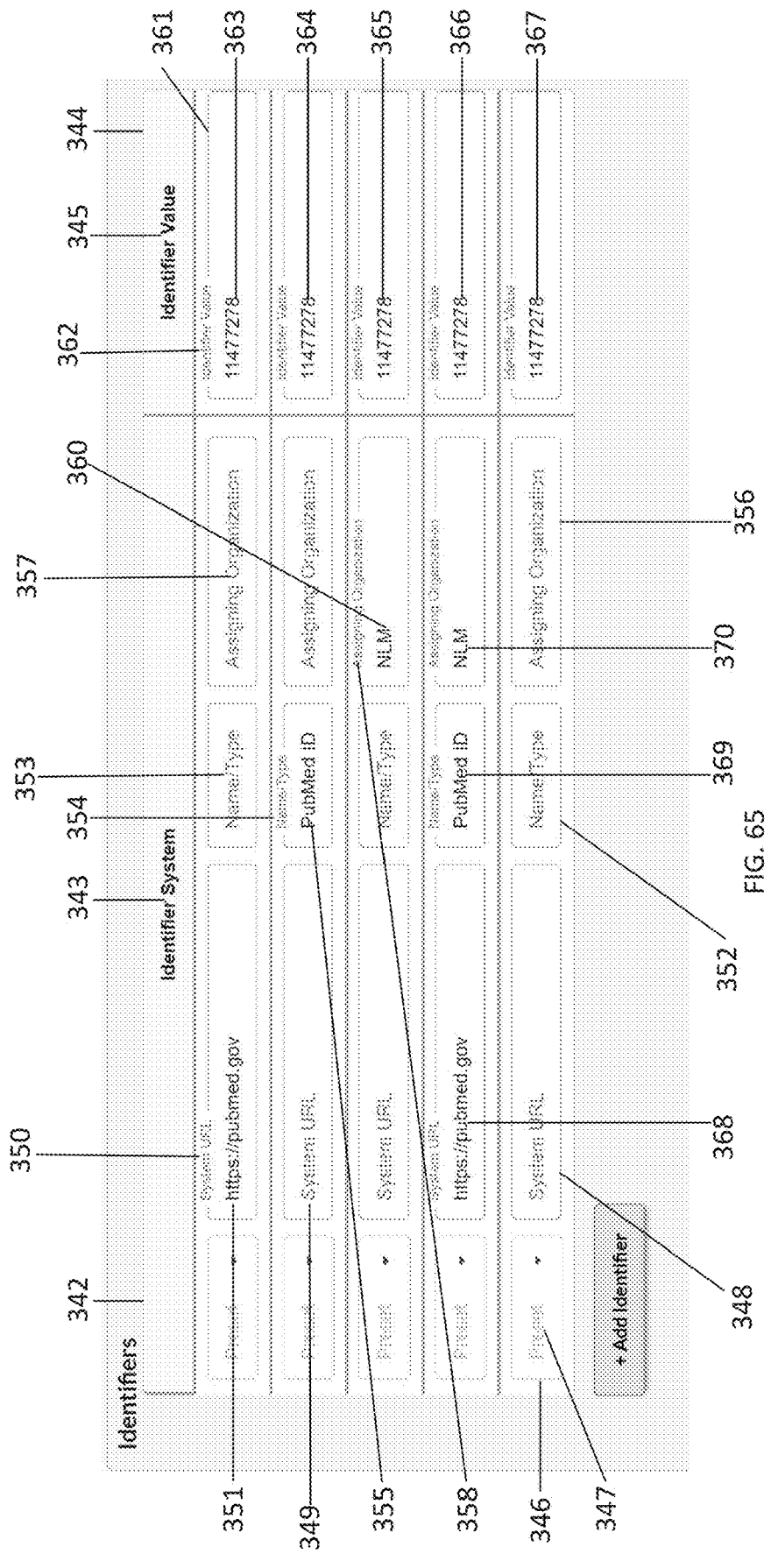
FIG. 65 is a screen shot of the Identifiers section of the Computable Publishing: Citation Builder tool version 1.4.4, an exemplary system and method consistent with the present disclosure.

FIG. 65 shows an example of a novel arrangement of elements providing a technical improvement over the prior art with an editor GUI that allows data entry for an identifier value and, for each identifier value, the user interface allows optional entry of metadata data element values representing an identification system where such metadata data element values may convey a URL value to define or describe the identification system, a text string value to define or describe the identification system, and a text string value to represent the organization assigning the identification system.

FIG. 65 shows a table to organize data entry to report identifiers. The table in FIG. 65 includes: a first column 342 with the column header "Identifier System" 343; a second column 344 with the column header "Identifier Value" 345; and rows which contain data entry fields including: the first data entry field 346 (in the "Identifier System" column) is labeled "Preset" 347; the second data entry field 348 (in the "Identifier System" column) is displayed with a label of "System URL" with the display label in lighter color in the data entry field when the data entry field is empty 349 and the display label in the upper border of the data entry field when the data entry field has data 350, and the data value displayed 351 when the data entry field has data; the third data entry field 352 (in the "Identifier System" column) is displayed with a label of "Name/Type" with the display label in lighter color in the data entry field when the data entry field is empty 353 and the display label in the upper border of the data entry field when the data entry field has data 354, and the data value displayed 355 when the data entry field has data; the fourth data entry field 356 (in the "Identifier System" column) is displayed with a label of "Assigning Organization" with the display label in lighter color in the data entry field when the data entry field is empty 357 and the display label in the upper border of the data entry field when the data entry field has data 358, and the data value displayed 360 when the data entry field has data; and the fifth data entry field 361 (in the "Identifier Value" column) is displayed with a label of "Identifier Value" with the display label in lighter color in the data entry field when the data entry field is empty (not shown in this example) and the display label in the upper border of the data entry field when the data entry field has data 362, and the data value displayed 363 when the data entry field has data.

The data entered in the example shown in FIG. 65 includes four different representations of the same "Identifier System" for the same "Identifier Value", including: the value of the "Identifier Value" is "11477278" 363, 364, 365, 366, 367 in all five rows; the first row shows the value "https://pubmed.gov" 351 for the data representing "System URL" to define or describe the identification system; the second row shows the value "PubMed ID" 355 for the data representing "Name/Type" to define or describe the identification system; the third row shows the value "NLM" 360 for the data representing "Assigning Organization" to define or describe the identification system; the fourth row shows the value "https://pubmed.gov" 368 for the data representing "System URL" to define or describe the identification system, the value "PubMed ID" 369 for the data representing "Name/Type" to define or describe the identification system, and the value "NLM" 370 for the data representing "Assigning Organization" to define or describe the identification system; and the fifth row shows the "Identifier Value" 367 with no data to define or describe the identification system.

Figure 66:
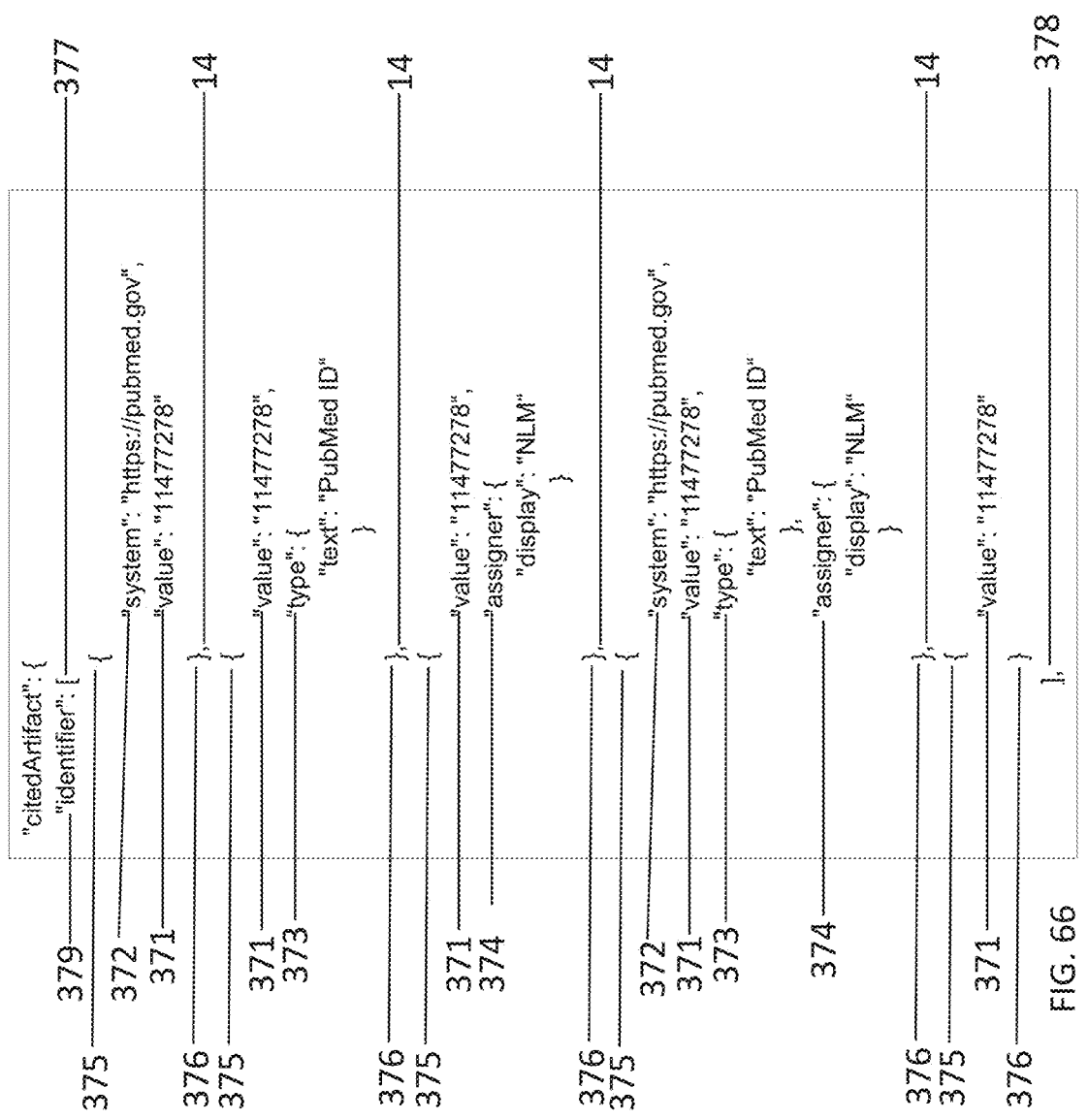
FIG. 66 is a portion of intermediate form of data, corresponding to the example in FIG. 65.

In some embodiments, a system and method consistent with the present disclosure will convert such data (identifier data element value plus associated metadata) into current data in an intermediate form. FIG. 66 shows an example of current data consistent with the data shown in FIG. 65 and converted into an intermediate form in JSON with the "Identifier Value" data element represented as "value": "11477278" 371; the "System URL" data element represented as "system": "https://pubmed.gov" 372 the "Name/Text" data element represented as "type": {"text": "PubMed ID"} 373 the "Assigning Organization" data element represented as "assigner": {"display": "NLM"} 374; and the association of any data elements representing the identification system with the data element representing the identifier value is maintained for each instance with all data elements for an instance are contained between { 375 and }

376 characters; all such instances are contained between [ 377 and ] 378 characters; instances are separated from each other with commas (, characters 14); and the entire array including the [ 377 and ] 378 characters immediately follows an "identifier:" element name 379.

The advantage of this arrangement of elements is that it avoids limitations of options for how to convey identification system data. This advantage overcomes a problem noted in Background #0022.

Figure 67:
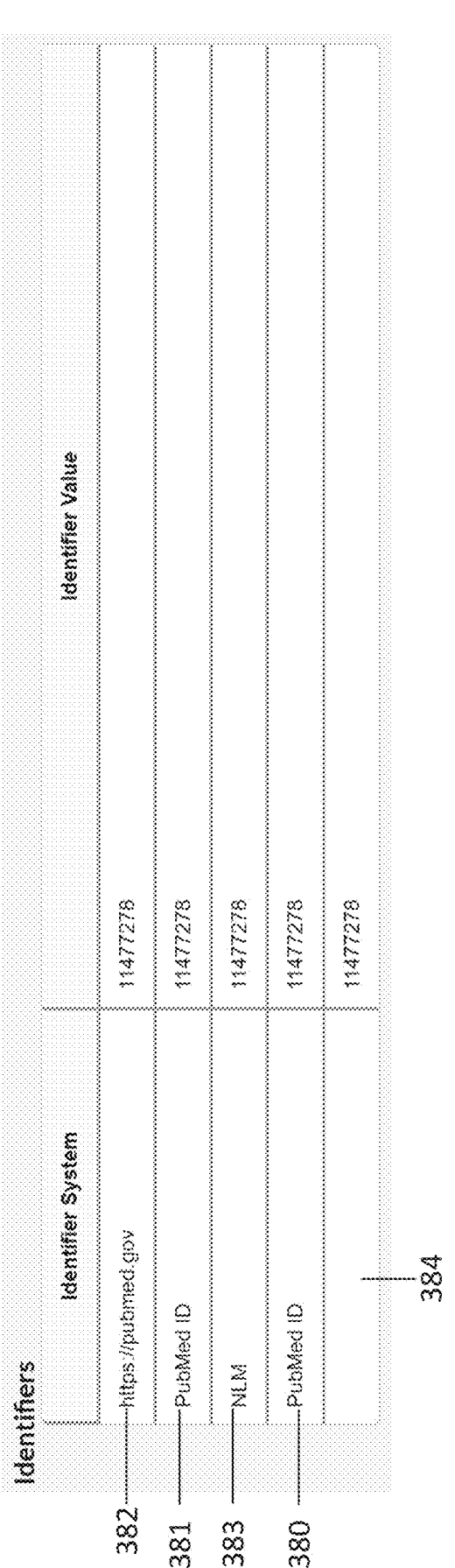
FIG. 67 is a screen shot of the Identifiers section of the Computable Publishing: Citation Viewer tool version 1.4.4 with 5 different representations of the identifier system for the same identifier, an exemplary system and method consistent with the present disclosure.

FIG. 67 shows an example of a novel arrangement of elements providing a technical improvement over the prior art with a reader GUI that displays a singular representation of an identification system derived from a prioritized selection from available data, including: a predetermined common display value associated with the identification system 380; use of the text string value designated to define or describe the identification system 381; use of the URL value designated to define or describe the identification system 382; use of the text string value representing the organization assigning the identification system 383; and default representation (left blank) when other options are not available to describe the identification system 384.

In some embodiments, a system and method consistent with the present disclosure will interpret the current data in an Identifier data type in an intermediate form (as shown in JSON in the example in FIG. 66) and convert such data to display values in a non-standard structured representation with an "identification system display" value derived from the prioritized selection of available data and a display of the identifier value, as shown in FIG. 67.

FIG. 67 shows five different display values to represent the same identification system.

The advantage of this arrangement of elements is that it is more efficient for the person viewing data about identifiers to view a singular representative display of the identification system than to view the detailed representation of how the metadata representing the identification system is structured. This advantage overcomes a problem noted in Background #0022.

Figure 68:
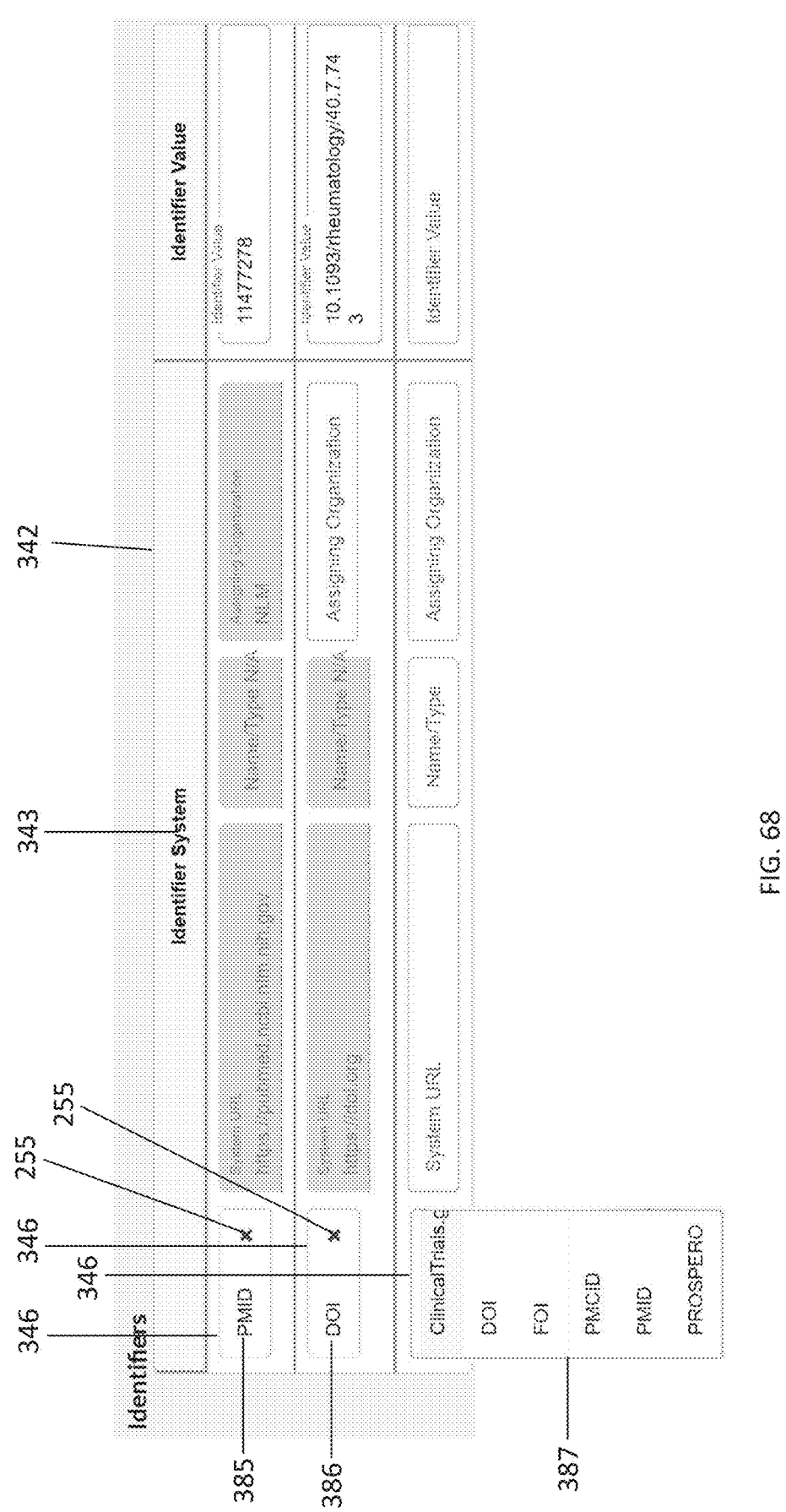
FIG. 68 is a screen shot of the Identifiers section of the Computable Publishing: Citation Builder tool version 1.4.4 showing a picklist, an exemplary system and method consistent with the present disclosure.

FIG. 68 shows an example of a novel arrangement of elements providing a technical improvement over the prior art with an editor GUI that presents a picklist containing the "human-friendly display" (single-phrase display values) for available options to facilitate rapid specification of an identifier system by allowing a predetermined pattern to be selected in one click. In FIG. 68: the first column of the table 342 has a column header "Identifier System" 343; in each row the first data entry field 346 (which was labeled "Preset" 347 in the example in FIG. 65) is shown with example data (and this data entry field 346 is herein called the "Identifier System Preset Selection" data entry field); the "Identifier System Preset Selection" data entry fields 346 in the first and second row contain a "human-friendly display" value 385, 386 and an x character 255; and When the user clicks on the data entry field 346 in an area not covered by the x character 255, the system displays a picklist 387 as shown in the third row.

Figure 69:
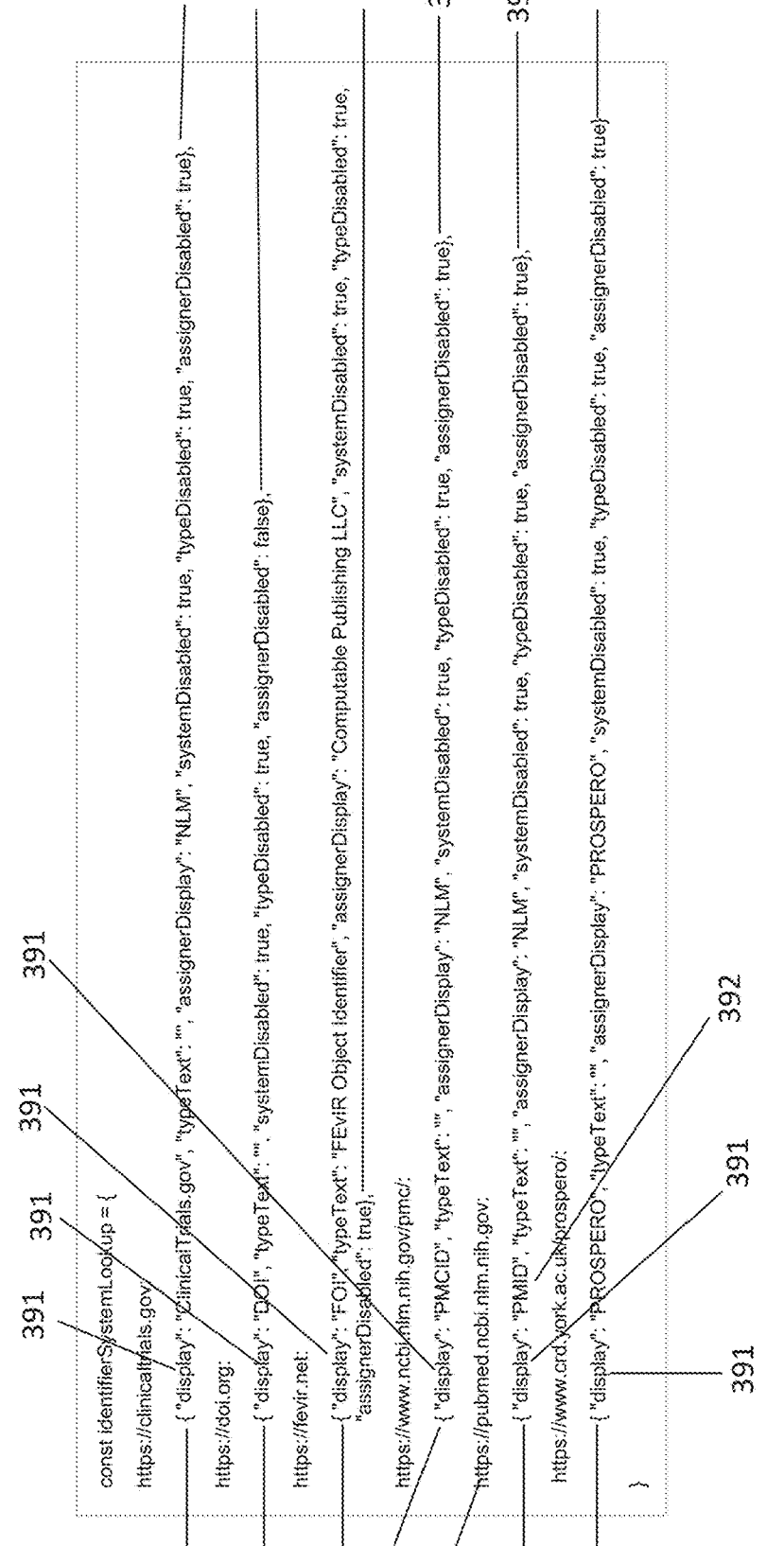
FIG. 69 is a portion of structured form of data, representing a predetermined list of terms and corresponding to the example in FIG. 68.

FIG. 69 shows an example of structured data representing a predetermined list of terms for "human-friendly display" values with: the first value for each group (with an example of "https://pubmed.ncbi.nlm.nih.gov": 388 in the fifth of six groups shown in FIG. 69) represents a value used for matching with the "system" element contained within the "identifier" element in the intermediate form in JSON; the remaining values for each group are contained between { 389 and } 390 characters to maintain group associations; the first contained element in each group is labeled "display": 391; and the value of the first contained element is represented between quotation marks (with an example of "PMID" 392 in the fifth of six groups shown in FIG. 69) and represents the predetermined term to be used for "human-friendly display".

In some embodiments, a system and method consistent with the present disclosure will interpret structured data representing a predetermined list of terms for "human-friendly display" values (as shown in FIG. 69), and convert such data into a picklist menu, as shown in FIG. 68.

The advantage of this arrangement of elements is that it is more efficient to select a recognized identification system than to enter data to describe the identification system. This advantage overcomes a problem noted in Background #0022.

FIGS. 70, 71, 72 and 5 show an example of a novel arrangement of elements providing a technical improvement over the prior art with an editor GUI that allows the user to select choices from a picklist containing the "human-friendly display" values for available options for specification of an identification system and a data conversion tool that translates choices selected from the picklist into structured data in standard form for the metadata (system, name/type, and assigning organization specifications) of the identification system.

Figure 70:
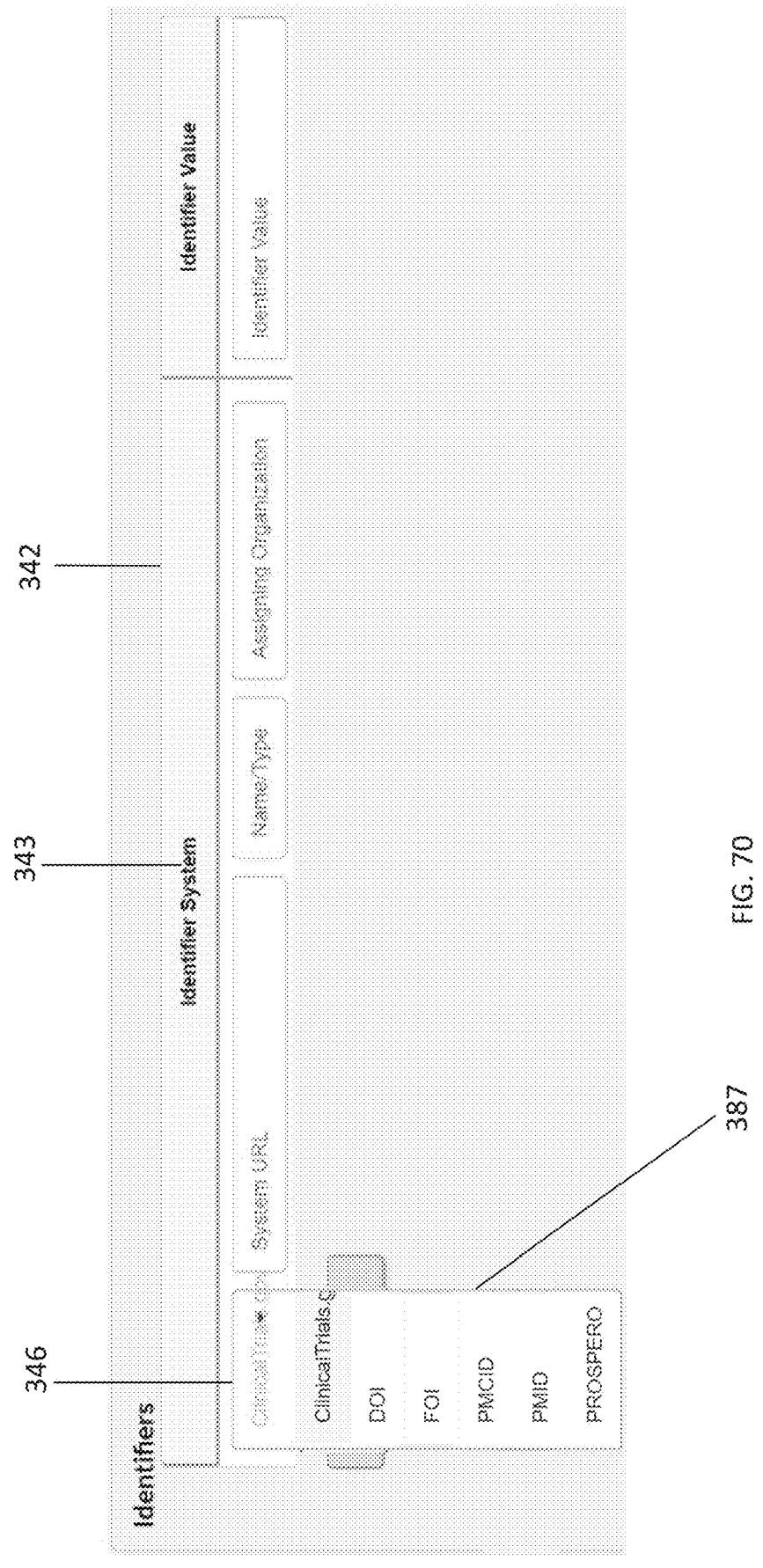
FIG. 70 is a screen shot of the Identifiers section of the Computable Publishing: Citation Builder tool version 1.4.4 showing a picklist, an exemplary system and method consistent with the present disclosure.

FIG. 70 is an example of the user interface shown in FIG. 68 but only showing one row of data entry fields. FIG. 70 shows: The first column of the table 342 has a column header "Identifier System" 343.

In the row, the first data entry field 346 (which was labeled "Preset" 347 in the example in FIG. 65) is shown with a picklist 387.

When the user clicks on the data entry field 346, the user interface displays a picklist 387.

Figure 71:
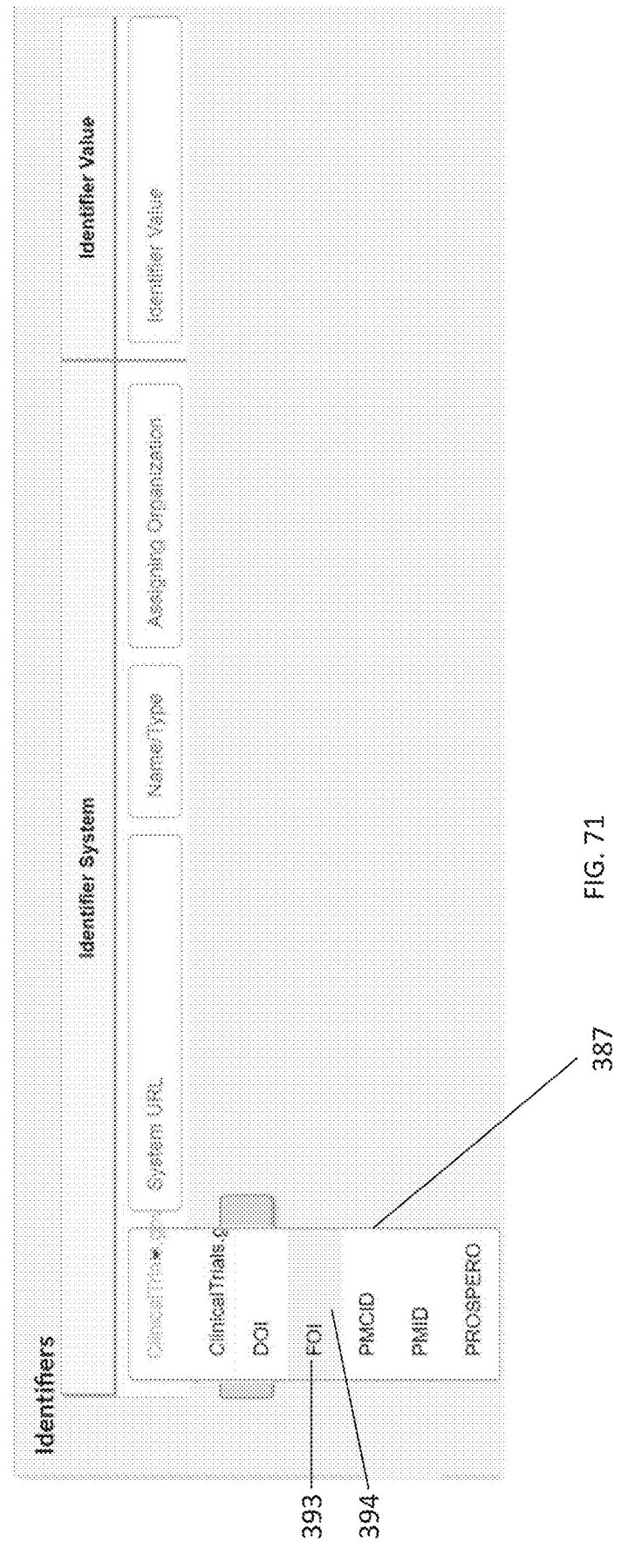
FIG. 71 is a screen shot of the Identifiers section of the Computable Publishing: Citation Builder tool version 1.4.4 showing a picklist with a picklist entry identified for selection and corresponding to the example in FIG. 70, an exemplary system and method consistent with the present disclosure.

FIG. 71 is an example of the user interface shown in FIG. 70 after a user emphasizes an entry in the picklist. When the user uses the computer mouse or other user interface functions to emphasize an entry in the picklist 387 (as shown with the selection of "FOI" 393 in the example) the area containing the selected entry will change to a highlighted item 394 by changing from a white background to gray background.

Figure 72:
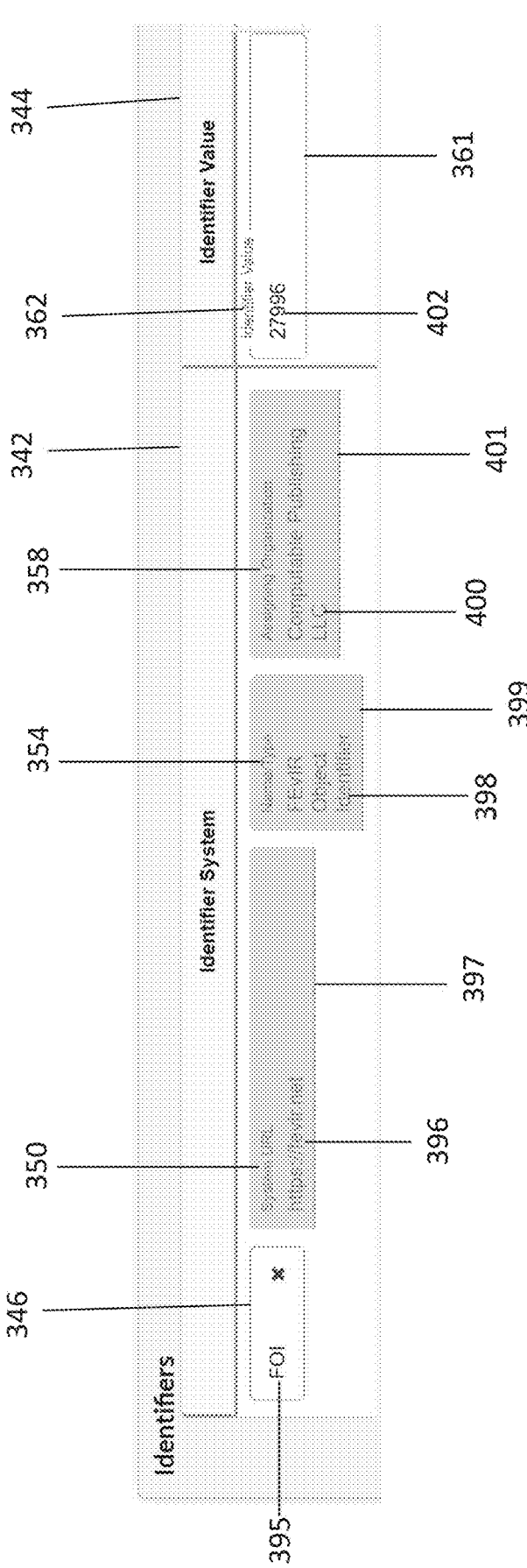
FIG. 72 is a screen shot of the Identifiers section of the Computable Publishing: Citation Builder tool version 1.4.4 showing the result after selecting a picklist entry corresponding to the example in FIG. 71, an exemplary system and method consistent with the present disclosure.

FIG. 72 is an example of the user interface shown in FIG. 71 that demonstrates what happens after the user clicks the mouse or presses the Enter key to select the highlighted item 393, 394 and the resulting display presents: the "human-friendly display" value ("FOI" 395 in the example) in the first data entry field 346 in the "Identifier System" column 342; the associated preset value for the "System URL" 396 in the data entry field 397 with a label "System URL" 350 and the entire data entry field 397 is gray to signal the field cannot be used directly for data entry; the associated preset value for the "Name/Text" 398 in the data entry field 399 with a label "Name/Text" 354 and the entire data entry field 399 is gray to signal the field cannot be used directly for data entry; and the associated preset value for the "Assigning Organization" 400 in the data entry field 401 with a label "Assigning Organization" 358 and the entire data entry field 401 is gray to signal the field cannot be used directly for data entry.

FIG. 72 also shows a data value "27996" 402 typed into the data entry field 361 labeled "Identifier Value" 362 in the "Identifier Value" column 344.

In some embodiments, a system and method consistent with the present disclosure will convert such data (identifier data element value plus associated metadata) as shown in FIG. 72 into current data in an intermediate form, as shown in JSON in the example in FIG. 5 which includes an identifier element 111 containing an "identifier" instance using multiple elements represented as {"type": {"text": "FEvIR Object Identifier"}, "system": "https://fevir.net", "value": "27996", "assigner": {"display": "Computable Publishing LLC"}} 403.

The advantage of this arrangement of elements is that it is more efficient to select a recognized identification system than to enter data to describe the identification system. This advantage overcomes a problem noted in Background #0022.

Figure 73:
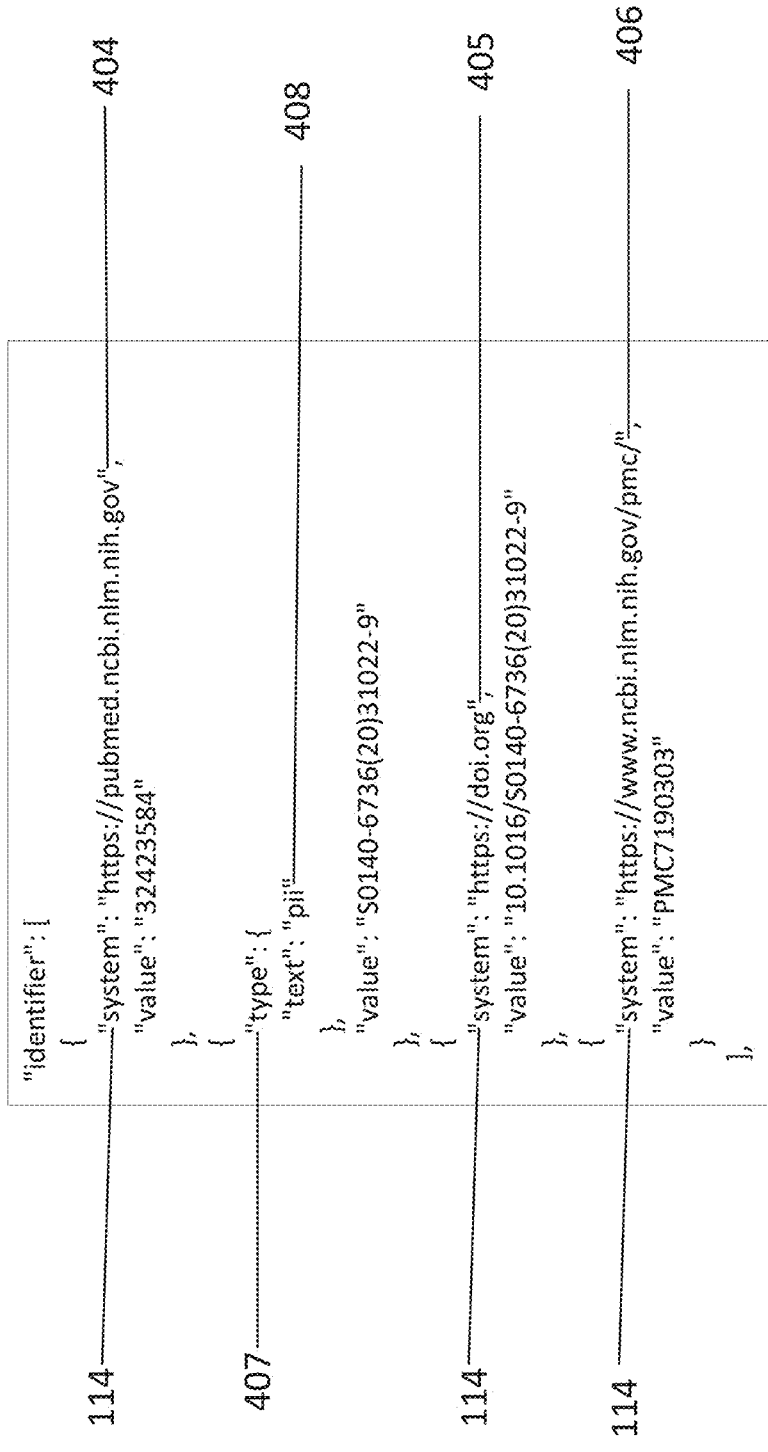
FIG. 73 is a portion of intermediate form of data including 4 identifier elements, one containing a system value and one containing a type value.
Figure 74:
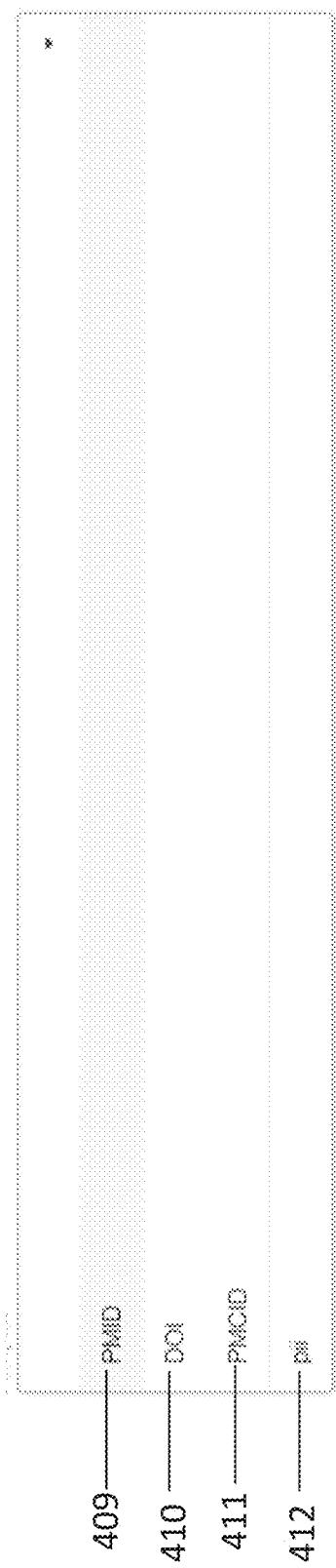
FIG. 74 is a screen shot showing a picklist with "pii" added to a list of otherwise predetermined options, corresponding to the example in FIG. 73, an exemplary system and method consistent with the present disclosure.

FIGS. 73 and 74 show an example of a novel arrangement of elements providing a technical improvement over the prior art with a system that translates data in an intermediate form for system, name/type, and assigning organization specifications of an identification system into an option in a picklist containing the "human-friendly display" values for available options for specification of an identification system.

FIG. 73 shows data for an Identifier data type in an intermediate form in JSON, including three identifiers with system elements 114 containing data element values ("https://pubmed.ncbi.nlm.nih.gov"404, "https://doi.org" 405, "https://www.ncbi.nlm.nih.gov/pmc/" 406) used to represent the identification system, and one identifier with a type element 407 containing the data element value {"text": "pii"} 408 used to represent the identification system.

In some embodiments, a system and method consistent with the present disclosure will interrogate the identifier data in intermediate form (as shown in FIG. 73), and calculate in a prioritized order to select the preferred representation for "human-friendly display" values: the system and method disclosed herein will select "identifier" instances that have a system element value matching values in a predetermined list for "human-friendly display" (in this example "https://pubmed.ncbi.nlm.nih.gov" 404 matches "PMID", "https://doi.org" 405 matches "DOI", and "https://www.ncbi.nlm-.nih.gov/pmc/" 406 matches "PMCID); and then for "identifier" instances without a matched system element value, the system and method disclosed herein will select instances that have a type.text element value to be used without conversion for "human-friendly display" (in this example "pii" is contained within "type": {"text": "pii"} 408).

In some embodiments, a system and method consistent with the present disclosure will convert the preferred representation for "human-friendly display" values into entries in the picklist menu, as shown with "PMID" 409, "DOI" 410, "PMCID" 411, and "pii" 412 in FIG. 74.

The advantages of this arrangement of elements are that it is more efficient to select a recognized identification system than to enter data to describe the identification system, and it is more efficient to generate a recognizable display of an identification system from the available data than to require pre-coordinated effort. These advantages overcome problems noted in Background #0022 and #0023. In some embodiments, a system and method consistent with the present disclosure will also support write-in options for data entry as described in #0262 and maintaining the text structure for write-in data as described in #0271.

Figure 75:
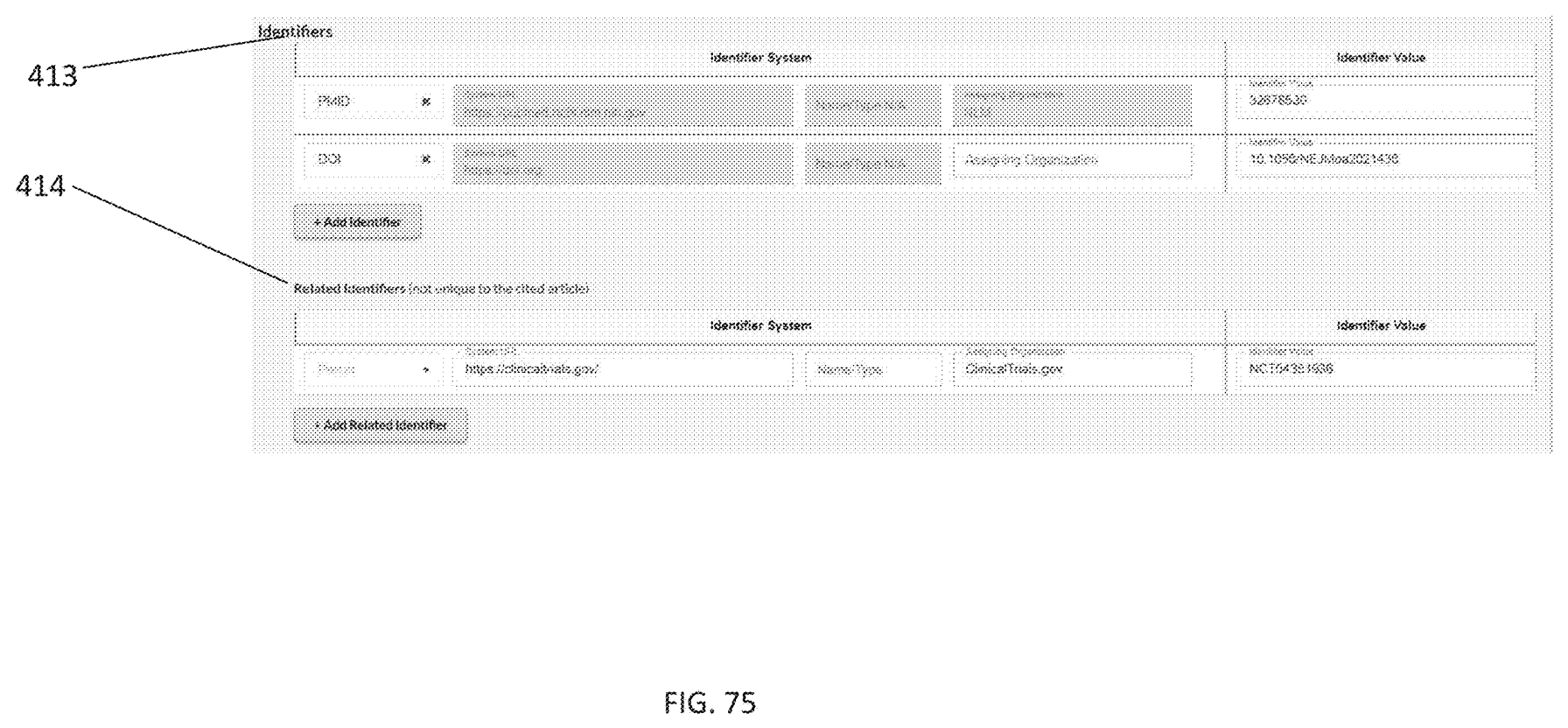

FIG. 75 shows an example of a novel arrangement of elements providing a technical improvement over the prior art with an editor GUI for data entry that clearly separates "Identifiers" 413 and "Related Identifiers (not unique to the cited artifact)" 414.

Figure 76:
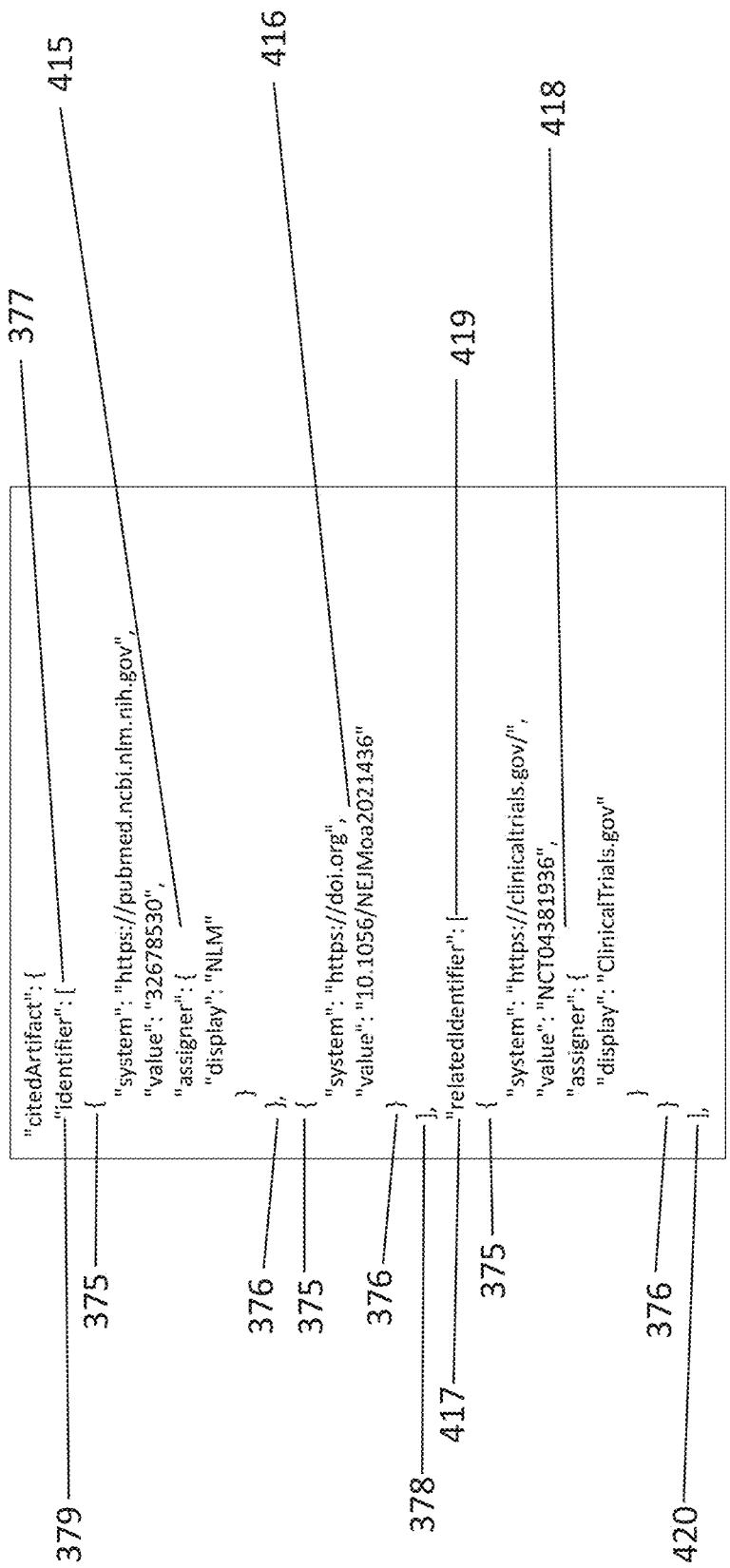
FIG. 76 is a portion of intermediate form of data corresponding to FIG. 75.

FIG. 76 shows examples of data for an Identifier data type in an intermediate form in JSON. FIG. 76 shows an identifier element name 379 which contains two instances of data element values 415, 416 contained between [ 377 and ] 378 characters, and each of these instances is contained between { 375 and } 376 characters; and a relatedIdentifier element 417 which contains one instance of a data element value 418 contained between { 375 and } 376 characters contained between [ 419 and ] 420 characters.

In some embodiments, a system and method consistent with the present disclosure will convert data entered in Identifier sections 413 (shown in FIG. 75) into intermediate form in "identifier" element name 379 (shown in FIG. 76), and the system and method disclosed herein will convert data entered in Related Identifier sections 414 (shown in FIG. 75) into intermediate form in "relatedIdentifier" elements 417 (shown in FIG. 76).

The advantage of this arrangement of elements is that the separation of identifiers from related identifiers will enable more efficient use of "only identifiers" for deduplication and coordination for sharing data about the same cited artifact. This advantage overcomes a problem noted in Background #0024.

Figure 77:
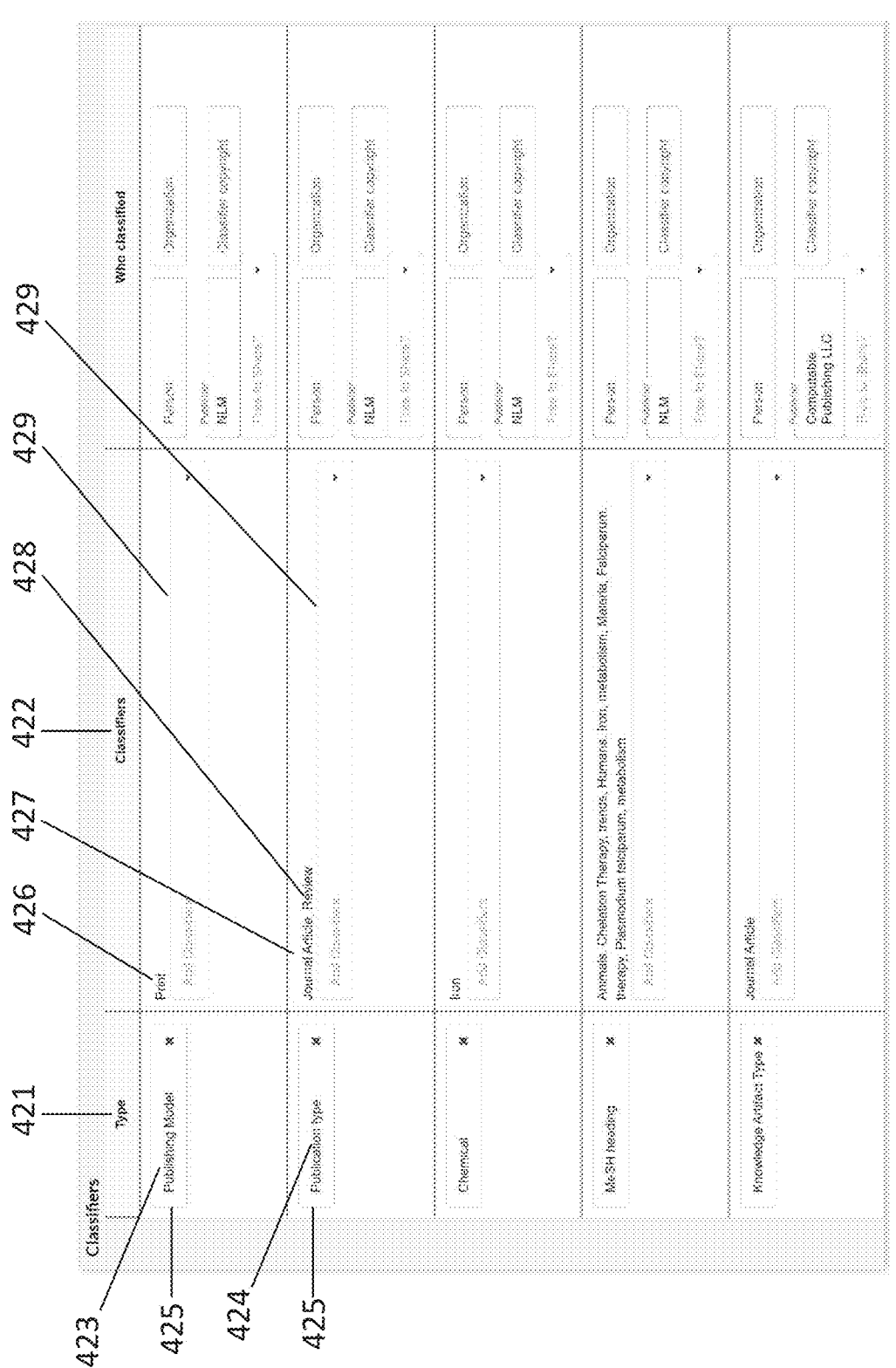
FIG. 77 is a screen shot of the Classifiers section of the Computable Publishing: Citation Builder tool version 1.4.4, an exemplary system and method consistent with the present disclosure.

FIG. 77 shows an example of a novel arrangement of elements providing a technical improvement over the prior art with an editor GUI that represents any number of classification systems and classifiers in a tabular form that allows picklist selection of preset coding values and text entry of write-in choices, in the same data entry field, for each of the classification systems and classifiers.

FIG. 77 shows a table with: a column with the header labeled "Type" 421; a second column with the header labeled "Classifiers" 422; rows containing single values 423, 424 in a data entry field 425 in the first ("Type") column; and rows containing single values 426 or multiple values 427, 428 followed by a data entry field 429 in the second ("Classifiers") column.

Figure 78:
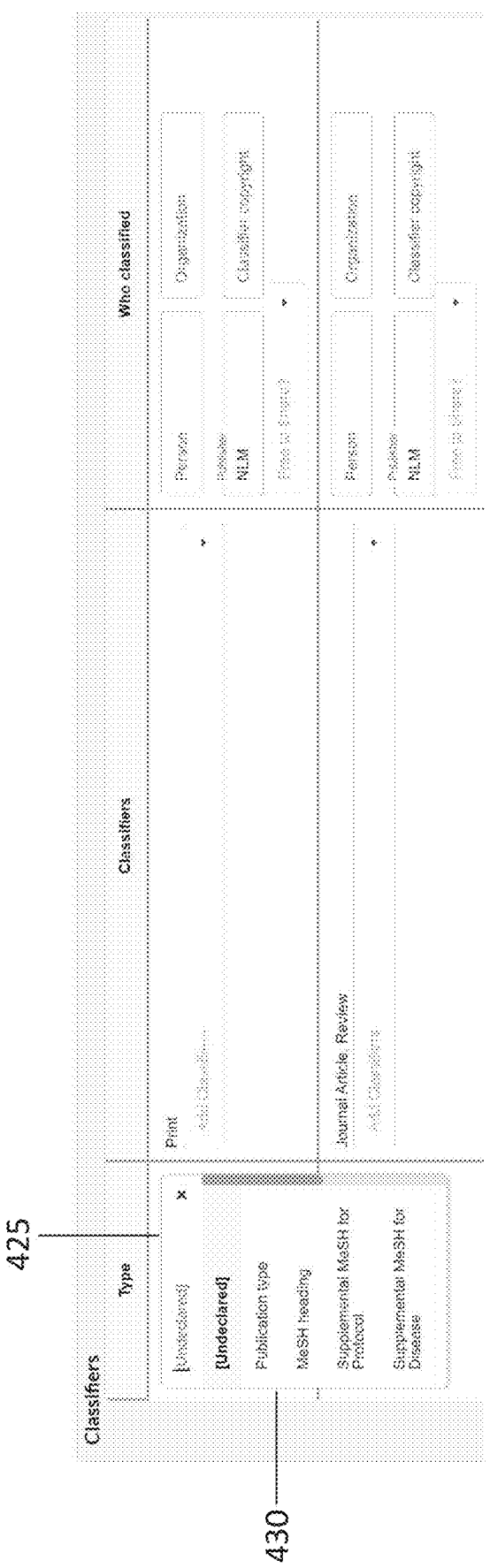
FIG. 78 is a screen shot of the Classifiers section of the Computable Publishing: Citation Builder tool version 1.4.4, including display of a picklist, an exemplary system and method consistent with the present disclosure.

FIG. 78 shows an example of a picklist 430 that is presented when the user clicks in the data entry field 425 in the first ("Type") column. In some embodiments, a system and method consistent with the present disclosure will also support write-in options for data entry as described in #0262.

In some embodiments, a system and method consistent with the present disclosure will interpret each row as a "classification" instance associating one "type" value for the classification with one or more "classifier" values.

In some embodiments, a system and method consistent with the present disclosure will convert such data specifying a classification into current data in an intermediate form. FIG. 79 shows an example of current data representing two "classification" instances in an intermediate form in JSON, including: a classification element 431; [ 432 and ] characters to contain the values of classification instances (Note: The ] character is not shown in the example in FIG. 79); { 433 and } 434 characters to contain each classification instance; type elements 435 within each classification instance, and each type element is followed by { 436 and } 437 characters to include one and only one type instance; and classifier elements 438 within each classification instance, and each classifier element is followed by [ 439 and ] 440 characters to include one or more classifier instances.

The advantages of this arrangement of elements are that large amounts of data representing classification systems and classifiers can be viewed in concise forms and support more data on the screen and reduced scrolling, and data for varied classification systems and classifiers can be viewed in the same interface without excessive scrolling or learning new interfaces, and data for varied classification systems and classifiers can be entered in the same interface without excessive scrolling or learning new interfaces. These advantages overcome problems noted in Background #0025.

Figure 80:
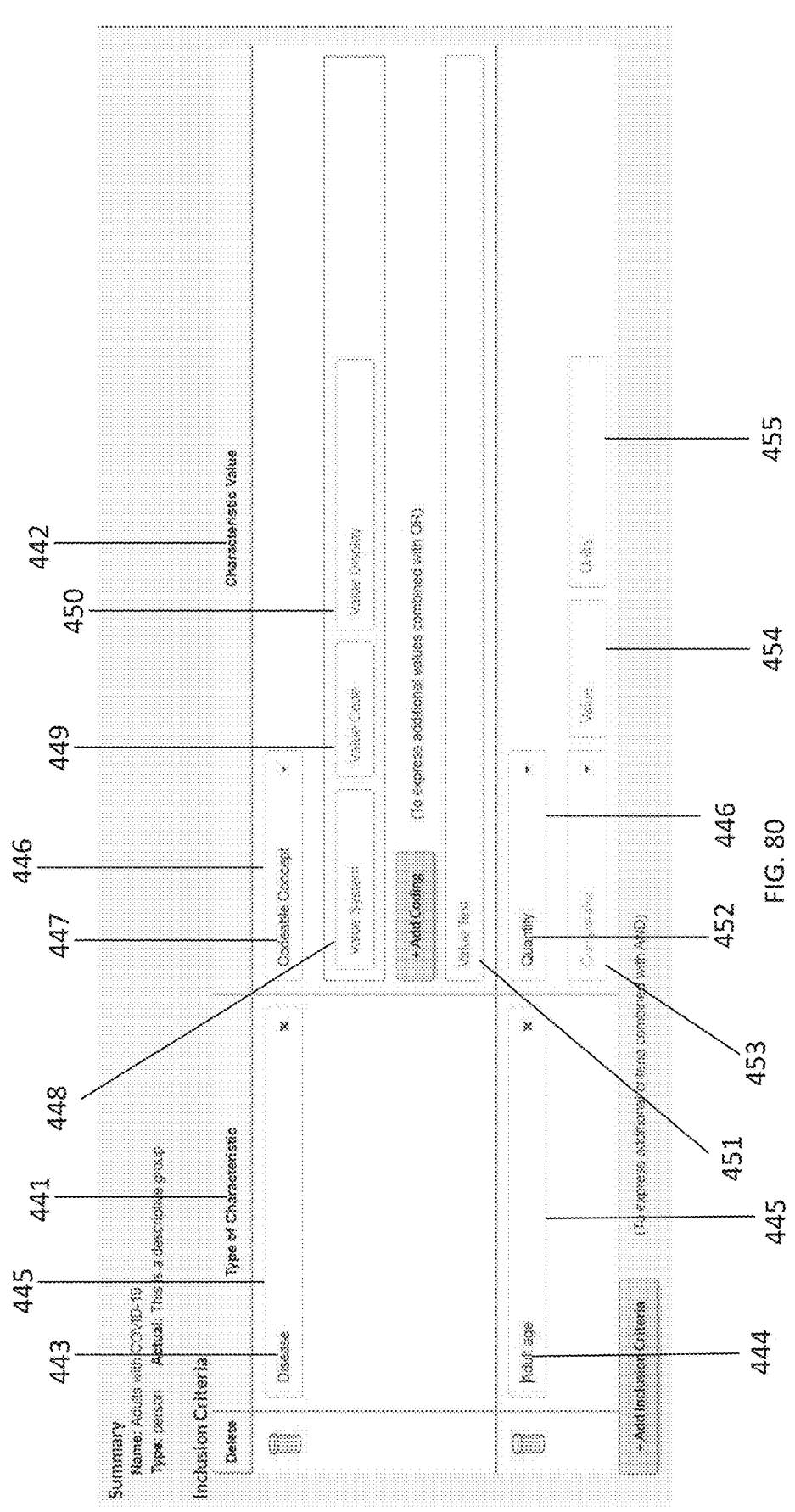
FIG. 80 is a screen shot of the Inclusion Criteria section of the Computable Publishing: Group (Population/Sample) Builder tool version 0.12.0, an exemplary system and method consistent with the present disclosure.

FIG. 80 shows an example of a novel arrangement of elements providing a technical improvement over the prior art with an editor GUI that allows picklist selection of data types and then provides the matching data entry fields, all occurring within a table cell.

FIG. 80 shows a table with: a second column with the header labeled "Type of Characteristic" 441; a third column with the header labeled "Characteristic Value" 442; rows containing single values 443, 444 in a data entry field 445 in the second ("Type of Characteristic") column; and rows containing different patterns for data entry in the third ("Characteristic Value") column, including: one row with a data type indicator 446 displaying the value "Codeable Concept" 447 which contains data entry fields labeled "Value System" 448, "Value Code" 449, "Value Display" 450, and "Value Text" 451; and one row with a data type indicator 446 displaying the value "Quantity" 452 which contains data entry fields labeled "Comparator" 453, "Value" 454, and "Units" 455.

Figure 81:
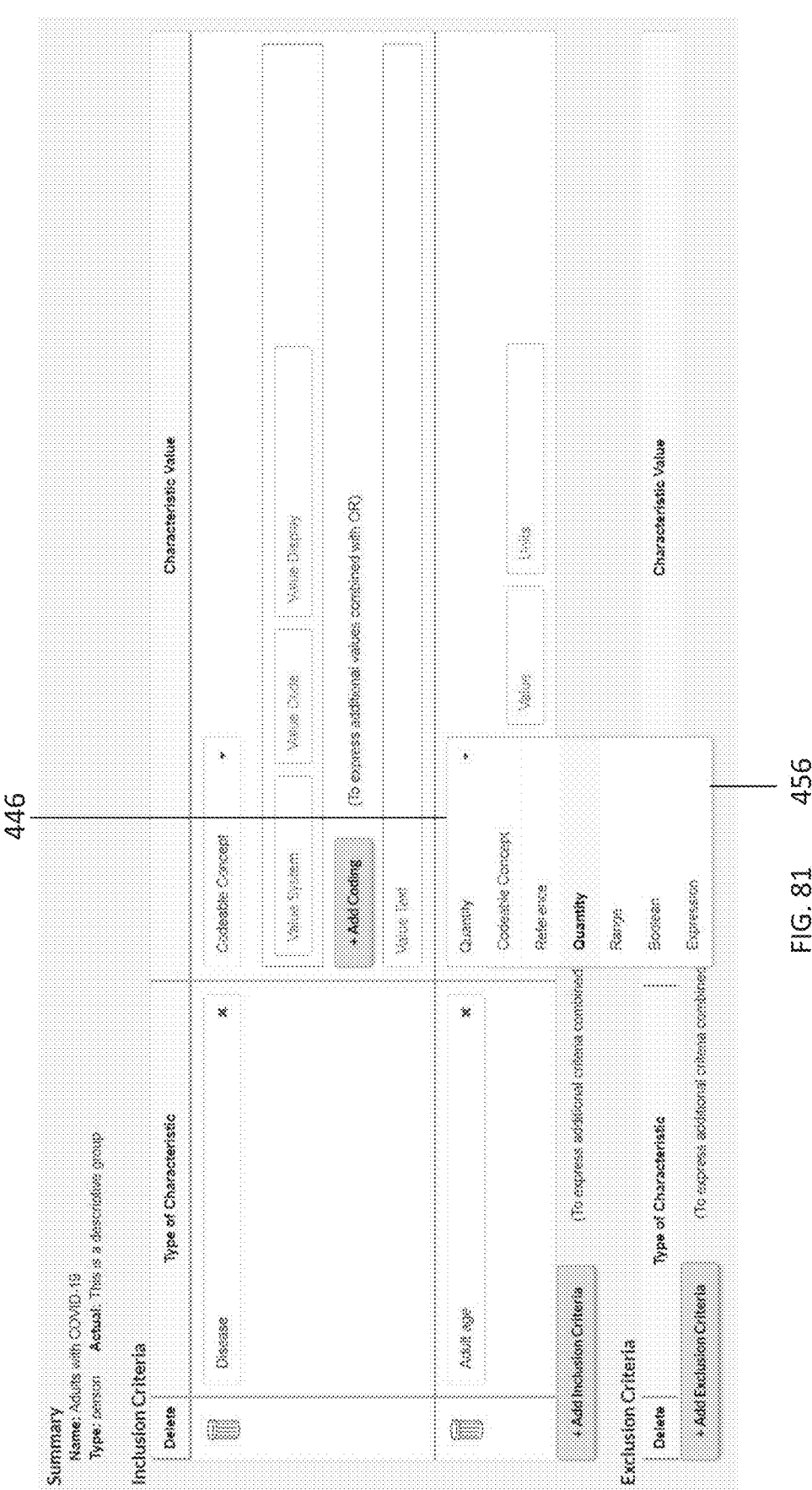
FIG. 81 is a screen shot of the Inclusion Criteria section of the Computable Publishing: Group (Population/Sample) Builder tool version 0.12.0, showing a picklist for selection of data type and corresponding to FIG. 80, an exemplary system and method consistent with the present disclosure.

FIG. 81 shows an example of the user interface shown in FIG. 80 with an example of a picklist 456 that is presented when the user clicks in the data type indicator 446.

Figure 82:
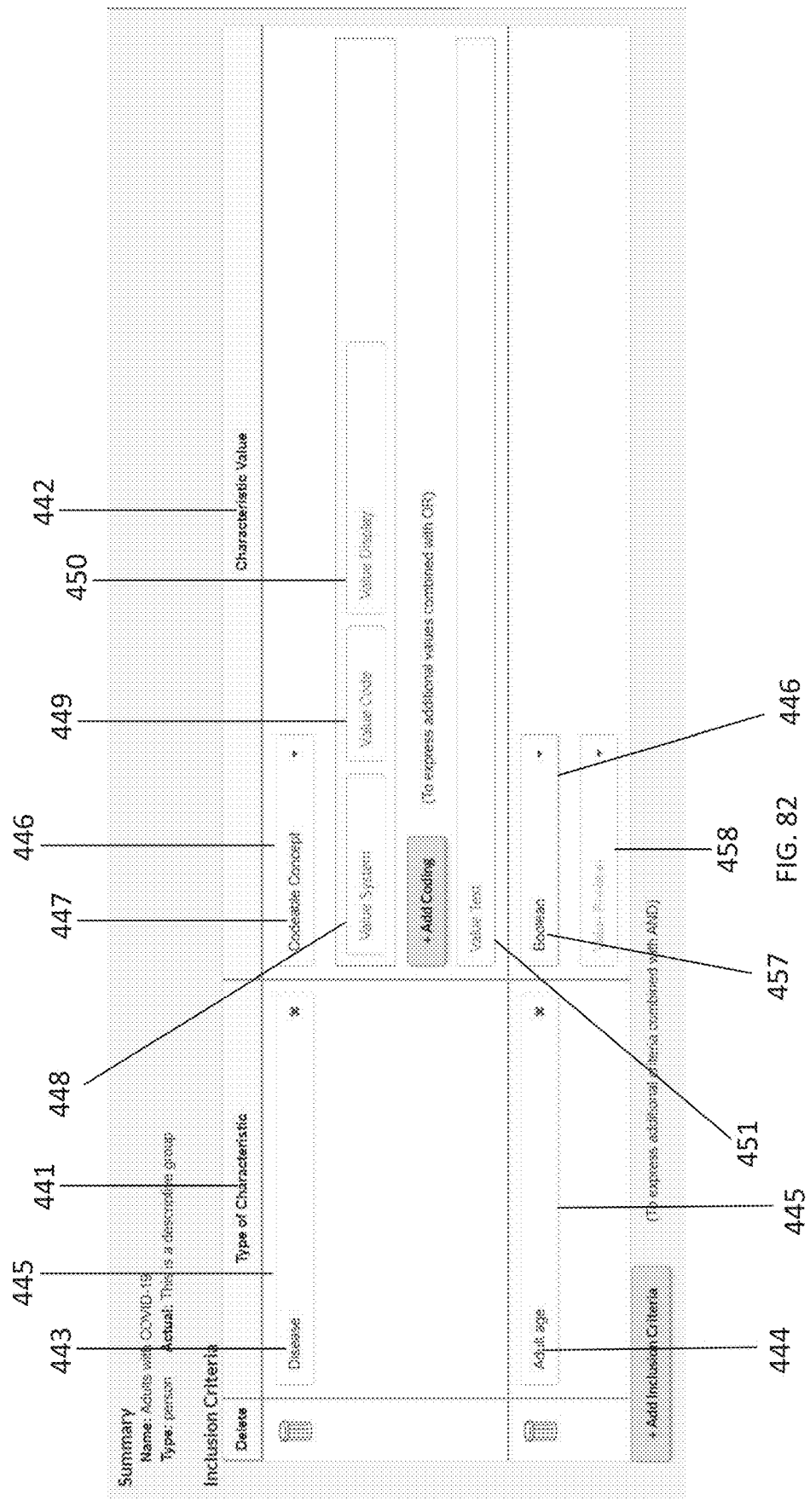
FIG. 82 is a screen shot of the Inclusion Criteria section of the Computable Publishing: Group (Population/Sample) Builder tool version 0.12.0, showing selection of a Boolean data type and corresponding to FIG. 81, an exemplary system and method consistent with the present disclosure.

FIG. 82 shows an example of the user interface shown in FIG. 80 after the user selects "Boolean" from the picklist 456 shown in FIG. 81. FIG. 82 shows a table with: a second column with the header labeled "Type of Characteristic" 441; a third column with the header labeled "Characteristic Value" 442; rows containing single values 443, 444 in a data entry field 445 in the second ("Type of Characteristic") column; and rows containing different patterns for data entry in the third ("Characteristic Value") column, including: one row with a data type indicator 446 displaying the value "Codeable Concept" 447 which contains data entry fields labeled "Value System" 448, "Value Code" 449, "Value Display" 450, and "Value Text" 451; and one row with a data type indicator 446 displaying the value "Boolean" 457 which contains one data entry field labeled "Value Boolean" 458.

Figure 83:
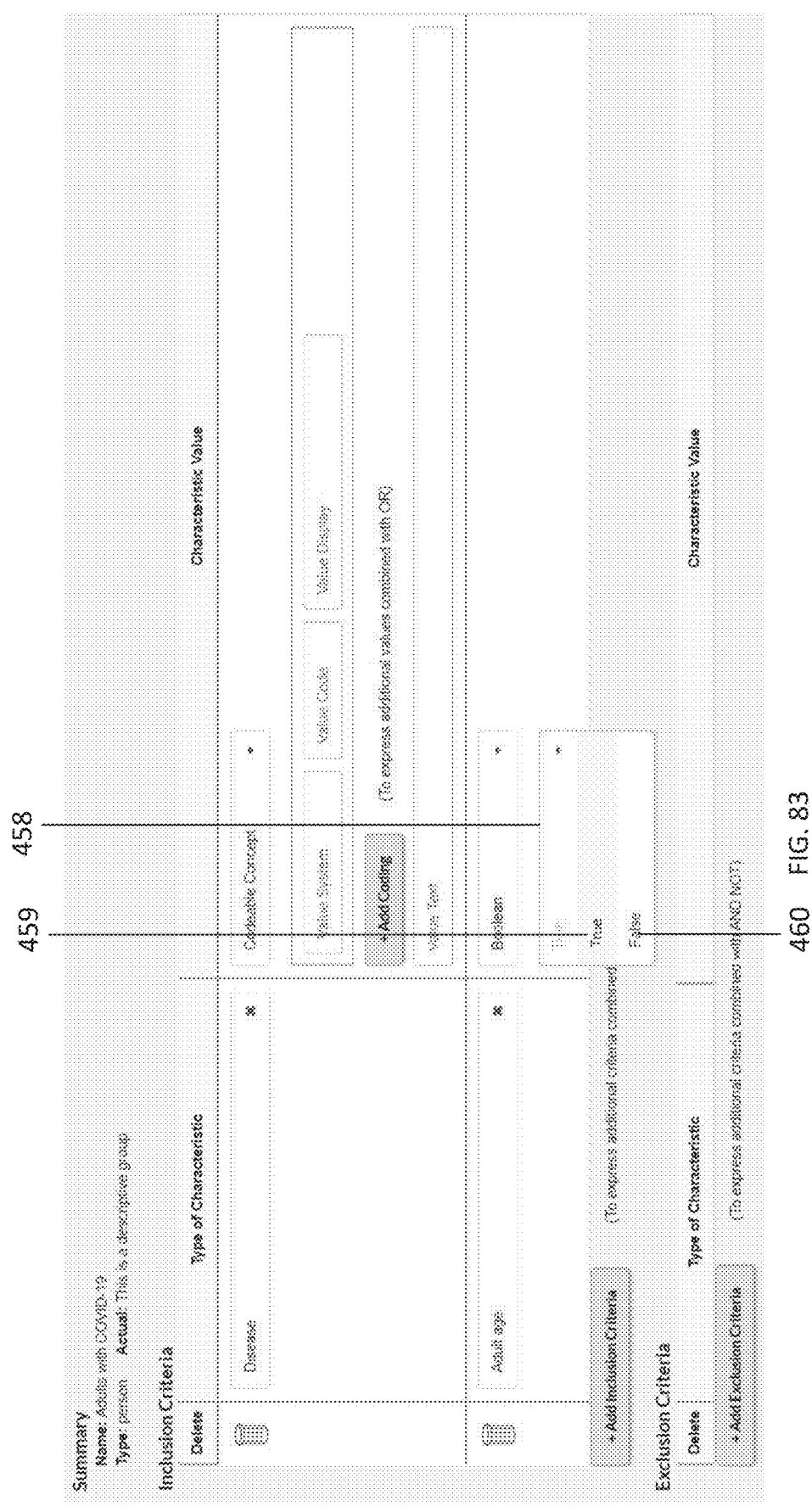
FIG. 83 is a screen shot of the Inclusion Criteria section of the Computable Publishing: Group (Population/Sample) Builder tool version 0.12.0, showing a picklist for selection of a value for a Boolean data type and corresponding to FIG. 82, an exemplary system and method consistent with the present disclosure.

FIG. 83 shows an example of the user interface shown in FIG. 82 after the user clicks on the data entry field that was previously labeled "Value Boolean" 458. FIG. 83 shows a picklist containing the values "True" 459 and "False" 460.

Figure 84:
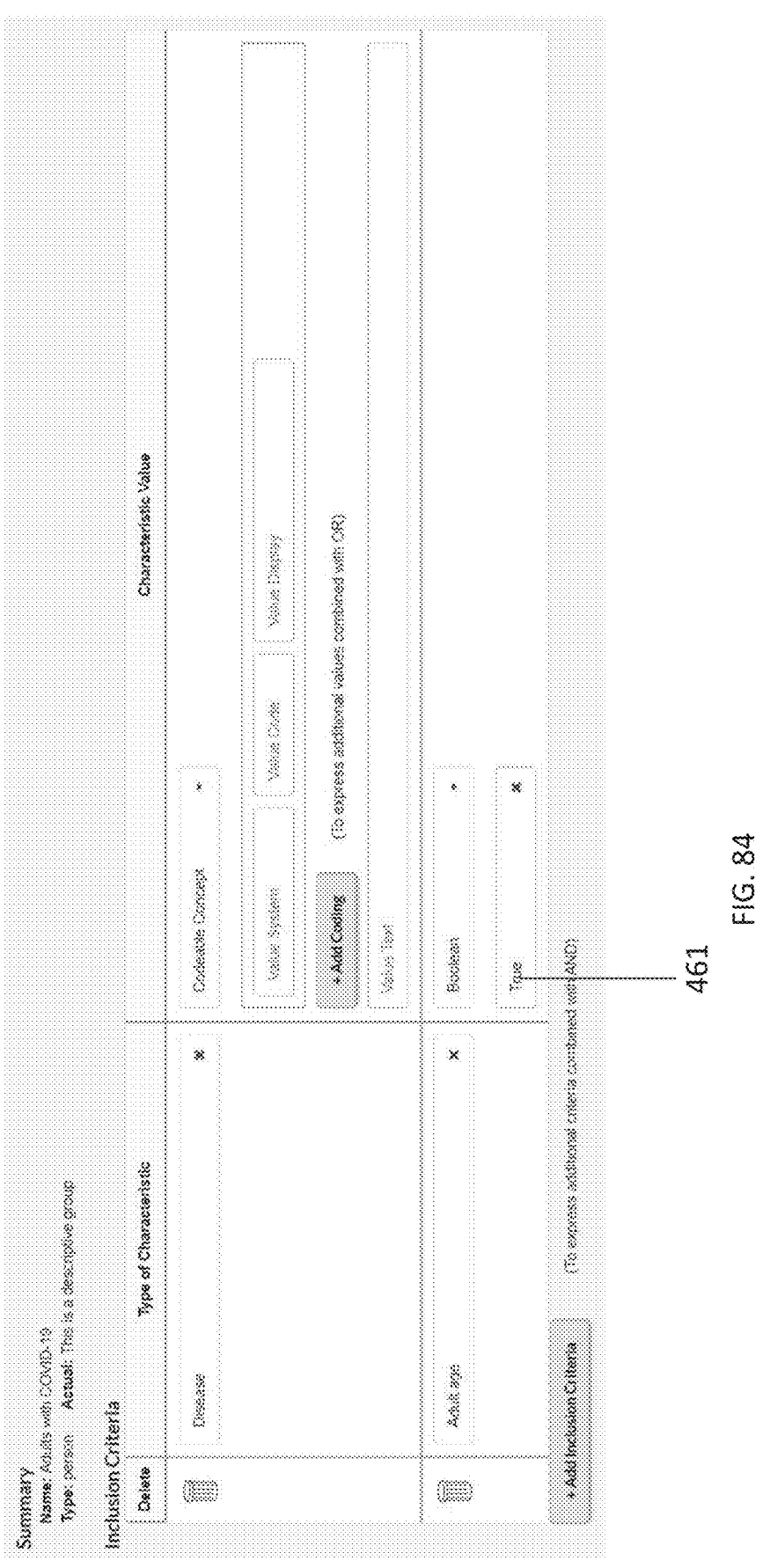
FIG. 84 is a screen shot of the Inclusion Criteria section of the Computable Publishing: Group (Population/Sample) Builder tool version 0.12.0, showing a selection of a value for a Boolean data type and corresponding to FIG. 83, an exemplary system and method consistent with the present disclosure.

FIG. 84 shows an example of the user interface shown in FIG. 83 after the user clicks on "True" in the picklist. FIG. 84 shows "True" 461 as the data value.

In some embodiments, a system and method consistent with the present disclosure will interpret each row as a "characteristic" instance associating one "Type of Characteristic" value with one data type for expression of the "Characteristic Value."

Figure 85:
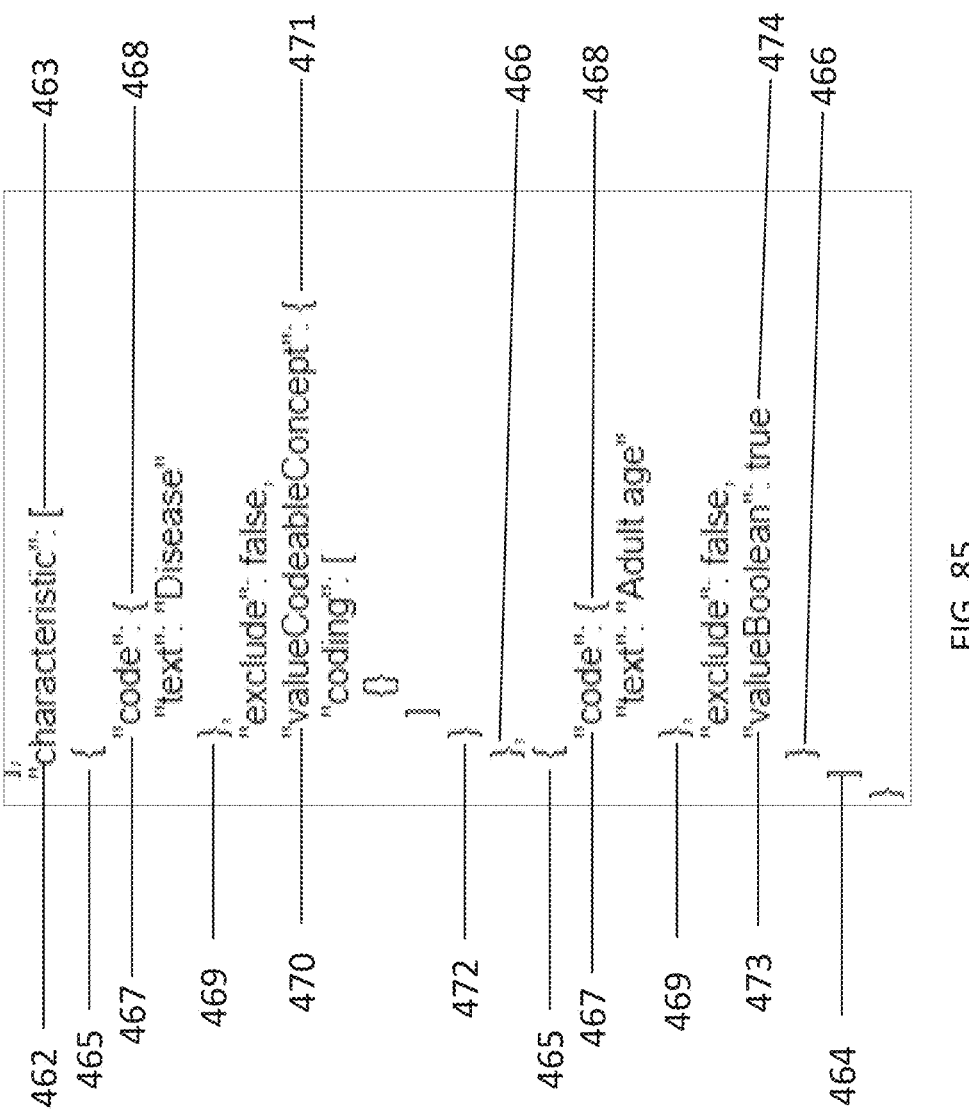
FIG. 85 is a portion of intermediate form of data corresponding to FIG. 84.

In some embodiments, a system and method consistent with the present disclosure will convert such data specifying a characteristic into current data in an intermediate form. FIG. 85 shows an example of data representing two "characteristic" instances in an intermediate form in JSON, including: a characteristic element 462; [×464 and ] 464 characters to contain the one or more instances of the characteristic element; { 465 and } 466 characters to contain each instance of the characteristic element; code elements 467 within each characteristic instance, and each code element is followed by { 468 and } 469 characters to include one and only one code instance; a valueCodeableConcept element 470 in one characteristic instance, and this value-CodeableConcept element is followed { 471 and } 472 characters to include one and only one valueCodableConcept instance which contains one or more elements; and a valueBoolean element 473 in one characteristic instance, and this valueBoolean element contains the data value "true" 474.

The advantages of this arrangement of elements are that classifier values can be expressed with a variety of data types (including codable concept, references, boolean, quantity, range, and expression) rather than restrictions limiting the data type; data entry with any data type can be completed within the same interface; and the semantic, structural, and syntactic integrity of the data is retained. These advantages overcome problems noted in Background #0026.

Figure 86:
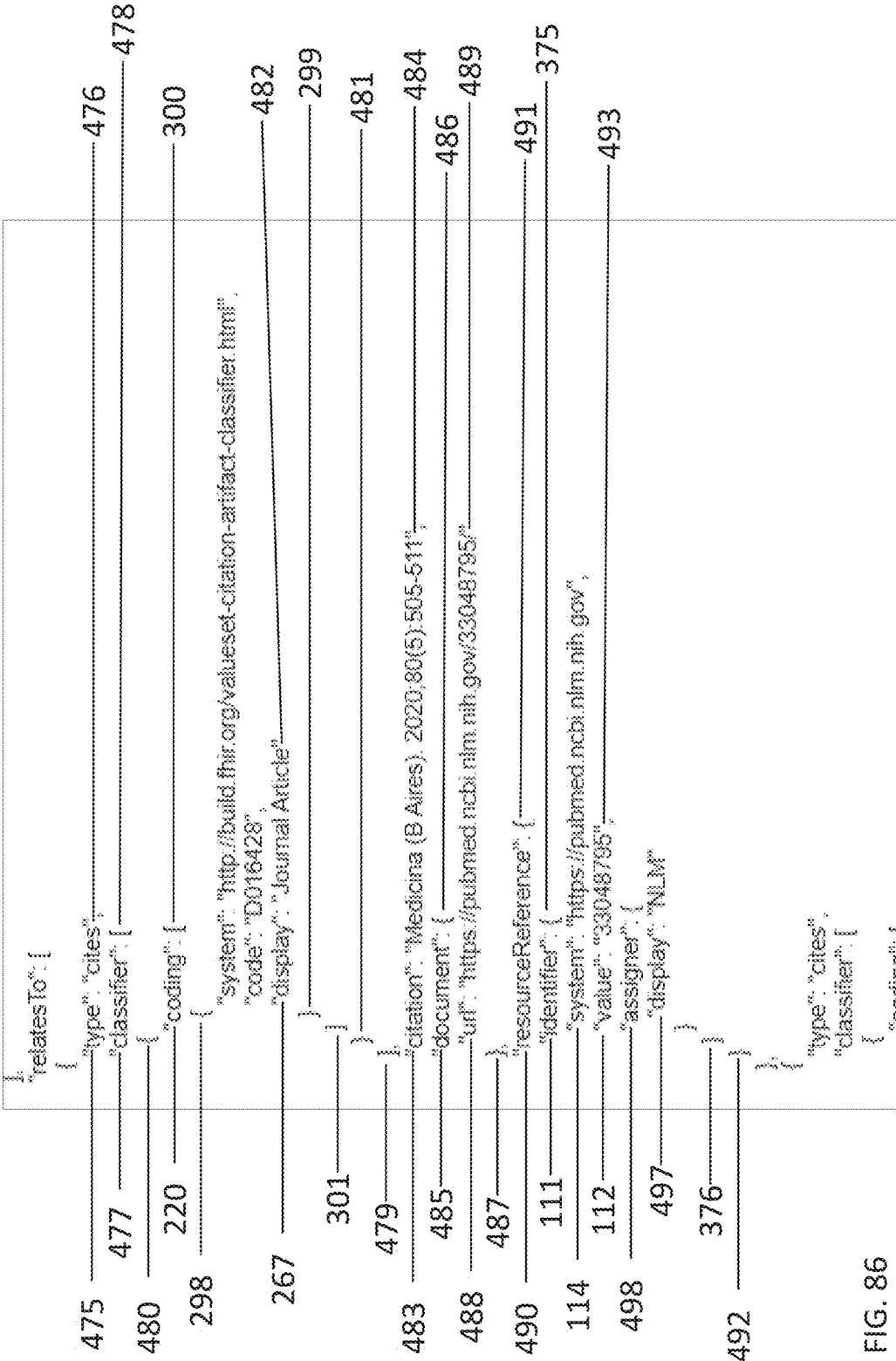
FIG. 86 is a portion of intermediate form of data, corresponding to the HL7 FHIR RelatedArtifact data type.
Figure 87:
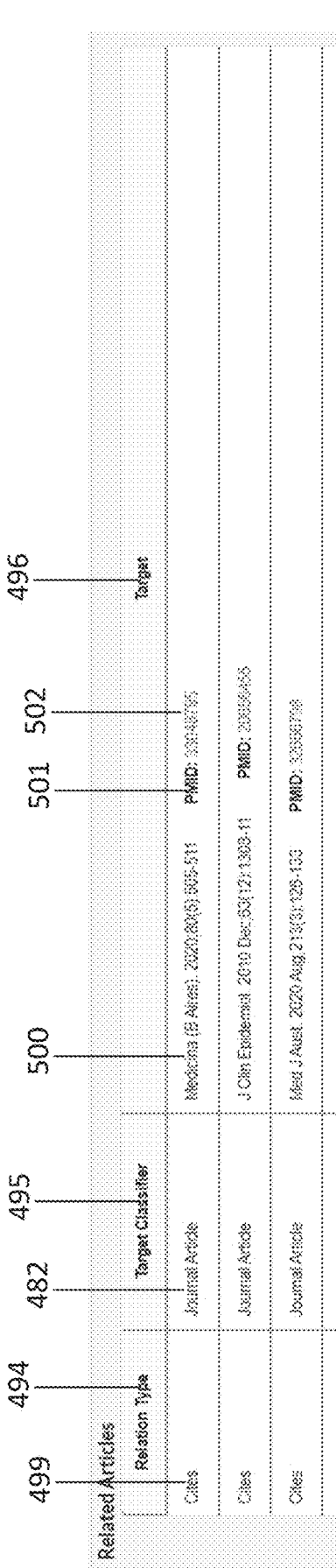
FIG. 87 is a screen shot of the Related Articles section of the Computable Publishing: Citation Viewer tool version 1.4.4 corresponding to FIG. 86, an exemplary system and method consistent with the present disclosure.

FIG. 86 and FIG. 87 show an example of a novel arrangement of elements providing a technical improvement over the prior art with a presentation of human-readable display of data structured in a FHIR RelatedArtifact data type.

FIG. 86 shows an example of data in an intermediate form in JSON using the RelatedArtifact structure, including: a type element 475 containing the value "cites" 476; a classifier element 477 containing: [ 478 and ] 479 characters to represent that one or more instances of the classifier element may be contained between these characters; { 480 and } 481 characters to represent a single instance of the classifier element that is contained between these characters; and a coding element 220 containing: [ 300 and ] 301 characters to represent that one or more instances of the coding element may be contained between these characters; { 298 and } 299 characters to represent a single instance of the coding element that is contained between these characters; a display element 267 containing the value "Journal Article" 482; a citation element 483 containing the value "Medicina (B Aires). 2020; 80(5):505-511" 484; a document element 485 containing: { 486 and } 487 characters to represent a single instance of the document element that is contained between these characters; and a URL element 488 containing the value "https://pubmed.ncbi.nlm.nih.gov/33048795/" 489; and a resourceReference element 490 containing: { 491 and } 492 characters to represent a single instance of the resourceReference element that is contained between these characters; and an identifier element 111 containing: { 375 and } 376 characters to represent a single instance of the identifier element that is contained between these characters; and a value element 112 containing the value "33048795" 493.

In some embodiments, a system and method consistent with the present disclosure will interpret current data in an intermediate form using the RelatedArtifact structure (as shown in JSON in the example in FIG. 86) and convert such data into data values selected for human-readable display (as shown in the example in FIG. 87). FIG. 87 shows an example of a reader GUI corresponding to the data shown in the example in FIG. 86. The conversion of data from the example shown in FIG. 86 to the example shown in FIG. 87 includes: the value associated with the type element 475 is matched to a display value in a predetermined pairing (for example, the value of "cites" is matched to a display value of "Cites") for use in display of the Relation Type 494; the value associated with a display element 267 contained in the classifier element 477 is used for display of the Target Classifier 495; and an algorithm to extract data values from the other elements available in the RelatedArtifact data type in prioritized order for display to identify the Target 496, including: a display value for the target is derived from the first available data value found among the citation element 483, display element (not shown in the example in FIG. 86), or a display element (not shown in the example in FIG. 86) contained in the resourceReference element 490; a display value for the identifier of the target is derived from the first available data value found among the value element 112 contained in the identifier element 111 contained in the resourceReference element 490, or the reference element (not shown in the example in FIG. 86) contained in the resourceReference element 490, or from the URL element 488 contained in the document element 485; and a display value for the identification system used for the identifier of the target is derived from the first available data value found in: a table matching data values to a value in the system element 114 contained in the identifier element 111 contained in the resourceReference element 490, or the text element contained in the type element (not shown in the example in FIG. 86) contained in the identifier element 111 contained in the resourceReference element 490, or the display element 497 contained in the assigner element 498 contained in the identifier element 111 contained in the resourceReference element 490, or the value "FOI" if the display value for the identifier is derived from the reference element (not shown in the example in FIG. 86) contained in the resourceReference element 490, or the value "URL" if the display value for the identifier is derived from the URL element 488 contained in the document element 485.

FIG. 87 shows an example of the reader GUI providing a human-readable display of data structured in a FHIR RelatedArtifact data type, including a table with: the first column has a header labeled Relation Type 494; the second column has a header labeled Target Classifier 495; the third column has a header labeled Target 496; and each row represents a single artifact-to-artifact relationship and includes: the display value 499 in a predetermined pairing matched to the value associated with the type element 475 will be displayed in the first ("Relation Type") column; the values 482 associated with a display element 267 contained in the classifier element 477 will be displayed in the second ("Target Classifier") column; and the third ("Target") column will include a display with up to three values, in order of: a display value for the target 500 that was derived from the first available data value found among the citation element 483, display element (not shown in the example in FIG. 86), or a display element (not shown in the example in FIG. 86) contained in the resourceReference element 490; a display value for the identification system used for the identifier of the target 501 that was derived from the first available data value found in: a table matching data values to a value in the system element 114 contained in the identifier element 111 contained in the resourceReference element 490, or the text element contained in the type element (not shown in the example in FIG. 86) contained in the identifier element 111 contained in the resourceReference element 490, or the display element 497 contained in the assigner element 498 contained in the identifier element 111 contained in the resourceReference element 490, or the value "FOI" if the display value for the identifier is derived from the reference element (not shown in the example in FIG. 86) contained in the resourceReference element 490, or the value "URL" if the display value for the identifier is derived from the URL element 488 contained in the document element 485; and a display value for the identifier of the target 502 that was derived from the first available data value found among the value element 112 contained in the identifier element 111 contained in the resourceReference element 490, or the reference element (not shown in the example in FIG. 86) contained in the resourceReference element 490, or the URL element 488 contained in the document element 485.

The advantages of this arrangement of elements are that it provides an efficient, recognizable, and repeatable display of the relationships between artifacts, the characteristics of the related artifact, and multiple methods of identification of the related artifact. These advantages overcome problems noted in Background #0027.

Figure 88:
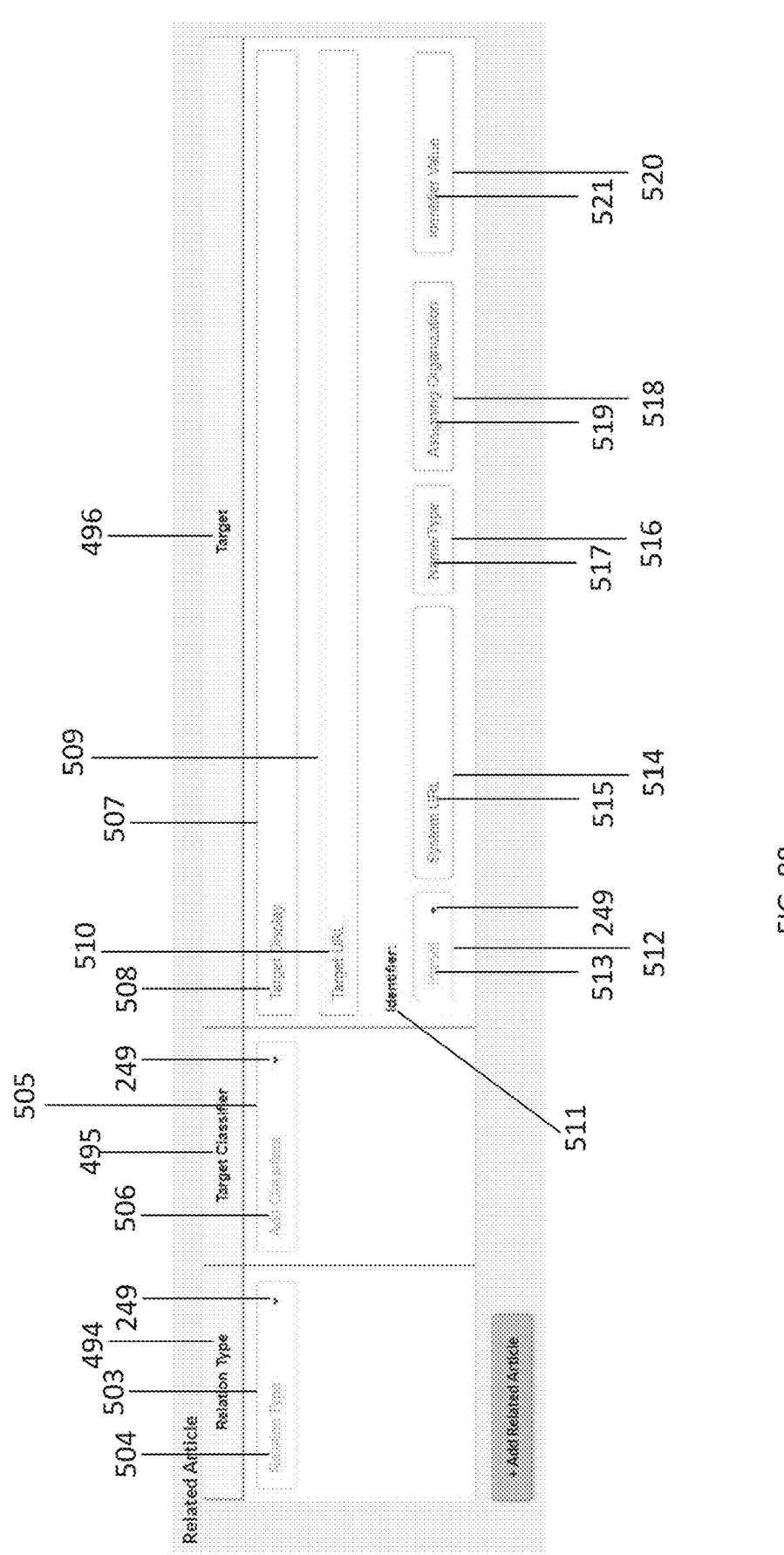
FIG. 88 is a screen shot of the Related Articles section of the Computable Publishing: Citation Builder tool version 1.4.4, an exemplary system and method consistent with the present disclosure.

FIG. 88 shows an example of a novel arrangement of elements providing a technical improvement over the prior art with an editor GUI that allows data entry for expression of the relationship between knowledge objects, the classification of the related knowledge object, and the identification of the related knowledge object and conversion to data structured in a RelatedArtifact datatype.

FIG. 88 shows data entry fields used to express a relationship between knowledge objects, including: the first column has a header labeled Relation Type 494; the second column has a header labeled Target Classifier 495; the third column has a header labeled Target 496; and each row represents a single artifact-to-artifact relationship and includes: a data entry field 503 labeled "Relation Type" 504 and marked with a downward-facing triangle 249 in the first ("Relation Type") column; a data entry field 505 labeled "Add Classifiers" 506 and marked with a downward-facing triangle 249 in the second ("Target Classifier") column; and the third ("Target") column includes: a data entry field 507 labeled "Target Display" 508; a data entry field 509 labeled "Target URL" 510; and a label "Identifier:" 511 preceding: a data entry field 512 labeled "Preset" 513 and marked with a downward-facing triangle 249; a data entry field 514 labeled "System URL" 515; a data entry field 516 labeled "Name/Type" 517; a data entry field 518 labeled "Assigning Organization" 519; and a data entry field 520 labeled "Identifier Value" 521.

Figure 89:
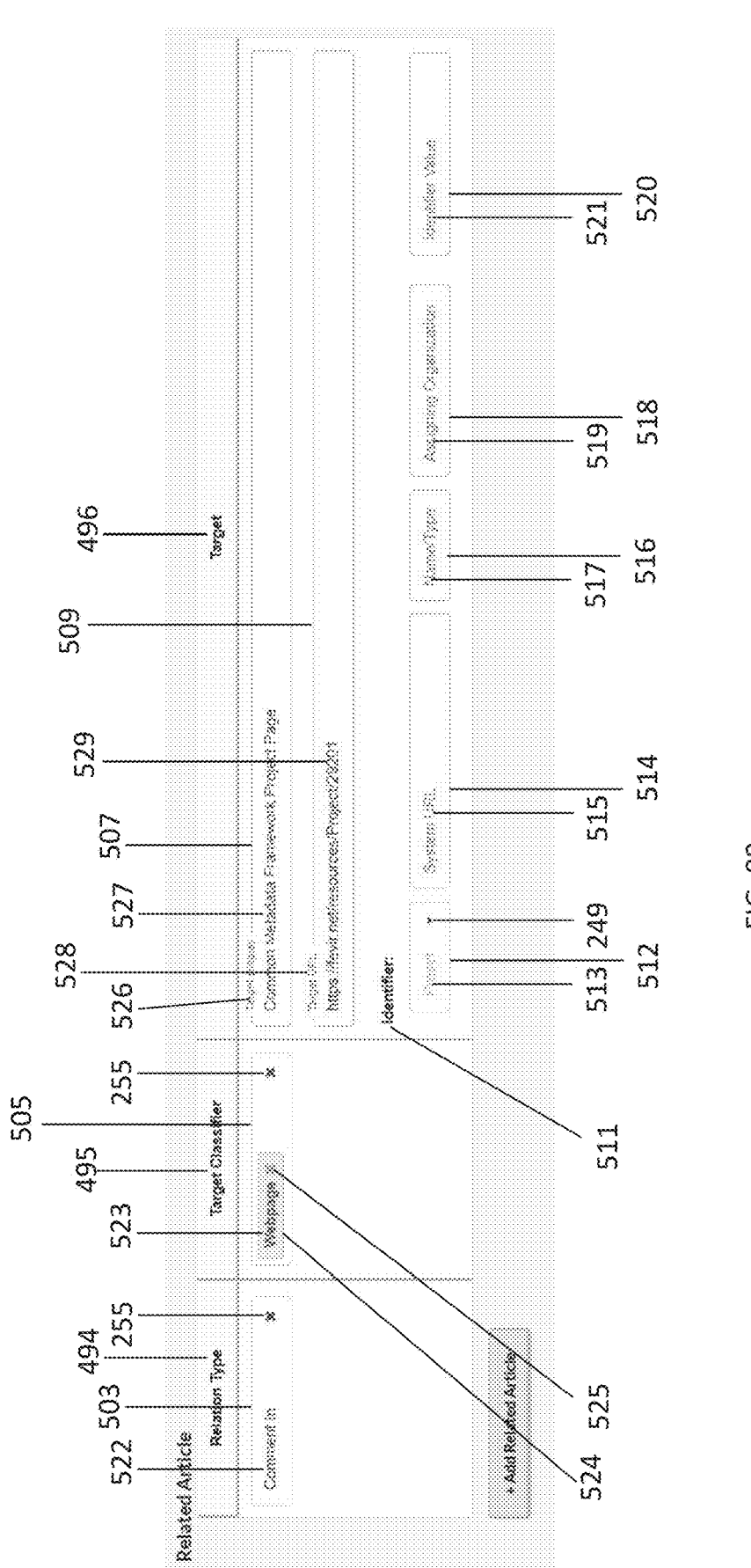
FIG. 89 is a screen shot of the Related Articles section of the Computable Publishing: Citation Builder tool version 1.4.4 with some data, an exemplary system and method consistent with the present disclosure.

FIG. 89 shows an example of the user interface display after data is entered in the example shown in FIG. 88, including: the first column has a header labeled Relation Type 494; the second column has a header labeled Target Classifier 495; the third column has a header labeled Target 496; and each row represents a single artifact-to-artifact relationship and includes: a data entry field 503 displaying the value "Comment In" 522 and marked with an x 255 in the first ("Relation Type") column; a data entry field 505 displaying the value "Webpage" 523 (within a rectangle with a gray background 524 and marked with an x 525) and marked with an x 255 in the second ("Target Classifier") column; and the third ("Target") column includes: a data entry field 507 labeled "Target Display" 526 and displaying the value "Common Metadata Framework Project Page" 527; a data entry field 509 labeled "Target URL" 528 and displaying the value "https://fevir.net/resources/Project/ 29201" 529; and a label "Identifier:" 511 preceding: a data entry field 512 labeled "Preset" 513 and marked with a downward-facing triangle 249; a data entry field 514 labeled "System URL" 515; a data entry field 516 labeled "Name/ Type" 517; a data entry field 518 labeled "Assigning Organization" 519; and a data entry field 520 labeled "Identifier Value" 521.

Figure 90:
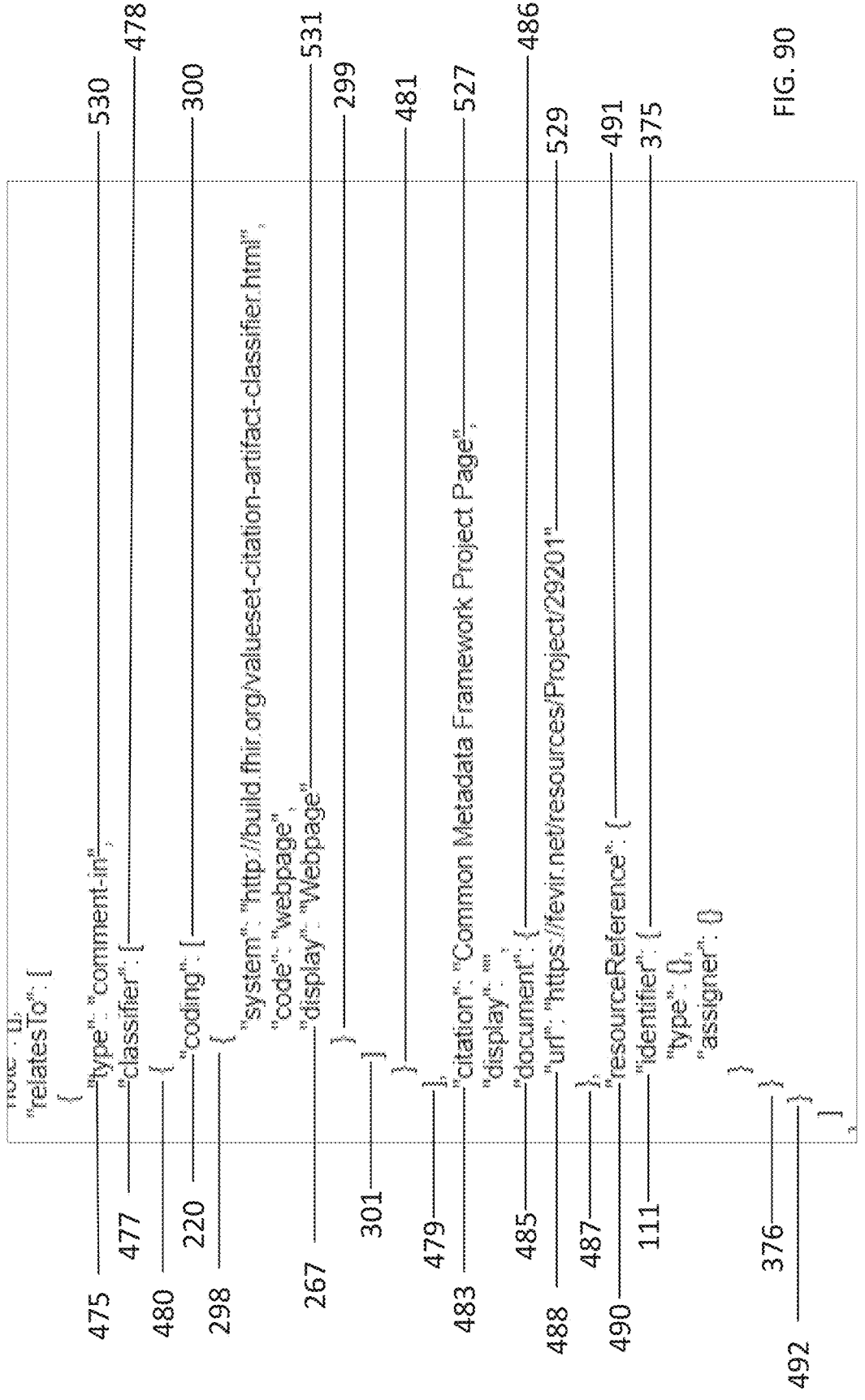
FIG. 90 is a portion of intermediate form of data, corresponding to FIG. 89.

In some embodiments, a system and method consistent with the present disclosure will convert such entered data specifying a relationship between knowledge objects into current data in an intermediate form. FIG. 90 shows an example of current data consistent with the entered data shown in FIG. 89 and converted into an intermediate form in JSON with: a type element 475 containing the value "comment-in" 530; a classifier element 477 containing: [ 478 and ] 479 characters to represent that one or more instances of the classifier element may be contained between these characters; { 480 and } 481 characters to represent a single instance of the classifier element that is contained between these characters; and a coding element 220 containing: [ 300 and ] 301 characters to represent that one or more instances of the coding element may be contained between these characters; { 298 and } 299 characters to represent a single instance of the coding element that is contained between these characters; a display element 267 containing the value "Webpage" 531; a citation element 483 containing the value "Common Metadata Framework Project Page" 527; a document element 485 containing: { 486 and } 487 characters to represent a single instance of the document element that is contained between these characters; and a URL element 488 containing the value "https:// fevir.net/resources/Project/29201" 529; and a resourceReference element 490 containing: { 491 and } 492 characters to represent a single instance of the resourceReference element that is contained between these characters; and an identifier element 111 containing: { 375 and } 376 characters to represent a single instance of the identifier element that is contained between these characters; and no data values in any of the contained elements (as there were no values entered in any of the corresponding data entry fields).

The advantages of this arrangement of elements are that data entry for relations to other knowledge artifact is efficient with use of picklists for common relationship types, use of picklists for common classifiers, and multiple optional methods for identification of the related knowledge artifact, all without navigating to different interfaces for these different data elements. These advantages overcome problems noted in Background #0027.

Figure 91:
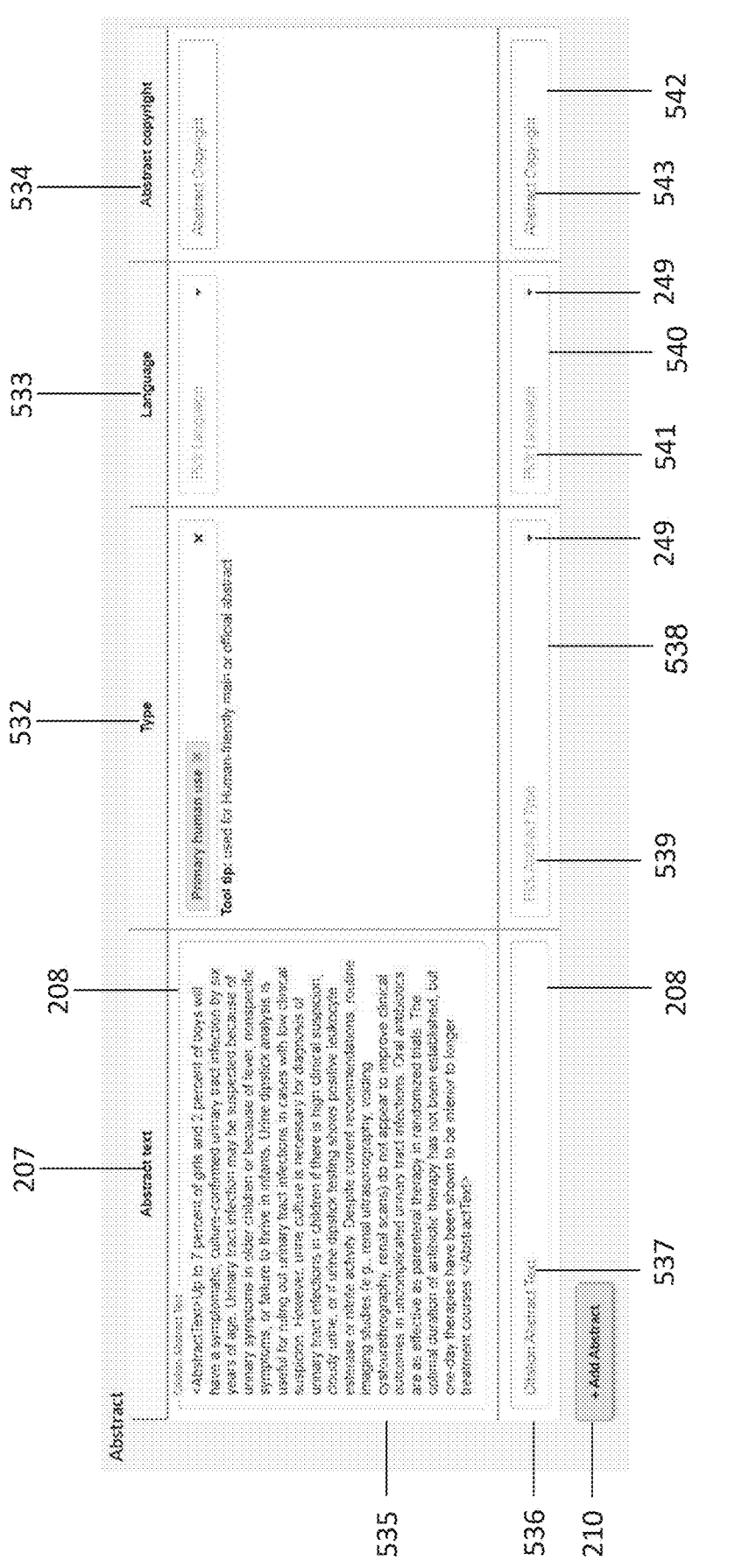
FIG. 91 is a screen shot of the Abstract section of the Computable Publishing: Citation Builder tool version 1.4.4, an exemplary system and method consistent with the present disclosure.

FIG. 91 shows an example of a novel arrangement of elements providing a technical improvement over the prior art with an editor GUI that includes a tabular format for a data entry interface in which the data element field names are represented as table column headers, each row in the table represents a single instance of the array (where each instance is a matched dataset), each table cell is the data entry form for that array entry instance for the column-specific data element, and an "Add entry" button results in the creation of a new row for data entry for a new array instance.

FIG. 91 shows data entry fields used to express four specific data elements (text, type, language, and copyright) for an abstract (a summary of a knowledge artifact), including: the first column has a header labeled Abstract text 207; the second column has a header labeled Type 532; the third column has a header labeled Language 533; the fourth column has a header labeled Abstract copyright 534; the first row 535 includes an example with data entered for an abstract; the second row 536 includes an example with no data entered, including: a data entry field 208 labeled "Citation Abstract Text" 537 in the first ("Abstract text") column; a data entry field 538 labeled "Pick Abstract Type" 539 and marked with a downward-facing triangle 249 in the second ("Type") column; a data entry field 540 labeled "Pick Language" 541 and marked with a downward-facing triangle 249 in the third ("Language") column; and a data entry field 542 labeled "Abstract Copyright" 543 in the fourth ("Abstract copyright") column; and a button labeled + Add Abstract 210.

In the example shown in FIG. 91, the user may enter data in any of the data entry fields 208, 538, 540, 542 by typing and may also enter data in the data entry fields 538, 540 marked with a downward-facing triangle 249 by clicking on the data entry field to display a picklist for selection of predetermined data values. In the example shown in FIG. 91, the user may click on the button labeled + Add Abstract 210 to add an additional row to the table which displays empty data entry fields as shown in the second row 536 in FIG. 91.

Figure 92:
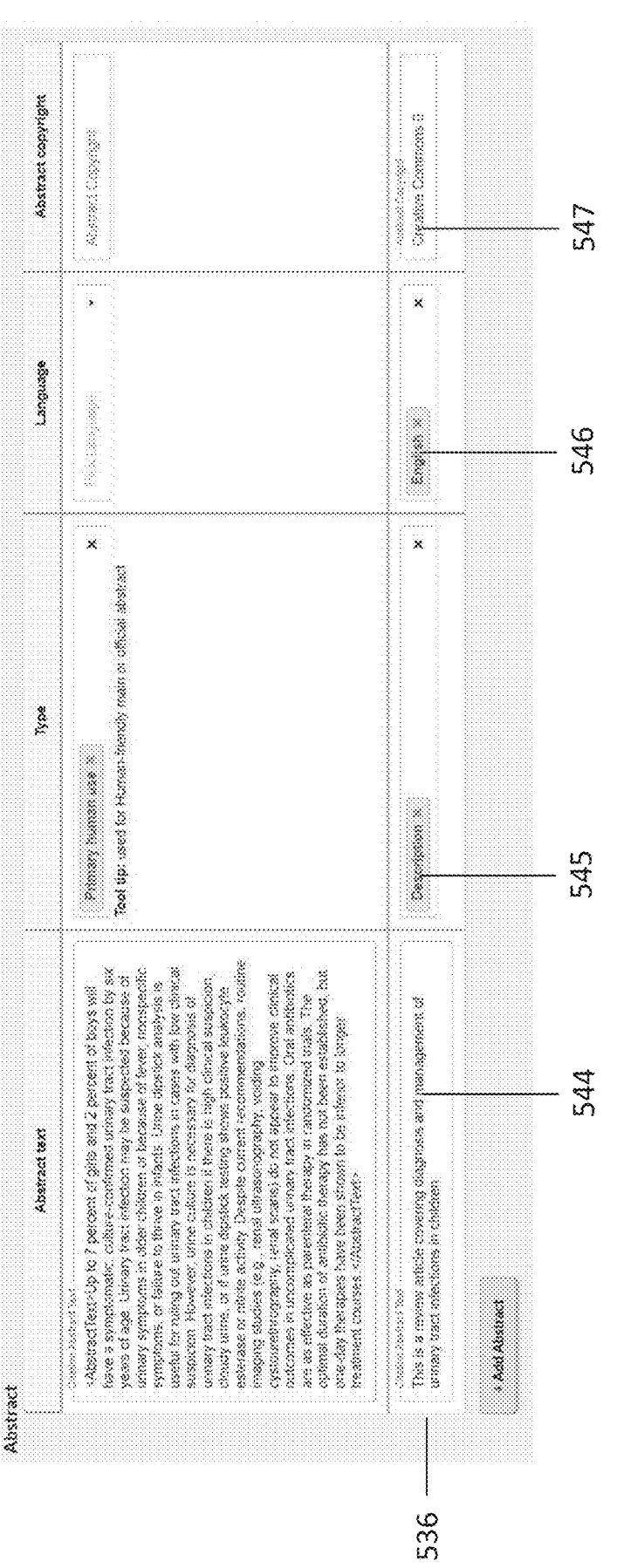
FIG. 92. Screen shot of the Abstract section of the Computable Publishing: Citation Builder tool version 1.4.4 corresponding to FIG. 91 with data added, an exemplary system and method consistent with the present disclosure.

FIG. 92 shows an example of the user interface shown in FIG. 91 after the addition of data (with data values of "This is a review article covering diagnosis and management of urinary tract infections in children." 544, "Description" 545, "English" 546, and "Creative Commons 0" 547) in the second row 536.

Figure 93:
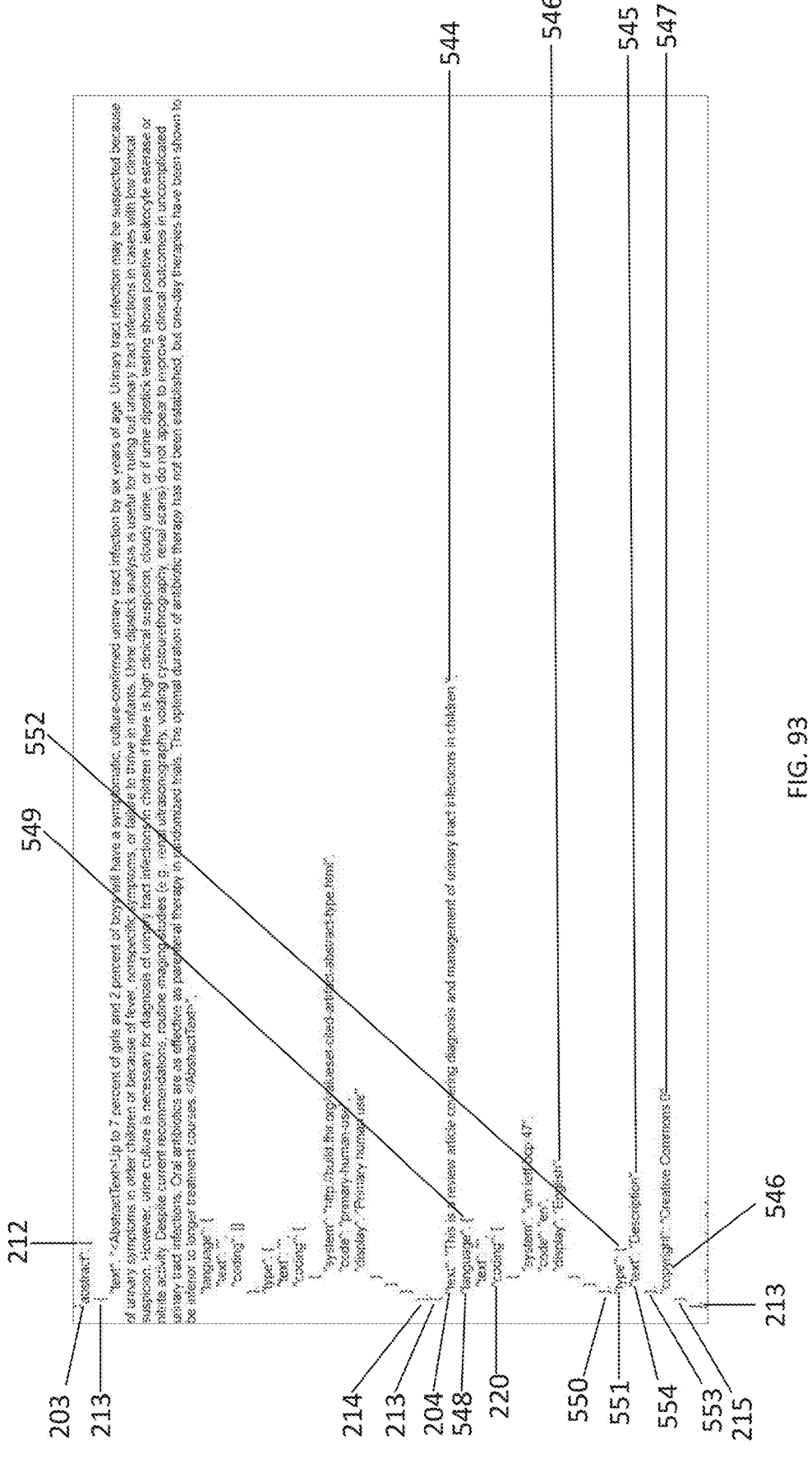
FIG. 93 is a portion of intermediate form of data, corresponding to FIG. 92.

In some embodiments, a system and method consistent with the present disclosure will convert such data specifying an array of matched datasets into current data in an intermediate form. FIG. 93 shows an example of current data consistent with the entered data shown in FIG. 92 and converted into an intermediate form in JSON with an abstract element 203 containing: [ 212 and ] 213 characters to represent that one or more instances of the abstract element may be contained between these characters; { 214 and } 215 characters to represent a single instance of the abstract element that is contained between these characters; a text element 204 containing the data value "This is a review article covering diagnosis and management of urinary tract infections in children." 544 (that was entered in a data entry field 208 labeled "Citation Abstract Text" 537 as shown in the example in FIG. 91); a language element 548 containing: { 549 and } 550 characters to represent a single instance of the language element that is contained between these characters; and a coding element 220 containing the data value "English" 546 (that was entered via picklist selection in a data entry field 540 labeled "Pick Language" 541 as shown in the example in FIG. 91); a type element 551 containing: { 552 and } 553 characters to represent a single instance of the type element that is contained between these characters; and a text element 554 containing the data value "Description" 545 (that was entered in a data entry field 538 labeled "Pick Abstract Type" 539 as shown in the example in FIG. 91); and a copyright element 546 containing the data value "Creative Commons 0" 547 (that was entered in a data entry field 542 labeled "Abstract Copyright" 543 as shown in the example in FIG. 91).

The advantages of this arrangement of elements are that data entry for repeated patterns of data elements without a prespecified number of repeats is efficient with repeated use of the element-specific data entry forms in alignment for rapid interpretation and repeated use, and the ability to add additional repeats without navigating to different interfaces for these different data elements. These advantages overcome problems noted in Background #0030.

Figure 94:
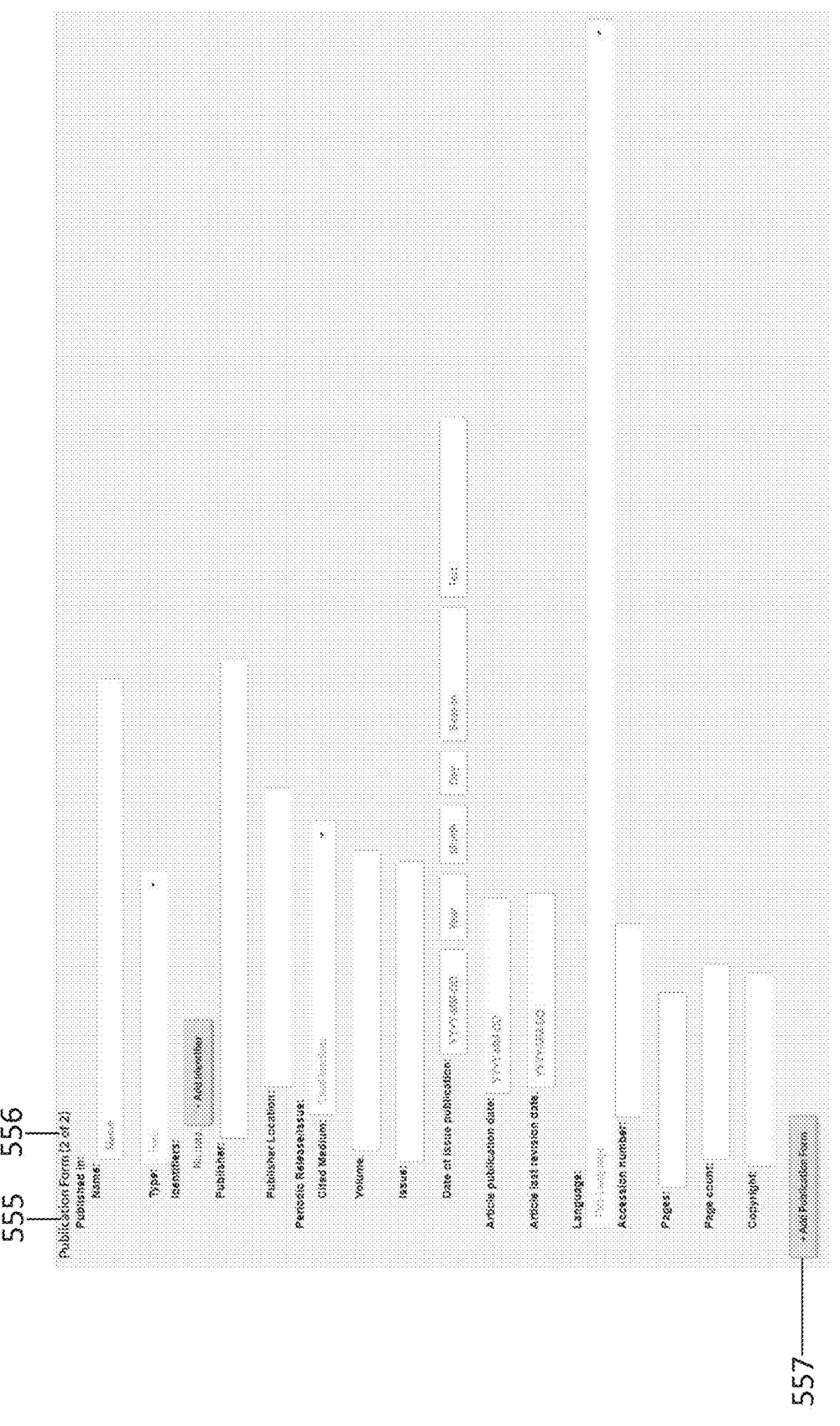
FIG. 94 is a screen shot of the Publication Form section of the Computable Publishing: Citation Builder tool version 1.4.4, an exemplary system and method consistent with the present disclosure.

FIG. 94 shows an example of a novel arrangement of elements providing a technical improvement over the prior art with an editor GUI that includes a numbered subsection format for a data entry interface in which the data entry form is available within the subsection, the subsections are numbered for placement within the array, and an "Add entry" button results in the creation of new subsection for data entry for a new array instance.

FIG. 94 shows a subsection header labeled "Publication Form" 555 followed by a parenthetical label with the number representing the position in the array for this instance and the number representing the total number of instances in the array with "(2 of 2)" 556, a series of data entry fields, and a button labeled + Add Publication Form 557.

Figure 95:
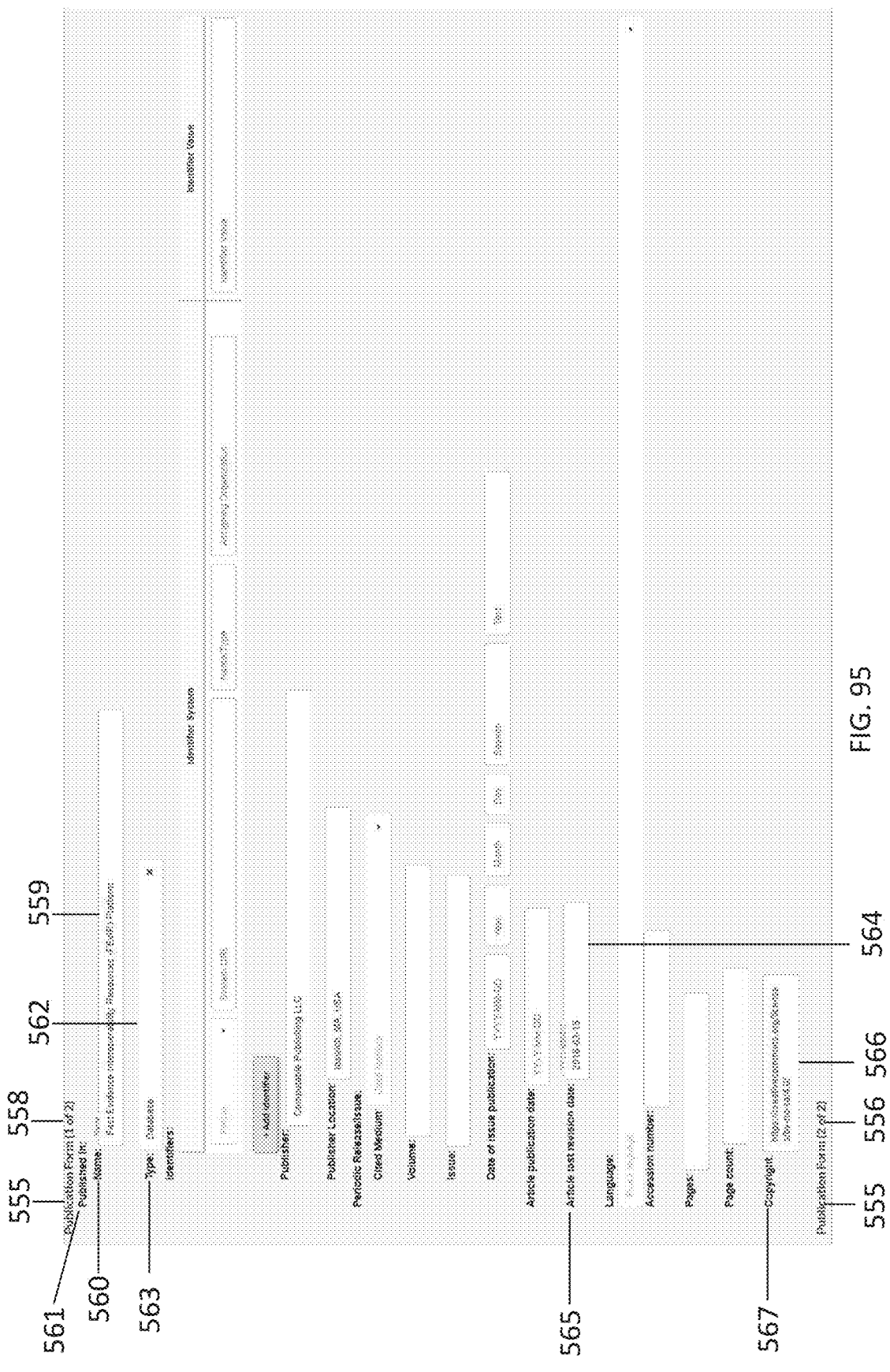
FIG. 95 is a screen shot of the Publication Form section of the Computable Publishing: Citation Builder tool version 1.4.4 with example data, an exemplary system and method consistent with the present disclosure.

FIG. 95 shows an example of the user interface consistent with FIG. 94 after data is entered in some of the data entry fields. FIG. 95 shows: a subsection header labeled "Publication Form" 555 followed by a parenthetical label with the number representing the position in the array for this instance and the number representing the total number of instances in the array with "(1 of 2)" 558; data entered in four data entry fields which include: a data entry field labeled "Name" 559 following a data entry field header labeled "Name:" 560 which is positioned below and to the right of a data entry field set header labeled "Published in:" 561; a data entry field 562 following a data entry field header labeled "Type:" 563 which is positioned below and to the right of a data entry field set header labeled "Published in:" 561; a data entry field labeled "YYYY-MM-DD" 564 following a data entry field header labeled "Article last revision date:" 565; and a data entry field 566 following a data entry field header labeled "Copyright:" 567; and a subsection header labeled "Publication Form" 555 followed by a parenthetical label with the number representing the position in the array for this instance and the number representing the total number of instances in the array with "(2 of 2)" 556.

Figure 96:
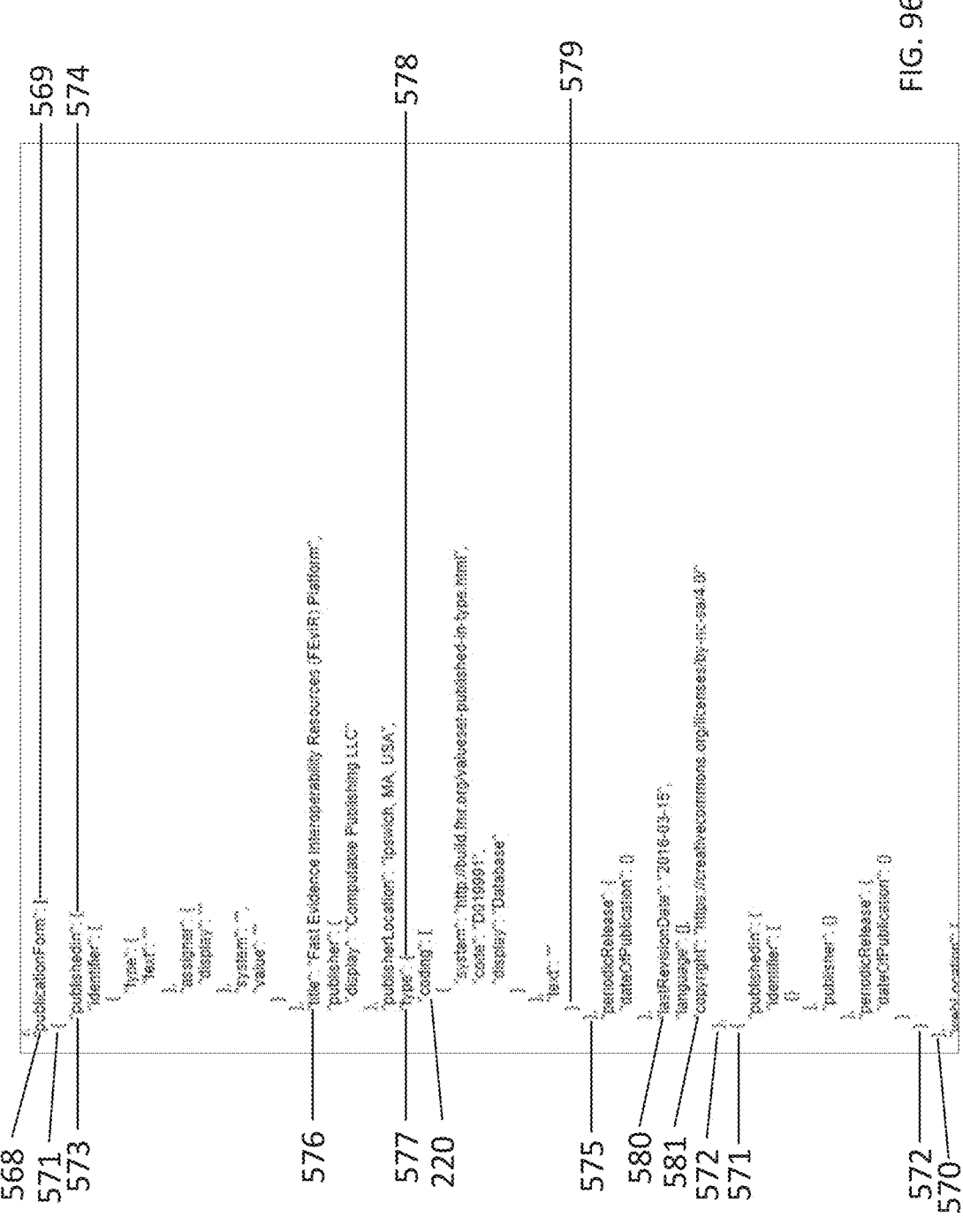
FIG. 96 is a portion of intermediate form of data, corresponding to FIG. 94 and FIG. 95.

In some embodiments, a system and method consistent with the present disclosure will convert such data specifying an array of matched datasets into current data in an intermediate form. FIG. 96 shows an example of current data consistent with the entered data shown in FIG. 95 and FIG. 94 and converted into an intermediate form in JSON with a publicationForm element 568 containing: [ 569 and ] 570 characters to represent that one or more instances of the publicationForm element may be contained between these characters; two instances of { 571 and } 572 characters to represent a single instance of the publicationForm element that is contained between these characters; a publishedIn element 573 containing: { 574 and } 575 characters to represent a single instance of the publishedIn element that is contained between these characters; a title element 576 containing the data (that was entered in a data entry field labeled "Name" 559 as shown in the example in FIG. 95); and a type element 577 containing: { 578 and } 579 characters to represent a single instance of the type element that is contained between these characters; and a coding element 220 containing data (that was entered via picklist selection in a data entry field following a data entry field header labeled "Type:" 563 as shown in the example in FIG. 95); a lastRevisionDate element 580 containing data (that was entered in a data entry field labeled "YYYY-MM-DD" 564 following a data entry field header labeled "Article last revision date:" 565 as shown in the example in FIG. 95); a copyright element 581 containing data (that was entered in a data entry field following a data entry field header labeled "Copyright:" 567 as shown in the example in FIG. 95).

The advantages of this arrangement of elements are that data entry for repeated patterns of data elements without a prespecified number of repeats is efficient with repeated use of the element-specific data entry forms in the same pattern for rapid interpretation and repeated use, and the ability to add additional repeats without navigating to different interfaces for these different data elements. Additional advantages of this arrangement include the clear identification of array instances and ability to edit data in specific instances. These advantages overcome problems noted in Background #0030.

Figure 97:
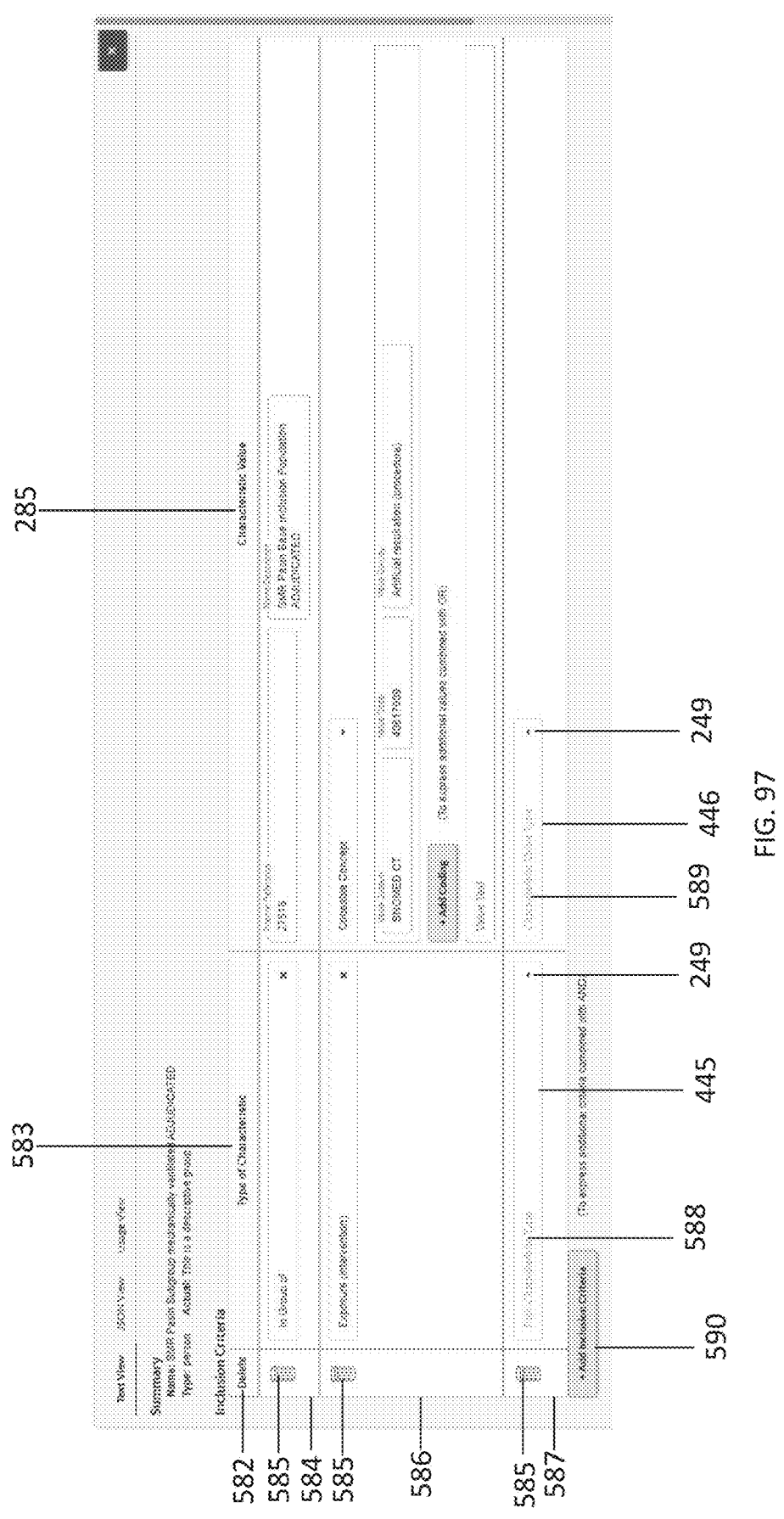
FIG. 97 is a screen shot of the Inclusion Criteria section of the Computable Publishing: Group (Population/Sample) Builder tool version 0.12.0, an exemplary system and method consistent with the present disclosure.

FIG. 97 shows an example of a novel arrangement of elements providing a technical improvement over the prior art with an editor GUI that presents a tabular format for editing instances of an array as table rows and includes delete functions to enable deletion of an entire array instance (table row).

FIG. 97 shows data entry fields used to express characteristic elements (containing type and value elements), including: the first column has a header labeled Delete 582; the second column has a header labeled Type of Characteristic 583; the third column has a header labeled Characteristic Value 285; the first row 584 includes an example with data entered for a characteristic and an image of a trash can 585 in the first ("Delete") column; the second row 586 includes an example with data entered for a characteristic and an image of a trash can 585 in the first ("Delete") column; the third row 587 includes an example with no data entered, including: an image of a trash can 585 in the first ("Delete") column; a data entry field 445 labeled "Pick Characteristic Type" 588 and marked with a downward-facing triangle 249 in the second ("Type of Characteristic") column; and a data entry field 446 labeled "Characteristic Value Type" 589 and marked with a downward-facing triangle 249 in the third ("Characteristic Value") column; and a button labeled + Add Inclusion Criteria 590.

Figure 98:
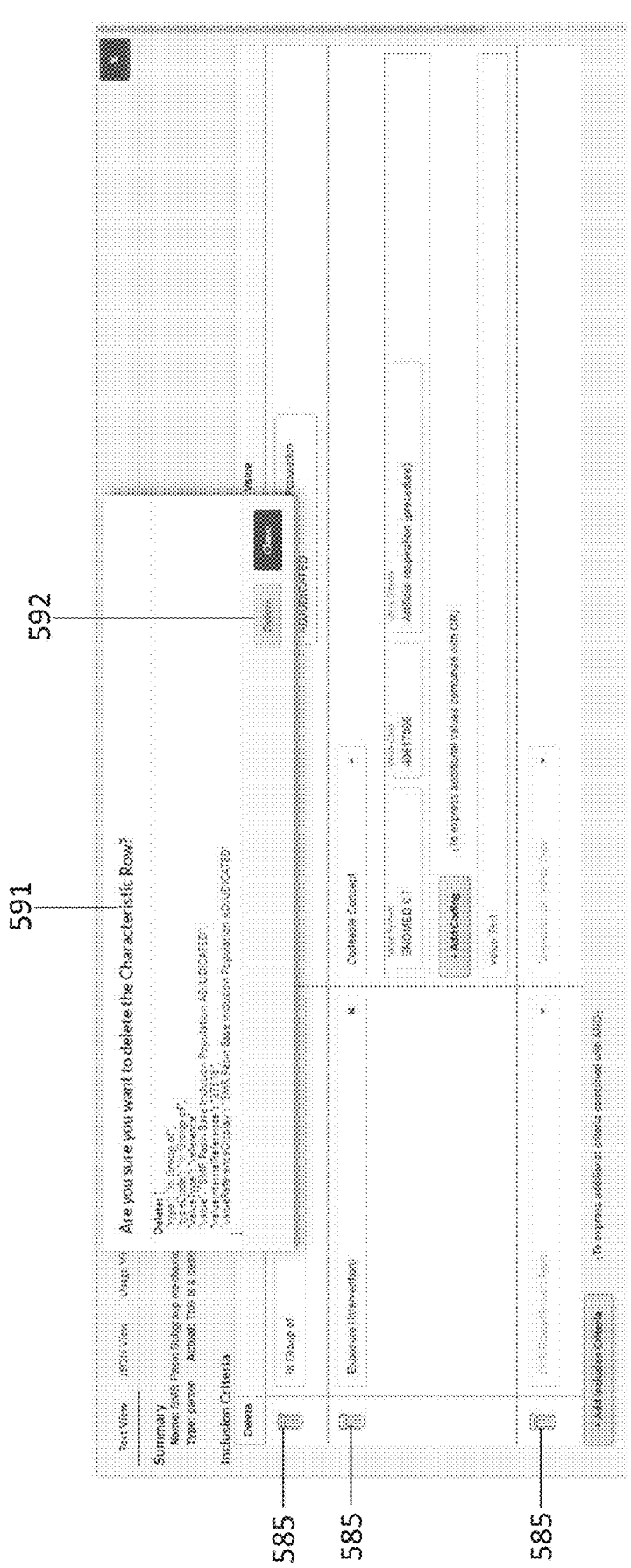
FIG. 98 is a screen shot of the Inclusion Criteria section of the Computable Publishing: Group (Population/Sample) Builder tool version 0.12.0 corresponding to clicking a trash can image in FIG. 97, an exemplary system and method consistent with the present disclosure.

FIG. 98 shows an example of the message 591 which is displayed after the user clicks the image of a trash can 585 in the first ("Delete") column. Clicking the "Delete" button 592 in this example would result in removal of the corresponding row from the table.

Figure 99:
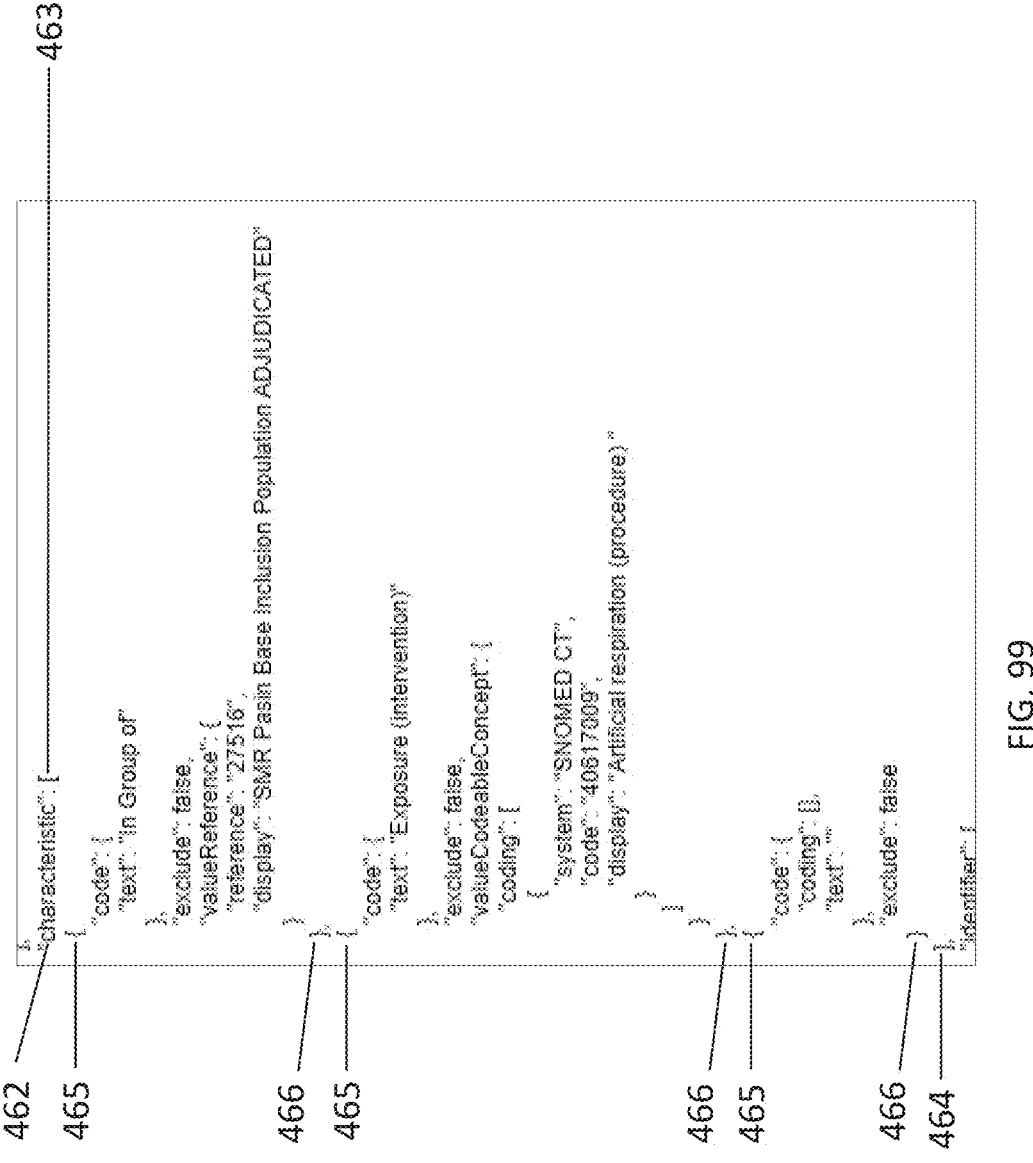
FIG. 99 is a portion of intermediate form of data, corresponding to FIG. 97.

In some embodiments, a system and method consistent with the present disclosure will convert such data specifying an array of matched datasets into current data in an intermediate form. FIG. 99 shows an example of current data consistent with the entered data shown in FIG. 97 and converted into an intermediate form in JSON with a characteristic element 462 containing: [ 463 and ] 464 characters to represent that one or more instances of the characteristic element may be contained between these characters; and three instances of { 465 and } 466 characters to represent three single instances of the characteristic element that is contained between each pair of these characters, with data corresponding to the data entered in three rows 584, 586, 587 shown in FIG. 97.

The advantages of this arrangement of elements are that data entry for repeated patterns of data elements without a prespecified number of repeats is efficient with repeated use of the element-specific data entry forms in alignment for rapid interpretation and repeated use, the ability to add additional repeats without navigating to different interfaces for these different data elements, the clear identification of array instances and ability to edit data in specific instances, and the ability to easily and clearly delete array instances. These advantages overcome problems noted in Background #0030.

Figure 100:
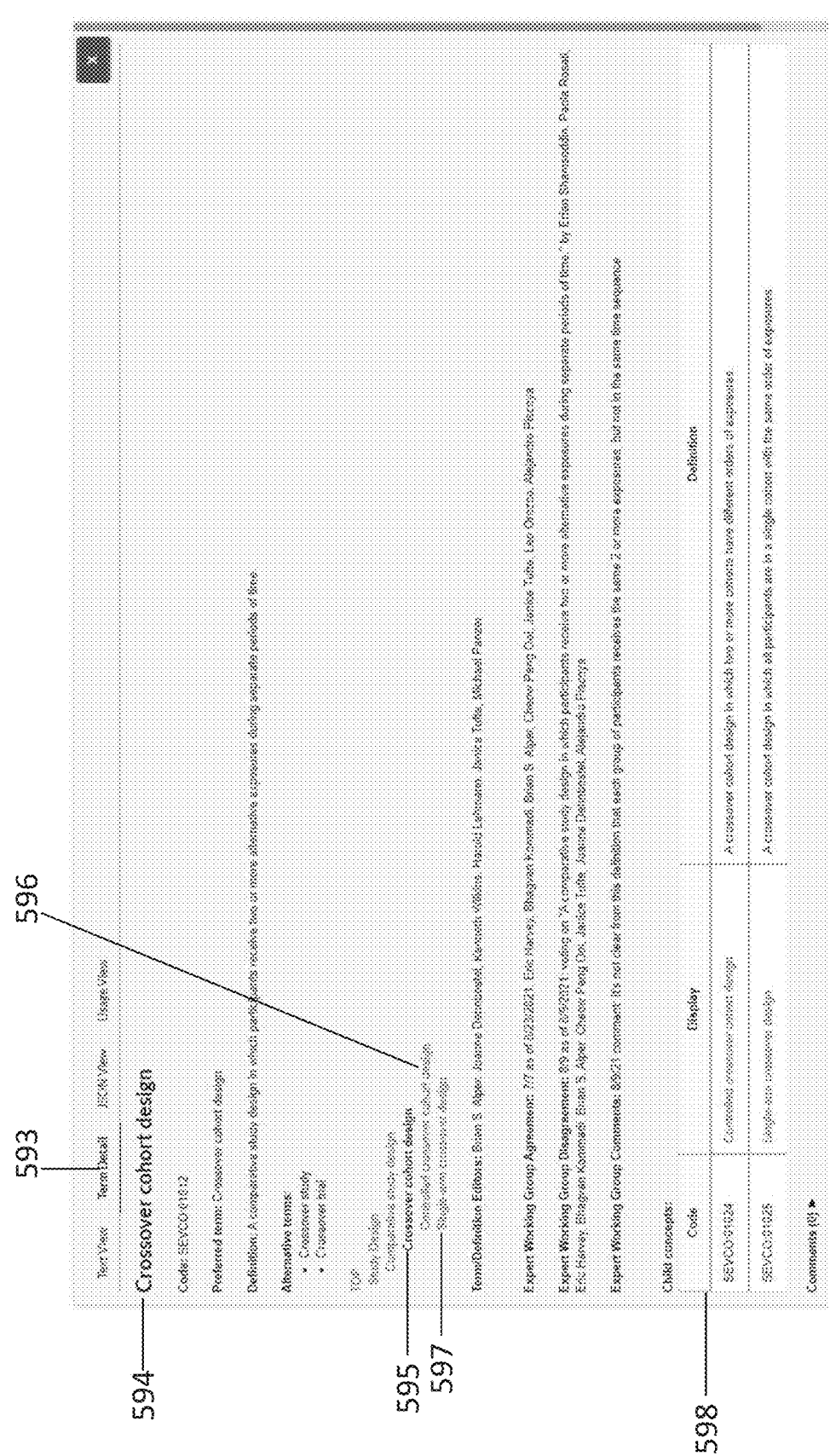
FIG. 100 is a screen shot of the Term Detail tab of the Computable Publishing: CodeSystem Viewer tool version 0.15.0, an exemplary system and method consistent with the present disclosure.

FIG. 100 shows an example of a novel arrangement of elements providing a technical improvement over the prior art with a reader GUI that presents a separate tab or page for viewing an instance of a compound data element in an array.

FIG. 100 shows a label for the tab view with "Term Detail" 593 and two human-readable representations to express that the parent term ("Crossover cohort design" 594) contains two subordinate terms, namely: a hierarchical display in which the current term of focus 595 (the parent term in this example) is bolded and followed by subordinate terms 596, 597 that are below and indented to the right of the parent term; and a tabular display 598 in which a subset of data elements from each instance of the compound data element in an array is presented as a row in the table.

Figure 101:
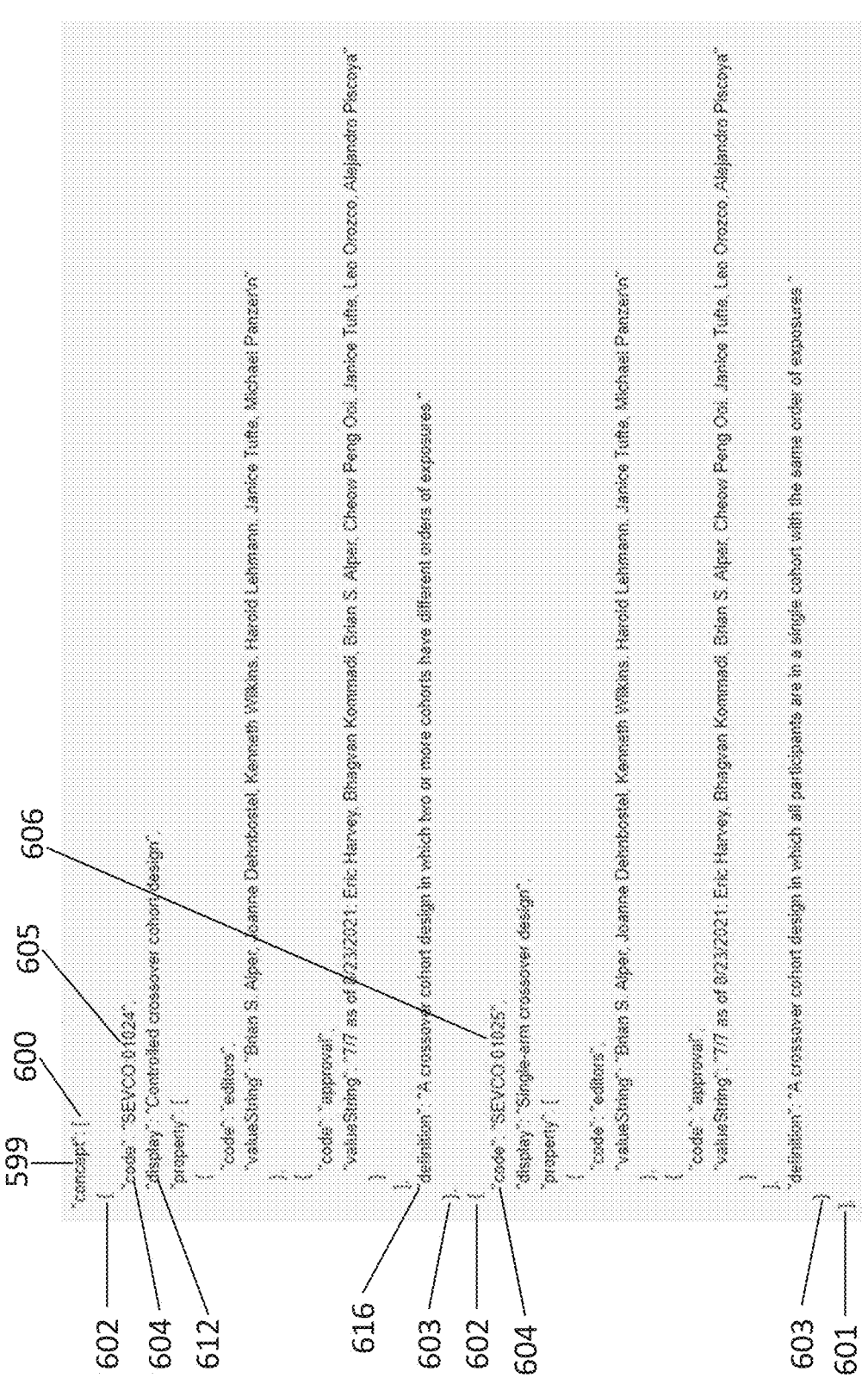
FIG. 101 is a portion of intermediate form of data, corresponding to FIG. 100.

The reader data displayed in FIG. 100 is converted from current data in an intermediate form. FIG. 101 shows an example of current data in an intermediate form in JSON consistent with the reader data shown in FIG. 100 with a concept element 599 containing: [ 600 and ] 601 characters to represent that one or more instances of the concept element may be contained between these characters; two instances of { 602 and } 603 characters to represent two single instances of the concept element that is contained between each pair of these characters; and each instance of the concept element contains a code element 604 which in this example includes the data values "SEVCO:01024" 605 and SEVCO:01025" 606.

Figure 102:
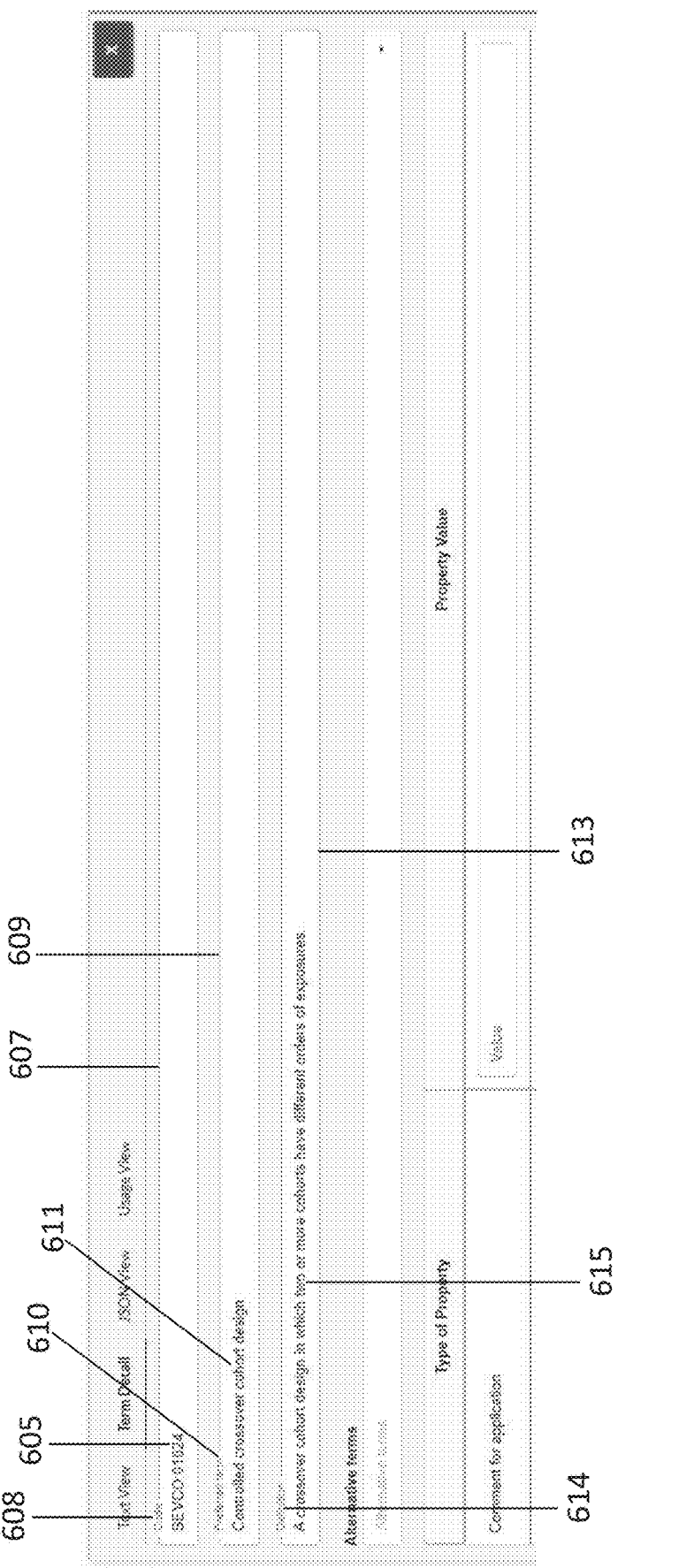
FIG. 102 is a screen shot of the Term Detail tab of the Computable Publishing: CodeSystem Builder tool version 0.15.0 corresponding to a term shown in FIG. 100 and FIG. 101, an exemplary system and method consistent with the present disclosure.

FIG. 102 shows an example of a novel arrangement of elements providing a technical improvement over the prior art with an editor GUI that presents a separate tab or page for editing an instance of a compound data element in an array.

When the user navigates to a user interface for editing (data entry) with identification of an instance for a data element in an array (such as an element instance with the code element 604 containing the data value "SEVCO: 01024" 605 as shown in the example shown in FIG. 102), the system and method disclosed herein will convert current data for the identified data element instance from intermediate form to a human-readable form for data entry.

FIG. 102 shows data entry fields used to express data values for concept elements, including: a data entry field 607 labeled "Code" 608 and containing the data value "SEVCO: 01024" 605 corresponding to the data value following a "code": element 604 name in the example in FIG. 101; a data entry field 609 labeled "Preferred term" 610 and containing the data value "Controlled crossover cohort design" 611 corresponding to the data value following a "display": element name 612 in the example in FIG. 101; and a data entry field 613 labeled "Definition" 614 and containing the data value "A crossover cohort design in which two or more cohorts have different orders of exposures." 615 corresponding to the data value following a "definition": element name 616 in the example in FIG. 101.

The advantages of this arrangement of elements are that data entry for repeated patterns of data elements without a prespecified number of repeats is efficient with repeated use of the element-specific data entry forms in the same pattern for rapid interpretation and repeated use, and the ability to navigate to each element separately where the number of repeated elements is too high for efficient viewing and editing on a single webpage. Additional advantages of this arrangement include the clear identification of array instances and ability to edit data in specific instances. These advantages overcome problems noted in Background #0030 and #0031.

Figure 103:
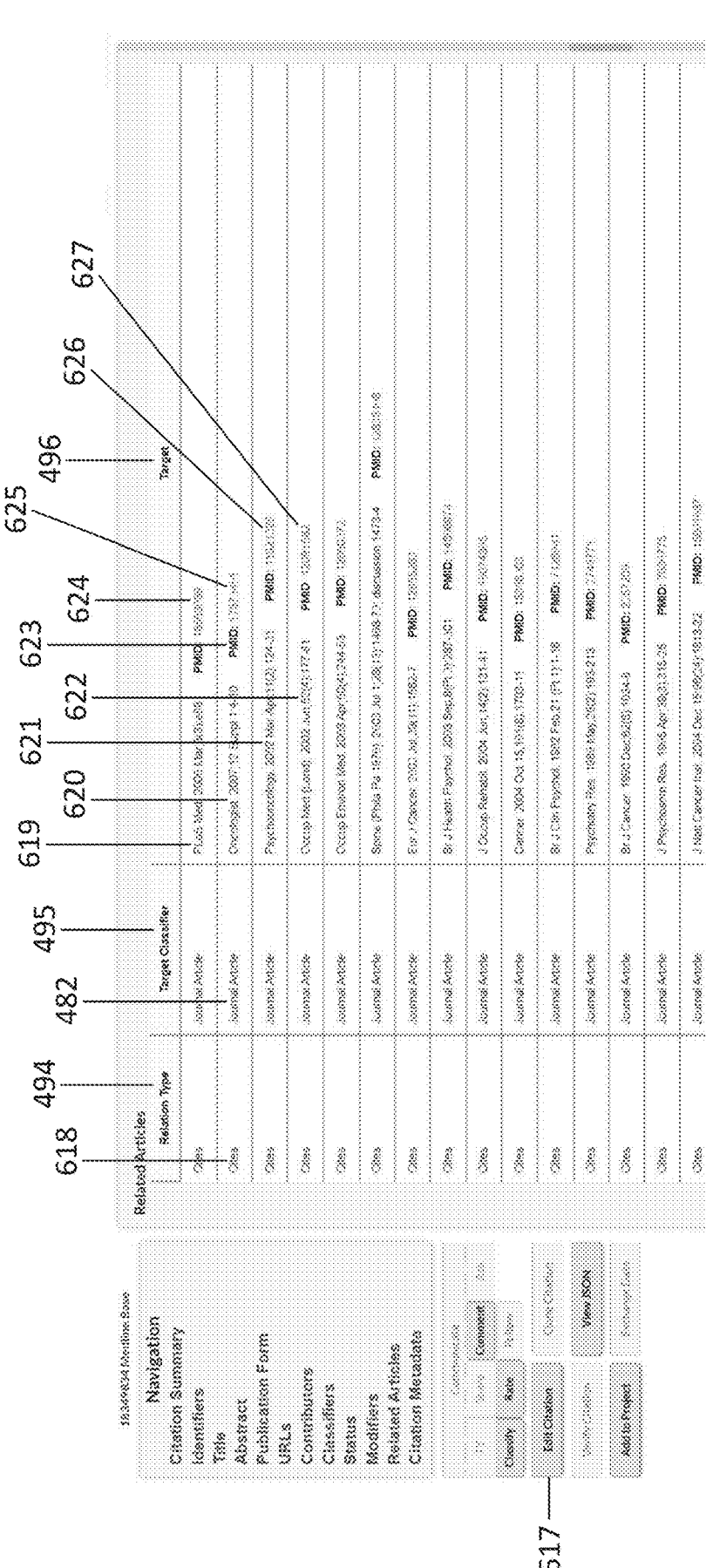
FIG. 103 is a screen shot of the Related Articles section of the Computable Publishing: Citation Viewer tool version 1.4.4, an exemplary system and method consistent with the present disclosure.
Figure 104:
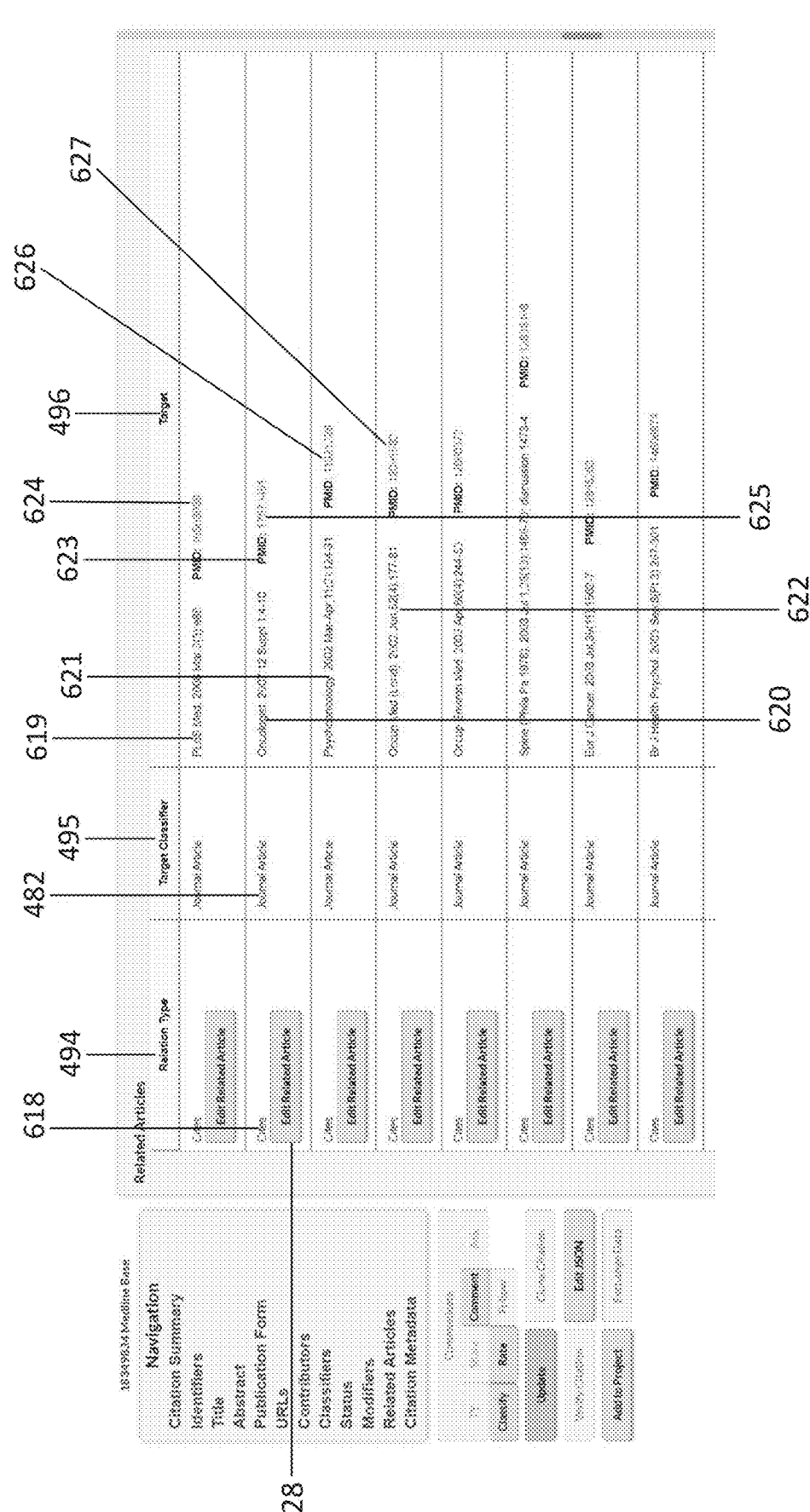
FIG. 104 is a screen shot of the Related Articles section of the Computable Publishing: Citation Builder tool version 1.4.4 corresponding to FIG. 103, an exemplary system and method consistent with the present disclosure.
Figure 105:
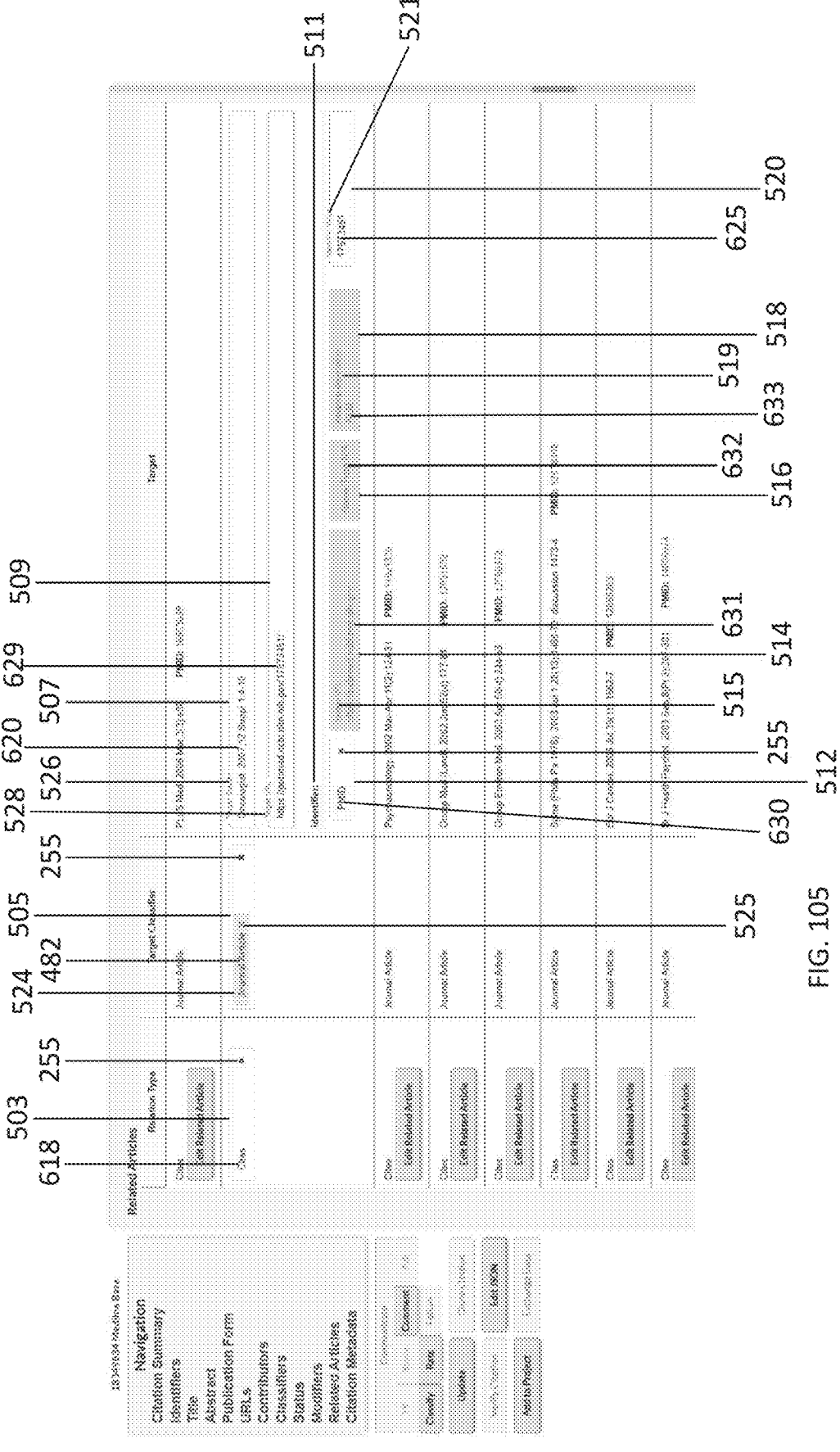
FIG. 105 is a screen shot of the Related Articles section of the Computable Publishing: Citation Builder tool version 1.4.4 with data entry fields displayed for a single related article and corresponding to FIG. 104, an exemplary system and method consistent with the present disclosure.

FIGS. 103, 104 and 105 show an example of a novel arrangement of elements providing a technical improvement over the prior art with a GUI that presents a separate access control method for editing an instance of a compound data element in an array.

FIG. 103 shows an example of a reader GUI providing a human-readable display of data, including a button labeled "Edit Citation" 617 and a table with: the first column has a header labeled Relation Type 494; the second column has a header labeled Target Classifier 495; the third column has a header labeled Target 496; and each row represents a single artifact-to-artifact relationship and includes: a display value of "Cites" 618 in the first ("Relation Type") column; a display value of "Journal Article" 482 in the second ("Target Classifier") column; and the third ("Target") column includes a display with up to three values, in order of: a display value for the target 619, 620, 621, 622; a display value of "PMID:" 623 for the identification system used for the identifier; and a display value for the identifier of the target 624, 625, 626, 627.

FIG. 104 shows an example of an editor GUI that appears after clicking the button labeled "Edit Citation" 617 in the user interface shown in FIG. 103. FIG. 104 shows a table with: the first column has a header labeled Relation Type 494; the second column has a header labeled Target Classifier 495; the third column has a header labeled Target 496; and each row represents a single artifact-to-artifact relationship and includes: a display value of "Cites" 618 in the first ("Relation Type") column; a button labeled "Edit Related Article" 628 in the first ("Relation Type") column; a display value of "Journal Article" 482 in the second ("Target Classifier") column; and the third ("Target") column includes a display with up to three values, in order of: a display value for the target 619, 620, 621, 622; a display value of "PMID:" 623 for the identification system used for the identifier; and a display value for the identifier of the target 624, 625, 626, 627.

FIG. 105 shows an example of the user interface that appears after clicking the button labeled "Edit Related Article" 628 in the second row in the example in FIG. 104. FIG. 105 shows the same table as shown in FIG. 104 except that the second row includes: a data entry field 503 displaying the value "Cites" 618 and marked with an x 255 in the first ("Relation Type") column; a data entry field 505 displaying the value "Journal Article" 482 (within a rectangle with a gray background 524 and marked with an x 525) and marked with an x 255 in the second ("Target Classifier") column; and the third ("Target") column includes: a data entry field 507 labeled "Target Display" 526 and displaying the value "Oncologist. 2007; 12 Suppl 1:4-10" 620; a data entry field 509 labeled "Target URL" 528 and displaying the value "https://pubmed.ncbi.nlm.nih.gov/17573451/"629; and a label "Identifier:" 511 preceding: a data entry field 512 displaying the value "PMID" 630 and marked with an x 255; a data entry field 514 labeled "System URL" 515 displaying the value "https://pubmed.ncbi.nlm.nih.gov" 631; a data entry field 516 labeled "Name/Type N/A" 632; a data entry field 518 labeled "Assigning Organization" 519 displaying the value "NLM" 633; and a data entry field 520 labeled "Identifier Value" 521 displaying the value "17573451" 625.

Figure 106:
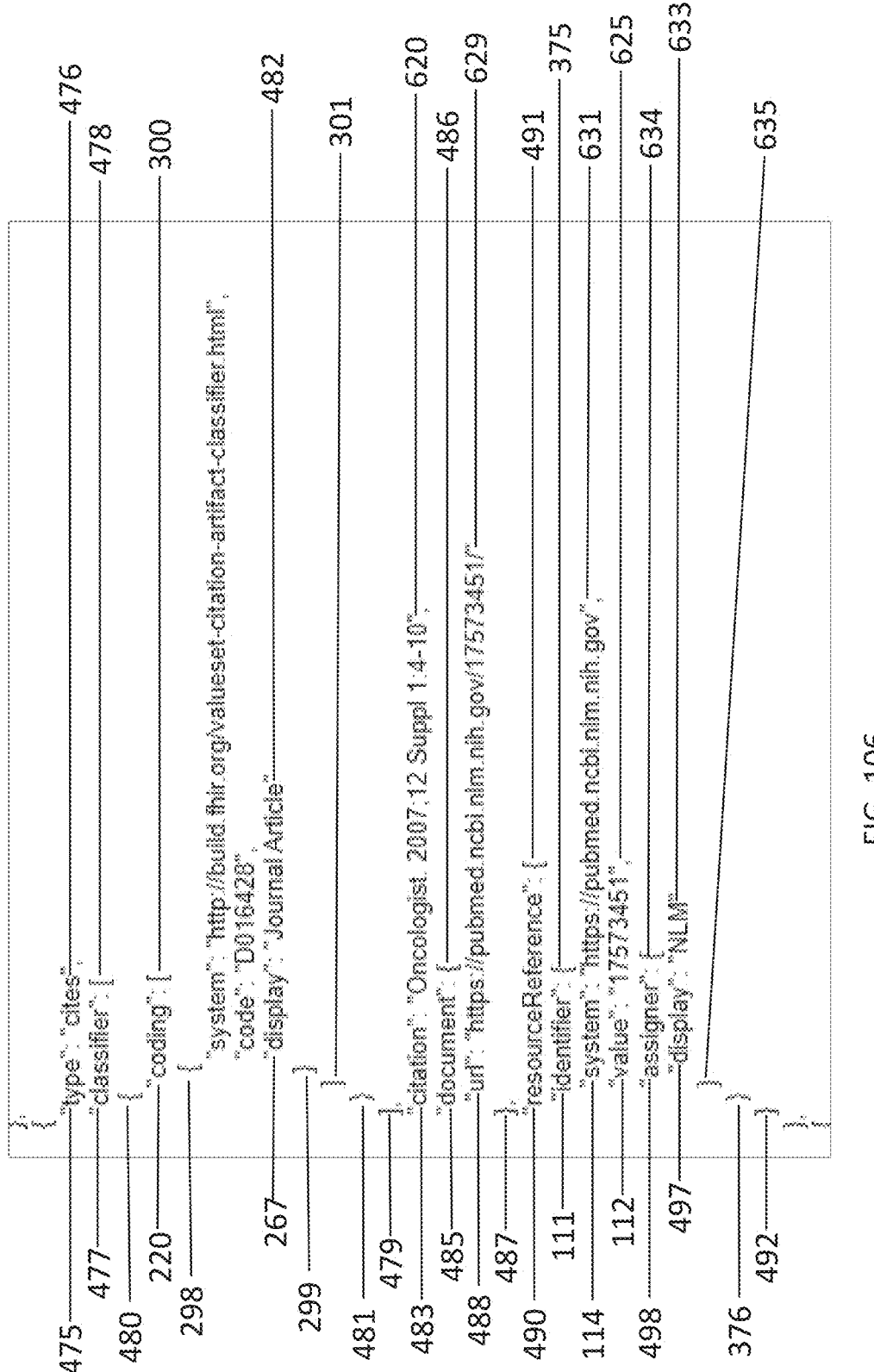
FIG. 106 is a portion of intermediate form of data, corresponding to FIG. 105.

In some embodiments, a system and method consistent with the present disclosure will convert such data specifying an array of matched datasets into current data in an intermediate form. FIG. 106 shows an example of current data consistent with the entered data shown in FIG. 105 and converted into an intermediate form in JSON with: a type element 475 containing the value "cites" 476; a classifier element 477 containing: [ 478 and ] 479 characters to represent that one or more instances of the classifier element may be contained between these characters; { 480 and } 481 characters to represent a single instance of the classifier element that is contained between these characters; and a coding element 220 containing: [ 300 and ] 301 characters to represent that one or more instances of the coding element may be contained between these characters; { 298 and } 299 characters to represent a single instance of the classifier element that is contained between these characters; a display element 267 containing the value "Journal Article" 482; a citation element 483 containing the value "Oncologist. 2007; 12 Suppl 1:4-10" 620; a document element 485 containing: { 486 and } 487 characters to represent a single instance of the document element that is contained between these characters; and a URL element 488 containing the value "https://pubmed.ncbi.nlm.nih.gov/17573451/" 629; and a resourceReference element 490 containing: { 491 and } 492 characters to represent a single instance of the resourceReference element that is contained between these characters; and an identifier element 111 containing: { 375 and } 376 characters to represent a single instance of the identifier element that is contained between these characters; a system element 114 containing the value "https://pubmed.ncbi.nlm.nih.gov"631; a value element 112 containing the value "17573451" 625; and an assigner element 498 containing { 634 and } 635 characters to represent a single instance of the assigner element that is contained between these characters, and containing a display element 497 containing the value "NLM" 633.

The advantage of this arrangement of elements is that computer processing time for interpretation and conversion of data in large arrays can be limited to the data identified for change. This advantage overcomes a problem noted in Background #0030 and #0031.

FIG. 54 shows an example of a novel arrangement of elements providing a technical improvement over the prior art with an editor GUI that presents a tabular format for editing instances of the parent array as table rows, and provides an array-supporting solution for data entry within a table cell for the child array, and includes delete functions to enable deletion of an entire array entry (table row).

FIG. 54 shows a table with: the first column has a header labeled Delete 582; the second column has a header labeled Type of Characteristic 583; the third column has a header labeled Characteristic Value 285; the first row 636 includes an example with no data entered, including: an image of a trash can 585 in the first ("Delete") column; a data entry field 445 labeled "Pick Characteristic Type" 588 and marked with a downward-facing triangle 249 in the second ("Type of Characteristic") column; and in the third ("Characteristic Value") column each of: the data type selected as Codeable Concept 286; a single-row table 287 with three data entry fields: a data entry field 216 labeled "Value System" 250 to indicate this is the text entry field for the value describing the code system, a data entry field 251 labeled "Value Code" 252 to indicate this is the text entry field for the value describing the code, and a data entry field 253 labeled "Value Display" 254 to indicate this is the text entry field for the value describing the display; a button 288 labeled "+Add Coding"; and descriptive text labeled "(To express additional values combined with OR)" 289; the second row 637 includes an example with no data entered consistent with the result of clicking the button 288 labeled "+Add Coding" in the first row and includes: the same content as shown in the first row plus an additional row 290 with the same three data entry fields 216, 251, 253 and the word "OR" 291 displayed in the line separating the rows for entering coding data into the single-row table 287 and the additional row 290; and the third row 638 shows an example consistent with the result of entering data values 292, 293, 294, 295, 296, 297 in each of the six data entry fields that were shown in empty form in the second row.

In some embodiments, a system and method consistent with the present disclosure will convert such data specifying an array of matched datasets into current data in an intermediate form. FIG. 55 shows an example of current data consistent with the entered data shown in FIG. 54 and converted into an intermediate form in JSON with data that includes: a characteristic element 462; [ 463 and ] 464 characters to contain the values of characteristic instances; { 465 and } 466 characters to contain each characteristic instance; a valueCodeableConcept element 470 in each classification instance, and this valueCodeableConcept element is followed { 471 and } 472 characters to include one and only one valueCodableConcept instance which contains one or more elements; and the third characteristic instance in the array (corresponding to the third row 638 in FIG. 54) contains a coding element 220 which contains [ 300 and ]

301 characters to represent that one or more instances of the coding element may be contained between these characters; { 298 and } 299 characters to represent each instance of the classifier element that is contained between these characters (with two instances corresponding to the example in FIG. 54); and data values 292, 293, 294, 295, 296, 297 corresponding to the example in FIG. 54.

The advantage of this arrangement of elements is that users can enter data in the parent array and contained (child) array in the same interface viewing all the data at once. This advantage overcomes problems noted in Background #0031.

FIGS. 107, 108, 109 and 110 show an example of a novel arrangement of elements providing a technical improvement over the prior art with an editor GUI that presents a subsection format for editing instances of the parent array as subsection entries and provides a tabular format for editing instances of the child array as table rows.

Figure 107:
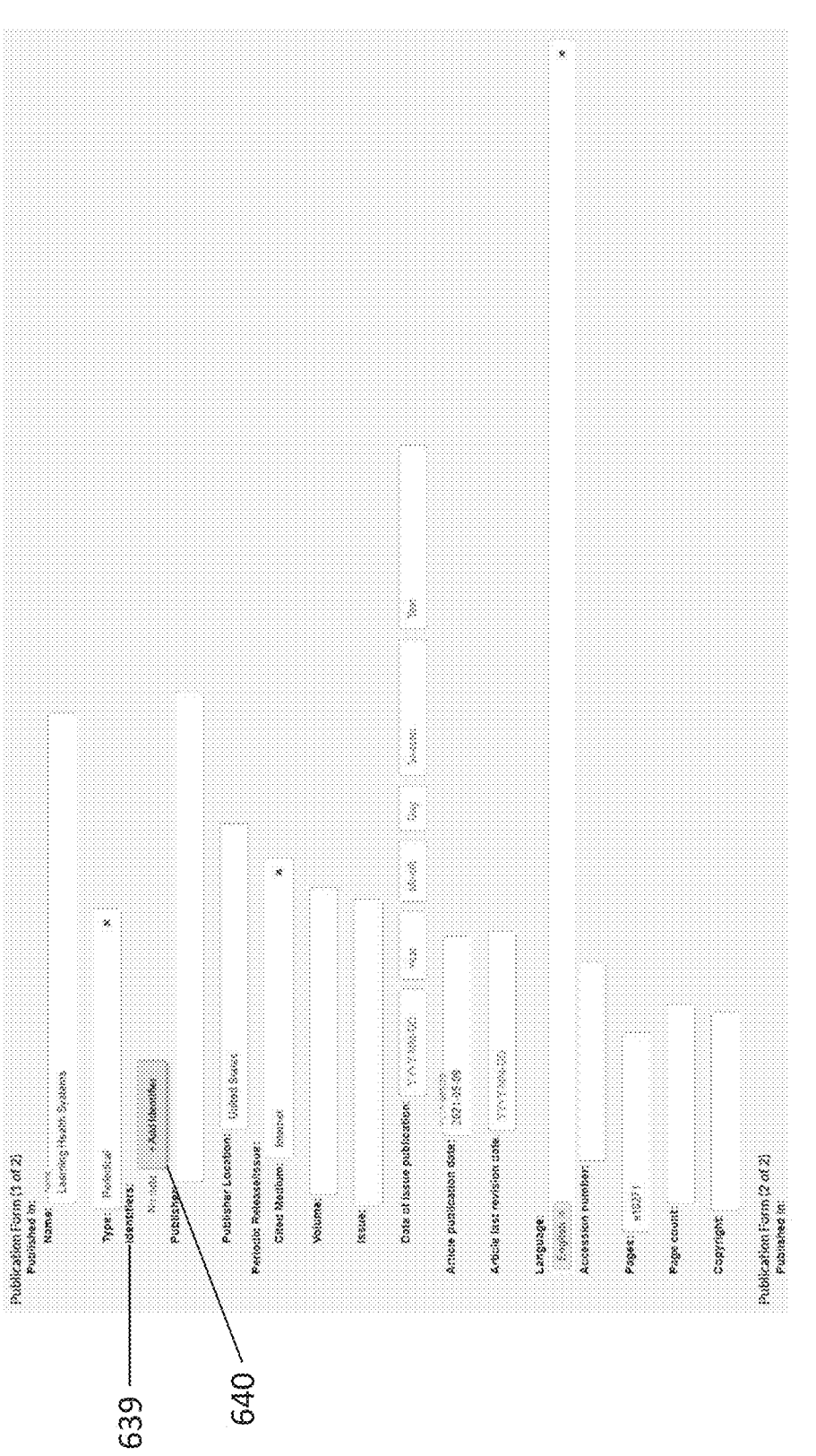
FIG. 107 is a screen shot of the Publication Form section of the Computable Publishing: Citation Builder tool version 1.4.4 with example data, an exemplary system and method consistent with the present disclosure.

FIG. 107 shows an example of an editor GUI that presents a subsection format for editing instances of the parent array as subsection entries (as described in #0377) and shows a label "Identifiers:" 639 followed by button labeled "+ Add Identifier" 640.

Figure 108:
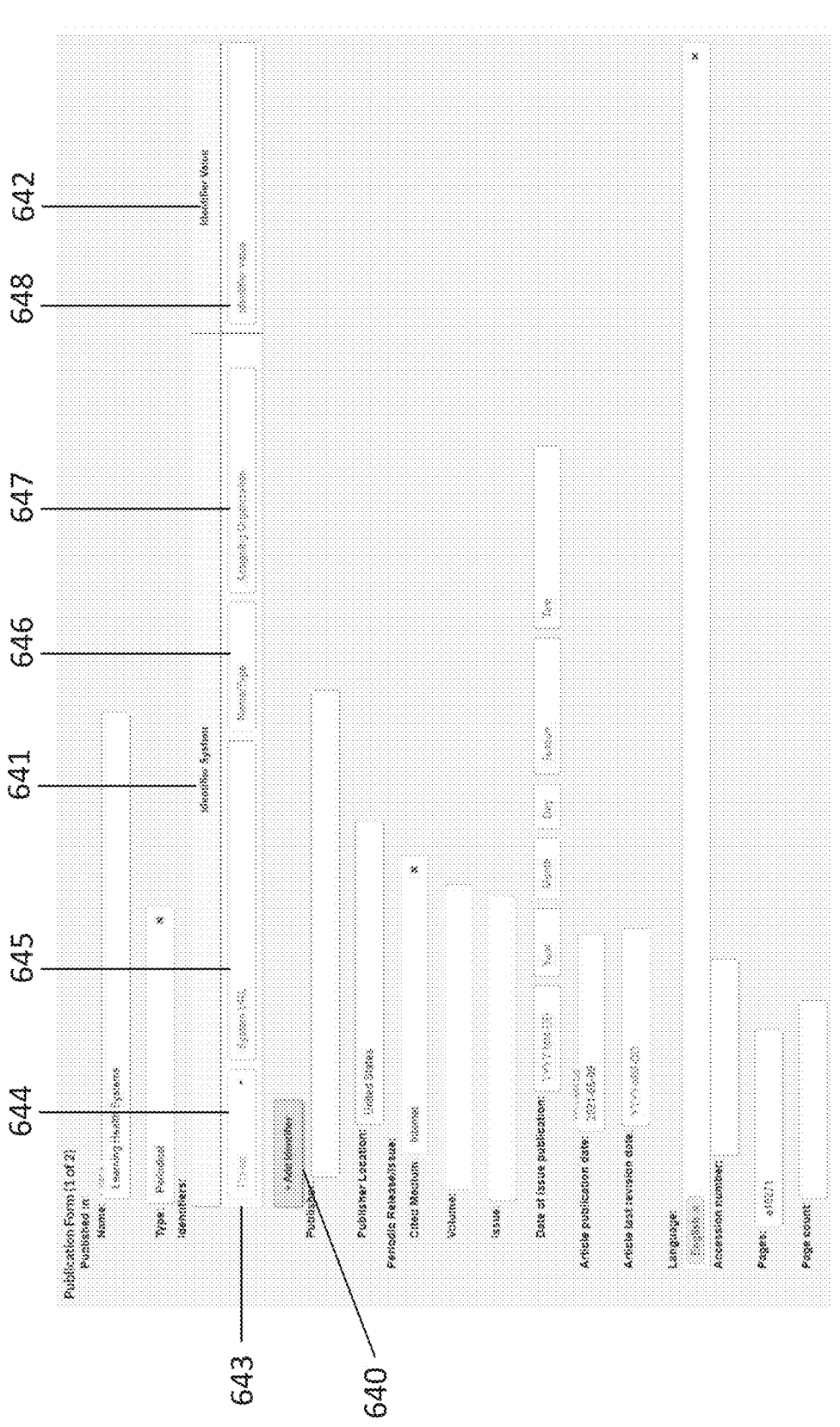
FIG. 108 is a screen shot of the Publication Form section of the Computable Publishing: Citation Builder tool version 1.4.4 with an example of a data entry form for one instance of a child array, an exemplary system and method consistent with the present disclosure.

FIG. 108 shows an example of the user interface shown in FIG. 107 after the user clicks the button labeled "+ Add Identifier"640. FIG. 108 shows a table including column headers "Identifier System"641 and "Identifier Value" 642 and one row 643 with data entry fields 644, 645, 646, 647, 648, and a button labeled "+ Add Identifier" 640.

Figure 109:
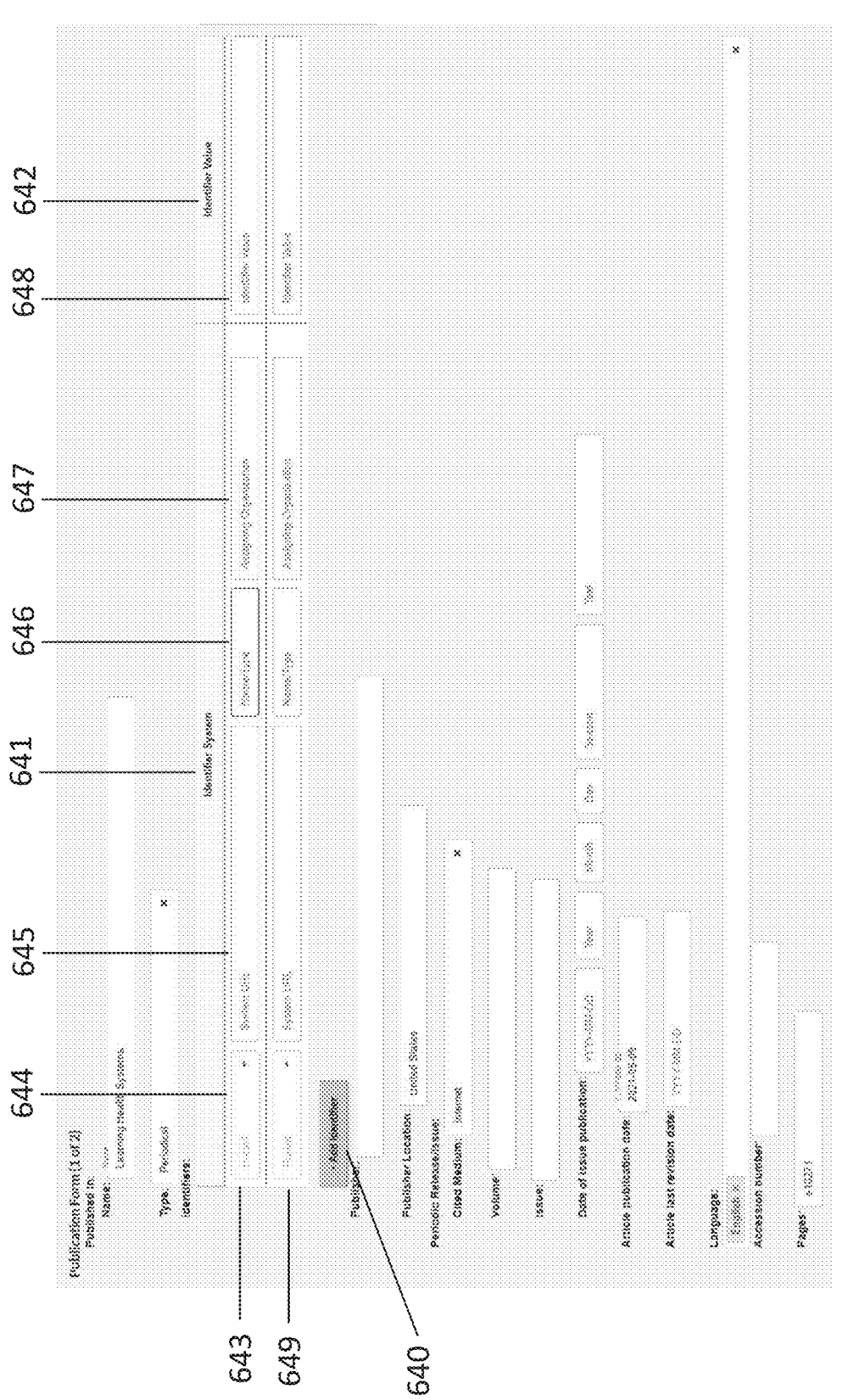
FIG. 109 is a screen shot of the Publication Form section of the Computable Publishing: Citation Builder tool version 1.4.4 with an example of a data entry form for two instances of a child array, an exemplary system and method consistent with the present disclosure.

FIG. 109 shows an example of the user interface shown in FIG. 108 after the user clicks the button labeled "+ Add Identifier"640. FIG. 109 shows a table including column headers "Identifier System"641 and "Identifier Value" 642 and two rows 643, 649 with data entry fields 644, 645, 646, 647, 648, and a button labeled "+ Add Identifier" 640.

Figure 110:
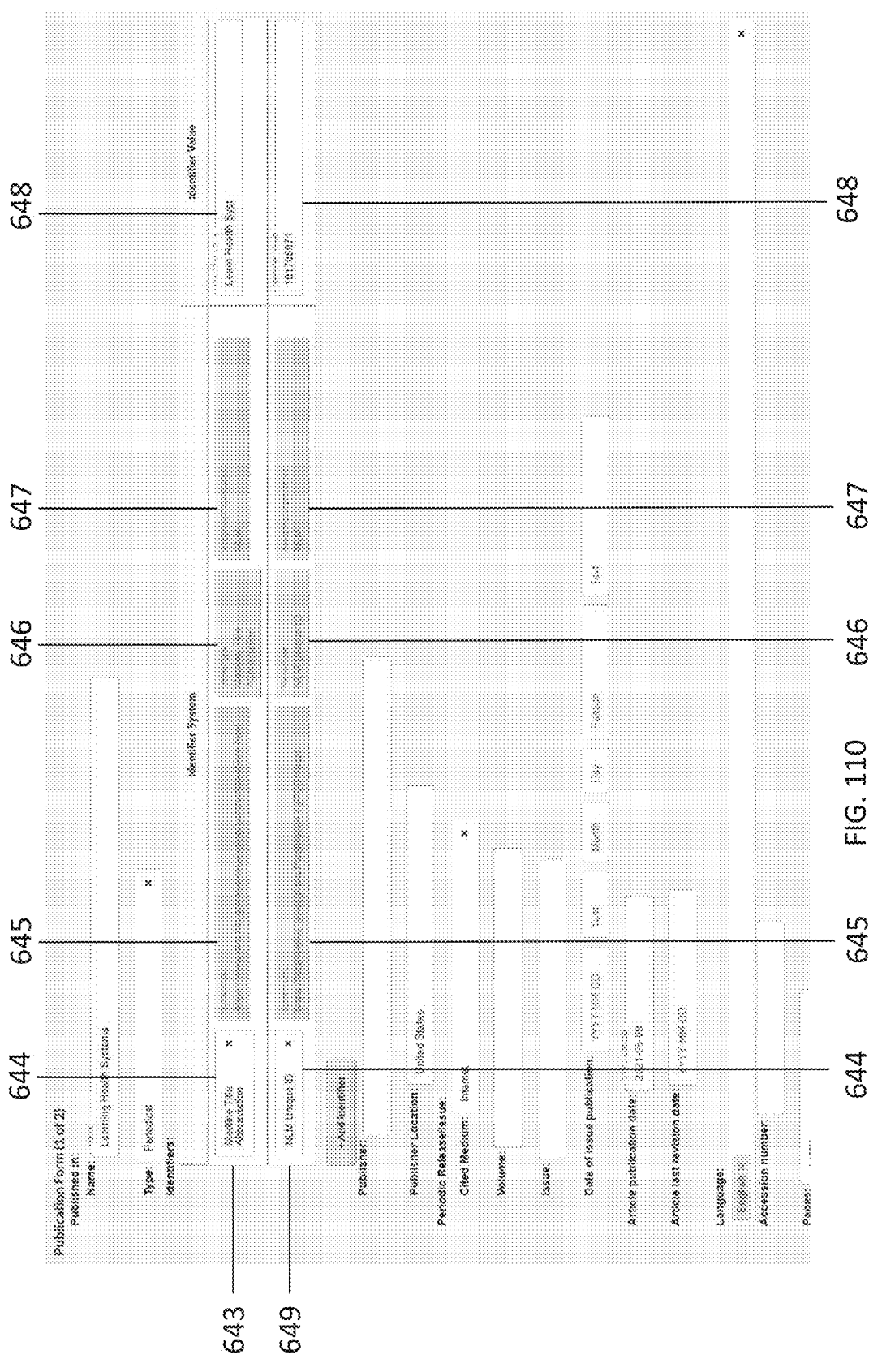
FIG. 110 is a screen shot of the Publication Form section of the Computable Publishing: Citation Builder tool version 1.4.4 with an example of a data entry form for two instances of a child array and containing example data, an exemplary system and method consistent with the present disclosure.

FIG. 110 shows an example of the user interface shown in FIG. 109 after the user enters data in the data entry fields 644, 645, 646, 647, 648 in both rows 643, 649.

Figure 111:
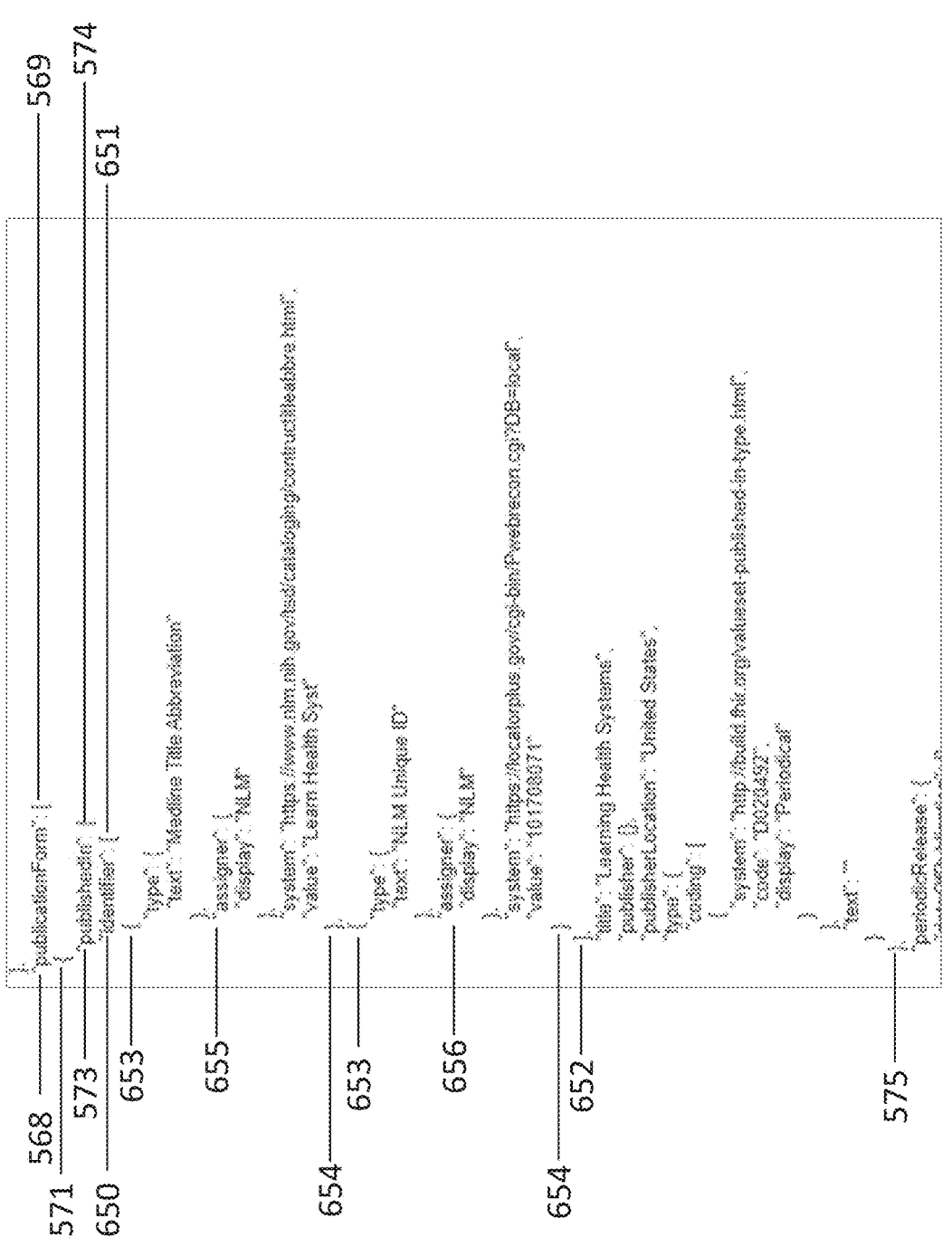
FIG. 111 is a portion of structured form of data, corresponding to the example in FIG. 110.

In some embodiments, a system and method consistent with the present disclosure will convert such data specifying an array of matched datasets into current data in an intermediate form. FIG. 111 shows an example of current data consistent with the entered data shown in FIG. 110 and converted into an intermediate form in JSON with a publicationForm element 568 containing: [ 569 and ] characters to represent that one or more instances of the publicationForm element may be contained between these characters { Note: The ] character is not shown in FIG. 111}; { 571 and } characters to represent a single instance of the publicationForm element that is contained between these characters {Note: The } character is not shown in FIG. 111}; a publishedIn element 573 containing: { 574 and } 575 characters to represent a single instance of the publishedIn element that is contained between these characters; and an identifier element 650 containing: [ 651 and ] 652 characters to represent that one or more instances of the identifier element may be contained between these characters two instances of { 653 and } 654 characters to represent a single instance of the identifier element that is contained between these characters; data in one instance 655 of the identifier element corresponding to the data entered in one row 643 in FIG. 110; and data in a second instance 656 of the identifier element corresponding to the data entered in one row 649 in FIG. 110.

The advantages of this arrangement of elements are that users can enter data in the parent array and contained (child) array in the same interface viewing all the data at once, and these advantages can be achieved when tabular display of the parent array is impractical. These advantages overcome problems noted in Background #0031.

FIGS. 112, 113, 114, 115, 116 and 117 show an example of a novel arrangement of elements providing a technical improvement over the prior art with an editor GUI that presents a separate tab or page for editing an instance of a compound data element in an array (herein referred to as the parent array), a tabular format for adding instances of data in compound data elements to a child array, and a separate tab or page for editing an instance of a compound data element in a child array.

Figure 112:
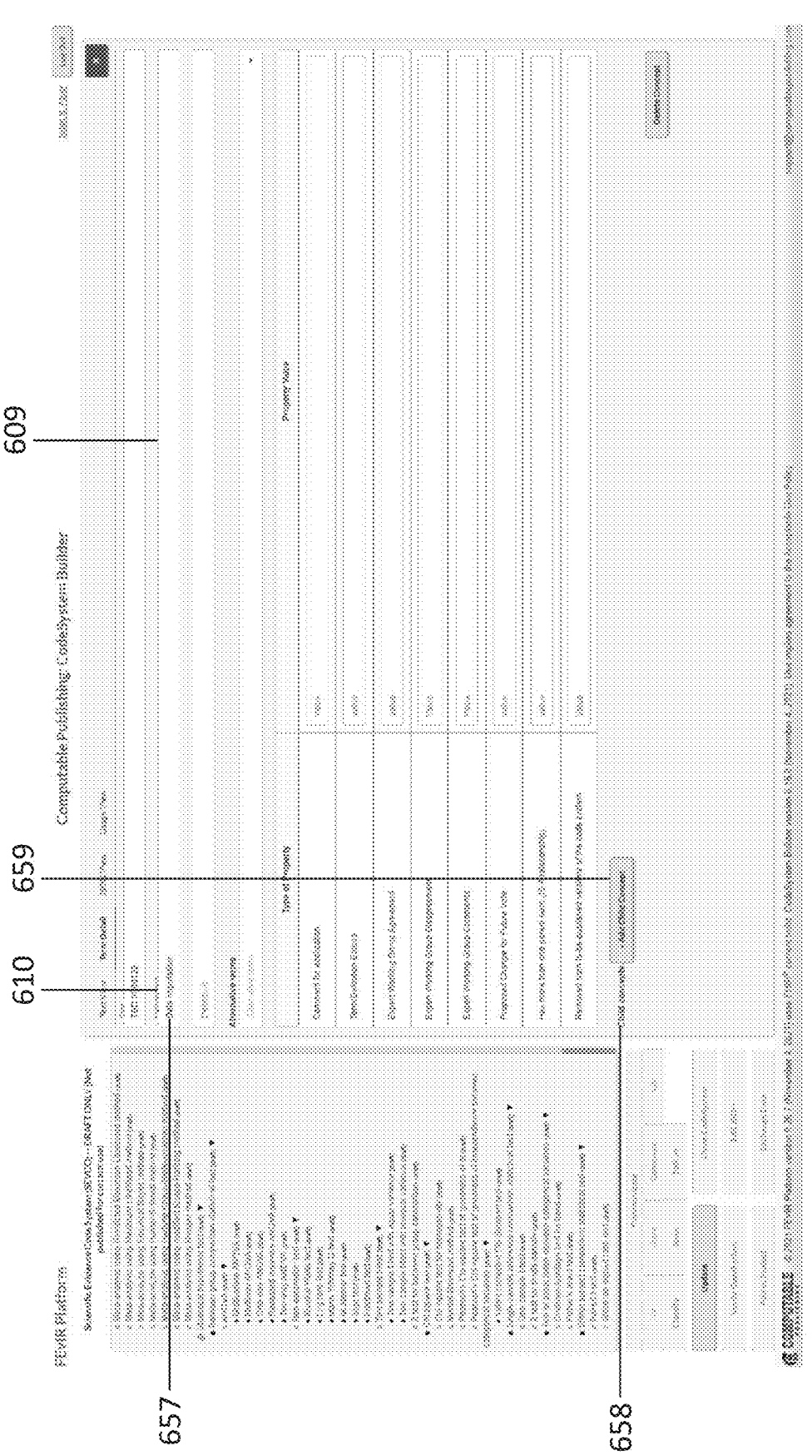
FIG. 112 is a screen shot of the Term Detail tab of the Computable Publishing: CodeSystem Builder tool version 0.15.0, an exemplary system and method consistent with the present disclosure.

FIG. 112 shows a data value of "Data imputation" 657 in a data entry field 609 labeled "Preferred term" 610 and a section header labeled "Child concepts:" 658 followed by a button labeled "+ Add Child Concept" 659.

Figure 113:
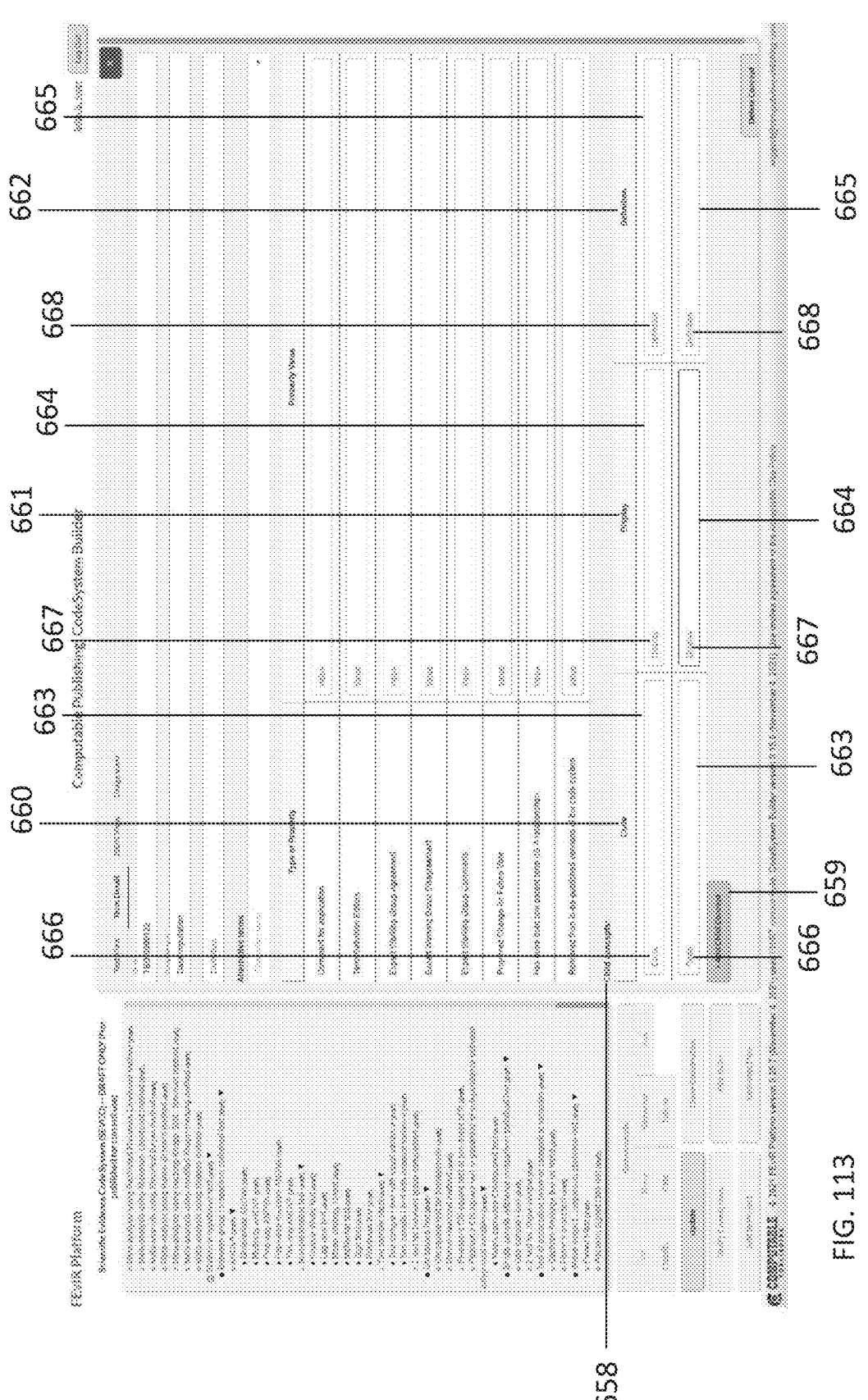
FIG. 113 is a screen shot of the Term Detail tab of the Computable Publishing: CodeSystem Builder tool version 0.15.0 with data entry forms for adding child concepts corresponding to FIG. 112, an exemplary system and method consistent with the present disclosure.

FIG. 113 shows an example of the user interface after clicking the button labeled "+ Add Child Concept" 659 in FIG. 112 and then clicking the button a second time. FIG. 113 shows a section header labeled "Child concepts:" 658 followed by a table with columns labeled "Code" 660, "Display" 661, and "Definition" 662 and two rows with data entry fields 663, 664, 665 labeled "Code" 666, "Display" 667, and "Definition" 668, and followed by a button labeled "+ Add Child Concept" 659.

Figure 114:
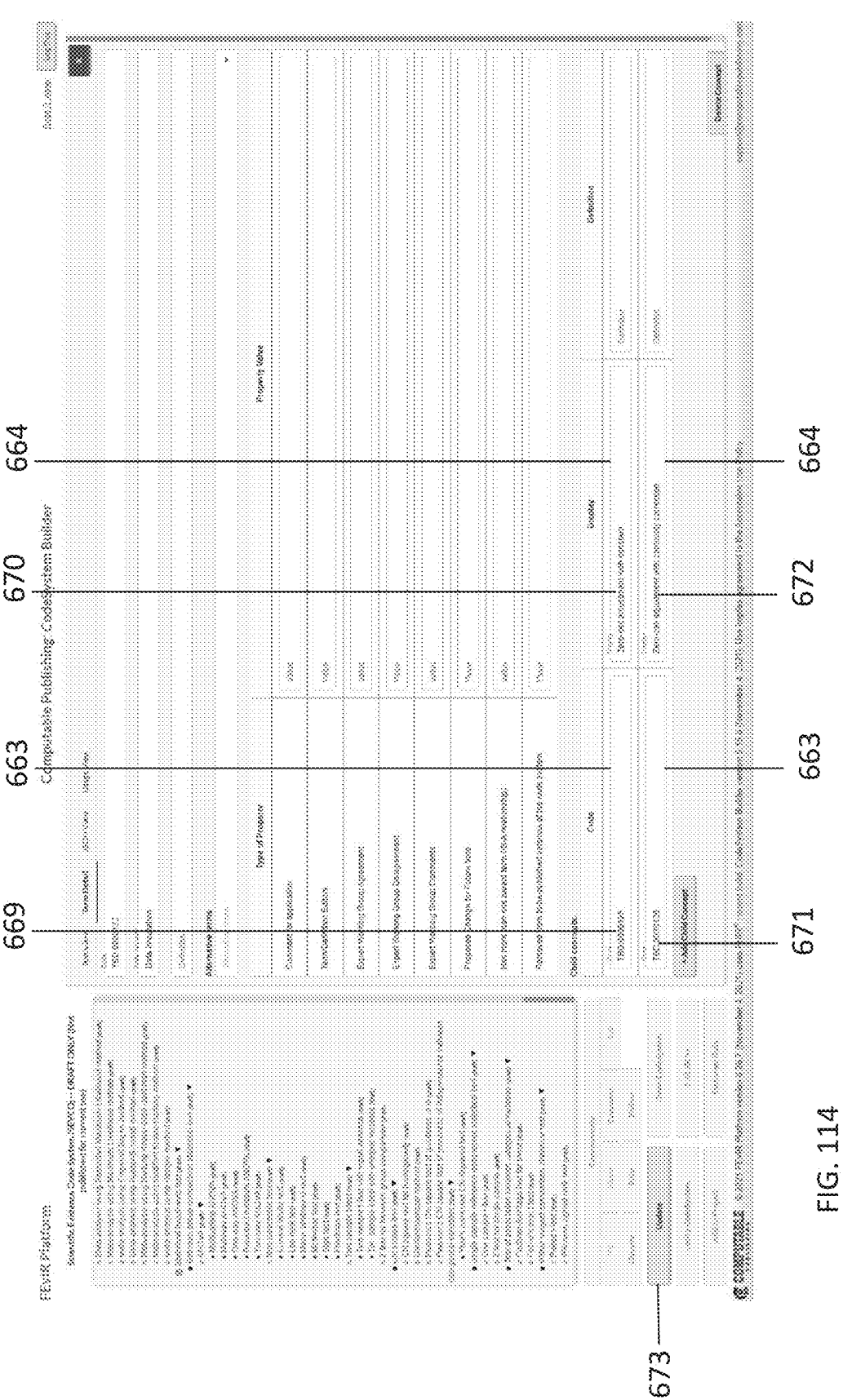
FIG. 114 is a screen shot of the Term Detail tab of the Computable Publishing: CodeSystem Builder tool version 0.15.0 with data entry forms for adding child concepts and example data corresponding to FIG. 113, an exemplary system and method consistent with the present disclosure.

FIG. 114 shows an example of the user interface with data values 669, 670, 671, 672 entered in four of the data entry fields 663, 664, 663, 664 shown in FIG. 113. FIG. 114 also shows a button labeled "Update" 673.

Figure 115:
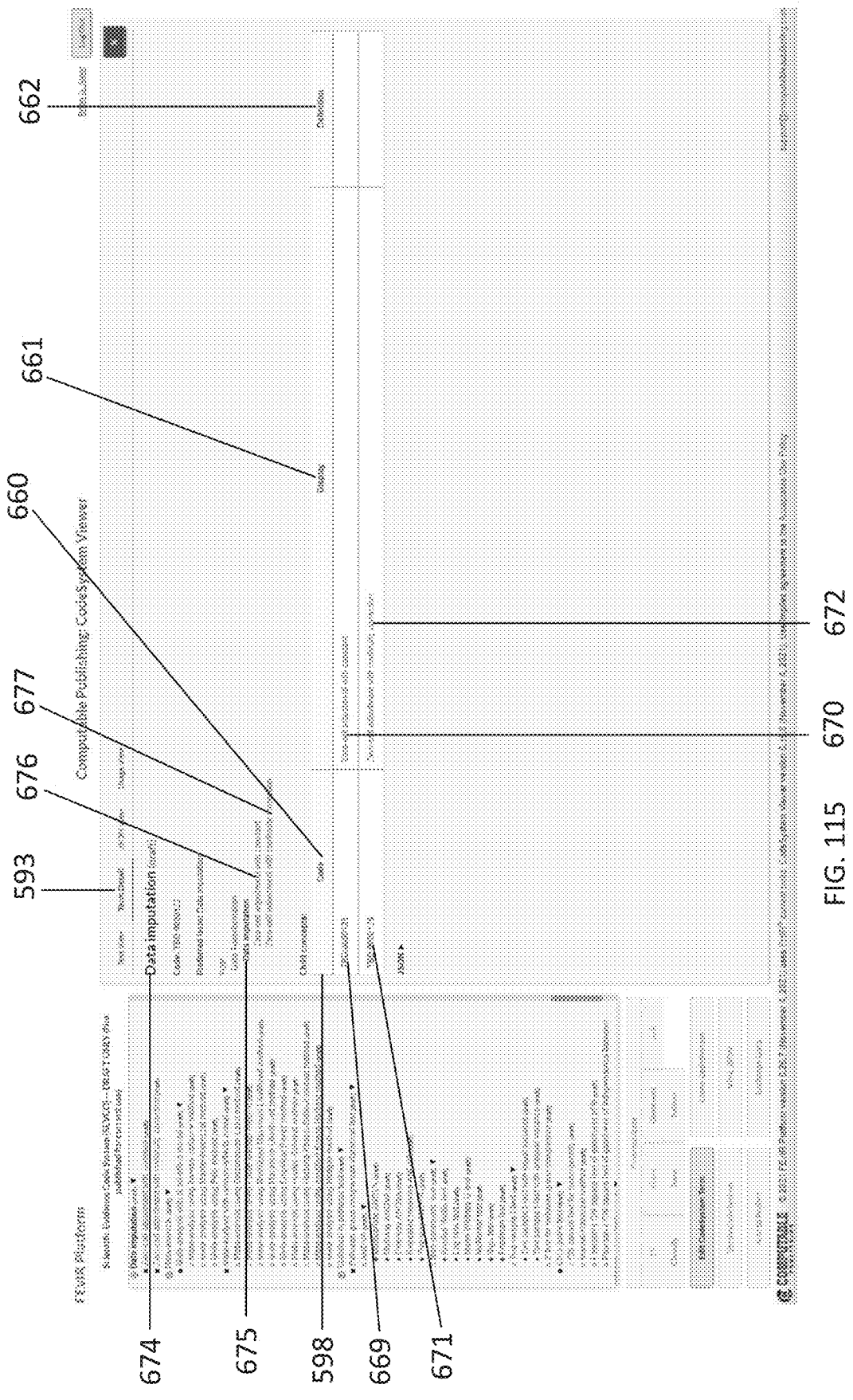
FIG. 115 is a screen shot of the Term Detail tab of the Computable Publishing: CodeSystem Viewer tool version 0.15.0 corresponding to FIG. 114, an exemplary system and method consistent with the present disclosure.

FIG. 115 shows an example of the user interface displaying data after clicking the button labeled "Update" 673 in FIG. 114. FIG. 115 shows a label for the tab view with "Term Detail" 593 and two human-readable representations to express that the parent term ("Data imputation" 674) contains two subordinate terms, namely: a hierarchical display in which the current term of focus 675 (the parent term in this example) is bolded and followed by subordinate terms 676, 677 that are below and indented to the right of the parent term; and a tabular display 598 in which a subset of data elements from each instance of the compound data element in an array is presented as a row in the table, including columns labeled "Code" 660, "Display" 661, and "Definition" 662 and data values 669, 670, 671, 672 shown to be entered in FIG. 114.

Figure 116:
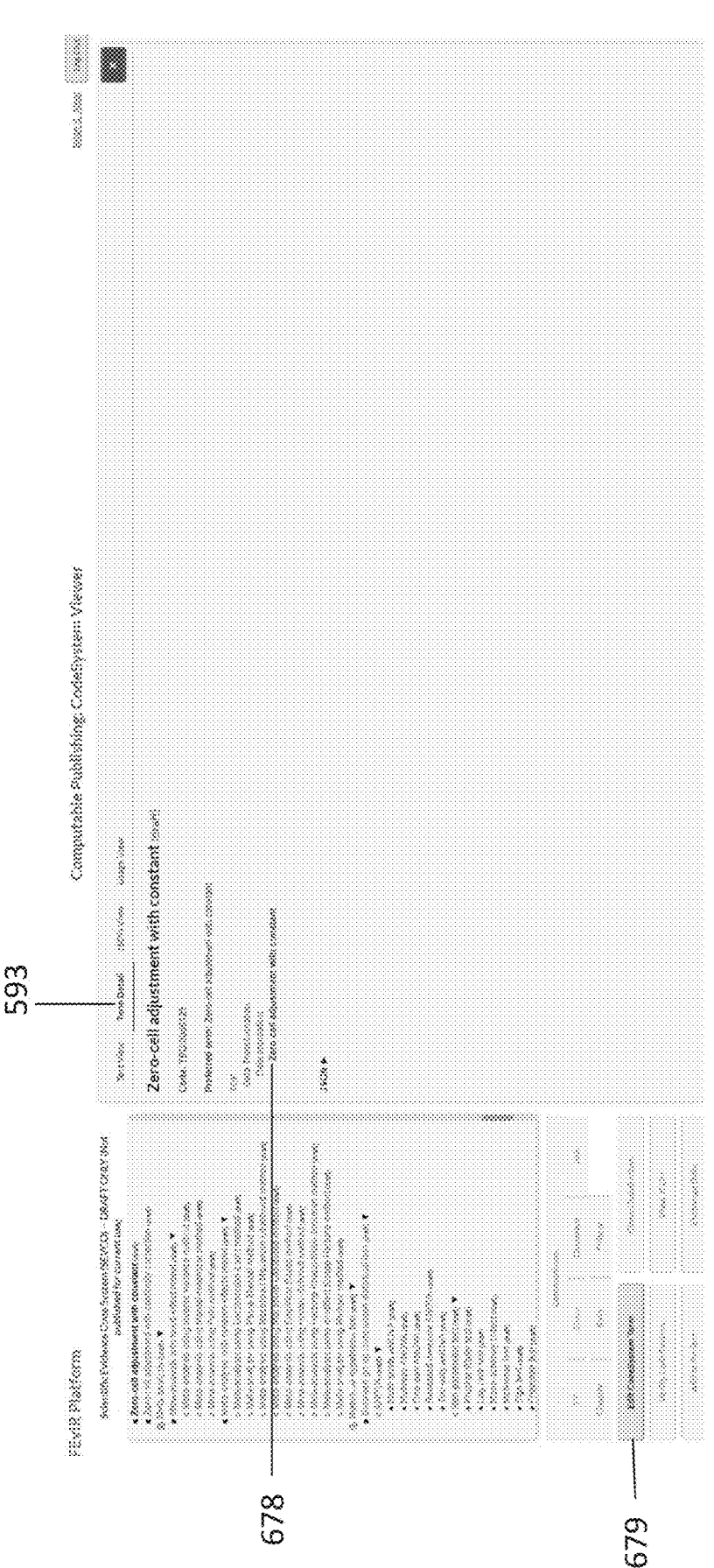
FIG. 116 is a screen shot of the Term Detail tab of the Computable Publishing: CodeSystem Viewer tool version 0.15.0 corresponding to a term referenced in FIG. 115, an exemplary system and method consistent with the present disclosure.

FIG. 116 shows an example of the user interface displaying data after clicking "Zero-cell adjustment with constant" 670 in the example shown in FIG. 115. FIG. 116 shows a label for the tab view with "Term Detail" 593, a hierarchical display in which the current term of focus 678 is the last entry in the hierarchical list, and a button labeled "Edit CodeSystem Term" 679.

Figure 117:
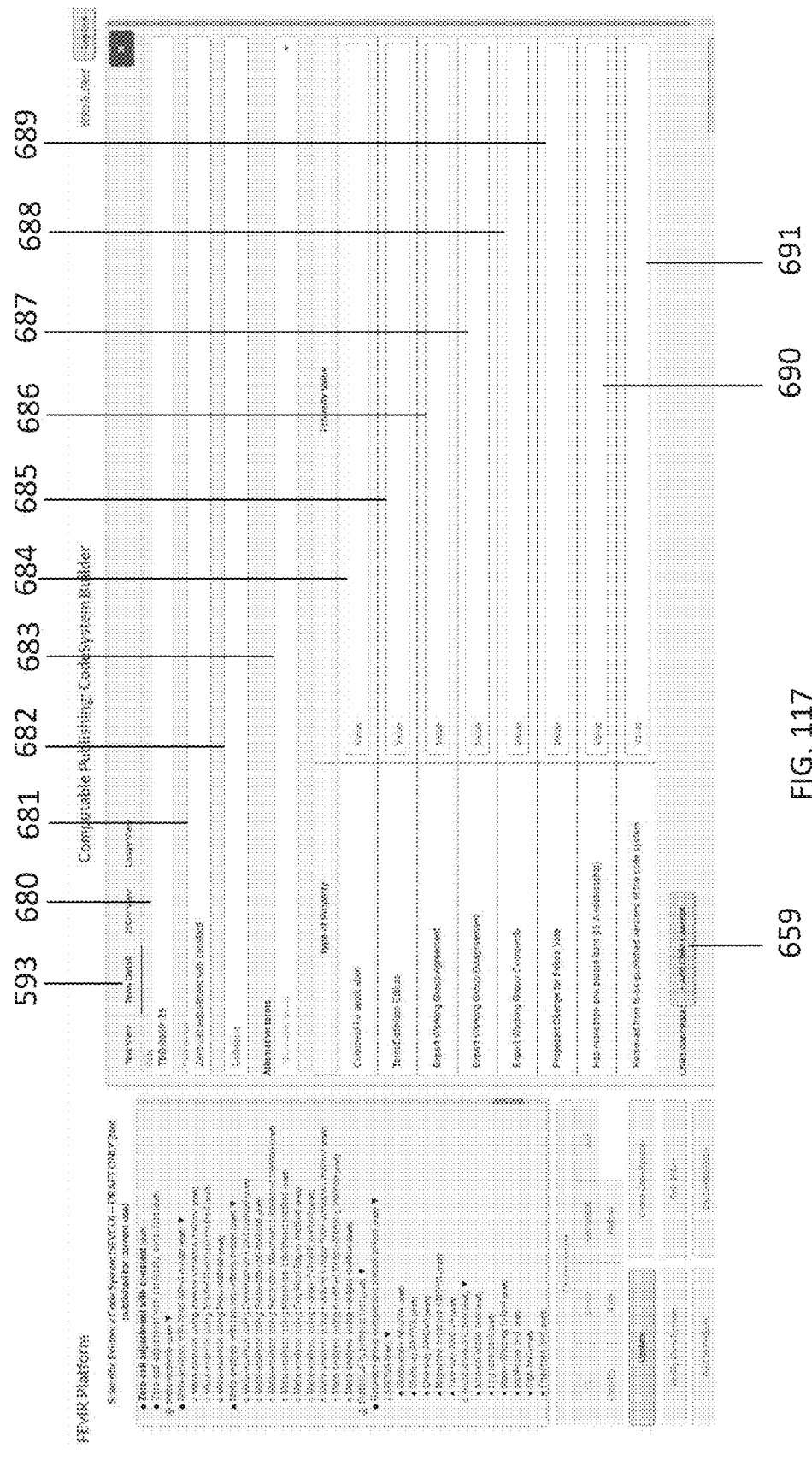
FIG. 117 is a screen shot of the Term Detail tab of the Computable Publishing: CodeSystem Builder tool version 0.15.0 corresponding to the term in FIG. 116, an exemplary system and method consistent with the present disclosure.

FIG. 117 shows an example of the user interface with data entry fields after clicking the button labeled "Edit CodeSystem Term" 679 in FIG. 116. FIG. 117 shows a label for the tab view with "Term Detail" 593, twelve data entry fields 680, 681, 682, 683, 684, 685, 686, 687, 688, 689, 690, 691, and a button labeled "+ Add Child Concept" 659.

Figure 118:
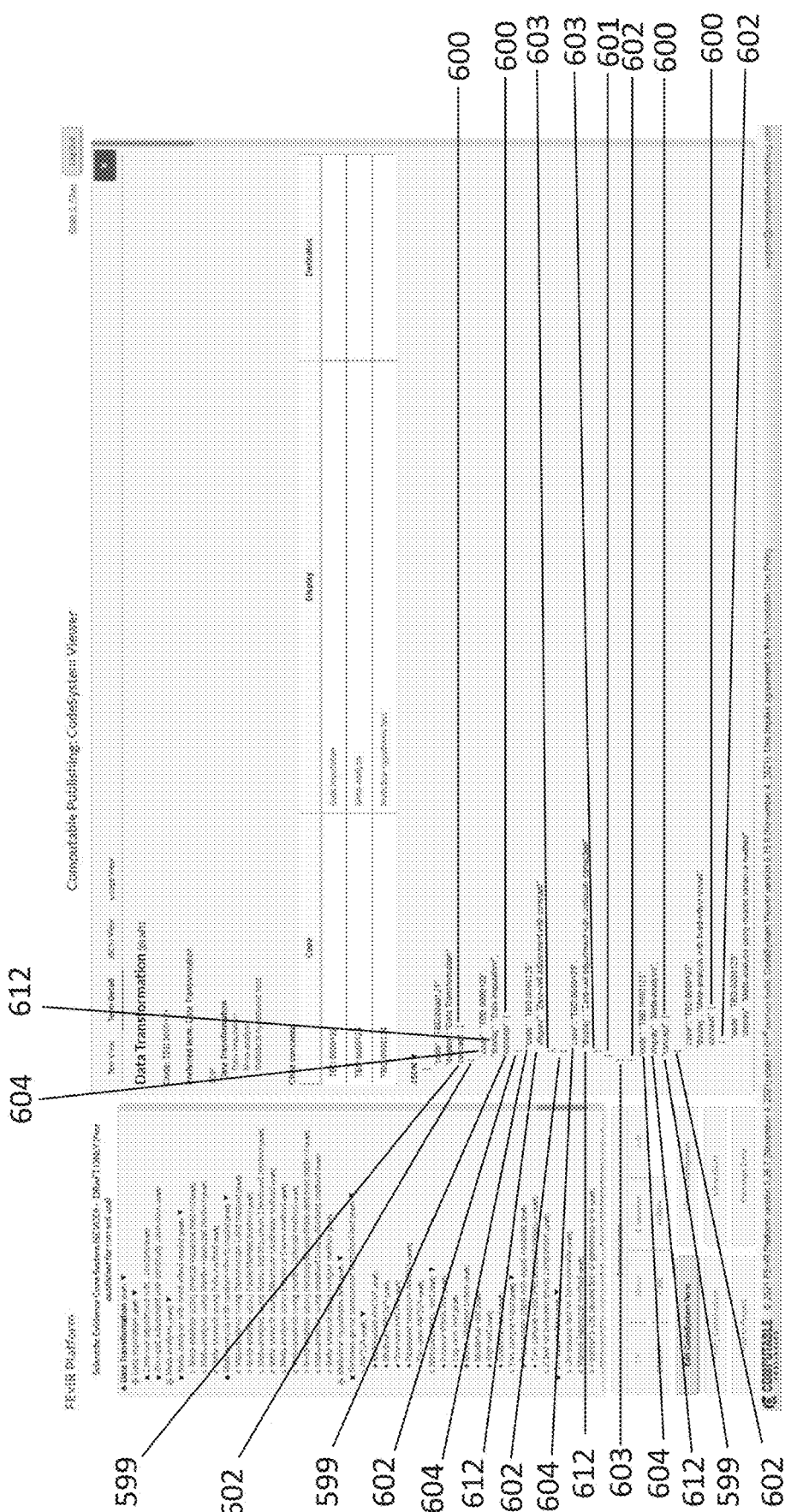
FIG. 118 is a portion of intermediate form of data, corresponding to FIG. 115.

In some embodiments, a system and method consistent with the present disclosure will convert such data specifying an array of matched datasets into current data in an intermediate form. FIG. 118 shows an example of current data consistent with the displayed data shown in FIG. 115 and converted into an intermediate form in JSON with concept elements 599 containing: [ 600 and ] 601 characters to represent that one or more instances of the concept element may be contained between these characters; multiple and nested instances of { 602 and } 603 characters to represent single instances of the concept element that is contained between each pair of these characters; and each instance of the concept element contains a code element 604 and a display element 612.

The advantages of this arrangement of elements are that data entry for repeated patterns of data elements without a prespecified number of repeats is efficient with repeated use of the element-specific data entry forms in the same pattern for rapid interpretation and repeated use, the ability to navigate to each element separately where the number of repeated elements is too high for efficient viewing and editing on a single webpage, clear identification of array instances and ability to edit data in specific instances, and that all these advantages can be achieved when tabular display of the parent array and of the child array is impractical. These advantages overcome problems noted in Background #0031.

Figure 119:
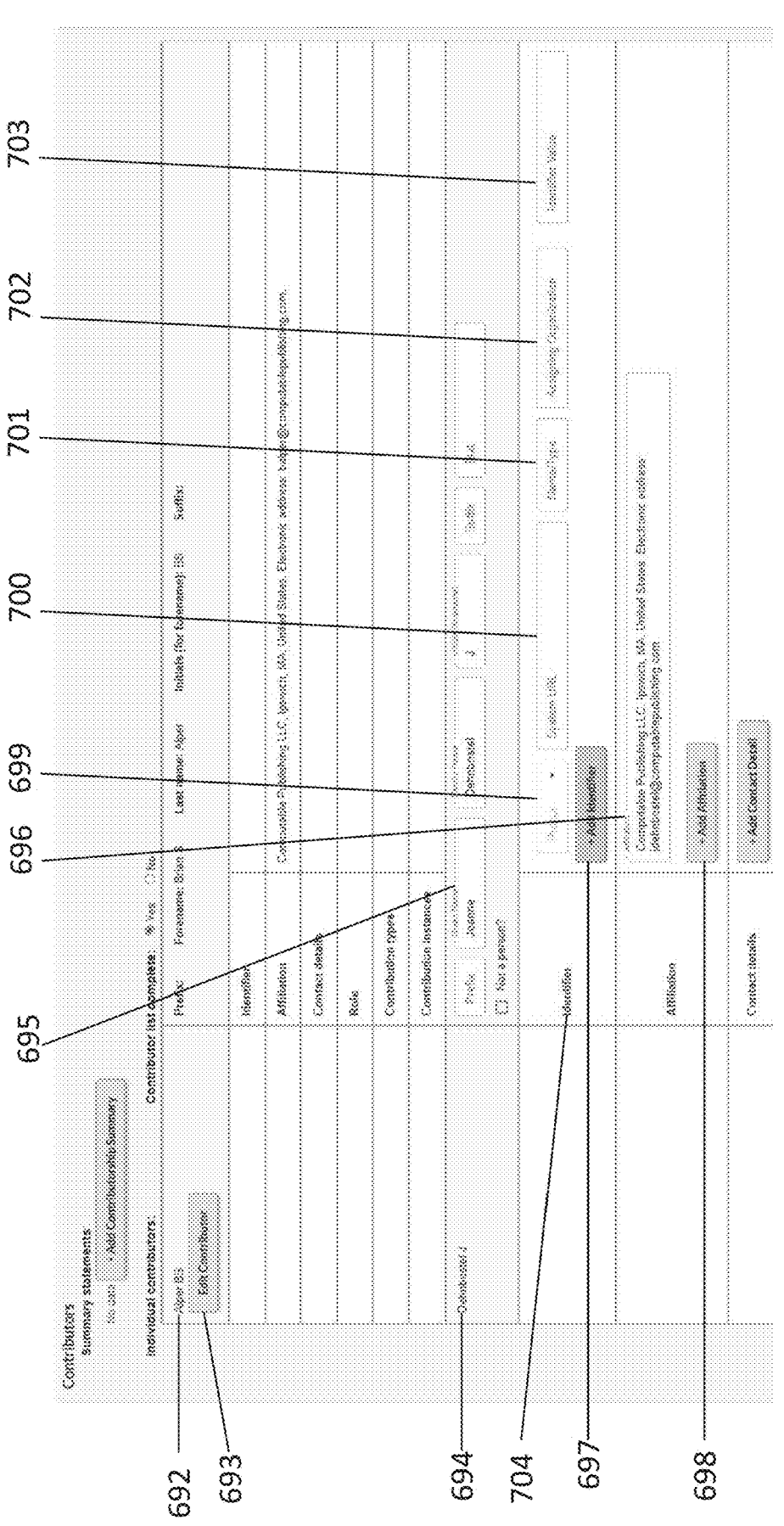

FIG. 119 shows an example of a novel arrangement of elements providing a technical improvement over the prior art with an editor GUI that presents a separate access control method for editing an instance of a compound data element in an array (herein referred to as the parent array), presents a tabular format for editing instances of data in compound data elements to a child array, and presents the data entry form for editing the instance-specific entry of the child array within the data entry form for the parent array.

FIG. 119 shows data related to one contributor ("Alper BS" 692) in an uneditable state with a button labeled "Edit Contributor" 693.

FIG. 119 shows data related to another contributor ("Dehnbostel J" 694) in an editable state corresponding to data displayed after clicking the button labeled "Edit Contributor" 693 that was present when in an uneditable state. FIG. 119 shows multiple data entry fields including data entry fields labeled "Given Name" 695 and "Affiliation" 696, multiple buttons for adding additional data elements including buttons labeled "+ Add Identifier" 697 and "+ Add Affiliation" 698, and a tabular set of data entry fields 699, 700, 701, 702, 703 in a table cell preceded to the left with a row header "Identifier" 704.

The advantages of this arrangement of elements are that data entry for repeated patterns of data elements without a prespecified number of repeats is efficient with repeated use of the element-specific data entry forms in the same pattern for rapid interpretation and repeated use, clear identification of array instances and ability to edit data in specific instances, and that computer processing time for interpretation and conversion of data in large arrays can be limited to the data identified for change. These advantages overcome problems noted in Background #0031.

FIG. 120 is a functional block diagram illustrating a distributed data processing environment, generally designated 800, suitable for operation of the program 812 consistent with the present disclosure. The term "distributed" as used herein describes a computer system that includes multiple, physically distinct devices that operate together as a single computer system. FIG. 120 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 800 includes computing device 810 optionally connected to network 820. Network 820 can be, for example, a telecommunications network, a local area network (LAN), a wide area network (WAN), such as the Internet, or a combination of the three, and can include wired, wireless, or fiber optic connections. Network 820 can include one or more wired and/or wireless networks that are capable of receiving and transmitting data, voice, and/or video signals, including multimedia signals that include voice, data, and video information. In general, network 820 can be any combination of connections and protocols that will support communications between computing device 810 and other computing devices (not shown) within distributed data processing environment 800.

Computing device 810 can be a standalone computing device, a management server, a web server, a mobile computing device, or any other electronic device or computing system capable of receiving, sending, and processing data. In an embodiment, computing device 810 can be a personal computer (PC), a desktop computer, a laptop computer, a tablet computer, a netbook computer, a smart phone, or any programmable electronic device capable of communicating with other computing devices (not shown) within distributed data processing environment 800 via network 820. In another embodiment, computing device 810 can represent a server computing system utilizing multiple computers as a server system, such as in a cloud computing environment. In yet another embodiment, computing device 810 represents a computing system utilizing clustered computers and components (e.g., database server computers, application server computers) that act as a single pool of seamless resources when accessed within distributed data processing environment 800.

In an embodiment, computing device 810 includes program 812. In an embodiment, program 812 is a program, application, or subprogram of a larger program for human data entry and conversion of data to expression in intermediate form for scientific knowledge. In an alternative embodiment, program 812 may be located on any other device accessible by computing device 810 via network 820.

In an embodiment, computing device 810 includes information repository 814. In an embodiment, information repository 814 may be managed by program 812. In an alternate embodiment, information repository 814 may be managed by the operating system of the computing device 810, alone, or together with, program 812. Information repository 814 is a data repository that can store, gather, compare, and/or combine information. In some embodiments, information repository 814 is located externally to computing device 810 and accessed through a communication network, such as network 820. In some embodiments, information repository 814 is stored on computing device 810. In some embodiments, information repository 814 may reside on another computing device (not shown), provided that information repository 814 is accessible by computing device 810. Information repository 814 includes, but is not limited to, system data, user data, API data, GUI data, and other data that is received by program 812 from one or more sources, and data that is created by program 812.

Information repository 814 may be implemented using any volatile or non-volatile storage media for storing information, as known in the art. For example, information repository 814 may be implemented with Random-Access Memory (RAM), Solid-State Drives (SSD), one or more independent hard disk drives, multiple hard disk drives in a Redundant Array Of Independent Disks (RAID), optical library, or a tape library. Similarly, information repository 814 may be implemented with any suitable storage architecture known in the art, such as, but not limited to, a relational database, an object database, or one or more tables.

In the example of FIG. 120, distributed data processing environment 800 also includes user device 832, user device 834, and user device n, optionally connected to network 820. Although only three user devices are shown in the example of FIG. 120, in other embodiments, distributed data processing environment 800 may include any number of user devices.

User device 832, user device 834, and user device n, can each be a standalone computing device, a management server, a web server, a mobile computing device, or any other electronic device or computing system capable of receiving, sending, and processing data. In an embodiment, user device 832, user device 834, and user device n, can each be a personal computer (PC), a desktop computer, a laptop computer, a tablet computer, a netbook computer, a smart phone, or any programmable electronic device capable of communicating with other computing devices (not shown) within distributed data processing environment 800 via network 820. In another embodiment, user device 832, user device 834, and user device n, can each represent a server computing system utilizing multiple computers as a server system, such as in a cloud computing environment. In yet another embodiment, user device 832, user device 834, and user device n, each represents a computing system utilizing clustered computers and components (e.g., database server computers, application server computers) that act as a single pool of seamless resources when accessed within distributed data processing environment 800.

Figure 121:
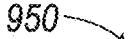

The example system 850 of FIG. 121 also includes GUI 1 961, GUI 2 963, GUI 3 965, and GUI 4 967, although the system may include any number of GUIs. Each GUI may contain one or more APIs to support interfaces that may include, but are not limited to, data display interfaces and data entry interfaces. The APIs are shown in FIG. 121 as API 1 962, API 2 964, API 3 966, API 4 968, API 5 953, API 6 954, API 7 955, API 8 956, and API 9 957.

Some non-limiting examples of these APIs may include data display interfaces Citation viewer (e.g., CitationViewer.js), CodeSystem Viewer (e.g., CodeSystemViewer.js), Evidence Viewer (e.g., EvidenceViewer.js), and Group Viewer (e.g., GroupViewer.js); data entry interfaces Citation Builder (e.g., CitationBuilder.js), CodeableConcept Builder (e.g., CodeableConceptBuilder.js), CodeSystem Builder (e.g., CodeSystemBuilder.js), and Group (Population/Sample) Builder (e.g., GroupBuilder.js). In addition, the APIs may include, but are not limited to, APIs supporting data extraction, such as MedlineExtractor.py 104 for data in MEDLINE and Research Information Systems (RIS) format and ClinicalTrialsExtractor.py for data in National Clinical Trials (NCT) format, and APIs supporting data transformation between structured forms, such as MedlineToFevir.py and ClinicalTrialsToFevir.py.

FIG. 122 is a flowchart diagram, generally designated workflow 900, depicting operations for the program for human data entry and conversion of data to expression in intermediate form for scientific knowledge, on the distributed data processing environment of FIG. 120, consistent with the present disclosure. In an alternative embodiment, the operations of workflow 900 may be performed by any other program while working with program 812.

It should be appreciated that embodiments of the present disclosure provide at least for human data entry and conversion of data to expression in intermediate form for scientific knowledge. However, FIG. 122 provides only an illustration of one implementation and does not imply any limitations with regard to the environments in which different embodiments may be implemented. Many modifications to the depicted environment may be made by those skilled in the art without departing from the scope of the disclosure as recited by the claims.

It should be appreciated that the process depicted in FIG. 122 illustrates one possible iteration of the program 812 for human data entry and conversion of data to expression in intermediate form for scientific knowledge, which repeats each a user requires human data entry and conversion of data to expression in intermediate form for scientific knowledge.

In the illustrated example 900, program 812 displays a creator GUI for entry of a first new data with paired data meanings (operation 902). In the illustrated example embodiment, program 812 displays a creator GUI for entry of a first new data by a user. A creator GUI, as described above, is a GUI specifically for entry of new data in the form of research knowledge by a user. The creator GUI is, therefore, formatted to facilitate the entry of the new data for a user in a human-readable form, or in the form normally used by the user for research knowledge. The new data received from the user may include paired meanings for the first new data.

As used in this disclosure, research knowledge may include, but is not limited to, statistical (quantitative) and qualitative findings from scientific investigation (research results), method specification for research conduct, registration of research study protocols and progress, assessments of reliability of research conduct and reporting, aggregations and synthesis of any of the aforementioned items, attribution of contributorship to any of the aforementioned items, and referential citations to any of the aforementioned items.

Program 812 receives the first new data from the user (operation 904). Program 812 receives the first new data that was entered into the creator GUI in operation 902.

Program 812 displays an uploader graphical user interface to receive a file containing a second new data in a known structured form (operation 906). In the illustrated example embodiment, program 812 displays an uploader GUI to receive a file from the user containing a second new data. An uploader GUI is a GUI specifically for uploading a file containing new data in the form of research knowledge. The uploader GUI is, therefore, formatted in a human-readable form to facilitate uploading the file containing the new data from the user.

Program 812 uses an API to extract the second new data from the file (operation 908). Program 812 uses an API that is specific to the known structured form of the uploaded file to extract the second new data from the file. For example, the API may be specific to a file that contains data in Medline format. Program 812 scans the file and extracts the relevant data in the known structured form.

Program 812 uses an API to convert the first new data and the second new data into a first current data in an intermediate form (operation 910). In some embodiments, the intermediate form is the Fast Healthcare Interoperability Resources (FHIR) standard. The API to convert the first new data and the second new data into the intermediate form may include, but is not limited to, MedlineExtractor.py for data in MEDLINE format, ClinicalTrialsExtractor.py for data in National Clinical Trials (NCT) format, or FevirAPI.js for data from the Fast Evidence Interoperability Resources (FEvIR) Platform.

Program 812 stores the first current data in the data storage server (operation 912). Once the first new data and the second new data have been converted into the first current data in the intermediate form, program 812 saves the second current data in the data storage server.

Program 812 uses an API to convert the first current data into a viewable data in a human-readable display form (operation 914). Program 812 converts the first current data into a viewable data in a human-readable display form to allow the user to view or edit the first current data, or to add additional data to the record.

Program 812 displays the viewable data in a reader GUI (operation 916). Program 812 displays the viewable data to the user in a reader GUI, where the reader GUI is one that displays the data that has been converted from the intermediate form into viewable data in a human-readable form to facilitate viewing by the user. Program 812 then ends for this cycle.

FIG. 123 is a block diagram depicting components of one example of the computing device 810 from FIG. 120 suitable for program 812, in accordance with at least one embodiment of the disclosure. FIG. 123 displays the computing device or computer 1000, one or more processor(s) 1004 (including one or more computer processors), a communications fabric 1002, a memory 1006 including, a random-access memory (RAM) 1016 and a cache 1018, a persistent storage 1008, a communications unit 1012, I/O interfaces 1014, a display 1022, and external devices 1020. It should be appreciated that FIG. 123 provides only an illustration of one embodiment and does not imply any limitations with regard to the environments in which different embodiments may be implemented. Many modifications to the depicted environment may be made.

As depicted, the computer 1000 operates over the communications fabric 1002, which provides communications between the computer processor(s) 1004, memory 1006, persistent storage 1008, communications unit 1012, and input/output (I/O) interface(s) 1014. The communications fabric 1002 may be implemented with an architecture suitable for passing data or control information between the processors 1004 (e.g., microprocessors, communications processors, and network processors), the memory 1006, the external devices 1020, and any other hardware components within a system. For example, the communications fabric 1002 may be implemented with one or more buses.

The memory 1006 and persistent storage 1008 are computer readable storage media. In the depicted embodiment, the memory 1006 comprises a RAM 1016 and a cache 1018. In general, the memory 1006 can include any suitable volatile or non-volatile computer readable storage media. Cache 1018 is a fast memory that enhances the performance of processor(s) 1004 by holding recently accessed data, and near recently accessed data, from RAM 1016.

Program instructions for program 812 may be stored in the persistent storage 1008, or more generally, any computer readable storage media, for execution by one or more of the respective computer processors 1004 via one or more memories of the memory 1006. The persistent storage 1008 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

The communications unit 1012, in these examples, provides for communications with other data processing systems or devices. In these examples, the communications unit 1012 includes one or more network interface cards. The communications unit 1012 may provide communications through the use of either or both physical and wireless communications links. In the context of some embodiments of the present disclosure, the source of the various input data may be physically remote to the computer 1000 such that the input data may be received, and the output similarly transmitted via the communications unit 1012.

The I/O interface(s) 1014 allows for input and output of data with other devices that may be connected to computer 1000. For example, the I/O interface(s) 1014 may provide a connection to external device(s) 1020 such as a keyboard, a keypad, a touch screen, a microphone, a digital camera, and/or some other suitable input device. External device(s) 1020 can also include portable computer readable storage media such as, for example, thumb drives, portable optical or magnetic disks, and memory cards. Software and data used to practice embodiments of the present disclosure, e.g., program 812, can be stored on such portable computer readable storage media and can be loaded onto persistent storage 1008 via the I/O interface(s) 1014. I/O interface(s) 1014 also connect to a display 1022.

Display 1022 provides a mechanism to display data to a user and may be, for example, a computer monitor. Display 1022 can also function as a touchscreen, such as a display of a tablet computer.

According to one aspect of the disclosure there is thus provided a system for acquiring data representing research knowledge in a non-standard form and converting such data to an intermediate form, the system including: a data storage server; one or more application programming interfaces (APIs); and a computing device. The computing device is configured to: display a creator graphical user interface (GUI) for entry of a first new data by a user; receive the first new data from the user; convert the first new data into a first current data in the intermediate form using a first API of the one or more APIs; store the first current data in the data storage server; convert the first current data into a viewable data in a human-readable display form using a second API of the one or more APIs; and display the viewable data in one or more reader GUIs.

According to another aspect of the disclosure, there is thus provided a non-transitory storage device that includes machine-readable instructions that, when executed by one or more processors, cause the one or more processors to perform operations, comprising: display a creator graphical user interface (GUI) for entry of a first new data by a user; receive the first new data from the user; convert the first new data into a first current data in an intermediate form using a first API of the one or more APIs; store the first current data in a data storage server; convert the first current data into a viewable data in a human-readable display form using a second API of the one or more APIs; and display the viewable data in one or more reader GUIs.

According to yet another aspect of the disclosure, there is provided a system for acquiring data representing research knowledge in a non-standard form and converting such data to an intermediate form, the system comprising: a data storage server; one or more application programming interfaces (APIs); and a computing device. The computing device is configured to: display a creator graphical user interface (GUI) for entry of a first new data by a user, wherein the first new data is research knowledge; receive the first new data from the user; display one or more uploader graphical user interfaces (GUIs) to receive a file containing a second new data in a known structured form, wherein the second new data is research knowledge; extract the second new data from the file using a first application programming interface (API) of the one or more APIs; convert the first new data and the second new data into a first current data in the intermediate form using a second API of the one or more APIs; store the first current data in the data storage server; convert the first current data into a viewable data in a human-readable display form using a third API of the one or more APIs; and display the viewable data in one or more reader GUIs.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hard-wired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, machine-readable instructions that when executed by circuitry perform the operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include one or more non-transitory computer readable storage media having computer readable program instructions thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but is not limited to, an electronic storage device, a magnetic storage device, an optical storage device, an electromagnetic storage device, a semiconductor storage device, or any suitable combination of the foregoing. A non-exhaustive list of more specific examples of the one or more non-transitory computer readable storage media includes the following: a portable computer diskette, a hard disk, a RAM, a ROM, an EPROM or Flash memory, a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from one or more non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in one or more non-transitory computer readable storage media within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in one or more non-transitory computer readable storage media that can direct a computer, a programmable data processing apparatus, and/or other devices to function in a particular manner, such that the one or more non-transitory computer readable storage media having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for acquiring data representing research knowledge in a non-standard form and converting such data to an intermediate form, the system comprising:
a data storage server;
one or more application programming interfaces (APIs); and
a computing device, the computing device configured to:
display a creator graphical user interface (GUI) for entry of a first new data by a user;
receive the first new data from the user;
convert the first new data into a first current data in the intermediate form using a first API of the one or more APIs;
store the first current data in the data storage server;
convert the first current data into a viewable data in a human-readable display form using a second API of the one or more APIs;
display the viewable data in one or more reader GUIs;
responsive to receiving a signal from a user, display the first current data in one or more developer GUIs comprising displaying one or more picklists with single-phrase display values to allow a predetermined pattern to be selected in one operation;
receive one or more revised data values and/or one or more second new data values from the user; and
convert the one or more revised data values and/or the one or more second new data values into a second current data in the intermediate form using a third API of the one or more APIs.

2. The system of claim 1 further comprising:
display the first current data in one or more editor GUIs;
responsive to receiving one or more revised data values and/or one or more second new data values from the user, convert the one or more revised data values and/or the one or more second new data values into a second current data in the intermediate form using a fourth API of the one or more APIs; and
store the second current data in the data storage server.

3. The system of claim 1, wherein the intermediate form is a Fast Healthcare Interoperability Resources (FHIR) standard.

4. The system of claim 1, wherein store the first current data in the data storage server comprises:
responsive to receiving a signal from the user that the first current data is correct, store the first current data in the data storage server.

5. The system of claim 1, wherein a type of data of the first new data is selected from the group consisting of a knowledge object, a coding, a codable concept, an identifier, a classifier, a text string value, and metadata.

6. The system of claim 5, wherein the codable concept is a data type consisting of any number of coding values and/or one text string value.

7. The system of claim 1, wherein display the creator GUI for entry of the first new data further comprises:
display the creator GUI for entry of the first new data, wherein the first new data is an identity of a code system using either a Universal Resource Indicator (URI) value or a text string value other than a URI; and
responsive to a user selecting the identity of the code system, converting the selection of the identity of the code system to the intermediate form.

8. A non-transitory storage device that includes machine-readable instructions that, when executed by one or more processors, cause the one or more processors to perform operations, comprising:
display a creator graphical user interface (GUI) for entry of a first new data by a user;
receive the first new data from the user;
convert the first new data into a first current data in an intermediate form using a first application programming interface (API) of one or more APIs;
store the first current data in a data storage server;
convert the first current data into a viewable data in a human-readable display form using a second API of the one or more APIs;
display the viewable data in one or more reader GUIs;
responsive to receiving a signal from a user, display the first current data in one or more developer GUIs;
receive one or more revised data values and/or one or more second new data values from the user;
determine whether the one or more revised data values and/or the one or more second new data values are in the intermediate form using a third API of the one or more APIs; and
responsive to determining that the one or more revised data values and/or the one or more second new data values are not in the intermediate form, signal the user to check the one or more revised data values and/or the one or more second new data values.

9. The non-transitory storage device of claim 8, wherein display the viewable data in the one or more reader GUIs comprises:
display the viewable data in one or more editor GUIs;
receive one or more revised data values and/or one or more second new data values from a user;
convert the one or more revised data values and/or the one or more second new data values into a second current data in the intermediate form using a fourth API of the one or more APIs; and
store the second current data in the data storage server.

10. The non-transitory storage device of claim 8, wherein a type of data of the first current data is selected from the group consisting of a knowledge object, a coding, a codable concept, an identifier, a classifier, a text string value, and metadata.

11. The non-transitory storage device of claim 10, wherein the codable concept is a data type consisting of any number of coding values and/or one text string value.

12. The non-transitory storage device of claim 8, wherein the first new data represents research knowledge and the research knowledge includes at least one of statistical (quantitative) and qualitative findings from scientific investigation (research results), method specification for research conduct, registration of research study protocols and progress, assessments of reliability of research conduct and reporting, aggregations and synthesis, attribution of contributorship, and referential citations.

13. A system for acquiring data representing research knowledge in a non-standard form and converting such data to an intermediate form, the system comprising:

a data storage server;

one or more application programming interfaces (APIs); and a computing device, the computing device configured to:

display a creator graphical user interface (GUI) for entry of a first new data by a user, wherein the first new data is represents the research knowledge;

receive the first new data from the user;

display one or more uploader graphical user interfaces (GUIs) to receive a file containing a second new data in a known structured form, wherein the second new data is represents the research knowledge;

extract the second new data from the file using a first application programming interface (API) of the one or more APIs;

convert the first new data and the second new data into a first current data in the intermediate form using a second API of the one or more APIs;

store the first current data in the data storage server;

convert the first current data into a viewable data in a human-readable display form using a third API of the one or more APIs; and display the viewable data in one or more reader GUIs.

14. The system of claim 13, wherein the research knowledge includes at least one of statistical (quantitative) and qualitative findings from scientific investigation (research results), method specification for research conduct, registration of research study protocols and progress, assessments of reliability of research conduct and reporting, aggregations and synthesis, attribution of contributorship, and referential citations.

15. The system of claim 13, wherein the intermediate form is a Fast Healthcare Interoperability Resources (FHIR) standard.

16. The system of claim 13, further comprising:

responsive to receiving a signal from a user, display the first current data in one or more developer GUIs;

receive one or more revised data values and/or one or more new data values from the user; and convert the one or more revised data values and/or the one or more new data values into a second current data in the intermediate form using a fourth API of the one or more APIs.

\*   \*   \*   \*   \*